United States Patent [19]
Balkanski et al.

[11] Patent Number: 5,341,318
[45] Date of Patent: Aug. 23, 1994

[54] SYSTEM FOR COMPRESSION AND DECOMPRESSION OF VIDEO DATA USING DISCRETE COSINE TRANSFORM AND CODING TECHNIQUES

[75] Inventors: Alexandre Balkanski, San Francisco; Steve Purcell, Mountain View; James Kirkpatrick, San Jose, all of Calif.

[73] Assignee: C-Cube Microsystems, Inc., Milpitas, Calif.

[21] Appl. No.: 985,092

[22] Filed: Dec. 1, 1992

Related U.S. Application Data

[60] Division of Ser. No. 818,403, Jan. 3, 1992, Pat. No. 5,191,548, which is a continuation of Ser. No. 495,583, Mar. 16, 1990, abandoned, which is a continuation-in-part of Ser. No. 494,242, Mar. 14, 1990, Pat. No. 5,196,946.

[51] Int. Cl.$^5$ .......................... G06F 7/38; H04N 11/00
[52] U.S. Cl. ............................ 364/725; 364/715.02; 358/427
[58] Field of Search ................. 358/427, 42, 43, 136, 358/137, 133, 261.1; 364/725, 715.02

[56] References Cited

U.S. PATENT DOCUMENTS

| | | | |
|---|---|---|---|
| 4,302,775 | 11/1981 | Widergren et al. | 358/136 |
| 4,396,906 | 8/1983 | Weaver | 358/427 |
| 4,410,965 | 10/1983 | Moore | 358/427 |
| 4,939,583 | 7/1990 | Tsuboi et al. | 358/427 |
| 4,982,282 | 1/1991 | Saito et al. | 358/427 |
| 5,113,255 | 5/1992 | Nagata et al. | 358/136 |
| 5,162,898 | 11/1992 | Aono | 358/133 |

OTHER PUBLICATIONS

Nomura et al., "Implementation of Video CODEC with Programmable Parellel DSP," 1989 IEEE, pp. 0908–0912.

*Primary Examiner*—Long T. Nguyen
*Attorney, Agent, or Firm*—Skjerven, Morrill, MacPherson, Franklin & Friel

[57] ABSTRACT

A digital video compression system and an apparatus implementing this system are disclosed. Specifically, matrices of pixels in the RGB signal format are converted into YUV representation, including a step of selectively sampling the chrominance components. The signals are then subjected to a discrete cosine transform (DCT). A circuitry implementing the DCT in a pipelined architecture is provided. A quantization step eliminates DCT coefficients having amplitude below a set of preset thresholds. The video signal is further compressed by coding the elements of the quantized matrices in a zig-zag manner. This representation is further compressed by Huffman codes. Decompression of the signal is substantially the reverse of compression steps. The inverse discrete cosine transform (IDCT) may be implemented by the DCT circuit. Circuits for implementing RGB to YUV conversion, DCT, quantization, coding and their decompression counterparts are disclosed. The circuits may be implemented in the form an integrated circuit chip.

16 Claims, 95 Drawing Sheets

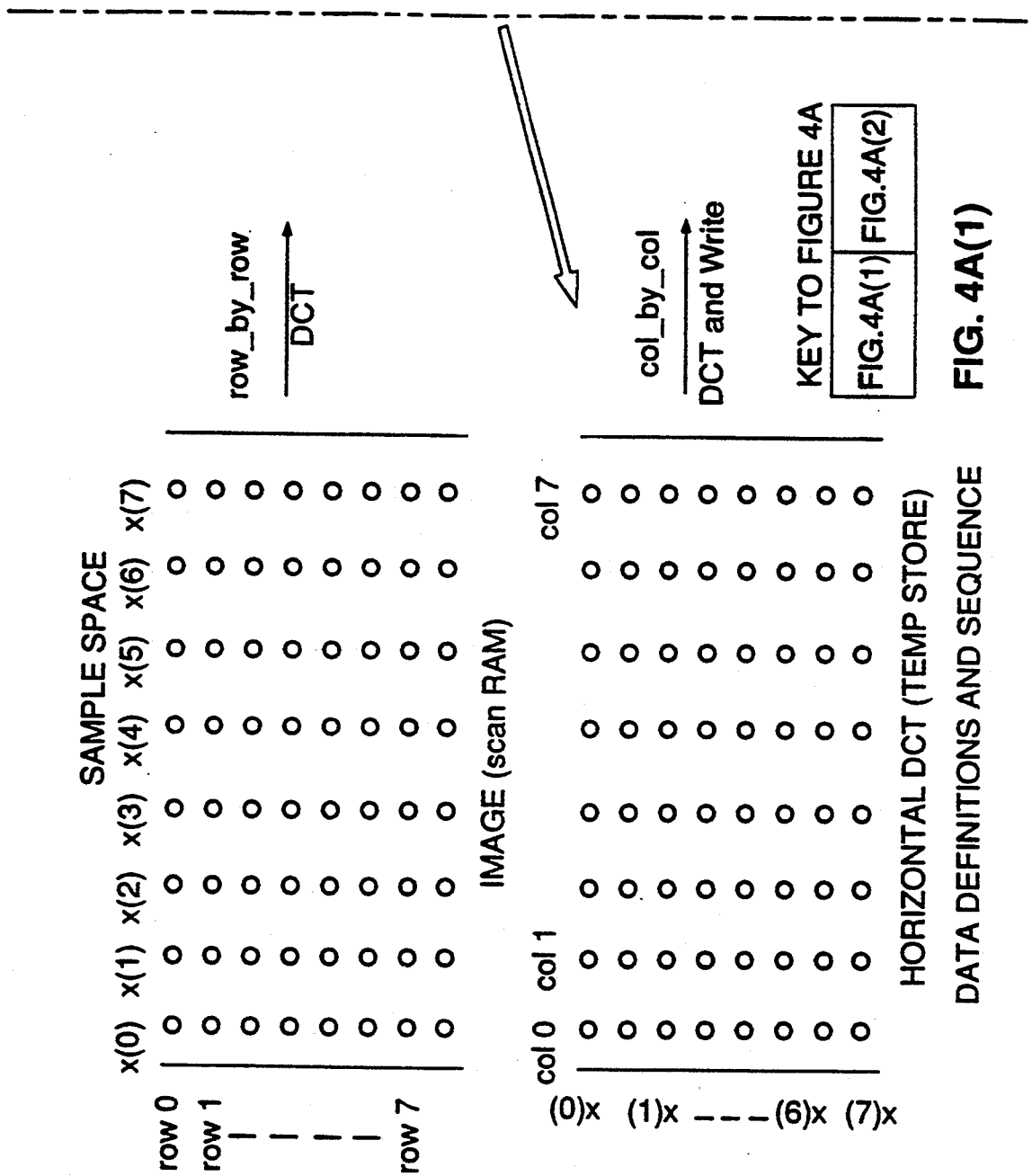

FIG. 4A(2)

DATA DEFINITIONS AND SEQUENCE x(0) x(1) x(2) x(3) x(4) x(5) x(6) x(7)

row 0
row 1
----
row 7

HORIZONTAL DCT (TEMP STORE)

col 0  col 1          col 7

(0)x  (1)x  ---  (6)x  (7)x

WRITTEN_TO_ZIGZAG

TRANSFORM SPACE

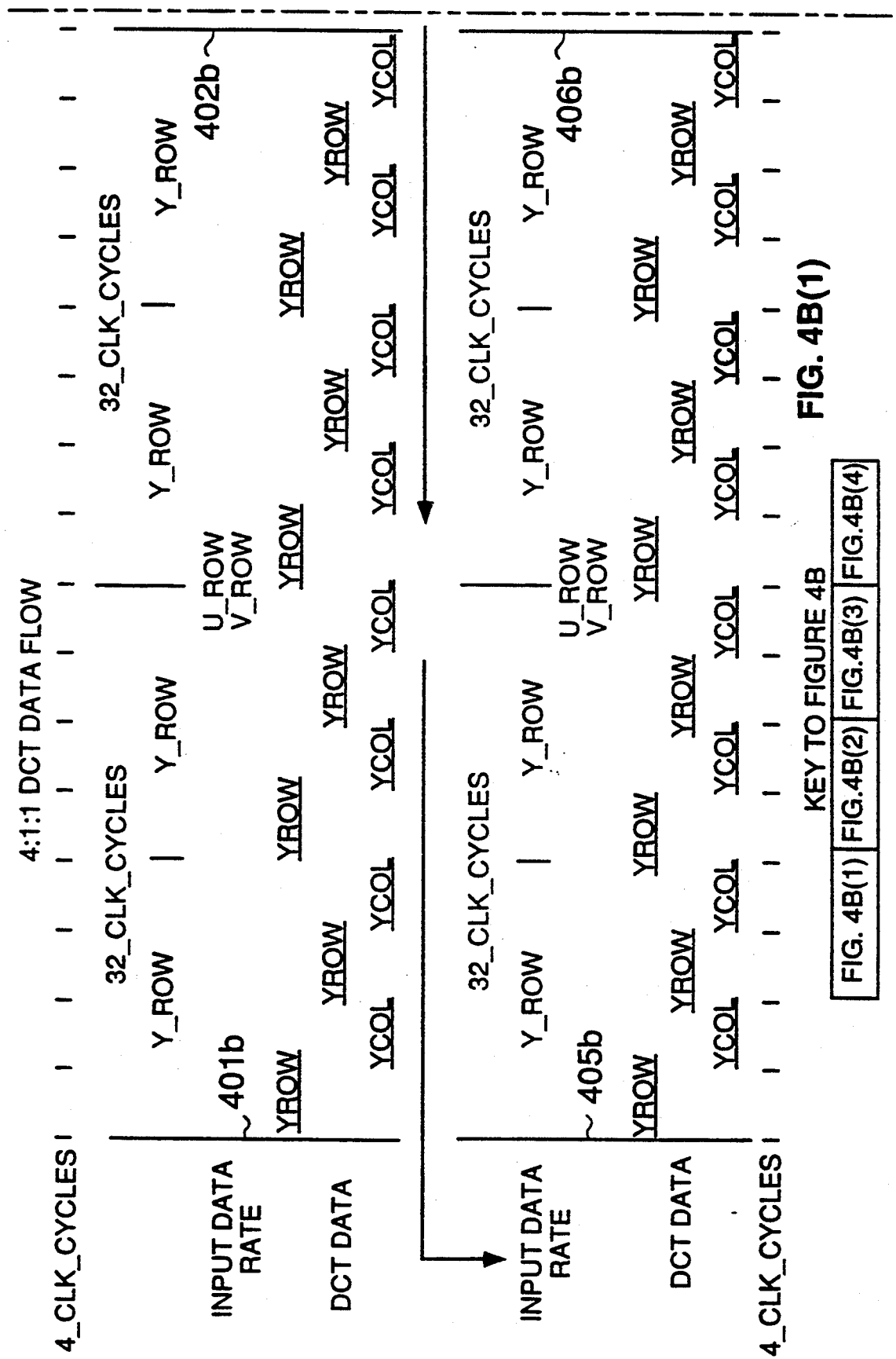
FIG. 4B(1)

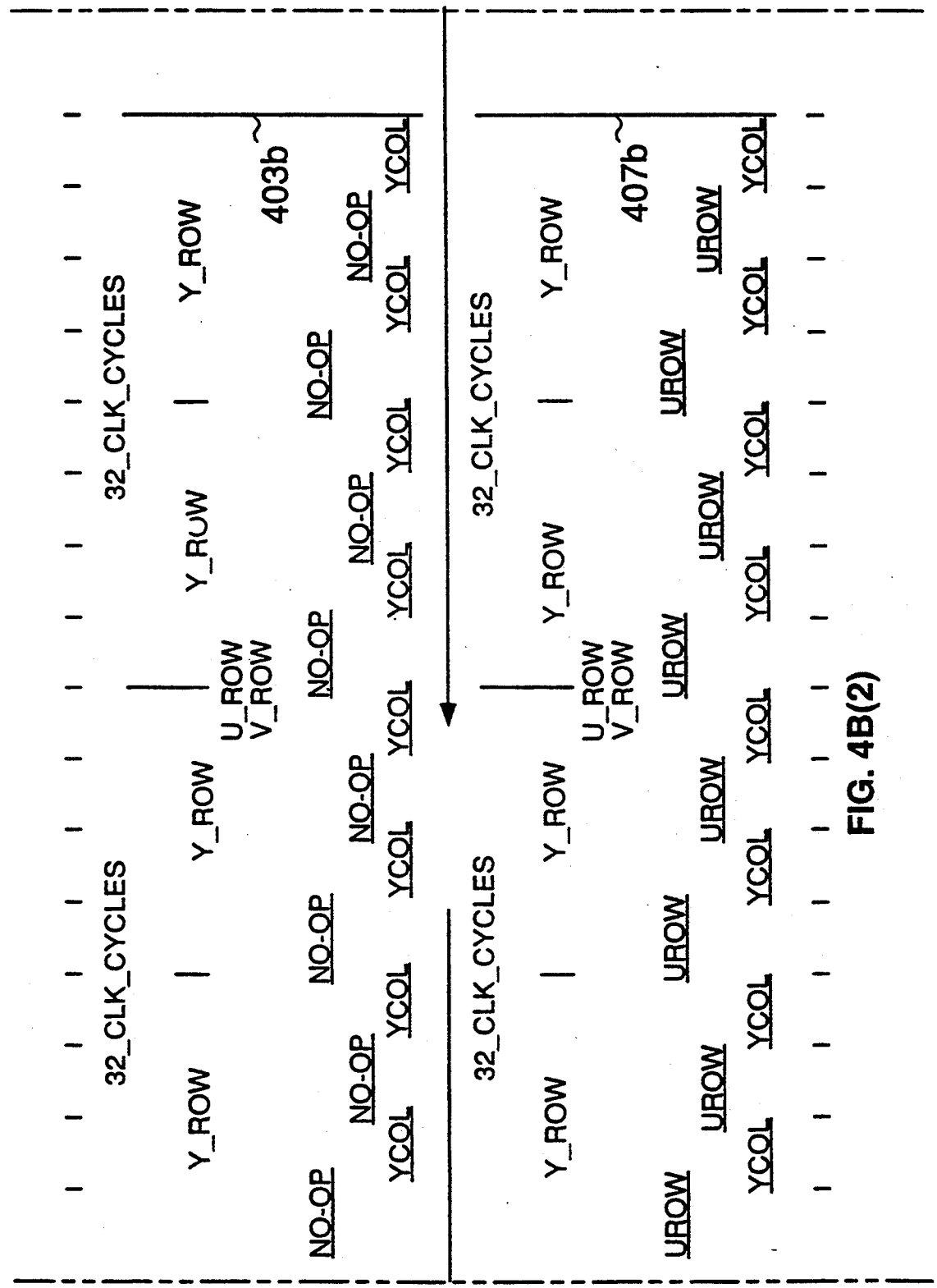
FIG. 4B(2)

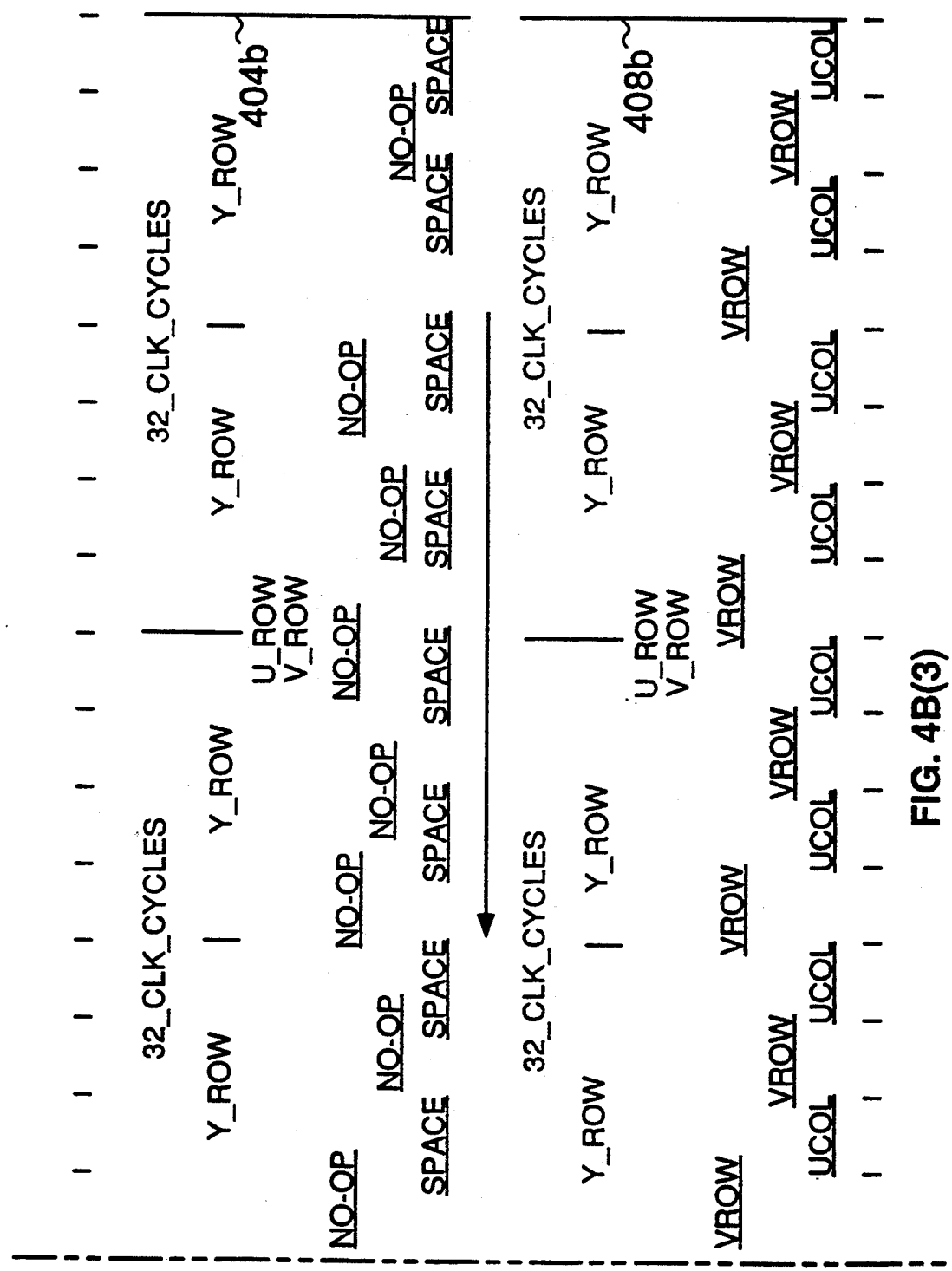
FIG. 4B(3)

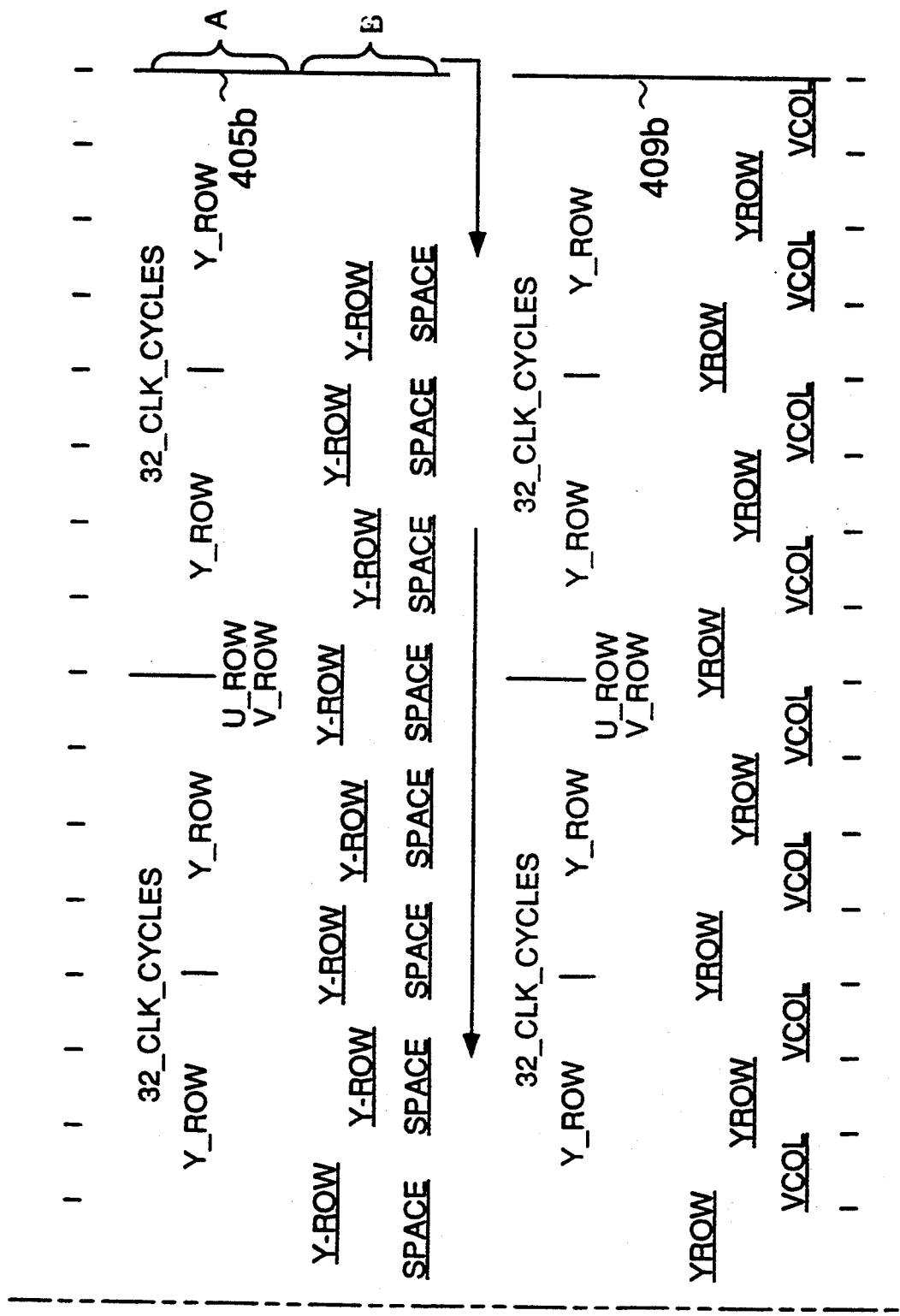
FIG. 4B(4)

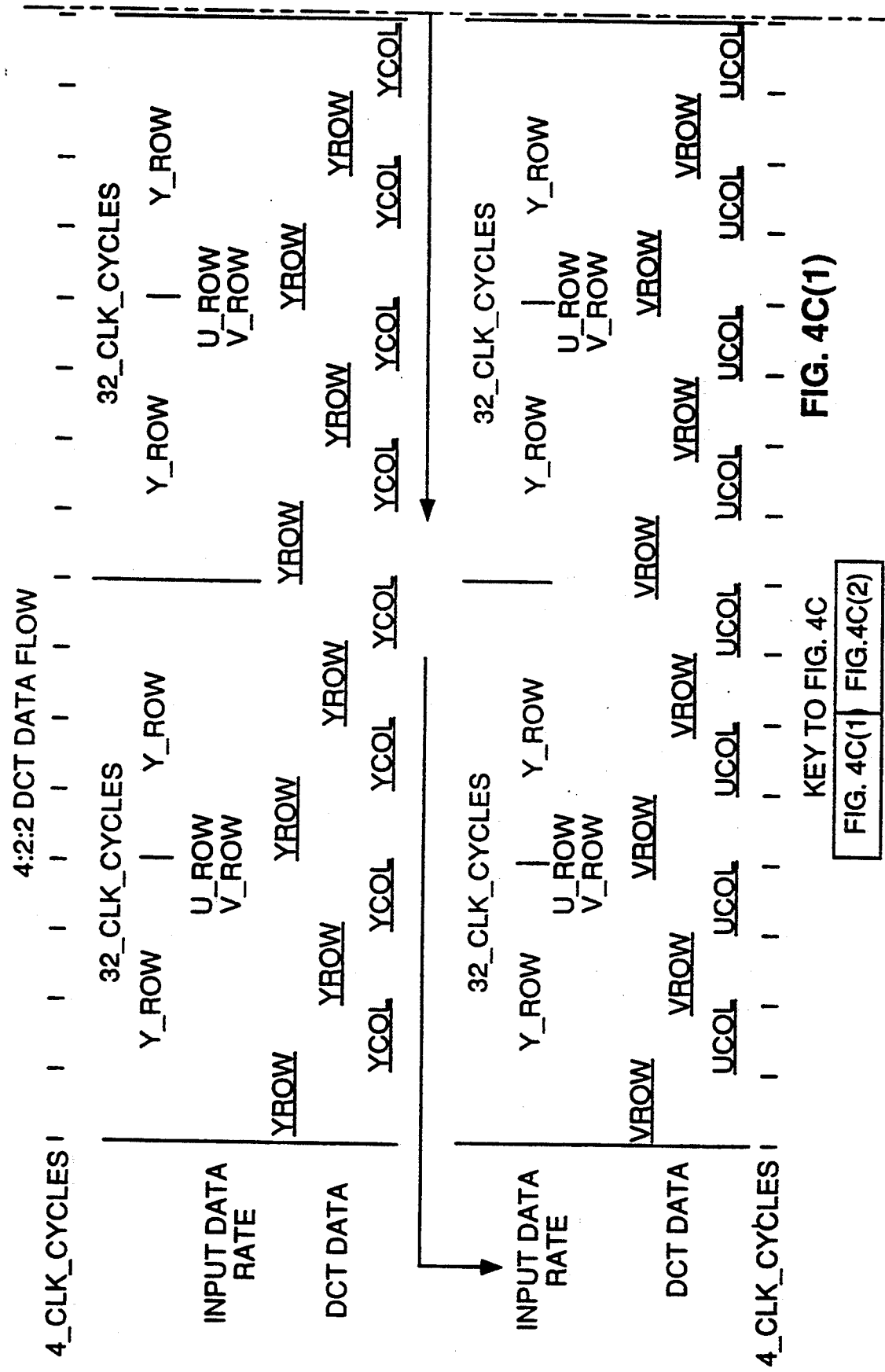
FIG. 4C(1)

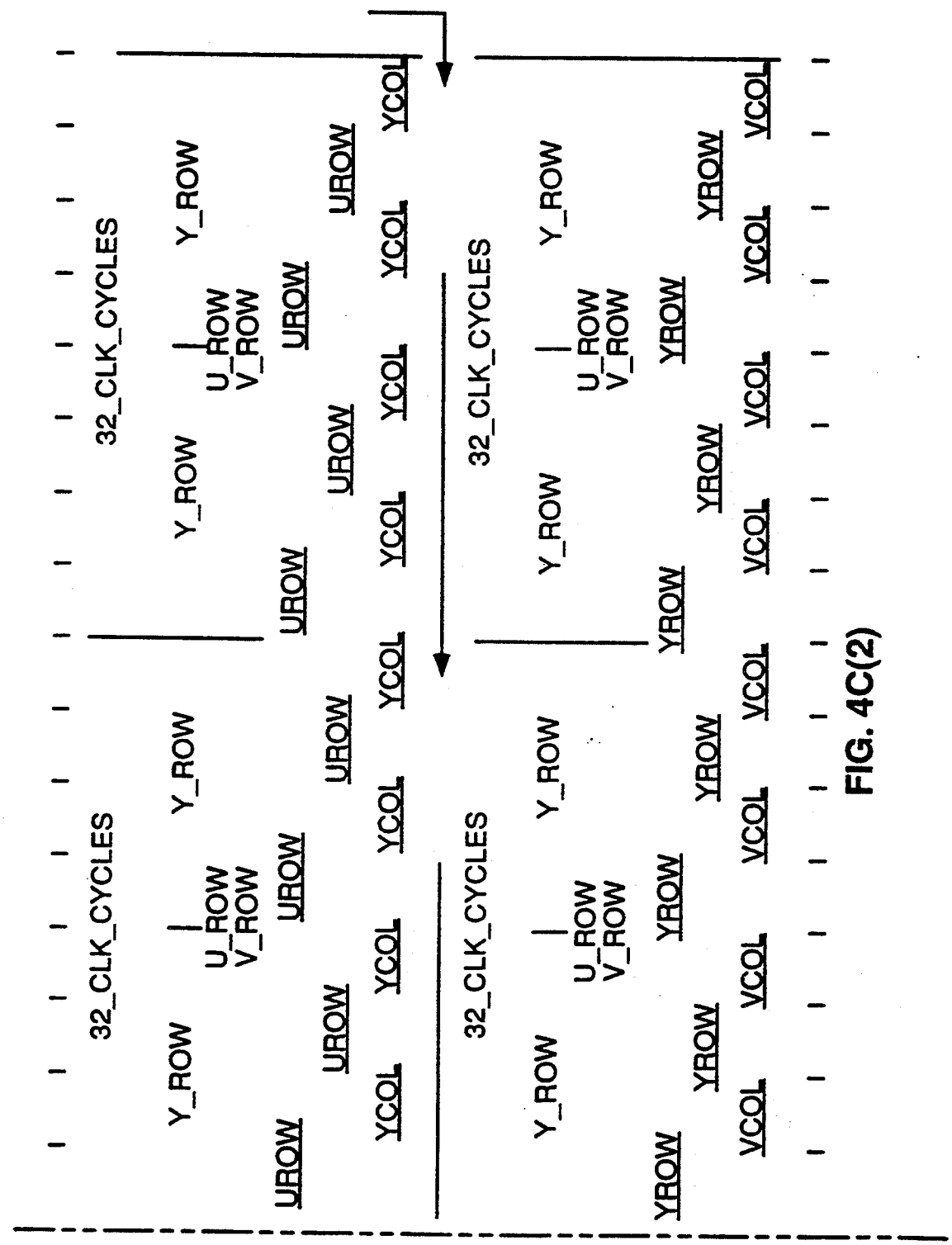
FIG. 4C(2)

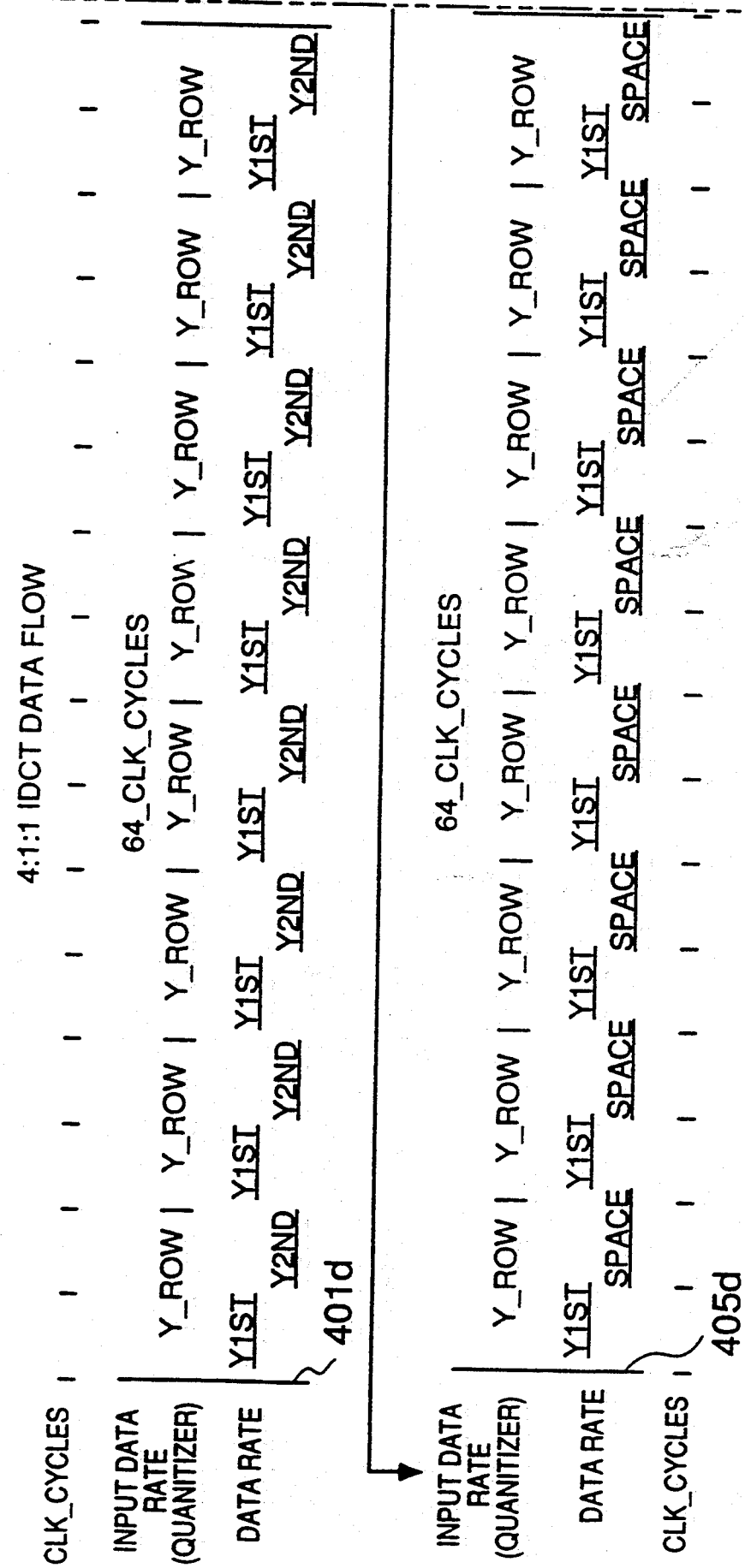
FIG. 4D(1)

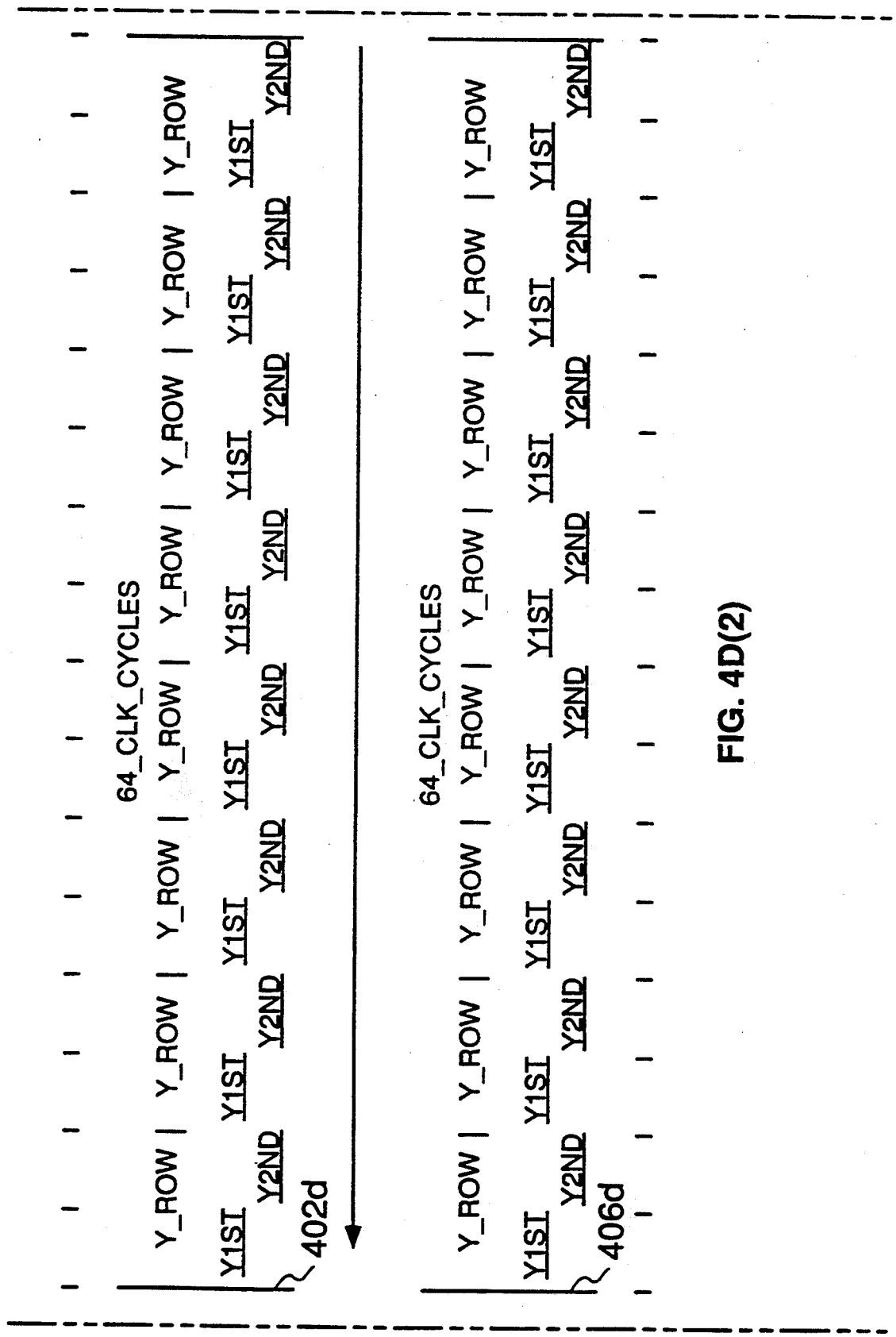
FIG. 4D(2)

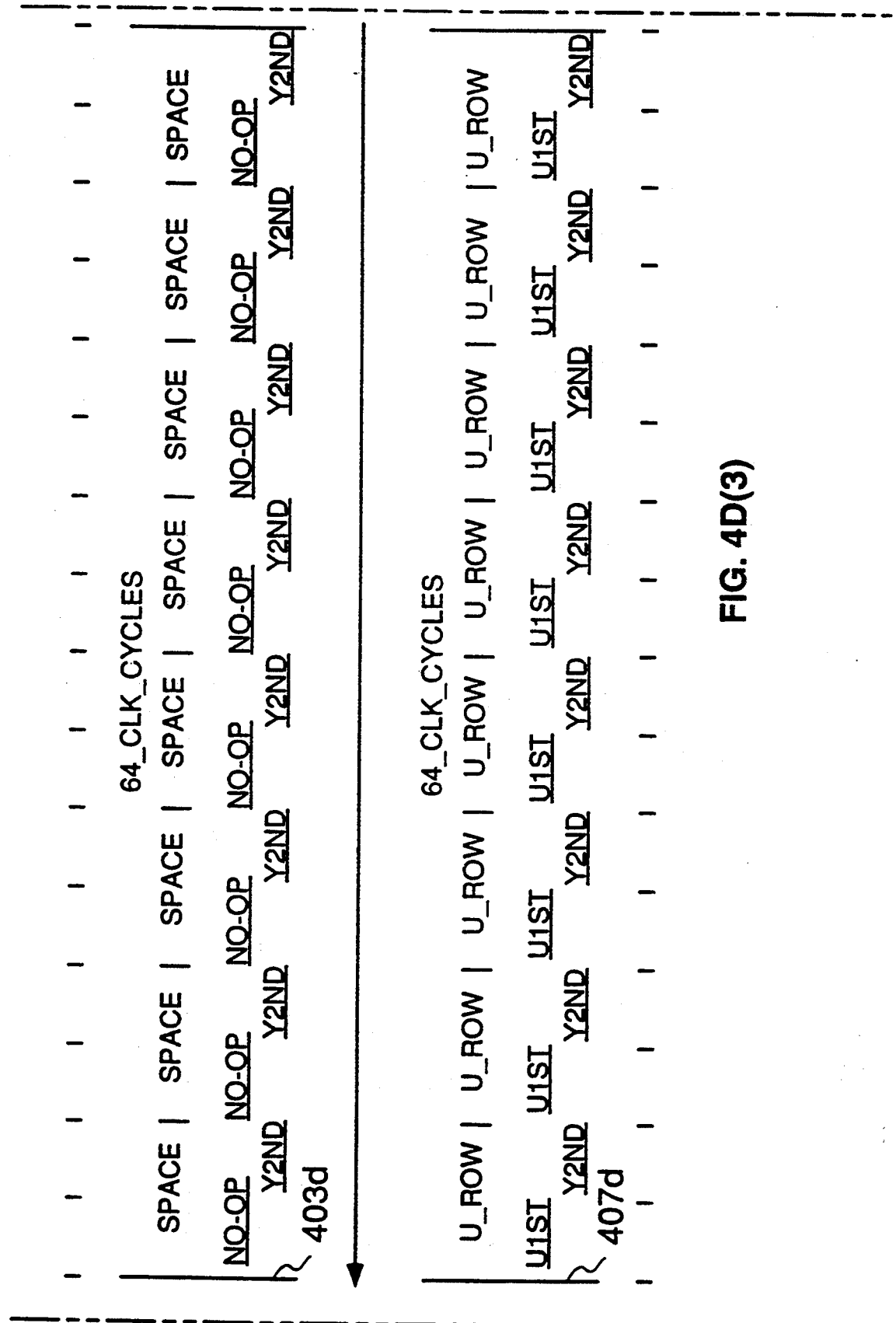
FIG. 4D(3)

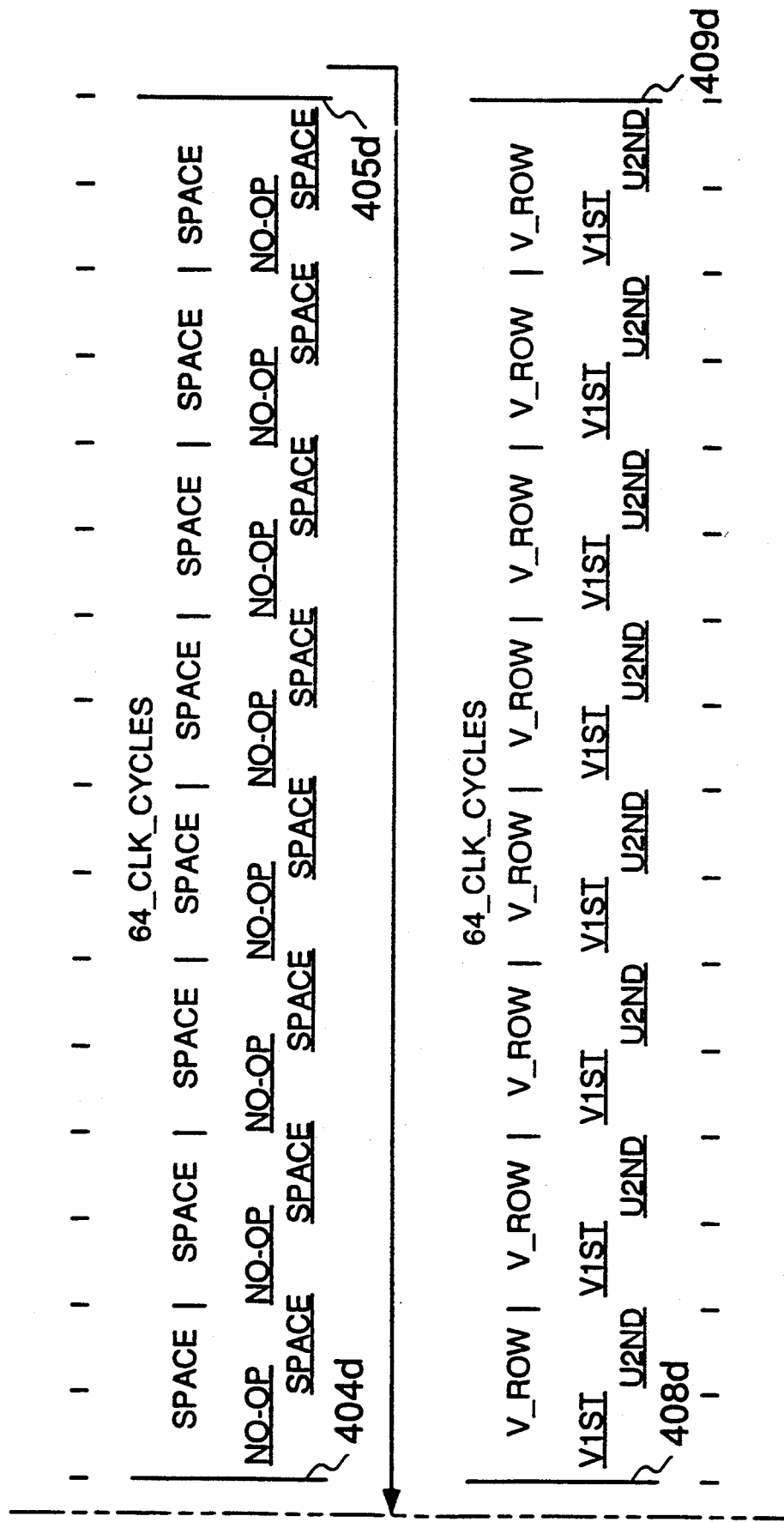
FIG. 4D(4)

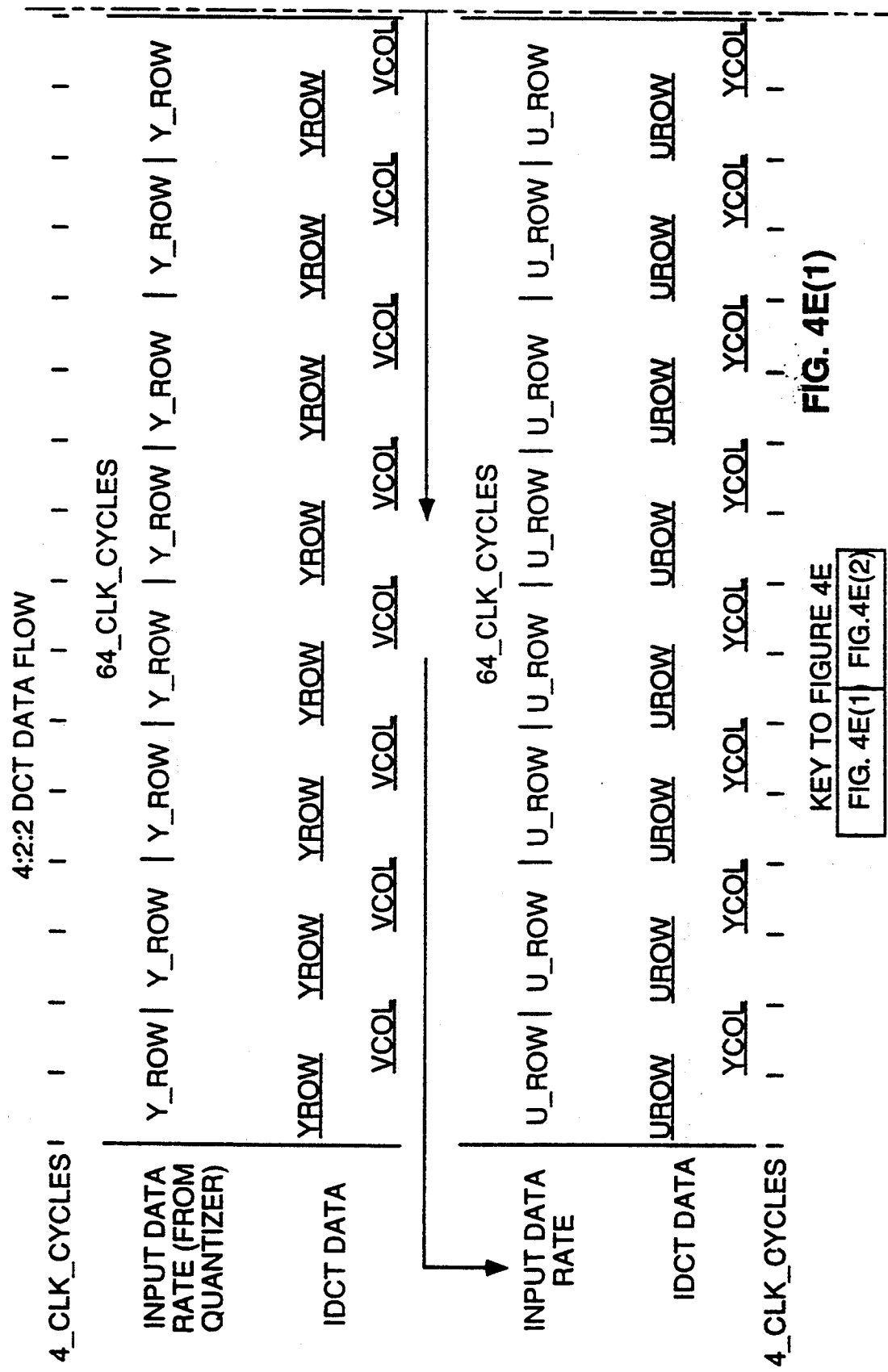
FIG. 4E(1)

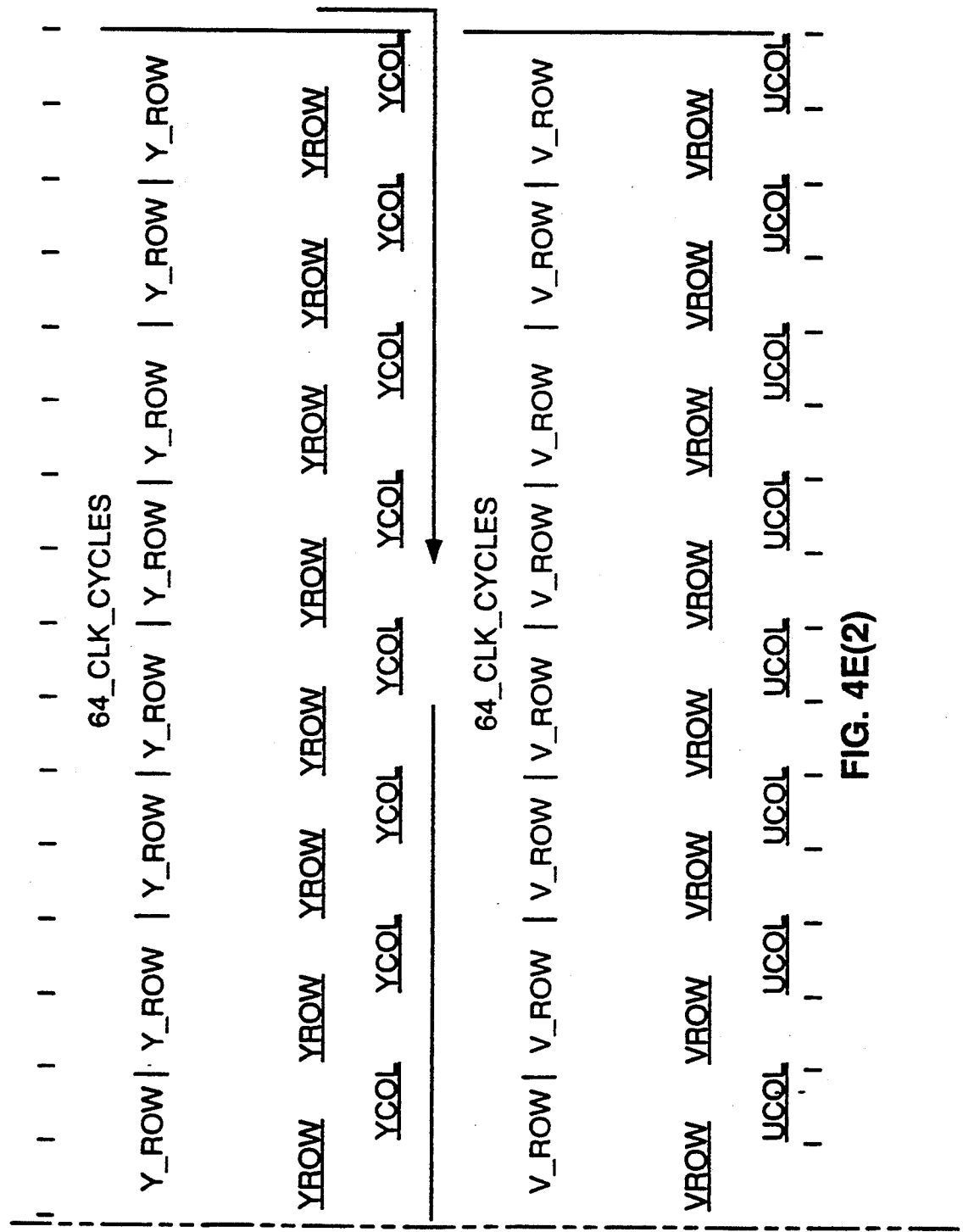
FIG. 4E(2)

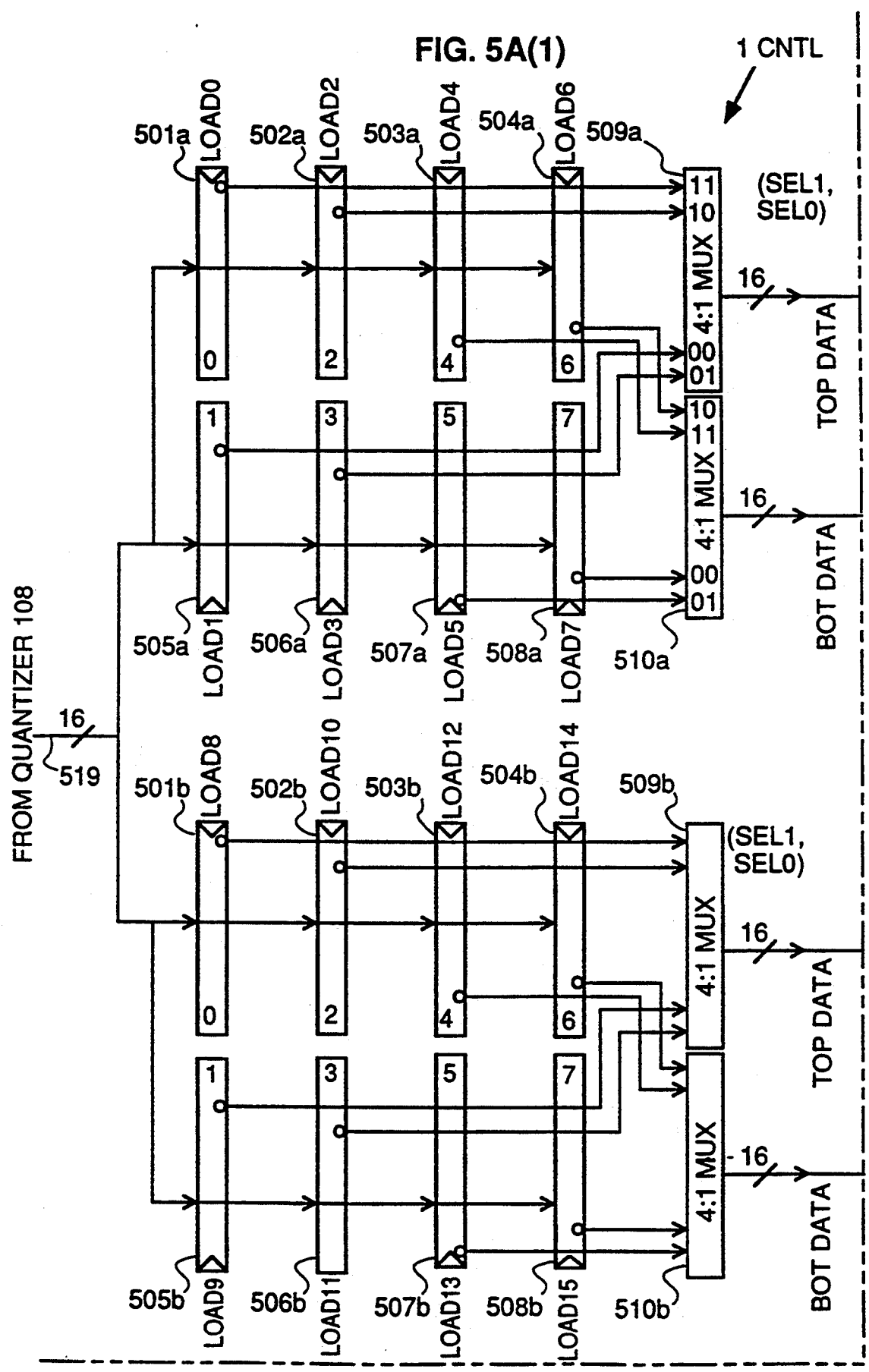
FIG. 5A(1)

FIG. 5A(2)
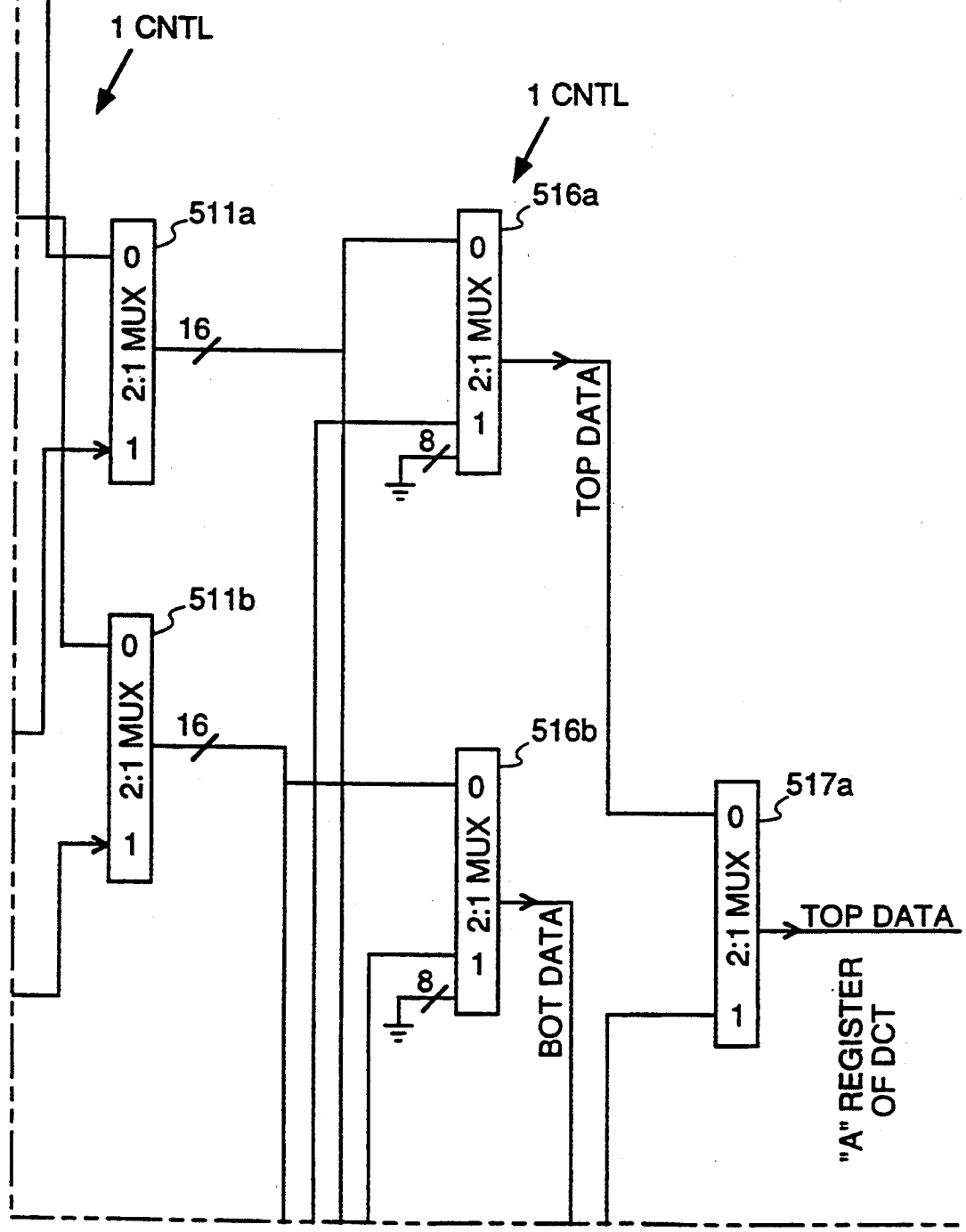

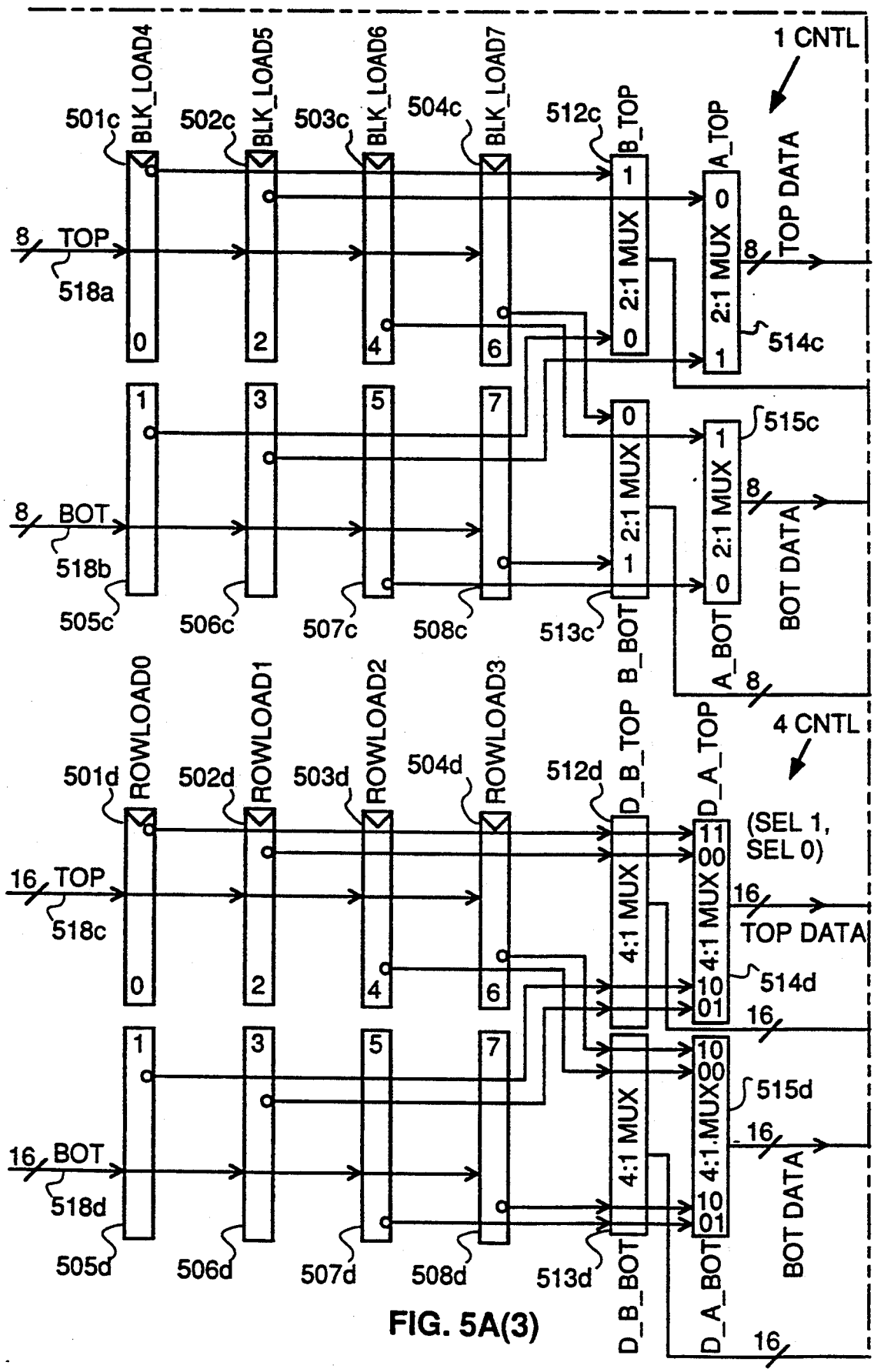
FIG. 5A(3)

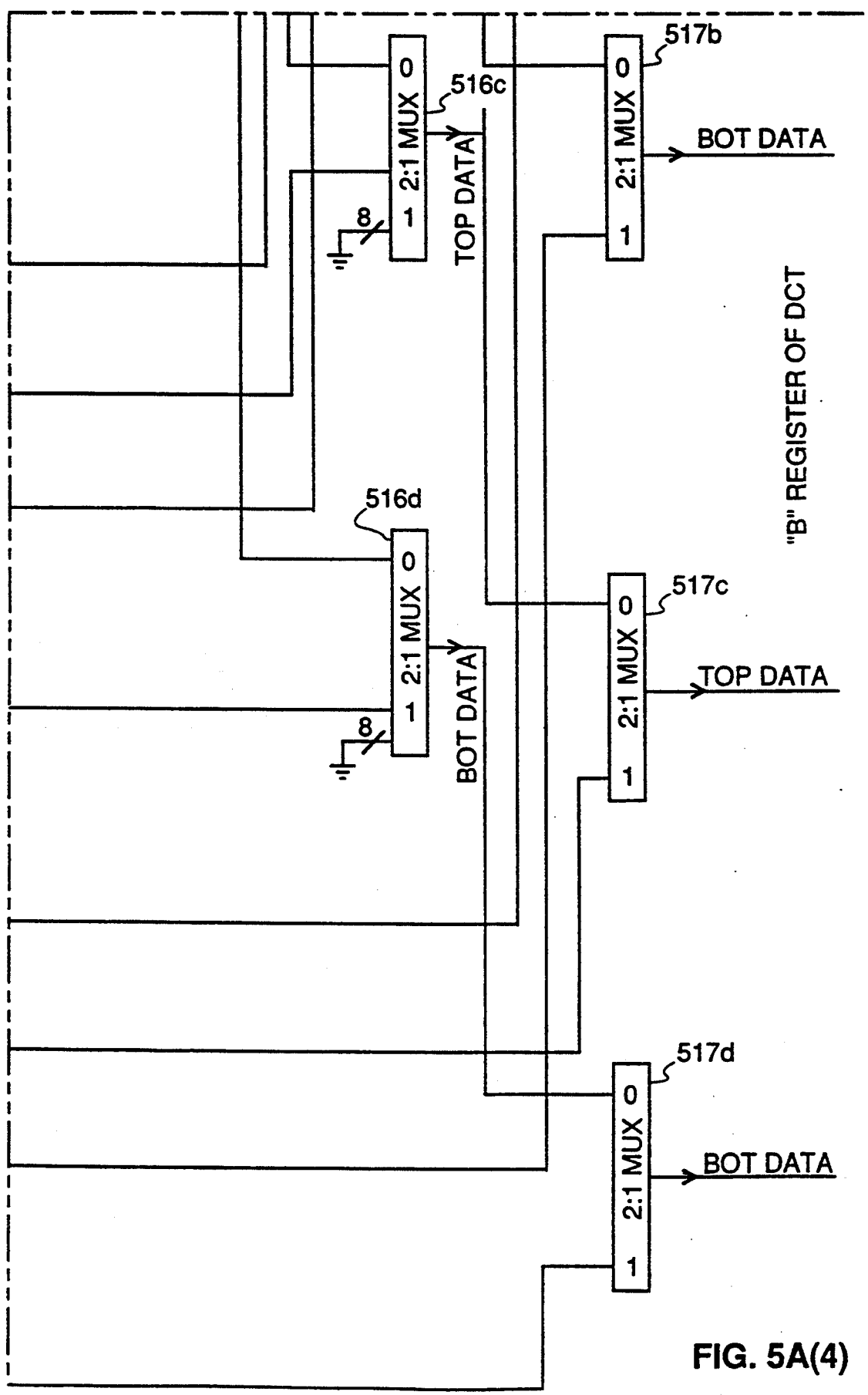
FIG. 5A(4)

FIG. 5B (1)

| | | CLOCK | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| | | LOAD 6 | 0 | 0 | 0 | 0 | | 0 | 0 | 1 | 0 | 0 | 0 | 0 | 0 | 0 | 1 | 0 |
| 507c LOAD 6 REG 503c | T B | | | | | | | | | X(4) | X(5) | | | | | | | |
| | | LOAD 5 | 0 | 0 | 0 | 0 | 0 | 1 | 0 | 0 | 0 | 0 | 0 | 0 | 0 | 1 | 0 | 0 |
| 506b LOAD 5 REG 502c | T B | | | | | | | | X(2) | X(3) | | | | | | | | |
| | | LOAD 4 | 0 | 0 | 0 | 0 | 1 | 0 | 0 | 0 | 0 | 0 | 0 | 0 | 1 | 0 | 0 | 0 |
| 505b LOAD 4 REG 501c | T B | | | | | | | X(0) | X(1) | | | | | | | | | |
| 518d FROM DCT STO | TOPDATA | | | Y(1) | Y(3) | Y(5) | Y(7) | | | | | | | | | | | |
| 518c | BOTDATA | | Y(0) | Y(2) | Y(4) | Y(6) | | | | | | | | | | | | |
| 518b FROM BLK STO | BOTDATA | | | | | | X(1) | X(3) | X(5) | X(7) | | | | | | | | |
| 518a | TOPDATA | | | | | | X(0) | X(2) | X(4) | X(6) | | | | | | | | |
| | | CNT(0) | 1 | 0 | 1 | 0 | 1 | 0 | 1 | 0 | 1 | 0 | 1 | 0 | 1 | 0 | 1 | 0 |
| | | CNT(1) | 1 | 0 | 0 | 1 | 1 | 0 | 0 | 1 | 1 | 0 | 0 | 1 | 1 | 0 | 0 | 1 |
| | | CNT(2) | 0 | 1 | 1 | 1 | 1 | 0 | 0 | 0 | 0 | 1 | 1 | 1 | 1 | 0 | 0 | 0 |
| | | CNT(3) | 1 | 1 | 1 | 1 | 1 | 0 | 0 | 0 | 0 | 0 | 0 | 0 | 0 | 1 | 1 | 1 |
| | | COMPRESS | 1 | 1 | 1 | 1 | 1 | 1 | 1 | 1 | 1 | 1 | 1 | 1 | 1 | 1 | 1 | 1 |

KEY TO FIGURE 5B

| FIG.5B(1) | FIG.5B(2) | FIG.5B(3) |

| | | | | | | | | | | | | | | | | | | | |
|---|---|---|---|---|---|---|---|---|---|---|---|---|---|---|---|---|---|---|---|
| BLK_OR_DCT | | 0 | 0 | 0 | 0 | 1 | 1 | 1 | 1 | 0 | 0 | 0 | 0 | 1 | 1 | 1 | 1 | |
| SELECTION OF DCT STORAGE | SEL 0 | 1 | 1 | 1 | 1 | 1 | 1 | 0 | 0 | 1 | 1 | 1 | 1 | 1 | 1 | 0 | 0 | 513d |
| | SEL 1 | 1 | 1 | 1 | 1 | 1 | 1 | 1 | 1 | 1 | 1 | 1 | 1 | 1 | 1 | 1 | 1 | |
| | B_BOT | | | | | Y(6) | Y(6) | Y(7) | Y(7) | | | | | | | | | |
| | SEL 0 | 1 | 1 | 1 | 1 | 0 | 0 | 1 | 1 | 1 | 1 | 1 | 1 | 0 | 0 | 1 | 1 | |
| | SEL 1 | 1 | 1 | 1 | 1 | 1 | 1 | 1 | 1 | 1 | 1 | 1 | 1 | 1 | 1 | 1 | 1 | |
| | B_TOP 512d | | | | | Y(1) | Y(1) | Y(0) | Y(0) | | | | | | | | | |
| | SEL 0 | 1 | 1 | 1 | 1 | 1 | 1 | 0 | 0 | 1 | 1 | 1 | 1 | 1 | 1 | 0 | 0 | |
| | SEL 1 | 1 | 1 | 1 | 1 | 0 | 0 | 0 | 0 | 1 | 1 | 1 | 1 | 0 | 0 | 0 | 0 | |
| | A_BOT 515d | | | | | Y(5) | Y(5) | Y(4) | Y(4) | | | | | | | | | |
| | SEL 0 | 1 | 1 | 1 | 1 | 0 | 0 | 1 | 1 | 1 | 1 | 1 | 1 | 0 | 0 | 1 | 1 | |
| | SEL 1 | 1 | 1 | 1 | 1 | 0 | 0 | 0 | 0 | 1 | 1 | 1 | 1 | 0 | 0 | 0 | 0 | |
| 514d | A_TOP | | | | | Y(2) | Y(2) | Y(3) | Y(3) | | | | | | | | | |
| | LOAD 3 | 0 | 0 | 0 | 1 | 0 | 0 | 0 | 0 | 0 | 0 | 0 | 1 | 0 | 0 | 0 | 0 | |
| 508d LOAD 3 REG 504d | T B | | | | Y(6) | Y(7) | | | | | | | | | | | | |

FIG. 5C (1) — DECOMPRESS CONTROL FOR DCT INPUT

| | | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| | LOAD 4 | 0 | 0 | 0 | 0 | 1 | 0 | 0 | 0 | 0 | 0 | 0 | 0 | 0 | 0 | 0 | 0 |
| 503a | LOAD 4 REG | | | | | | X(4) | | | | | | | | | | |
| | LOAD 3 | 0 | 0 | 0 | 1 | 0 | 0 | 0 | 0 | 0 | 0 | 0 | 0 | 0 | 0 | 0 | 0 |
| 506a | LOAD 3 REG | | | | | X(3) | | | | | | | | | | | |
| | LOAD 2 | 0 | 0 | 1 | 0 | 0 | 0 | 0 | 0 | 0 | 0 | 0 | 0 | 0 | 0 | 0 | 0 |
| 502a | LOAD 2 REG | | | | X(2) | | | | | | | | | | | | |
| | LOAD 1 | 0 | 1 | 0 | 0 | 0 | 0 | 0 | 0 | 0 | 0 | 0 | 0 | 0 | 0 | 0 | 0 |
| 505a | LOAD 1 REG | | | X(1) | | | | | | | | | | | | | |
| | LOAD Ø | 1 | 0 | 0 | 0 | 0 | 0 | 0 | 0 | 0 | 0 | 0 | 0 | 0 | 0 | 0 | 0 |
| 501a | LOAD Ø REG | | X(0) | | | | | | | | | | | | | | |
| 518d FROM DCT SLO | BOTDATA | Y(1) | Y(3) | Y(5) | Y(7) | | | | | W(1) | W(3) | W(5) | W(7) | | | | |
| 518c FROM QUANTIZER | TOPDATA | Y(0) | Y(2) | Y(4) | Y(6) | | | | | W(0) | W(2) | W(4) | W(6) | | | | |
| | BOTDATA | | | | | | | | | | | | | | | | |
| | TOPDATA | X(0) | X(1) | X(2) | X(3) | X(4) | X(5) | X(6) | X(7) | Z(0) | Z(1) | Z(2) | Z(3) | Z(4) | Z(5) | Z(6) | Z(7) |
| 519 | CNL (Ø) | 1 | 0 | 1 | 0 | 1 | 0 | 1 | 0 | 1 | 0 | 1 | 0 | 1 | 0 | 1 | 0 |
| | CNL (1) | 1 | 0 | 0 | 1 | 1 | 0 | 0 | 1 | 1 | 0 | 0 | 1 | 1 | 0 | 0 | 1 |
| | CNL (2) | 0 | 1 | 1 | 1 | 1 | 0 | 0 | 0 | 0 | 1 | 1 | 1 | 1 | 0 | 0 | 0 |
| | CNL (3) | 1 | 1 | 1 | 1 | 1 | 0 | 0 | 0 | 0 | 0 | 0 | 0 | 0 | 1 | 1 | 1 |
| | COMPRESS | 0 | 0 | 0 | 0 | 0 | 0 | 0 | 0 | 0 | 0 | 0 | 0 | 0 | 0 | 0 | 0 |
| | CLOCK | 0 | 1 | 2 | 3 | 4 | 5 | 6 | 7 | 8 | 9 | 10 | 11 | 12 | 13 | 14 | 15 |

KEY TO FIGURE 5C: FIG. 5C(1) | FIG. 5C(2) | FIG. 5C(3) | FIG. 5C(4)

| Signal | | | | | | | | | | | | | | | | | |
|---|---|---|---|---|---|---|---|---|---|---|---|---|---|---|---|---|---|
| SCL 0 | | | | | 0 | 1 | 0 | 1 | | | | | 0 | 1 | 0 | 1 |
| SCL 1 | | | | | 1 | 0 | 0 | 1 | | | | | 1 | 0 | 0 | 1 |
| A_TOP (514D) | | | | | Y(1) | Y(3) | Y(2) | Y(0) | | | | | W(1) | W(3) | W(2) | W(0) |
| LOAD 3 | 0 | 0 | 0 | 1 | 0 | 0 | 0 | 0 | 0 | 0 | 0 | 1 | 0 | 0 | 0 | 0 |
| LOAD 3 REG (508d/504d) T/B | | | | | Y(6) Y(7) | | | | | | | | W(6) W(7) | | | |
| LOAD 2 | 0 | 0 | 1 | 0 | 0 | 0 | 0 | 0 | 0 | 0 | 1 | 0 | 0 | 0 | 0 | 0 |
| LOAD 2 REG (507d/503d) T/B | | | | | Y(4) Y(5) | | | | | | | | W(4) W(5) | | | |
| LOAD 1 | 0 | 1 | 0 | 0 | 0 | 0 | 0 | 0 | 0 | 1 | 0 | 0 | 0 | 0 | 0 | 0 |
| LOAD 1 REG (506d/502d) T/B | | | | | Y(2) Y(3) | | | | | | | | W(2) W(3) | | | |
| LOAD 0 | 1 | 0 | 0 | 0 | 0 | 0 | 0 | 0 | 1 | 0 | 0 | 0 | 0 | 0 | 0 | 0 |
| LOAD 0 REG (505d/510d) T/B | Y(0) Y(1) | | | | | | | | W(0) W(1) | | | | | | | |
| BANK | 1 | 1 | 1 | 1 | 1 | 1 | 1 | 1 | 0 | 0 | 0 | 0 | 1 | 1 | 1 | 1 |
| 4:1 MUX | 00 | 01 | 10 | 11 | 1 | 1 | 1 | 1 | 00 | 01 | 10 | 11 | 1 | 1 | 1 | 1 |
| BOT DATA | Z(1) | Z(3) | Z(2) | Z(0) | | | | | X(7) | X(5) | X(6) | X(4) | | | | |
| TOP DATA | Z(1) | Z(3) | Z(2) | Z(0) | | | | | X(1) | X(3) | X(2) | X(0) | | | | |
| LOAD 15 | 0 | 0 | 0 | 0 | 0 | 0 | 0 | 0 | 0 | 0 | 0 | 0 | 0 | 0 | 0 | 1 |

FIG. 5C (4)

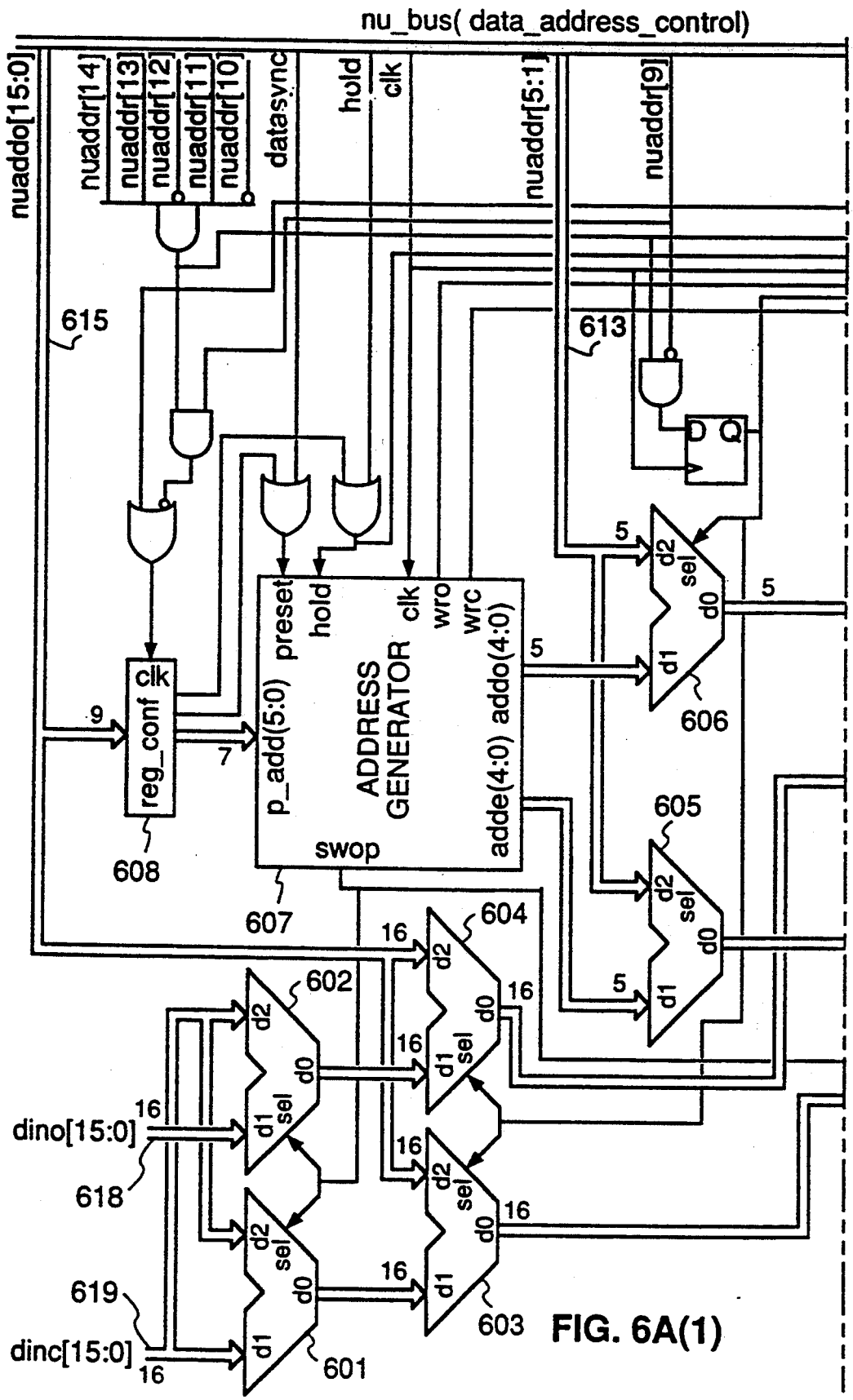
FIG. 6A(1)

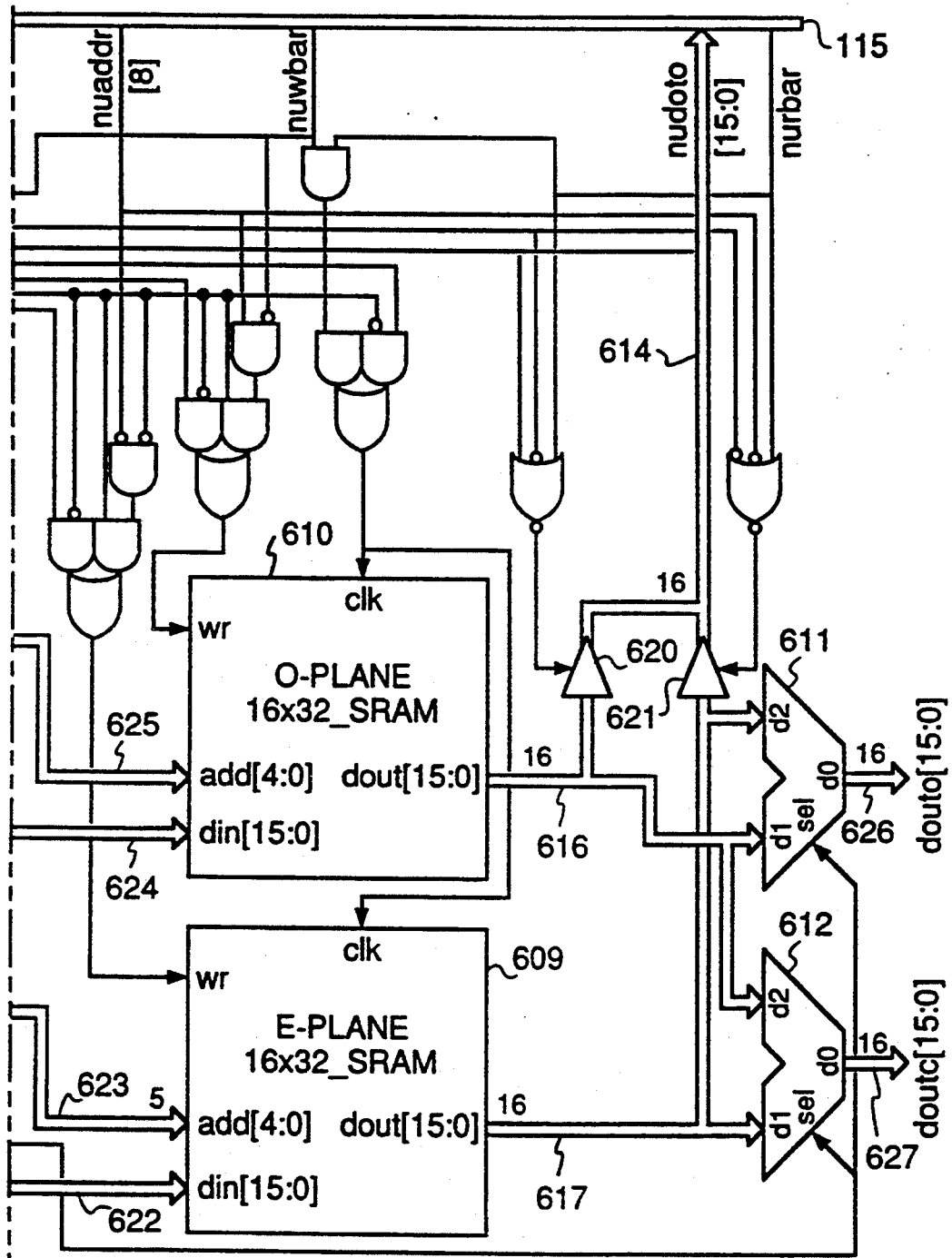
FIG. 6A(2)
DCT MEMORY
KEY TO FIGURE 6A
| FIG. 6A (1) | FIG. 6A (2) |

| 0 X0(0) X0(1)<br>e    o | 1 X0(2) X0(3)<br>e    o | 2 X0(4) X0(5)<br>e    o | 3 X0(6) X0(7)<br>e    o |
|---|---|---|---|
| 4 X1(0) X1(1)<br>o    e | 5 X1(2) X1(3)<br>o    e | 6 X1(4) X1(5)<br>o    e | 7 X1(6) X1(7)<br>o    e |
| 8 X2(0) X2(1)<br>e    o | 9 X2(2) X2(3)<br>e    o | 10 X2(4) X2(5)<br>e    o | 11 X2(6) X2(7)<br>e    o |
| 12 X3(0) X3(1)<br>o    e | 13 X3(2) X3(3)<br>o    e | 14 X3(4) X3(5)<br>o    e | 15 X3(6) X3(7)<br>o    e |
| 16 X4(0) X4(1)<br>e    o | 17 X4(2) X4(3)<br>e    o | 18 X4(4) X4(5)<br>e    o | 19 X4(6) X4(7)<br>e    o |
| 20 X5(0) X5(1)<br>o    e | 21 X5(2) X5(3)<br>o    e | 22 X5(4) X5(5)<br>o    e | 23 X5(6) X5(7)<br>o    e |
| 24 X6(0) X6(1)<br>e    o | 25 X6(2) X6(3)<br>e    o | 26 X6(4) X6(5)<br>e    o | 27 X6(6) X6(7)<br>e    o |
| 28 X7(0) X7(1)<br>o    e | 29 X7(2) X7(3)<br>o    e | 30 X7(4) X7(5)<br>o    e | 31 X7(6) X7(7)<br>o    e |

DCT MEMORY HORIZONTAL WRITE PATTERN

FIG. 6B

| 0 Y0(0) e | Y1(0) o | 1 Y2(0) e | Y3(0) o | 2 Y4(0) e | Y5(0) o | 3 Y6(0) e | Y7(0) o |
|---|---|---|---|---|---|---|---|
| 4 Y0(1) o | Y1(1) e | 5 Y2(1) o | Y3(1) e | 6 Y4(1) o | Y5(1) e | 7 Y6(1) o | Y7(1) e |
| 8 Y0(2) e | Y1(2) o | 9 Y2(2) e | Y3(2) o | 10 Y4(2) e | Y5(2) o | 11 Y6(2) e | Y7(2) o |
| 12 Y0(3) o | Y1(3) e | 13 Y2(3) o | Y3(3) e | 14 Y4(3) o | Y5(3) e | 15 Y6(3) o | Y7(3) e |
| 16 Y0(4) e | Y1(4) o | 17 Y2(4) e | Y3(4) o | 18 Y4(4) e | Y5(4) o | 19 Y6(4) e | Y7(4) o |
| 20 Y0(5) o | Y1(5) e | 21 Y2(5) o | Y3(5) e | 22 Y4(5) o | Y5(5) e | 23 Y6(5) o | Y7(5) e |
| 24 Y0(6) e | Y1(6) o | 25 Y2(6) e | Y3(6) o | 26 Y4(6) e | Y5(6) o | 27 Y6(6) e | Y7(6) o |
| 28 Y0(7) o | Y1(7) e | 29 Y2(7) o | Y3(7) e | 30 Y4(7) o | Y5(7) e | 31 Y6(7) o | Y7(7) e |

DCT MEMORY VERTICAL WRITE PATTERN

FIG. 6C

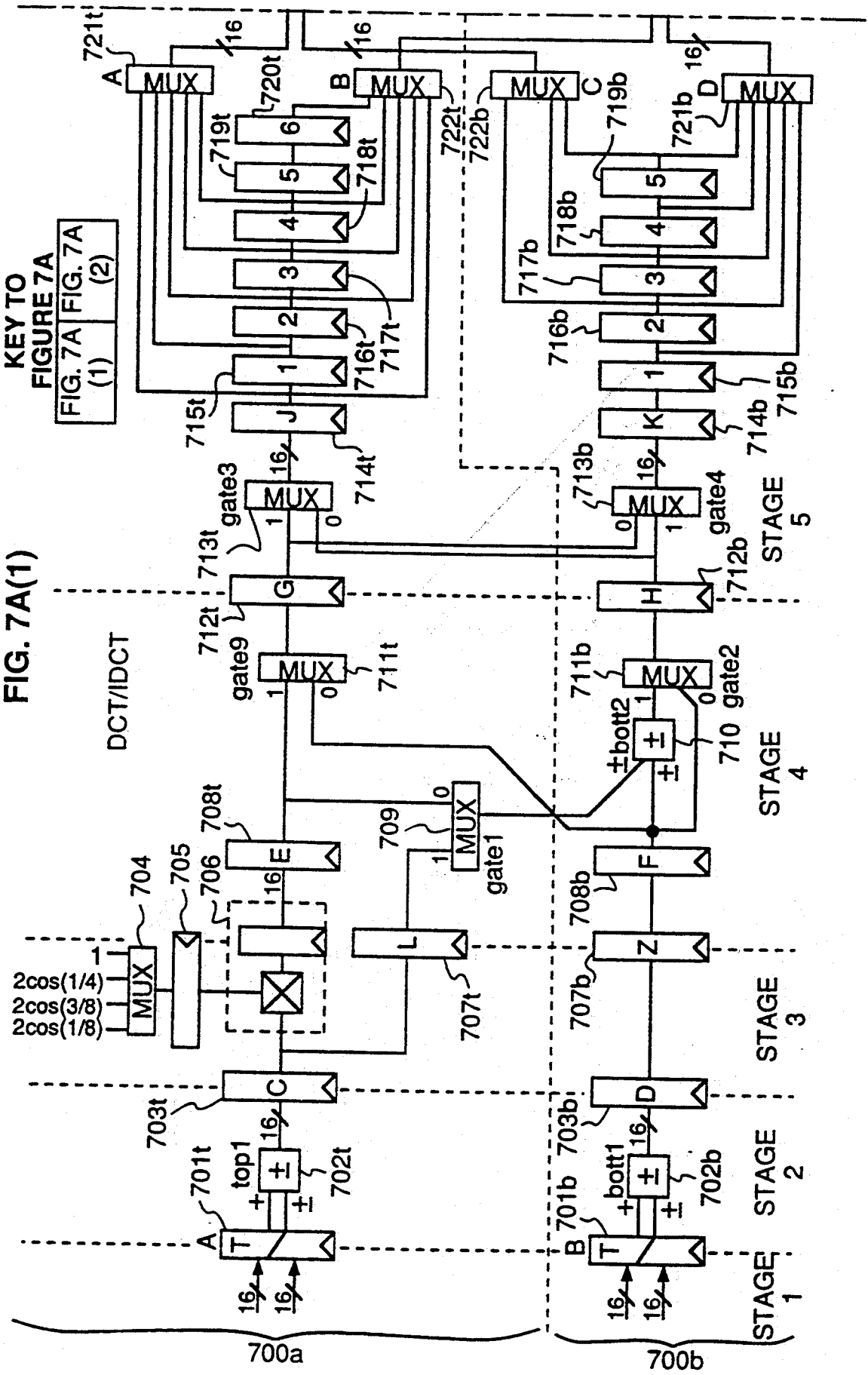

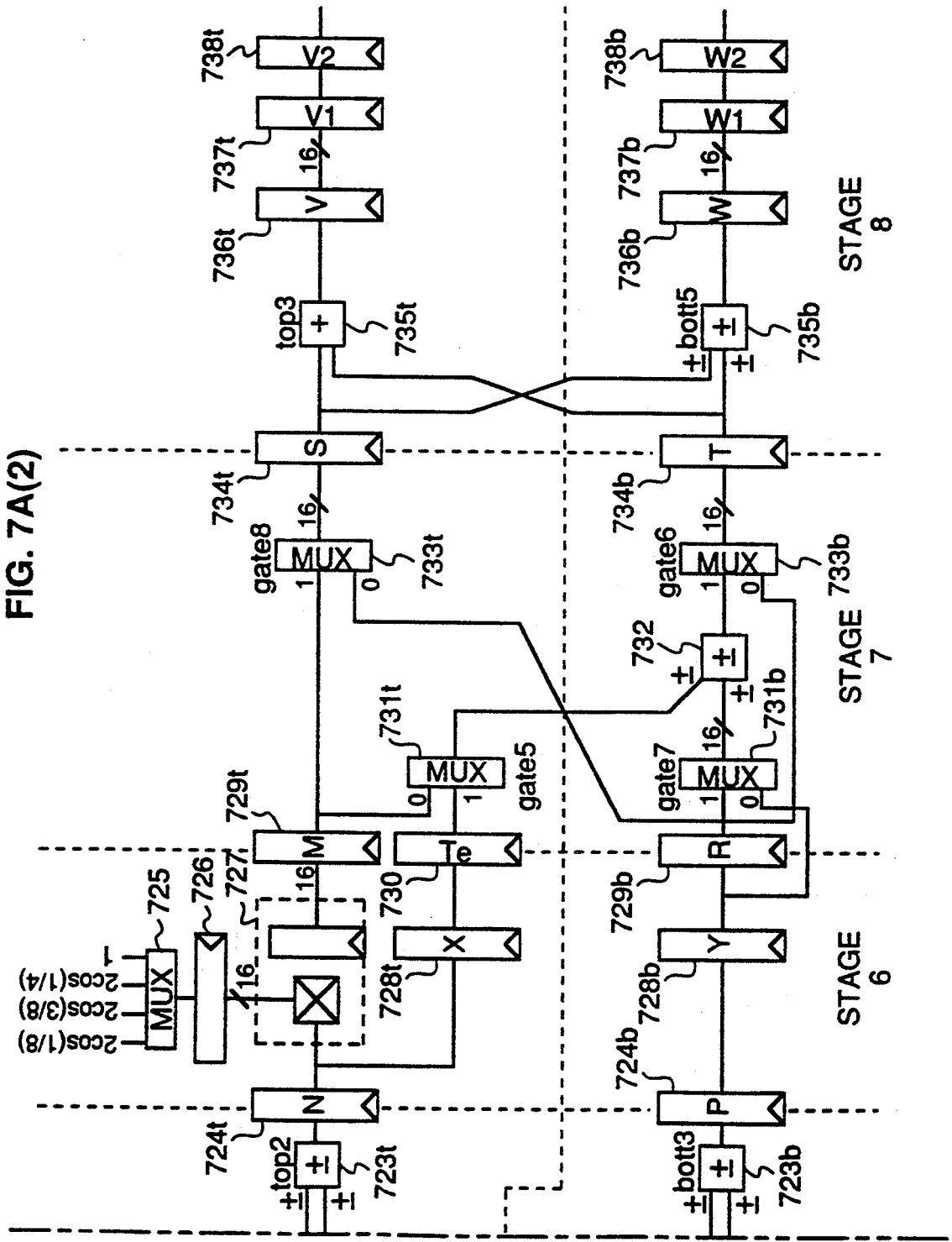
FIG. 7A(2)

FIG. 7C(1)

| KEY TO FIGURE 7C | |
|---|---|
| FIG. 7C(1) | FIG. 7C(2) |
| FIG. 7C(3) | FIG. 7C(4) |

| | A | B | C | D | L | Z | E | F | G | H | J | K | | J (DCT) | | |
|---|---|---|---|---|---|---|---|---|---|---|---|---|---|---|---|---|
| | T | T | T | | T | | T | | T | | T | | | 1 2 | 3 4 | 5 6 |
| 0 | 2,5 | 1,6 | | | | | | | | | | | | | | |
| 1 | 2,5 | 1,6 | Y3 | Y7 | | | | | | | | | | | | |
| 2 | 3,4 | 0,7 | Y6 | Y2 | Y3 | Y7 | | | | | | | | | | |
| 3 | 3,4 | 0,7 | Y4 | Y8 | Y6 | Y2 | W3 | W7 | | | | | | | | |
| 4 | | | Y5 | Y1 | Y4 | Y8 | W6 | W2 | Z3 | Z7 | | | | | | |
| 5 | | | | | Y5 | Y1 | W4 | W8 | Z6 | Z2 | Z3 | Z7 | | | | |
| 6 | | | | | | | W5 | W1 | Z4 | Z8 | Z6 | Z2 | | Z3 | | |

| | K | N | P | X | Y | Te | M | R | S | T | V | W | |
|---|---|---|---|---|---|---|---|---|---|---|---|---|---|
| | 1 2 3 4 5 | T | | T | | T | T | | T | | T | | |
| | | | | | | | | | | | | | Z7 |

COMPRESS CONTROL FOR DCT/IDCT

| | | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|
| 721t | A SEL | SEL0 | | | | | | | | | 0 | 1 | 0 | 1 | | | |
| | | SEL1 | | | | | | | | | 0 | 0 | 1 | 0 | | | |
| | | SEL2 | | | | | | | | | 0 | 0 | 0 | 0 | | | |
| 713b | | GATE4MUX | | | | | 1 | 1 | 1 | 1 | | | | | | | |
| 713t | | GATE3MUX | | | | | 1 | 1 | 1 | 1 | | | | | | | |
| 711t | | GATE9MUX | | | | | 1 | 1 | 1 | 1 | | | | | | | |
| 711b | | GATE2 MUX | | | | | 1 | 0 | 1 | 0 | | | | | | | |
| 710 | BOTT2 ADDER | SCALE0 SCALE1 | | | | | 01 | : | 01 | : | | | | | | | |
| | | ADDBOT | | | | | 1 | : | 1 | : | | | | | | | |
| | | ADDTOP | | | | | 0 | : | 0 | : | | | | | | | |
| 709 | | GATE1 MUX | | | | | 1 | : | 1 | : | | | | | | | |
| 704 | COEF1 | CO1SEL0 | 1 | 0 | 1 | 0 | | | | | | | | | | | |
| | | CO1SEL1 | 0 | 0 | 0 | 0 | | | | | | | | | | | |
| 702b | BOTT1 ADDER | SCALE0 SCALE1 | 01 | 01 | 01 | 01 | | | | | | | | | | | |
| | | ADDBOT | 0 | 1 | 0 | 1 | | | | | | | | | | | |
| | | ADDTOP | 1 | 1 | 1 | 1 | | | | | | | | | | | |
| 702t | TOP1 ADDER | SCALE0 SCALE1 | 01 | 01 | 01 | 01 | | | | | | | | | | | |
| | | ADDBOT | 1 | 0 | 1 | 0 | | | | | | | | | | | |
| | | ADDTOP | 1 | 1 | 1 | 1 | | | | | | | | | | | |
| | | RESET | 1 | 0 | 0 | 0 | 0 | 0 | 0 | 0 | 0 | 0 | 0 | 0 | 0 | 0 | 0 |
| | | COMPRESS | 1 | 1 | 1 | 1 | 1 | 1 | 1 | 1 | 1 | 1 | 1 | 1 | 1 | 1 | 1 |
| | | CLOCK | 0 | 1 | 2 | 3 | 4 | 5 | 6 | 7 | 8 | 9 | 10 | 11 | 12 | 13 | 14 |

KEY TO FIGURE 7D

| FIG. 7D(1) | FIG. 7D(2) | FIG. 7D(3) |
|---|---|---|

| | | | | | | | | | | | | | | | |
|---|---|---|---|---|---|---|---|---|---|---|---|---|---|---|---|
| 733b | | GATE6MUX | | | | | | | | | | | 1 | 1 | 1 | 0 |
| 732 | BOTT4 ADDER | SCALE0 / SCALE1 | | | | | | | | | | | 01 | 01 | 01 | · |
| | | ADDBOT | | | | | | | | | | | 1 | 1 | 1 | · |
| | | ADDTOP | | | | | | | | | | | 0 | 0 | 0 | · |
| 731t | | GATE5MUX | | | | | | | | | | | 1 | 1 | 1 | · |
| 725 | COEF2 | CO2SEL0 | | | | | | | | | | 1 | 0 | 0 | 1 | |
| | | CO2SEL1 | | | | | | | | | | 1 | 0 | 1 | 0 | |
| 723b | BOTT3 ADDER | SCALE0 / SCALE1 | | | | | | | | | | 01 | 01 | 01 | 01 | |
| | | ADDBOT | | | | | | | | | | 1 | 1 | 1 | 1 | |
| | | ADDTOP | | | | | | | | | | 1 | 0 | 0 | 1 | |
| 723t | TOP2 ADDER | SCALE0 / SCALE1 | | | | | | | | | | 01 | 01 | 01 | 01 | |
| | | ADDBOT | | | | | | | | | | 1 | 1 | 1 | 1 | |
| | | ADDTOP | | | | | | | | | | 1 | 0 | 0 | 1 | |
| 721b | D SEL | SEL0 | | | | | | | | | | 0 | 0 | 1 | 0 | |
| | | SEL1 | | | | | | | | | | 0 | 0 | 0 | 1 | |
| | | SEL2 | | | | | | | | | | 0 | 0 | 0 | 0 | |
| 722b | C SEL | SEL0 | | | | | | | | | | 0 | 0 | 1 | 0 | |
| | | SEL1 | | | | | | | | | | 0 | 0 | 0 | 0 | |
| | | SEL2 | | | | | | | | | | 0 | 0 | 0 | 0 | |
| 722t | B SEL | SEL0 | | | | | | | | | | 0 | 0 | 1 | 0 | |
| | | SEL1 | | | | | | | | | | 0 | 0 | 0 | 1 | |
| | | SEL2 | | | | | | | | | | 0 | 0 | 0 | 0 | |

| COEFF1: COMP OR DECOMP | CO1SEL0 | CO1SEL1 |
|---|---|---|
| 2COS(1/4) | 0 | 0 |
| 1 | 1 | 0 |
| 2COS(3/8) | 0 | 1 |
| 2COS(1/8) | 1 | 1 |

| COEFF2: COMP OR DECOMP | CO2SEL0 | CO2SEL1 |
|---|---|---|
| 2COS(1/4) | 0 | 0 |
| 1 | 1 | 0 |
| 2COS(3/8) | 0 | 1 |
| 2COS(1/8) | 1 | 1 |

ADDERS CONTROLS
1 TO ADD, 0 TO SUBTRACT
SCALE: SCALE1 SCALE0

| | SCALE1 | SCALE0 |
|---|---|---|
| PASS | 0 | 0 |
| /2 | 0 | 1 |
| *2 | 1 | 0 |

ABCD SEL

| COMPRESS A B C D | DECOMPRESS A B C D | SEL0 | SEL1 | SEL2 |
|---|---|---|---|---|
| J  J2 J4 J6 | K3 K5 K1 K2 | 0 | 0 | 0 |
| J2 J4 K3 K5 | J4 J6 K3 K4 | 1 | 0 | 0 |
| J4 J6 K5 K5 | J3 J1 K2 K4 | 0 | 1 | 0 |
|  |  | 1 | 1 | 0 |
|  |  | 0 | 0 | 1 |

| | | CLOCK | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|
| 735b | BOTT5 ADDER | SCALE0 SCALE1 | | | | | | | | | | | | | 01 | 01 | 01 | 01 |
| | | ADDBOT | | | | | | | | | | | | | 1 | 1 | 1 | 0 |
| | | ADDTOP | | | | | | | | | | | | | 0 | 0 | 0 | 1 |
| 735t | TOP3 ADDER | SCALE0 SCALE1 | | | | | | | | | | | | | 01 | 01 | 01 | 01 |
| | | ADDBOT | | | | | | | | | | | | | 1 | 1 | 1 | 1 |
| | | ADDTOP | | | | | | | | | | | | | 1 | 1 | 1 | 1 |
| 733t | | GATE8MUX | | | | | | | | | | | | 1 | 1 | 1 | 1 | |
| 731b | | GATE7MUX | | | | | | | | | | | | 1 | 1 | 1 | 1 | |

FIG. 7F(1)

KEY TO FIGURE 7F

| FIG. 7F(1) | FIG. 7F(2) |
|---|---|
| FIG. 7F(3) | FIG. 7F(4) |

IDCT 701t, 701b, 703t, 703b, 707t, 707b, 708t, 708b, 712t, 712b, 714t, 714b, 715t-720t

|   | A | B | C | D | L | Z | E | F | G | H | J | K | J |
|---|---|---|---|---|---|---|---|---|---|---|---|---|---|
|   | T | T | T | T | T | T | T | T | T | T | T | T |   |
| 0 | 1,7 | 1,7 |   |   |   |   |   |   |   |   |   |   | 1 2   3 4   5 6 |
| 1 | 3,5 | 3,5 | Y8 | Y2 |   |   |   |   |   |   |   |   |   |
| 2 | 2,6 | 2,6 | Y6 | Y4 | Y8 | Y2 | W8 |   |   |   |   |   |   |
| 3 | 0,4 | 0,4 | Y7 | Y3 | Y6 | Y4 | W6 | W2 |   |   |   |   |   |
| 4 |   |   | Y5 | Y1 | Y7 | Y3 | W7 | W4 | Z2 | Z8 |   |   |   |
| 5 |   |   |   | Y5 | Y5 | Y1 | W5 | W3 | Z4 | Z6 | Z2 | Z8 | Z2 |
| 6 |   |   |   |   |   |   |   | W1 | Z3 | Z7 | Z6 | Z4 |   |

FIG. 7F(2)

| | K | | | N | P | X | Y | M | R | Te | S | T | V | W | |
|---|---|---|---|---|---|---|---|---|---|---|---|---|---|---|---|
| 1 2 | 3 4 | 5 | | T | | T | | T | | | T | | T | | Z8 |

| | 7 | 8 | 9 | 10 | 11 | 12 | 13 | 14 | 15 | 16 | 17 |
|---|---|---|---|---|---|---|---|---|---|---|---|
| | | | | | | Z5 Z3Z6 Z2 | Z5Z3 Z6Z2 | Z5 Z3Z6 | Z5Z3 | Z5 | | |
| | | Z6Z2 | Z3Z6 Z2 | Z5Z3 Z6Z2 | Z5 Z3Z6 Z2 | | | | | | | |
| | | | | | | | | | | | | |
| | Z7 | Z1 | | | | | | | | | |
| | Z3 | Z5 | | | | | | | | | |
| | Z1 | | | | | | | | | | |
| | Z5 | | | | | | | | | | |

DECOMPRESS CONTROL FOR DCT/IDCT

KEY TO FIGURE 7G:

| FIG. 7G(1) | FIG. 7G(2) | FIG. 7G(3) |

| | | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|
| 721t | A SEL | SEL0 | | | | | | | | | | 1 | 0 | 1 | 1 | | | |
| | | SEL1 | | | | | | | | | | 1 | 0 | 0 | 0 | | | |
| | | SEL2 | | | | | | | | | | 0 | 1 | 0 | 0 | | | |
| 713b | | GATE4MUX | | | | | | 1 | 0 | 1 | 1 | | | | | | | |
| 713t | | GATE3MUX | | | | | | 1 | 0 | 1 | 1 | | | | | | | |
| 711t | | GATE9MUX | | | | | 0 | 0 | 0 | 1 | | | | | | | | |
| 711b | | GATE2 MUX | | | | | 1 | 1 | 1 | 0 | | | | | | | | |
| 710 | BOTT2 ADDER | SCALE0 | | | | | 0 | 0 | 0 | | | | | | | | | |
| | | SCALE1 | | | | | 0 | 0 | 0 | | | | | | | | | |
| | | ADDBOT | | | | | 0 | 0 | 0 | | | | | | | | | |
| | | ADDTOP | | | | | 1 | 1 | 1 | | | | | | | | | |
| 709 | | GATE1 MUX | | | | | 0 | 0 | 0 | | | | | | | | | |
| 704 | COEF1 | CO1SEL0 | 1 | 0 | 0 | 1 | | | | | | | | | | | | |
| | | CO1SEL1 | 1 | 1 | 0 | 0 | | | | | | | | | | | | |
| 702b | BOTT1 ADDER | SCALE0 | 0 | 0 | 0 | 0 | | | | | | | | | | | | |
| | | SCALE1 | 0 | 0 | 0 | 0 | | | | | | | | | | | | |
| | | ADDBOT | 1 | 1 | 1 | 1 | | | | | | | | | | | | |
| | | ADDTOP | 1 | 1 | 1 | 1 | | | | | | | | | | | | |
| 702t | TOP1 ADDER | SCALE0 | 1 | 1 | 1 | 0 | | | | | | | | | | | | |
| | | SCALE1 | 0 | 0 | 0 | 0 | | | | | | | | | | | | |
| | | ADDBOT | 0 | 0 | 0 | 0 | | | | | | | | | | | | |
| | | ADDTOP | 1 | 1 | 1 | 1 | | | | | | | | | | | | |
| | | RESET | 1 | 0 | 0 | 0 | 0 | 0 | 0 | 0 | 0 | 0 | 0 | 0 | 0 | 0 | 0 |
| | | COMPRESS | 0 | 0 | 0 | 0 | 0 | 0 | 0 | 0 | 0 | 0 | 0 | 0 | 0 | 0 | 0 |
| | | CLOCK | 0 | 1 | 2 | 3 | 4 | 5 | 6 | 7 | 8 | 9 | 10 | 11 | 12 | 13 | 14 |

| Ref | Group | Signal | | | | | | | | | | | | | | | | | | |
|---|---|---|---|---|---|---|---|---|---|---|---|---|---|---|---|---|---|---|---|---|
| 733b | | GATE6MUX | | | | | | | | | | | | | | | 1 | 0 | 1 | 0 |
| 733b | BOTT4 ADDER | SCALE0 / SCALE1 | | | | | | | | | | | | | | | 00 | : | 00 | : |
| 732 | | ADDBOT | | | | | | | | | | | | | | | 0 | · | 0 | · |
| | | ADDTOP | | | | | | | | | | | | | | | 1 | · | 1 | · |
| 731t | | GATE5MUX | | | | | | | | | | | | | | | 0 | · | 0 | · |
| 731t | COEF2 | CO2SEL0 | | | | | | | | | | | | | 0 | 1 | 0 | 1 | | |
| 725 | | CO2SEL1 | | | | | | | | | | | | | 0 | 0 | 0 | 0 | | |
| | BOTT3 ADDER | SCALE0 / SCALE1 | | | | | | | | | | | | | 00 | 00 | 00 | 00 | | |
| 723b | | ADDBOT | | | | | | | | | | | | | 0 | 1 | 1 | 1 | | |
| 723b | | ADDTOP | | | | | | | | | | | | | 1 | 1 | 0 | 1 | | |
| 723t | TOP2 ADDER | SCALE0 / SCALE1 | | | | | | | | | | | | | 10 | 00 | 10 | 00 | | |
| | | ADDBOT | | | | | | | | | | | | | 0 | 1 | 1 | 1 | | |
| | | ADDTOP | | | | | | | | | | | | | 1 | 1 | 0 | 1 | | |
| 721b | D SEL | SEL0 | | | | | | | | | | | | | 0 | 0 | 1 | 0 | | |
| | | SEL1 | | | | | | | | | | | | | 0 | 0 | 1 | 1 | | |
| | | SEL2 | | | | | | | | | | | | | 0 | 1 | 0 | 0 | | |
| 722b | C SEL | SEL0 | | | | | | | | | | | | | 0 | 0 | 1 | 0 | | |
| | | SEL1 | | | | | | | | | | | | | 1 | 1 | 0 | 0 | | |
| | | SEL2 | | | | | | | | | | | | | 0 | 0 | 0 | 0 | | |
| 722t | B SEL | SEL0 | | | | | | | | | | | | | 0 | 1 | 1 | 0 | | |
| | | SEL1 | | | | | | | | | | | | | 0 | 1 | 1 | 1 | | |
| | | SEL2 | | | | | | | | | | | | | 1 | 0 | 0 | 0 | | |

| COEFF1: COMP OR DECOMP | CO1SEL0 | CO1SEL1 |
|---|---|---|
| 2COS(1/4) | 0 | 0 |
| 1 | 1 | 0 |
| 2COS(3/8) | 0 | 1 |
| 2COS(1/8) | 1 | 1 |

| COEFF2: COMP OR DECOMP | CO2SEL0 | CO2SEL1 |
|---|---|---|
| 2COS(1/4) | 0 | 0 |
| 1 | 1 | 0 |
| 2COS(3/8) | 0 | 1 |
| 2COS(1/8) | 1 | 1 |

ADDERS CONTROLS
1 TO ADD, 0 TO SUBTRACT
SCALE: SCALE1 SCALE0

| | SCALE1 | SCALE0 |
|---|---|---|
| PASS | 0 | 0 |
| /2 | 0 | 1 |
| *2 | 1 | 0 |

ABCD SEL

| | COMPRESS A B C D | DECOMPRESS A B C D | SEL0 | SEL1 | SEL2 |
|---|---|---|---|---|---|
| | J1 J2 K3 K1 | K3 K1 J1 J2 | 0 | 0 | 0 |
| | J4 J6 K5 K3 | K5 K3 J3 J4 | 1 | 0 | 0 |
| | J2 J4 K3 K5 | J6 J3 K2 K5 | 0 | 1 | 0 |
| | J6 J3 K2 K5 | J4 J6 K3 K5 | 1 | 1 | 0 |
| | | J1 J2 K3 K1 | 0 | 0 | 1 |

| | | CLOCK | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|
| 735b | BOTT5 ADDER | SCALE0 SCALE1 | | | | | | | | | | | | | 00 | 00 | 00 | 00 |
| | | ADDBOT | | | | | | | | | | | | | 0 | 0 | 0 | 0 |
| | | ADDTOP | | | | | | | | | | | | | 1 | 1 | 1 | 1 |
| 735t | TOP3 ADDER | SCALE0 SCALE1 | | | | | | | | | | | | | 00 | 00 | 00 | 00 |
| | | ADDBOT | | | | | | | | | | | | | 1 | 1 | 1 | 1 |
| | | ADDTOP | | | | | | | | | | | | | 1 | 1 | 1 | 1 |
| 733t | | GATE8MUX | | | | | | | | | | | | 0 | 1 | 0 | 1 | |
| 731b | | GATE7MUX | | | | | | | | | | | | 0 | - | 0 | - | |

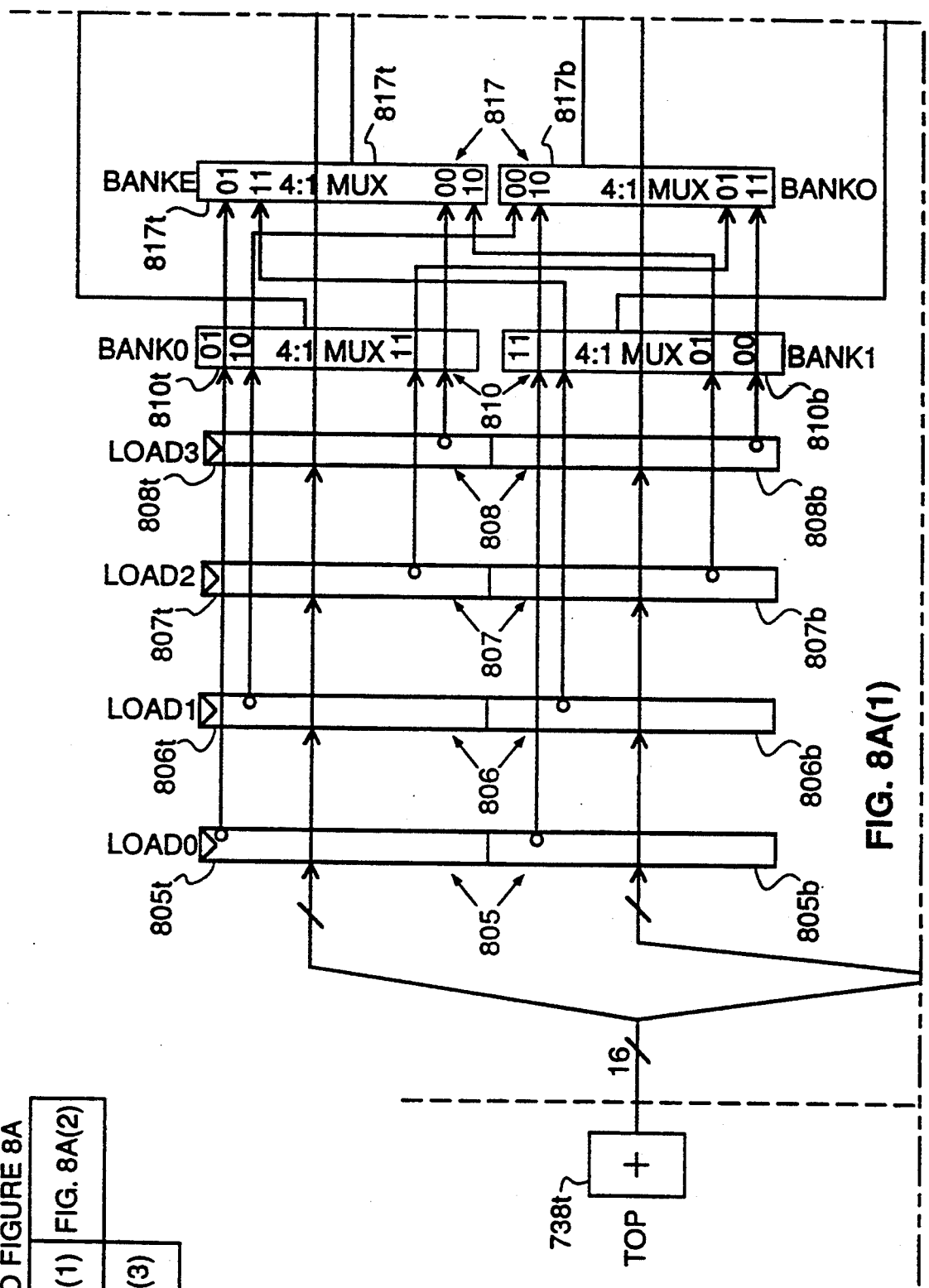
FIG. 8A(1)

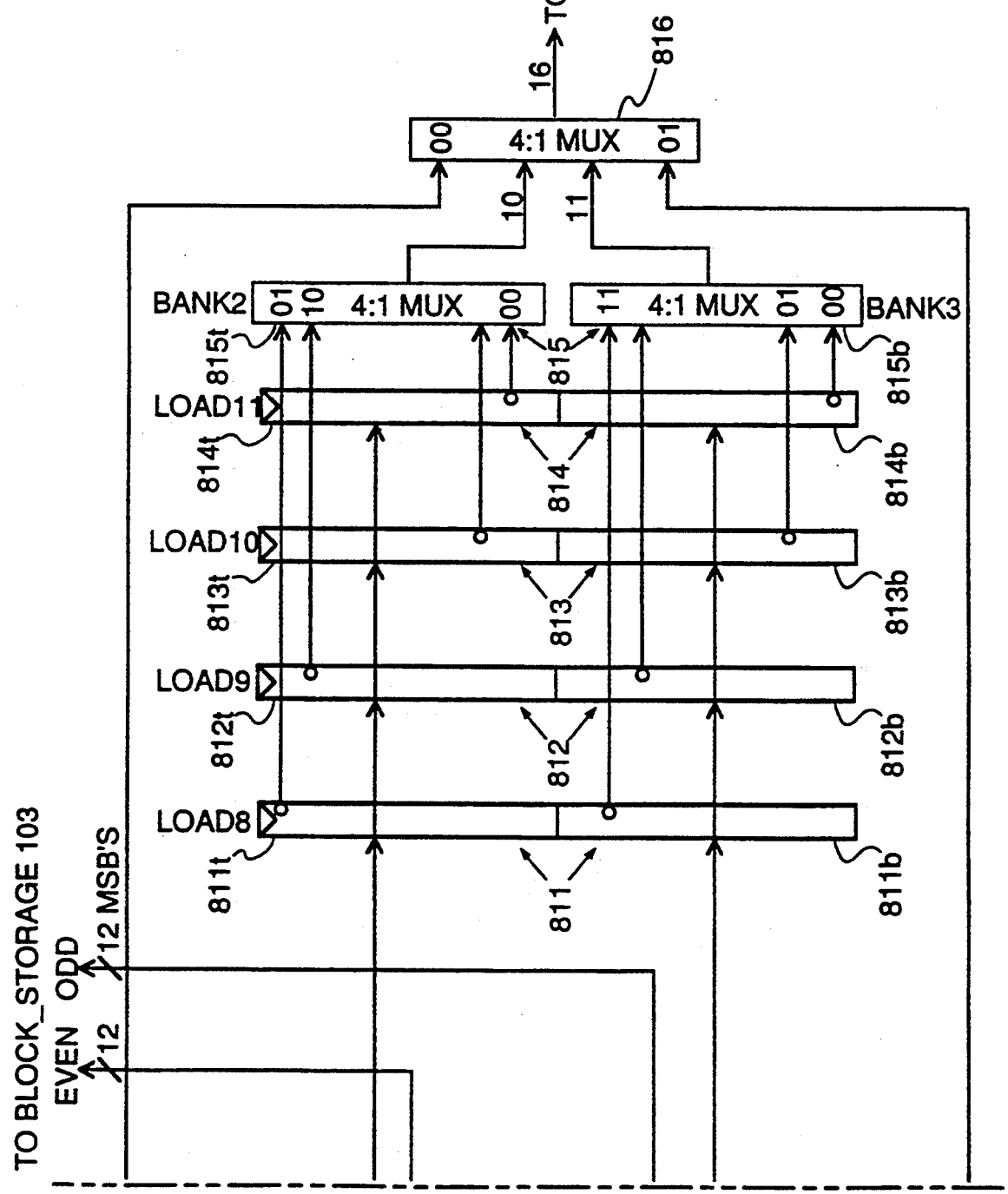
FIG. 8A(2)

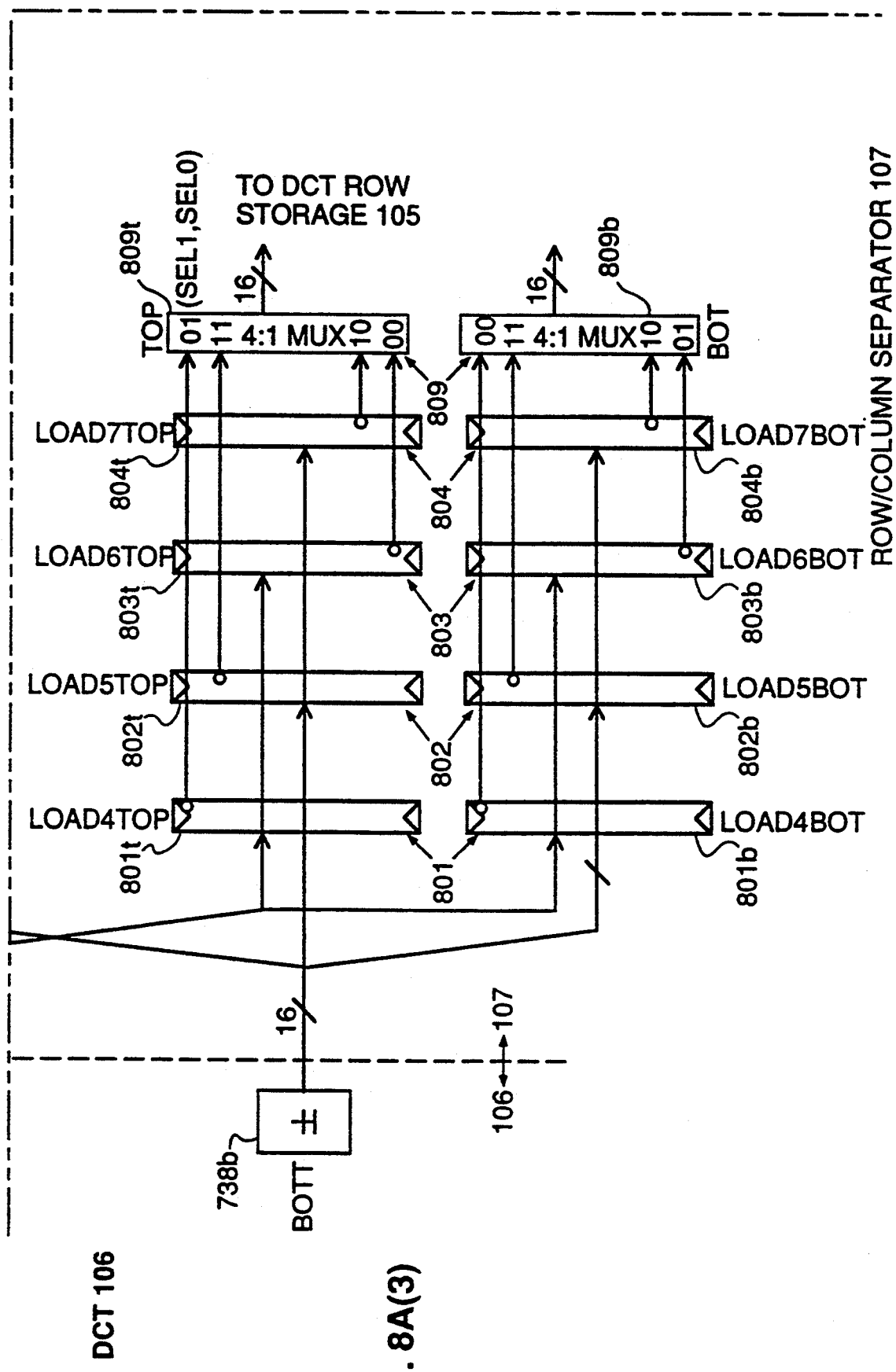
FIG. 8A(3)

FIG. 8B(1)

KEY TO FIG. 8B

| FIG. 8B(1) | FIG. 8B(2) | FIG. 8B(3) |
|---|---|---|
| FIG. 8B(4) | FIG. 8B(5) | FIG. 8B(6) |

| | | T/B | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| TO DCT_MEM | TOPMUX | SEL0 | | | | | 0 | 1 | 0 | 1 | | | | | 0 | 1 | 0 | 1 |
| | | SEL1 | | | | | 0 | 0 | 1 | 1 | | | | | 0 | 0 | 1 | 1 |
| | BOTMUX | | | | | | X(1) | X(3) | X(5) | X(7) | | | | | Z(1) | Z(3) | Z(5) | Z(7) |
| | TOPMUX | | | | | | X(0) | X(2) | X(4) | X(6) | | | | | Z(0) | Z(2) | Z(4) | Z(6) |
| 809 | LOAD7BOT / LOAD7TOP | | 00/00 | 00/00 | 01/00 | 10/00 | 00/00 | 00/00 | 00/00 | 00/00 | 00/00 | 00/00 | 01/00 | 10/00 | 00/00 | 00/00 | 00/00 | 00/00 |
| 804 | LOAD7 REG | B | | | | X(5) | | | | | | | | Z(5) | | | | |
| | | T | | | | X(4) | | | | | | | | Z(4) | | | | |
| | LOAD6BOT / LOAD6TOP | | 00/00 | 00/00 | 01/00 | 10/00 | 00/00 | 00/00 | 00/00 | 00/00 | 00/00 | 00/00 | 01/00 | 10/00 | 00/00 | 00/00 | 00/00 | 00/00 |
| 803 | LOAD6 REG | B | | | X(3) | | | | | | | | Z(3) | | | | | |
| | | T | | | X(0) | | | | | | | | Z(0) | | | | | |
| | LOAD5BOT / LOAD5TOP | | 01/00 | 10/00 | 00/00 | 00/00 | 00/00 | 00/00 | 00/00 | 00/00 | 01/00 | 10/00 | 00/00 | 00/00 | 00/00 | 00/00 | 00/00 | 00/00 |
| 802 | LOAD5 REG | B | | X(7) | | | | | | | | Z(7) | | | | | | |
| | | T | | X(6) | | | | | | | | Z(6) | | | | | | |
| | LOAD4BOT / LOAD4TOP | | 01/00 | 10/00 | 00/00 | 00/00 | 00/00 | 00/00 | 00/00 | 00/00 | 01/00 | 10/00 | 00/00 | 00/00 | 00/00 | 00/00 | 00/00 | 00/00 |
| 801 | LOAD4 REG | B | | X(1) | | | | | | | | Z(1) | | | | | | |
| | | T | | X(2) | | | | | | | | Z(2) | | | | | | |
| 738b | BOTDATA | | X(7) | X(6) | X(5) | X(4) | Y(7) | Y(6) | Y(5) | Y(4) | Z(7) | Z(6) | Z(5) | Z(4) | W(7) | W(6) | W(5) | W(4) |
| 738t | TOPDATA | | X(1) | X(2) | X(3) | X(0) | Y(1) | Y(2) | Y(3) | Y(0) | Z(1) | Z(2) | Z(3) | Z(0) | W(1) | W(2) | W(3) | W(0) |
| | COMPRESS | | 1 | 1 | 1 | 1 | 1 | 1 | 1 | 1 | 1 | 1 | 1 | 1 | 1 | 1 | 1 | 1 |
| | CLOCK | | 0 | 1 | 2 | 3 | 4 | 5 | 6 | 7 | 8 | 9 | 10 | 11 | 12 | 13 | 14 | 15 |

FIG. 8B(2) COMPRESS CONTROL FOR SEPARATOR

FIG. 8B(3)

| 810 OR 815 | | EXIT DCT | | | | QMUX | |
|---|---|---|---|---|---|---|---|
| | BK0 | BK1 | BK02 | BK3 | | | |
| | SEL0 SEL1 | SEL0 SEL1 | SEL0 SEL1 | SEL0 SEL1 | SEL0 SEL1 | | |
| OUT | | | | | | | |
| Y(0) | 00 | | | | 00 | | |
| Y(1) | 01 | | | | 00 | | |
| Y(2) | 10 | | | | 00 | | |
| Y(3) | 11 | | | | 00 | | |
| Y(4) | | 00 | | | 01 | | |
| Y(5) | | 01 | | | 01 | | |
| Y(6) | | 10 | | | 01 | | |
| Y(7) | | 11 | | | 01 | | |

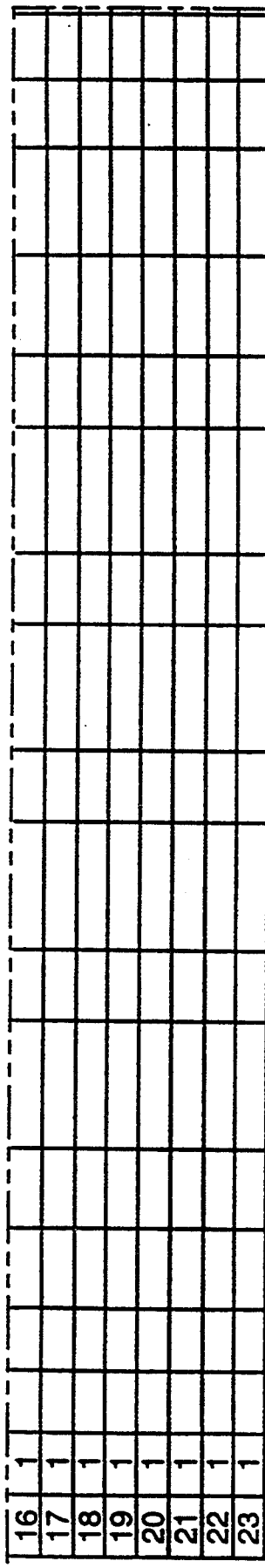
FIG. 8B(4)

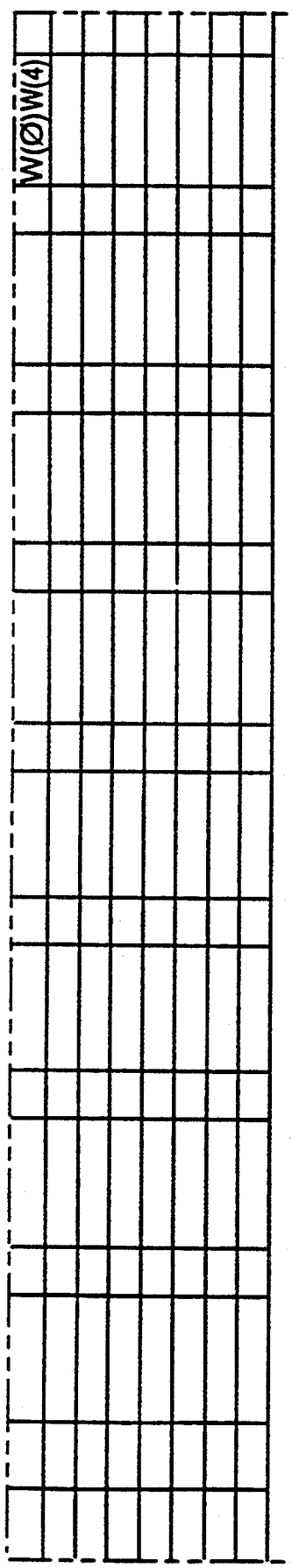
FIG. 8B(5)

| | | | | | | |
|---|---|---|---|---|---|---|
| W(0) | 00 | | | | | |
| W(1) | 01 | | | 10 | | |
| W(2) | 10 | | | 10 | | |
| W(3) | 11 | | | 10 | | |
| W(4) | | 00 | | 10 | | |
| W(5) | | 01 | | 11 | | |
| W(6) | | 10 | | 11 | | |
| W(7) | | 11 | | 11 | | |

FIG. 8B(6)

FIG. 8C(1)
DECOMPRESS CONTROL FOR SEPARATOR

| KEY TO FIGURE 8C | | |
|---|---|---|
| FIG. 8C(1) | FIG. 8C(2) | FIG. 8C(3) |
| FIG. 8C(4) | FIG. 8C(5) | FIG. 8C(6) |

| Signal | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CLOCK | 0 | 1 | 2 | 3 | 4 | 5 | 6 | 7 | 8 | 9 | 10 | 11 | 12 | 13 | 14 | 15 |
| COMPRESS | 0 | 0 | 0 | 0 | 0 | 0 | 0 | 0 | 0 | 0 | 0 | 0 | 0 | 0 | 0 | 0 |
| TOPDATA | X(2) | X(1) | X(3) | X(0) | Y(2) | Y(1) | Y(3) | Y(0) | Z(2) | Z(1) | Z(3) | Z(0) | W(2) | W(1) | W(3) | W(0) |
| BOTDATA | X(5) | X(6) | X(4) | X(7) | Y(5) | Y(6) | Y(4) | Y(7) | Z(5) | Z(6) | Z(4) | Z(7) | W(5) | W(6) | W(4) | W(7) |
| LOAD4 REG | | X(2) | X(1) | | | | | | | Z(2) | Z(1) | | | | | |
| LOAD4BOT / LOAD4TOP | 10 | 01 | 00 | 00 | 00 | 00 | 00 | 00 | 10 | 01 | 00 | 00 | 00 | 00 | 00 | 00 |
| LOAD5 REG | X(5) | | X(6) | | | | | | Z(5) | | Z(6) | | | | | |
| LOAD5BOT / LOAD5TOP | 01 | 10 | 00 | 00 | 00 | 00 | 00 | 00 | 01 | 10 | 00 | 00 | 00 | 00 | 00 | 00 |
| LOAD6 REG | | | | X(3) | X(0) | | | | | | | Z(3) | Z(0) | | | |
| LOAD6BOT / LOAD6TOP | 00 | 00 | 01 | 10 | 00 | 00 | 00 | 00 | 00 | 00 | 01 | 10 | 00 | 00 | 00 | 00 |
| LOAD7 REG | | | | | X(4) | | | X(7) | | | | | Z(4) | | | Z(7) |
| LOAD7BOT / LOAD7TOP | 00 | 00 | 10 | 01 | 00 | 00 | 00 | 00 | 00 | 00 | 10 | 01 | 00 | 00 | 00 | 00 |
| TO DCT_MEM TOPMUX | | | | | X(0) | X(2) | X(4) | X(6) | | | | | Z(0) | Z(2) | Z(4) | Z(6) |
| TO DCT_MEM BOTMUX | | | | | X(1) | X(3) | X(5) | X(7) | | | | | Z(1) | Z(3) | Z(5) | Z(7) |
| TOPMUX SEL1 | | | | | 0 | 0 | 1 | 1 | | | | | 0 | 0 | 1 | 1 |
| TOPMUX SEL0 | | | | | 0 | 1 | 0 | 1 | | | | | 0 | 1 | 0 | 1 |

FIG. 8C(2)

| | | | | | | | | | | | | | | | | | |
|---|---|---|---|---|---|---|---|---|---|---|---|---|---|---|---|---|---|
| LOAD11 | | | | | | | | | | | | | | | | | |
| LOAD11 REG | | | | | | | | | | | | | | | | | |
| LOAD10 | | | | | | | | | | | | | | | | | |
| LOAD10 REG | | | | | | | | | | | | | | | | | |
| LOAD9 | | | | | | | | | | | | | | | | | |
| LOAD9 REG | | | | | | | | | | | | | | | | | |
| LOAD8 | | | | | | | | | | | | | | | | | |
| LOAD8 REG | | | | | | | | | | | | | | | | | |
| 808 — LOAD3 | | 0 | 0 | 0 | 0 | 0 | 0 | 1 | 0 | 0 | 0 | 0 | 0 | 0 | 1 | | |
| LOAD3 REG | | | | | | | | | Y(0) Y(7) | | | | | | | | |
| 807 — LOAD2 | | 0 | 0 | 0 | 0 | 0 | 1 | 0 | 0 | 0 | 0 | 0 | 0 | 1 | 0 | | |
| LOAD2 REG | | | | | | | | Y(3) Y(4) | | | | | | | W(3) W(4) | | |
| 806 — LOAD1 | | 0 | 0 | 0 | 0 | 1 | 0 | 0 | 0 | 0 | 0 | 0 | 1 | 0 | 0 | | |
| LOAD1 REG | | | | | | | Y(1) Y(6) | | | | | | | W(1) W(6) | | | |
| LOAD0 | | 0 | 0 | 0 | 1 | 0 | 0 | 0 | 0 | 0 | 0 | 1 | 0 | 0 | 0 | | |
| 805 — LOAD0 REG | | | | | | Y(2) Y(5) | | | | | | | W(2) W(5) | | | | |
| BOTMUX SEL0 | | | | | 0 | 1 | 1 | 0 | | | | 0 | 1 | 1 | 0 | | |
| BOTMUX SEL1 | | | | | 0 | 0 | 1 | 1 | | | | 0 | 0 | 1 | 1 | | |

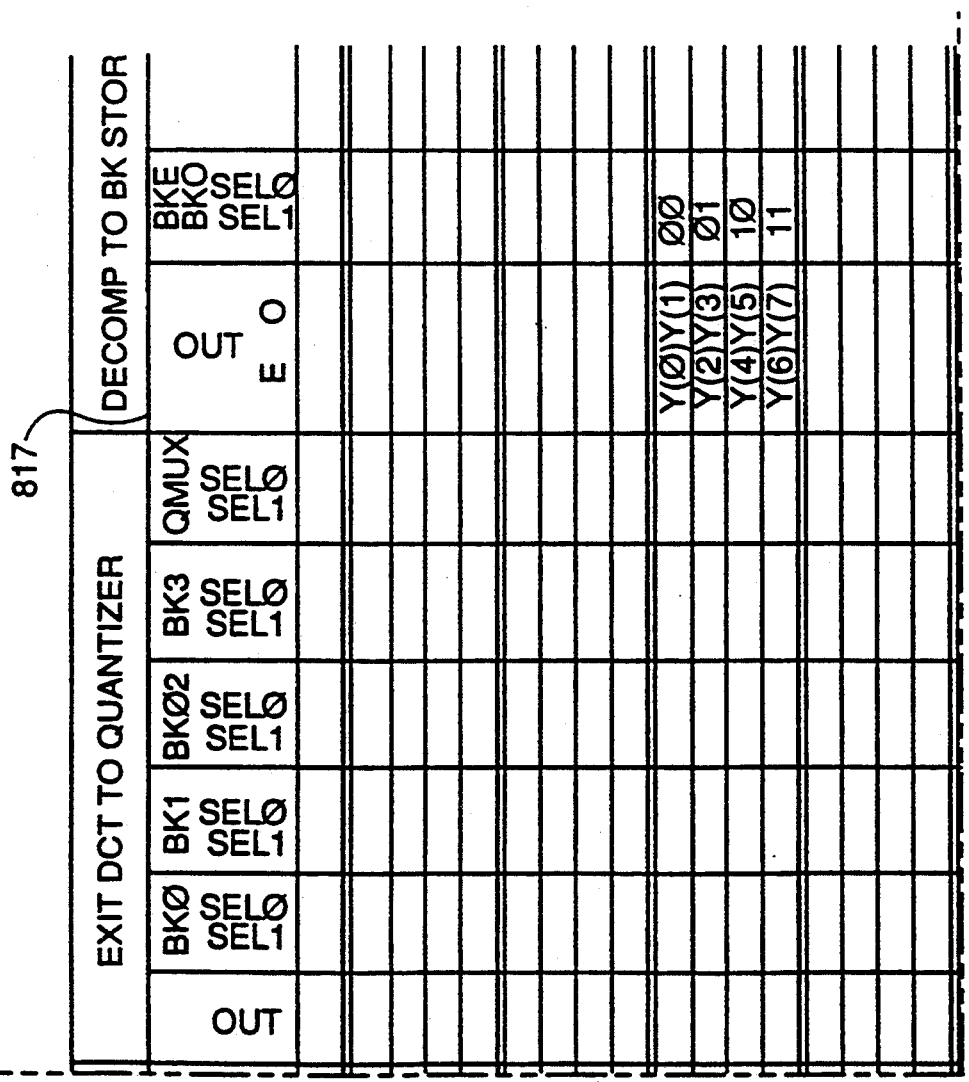

FIG. 8C(4)

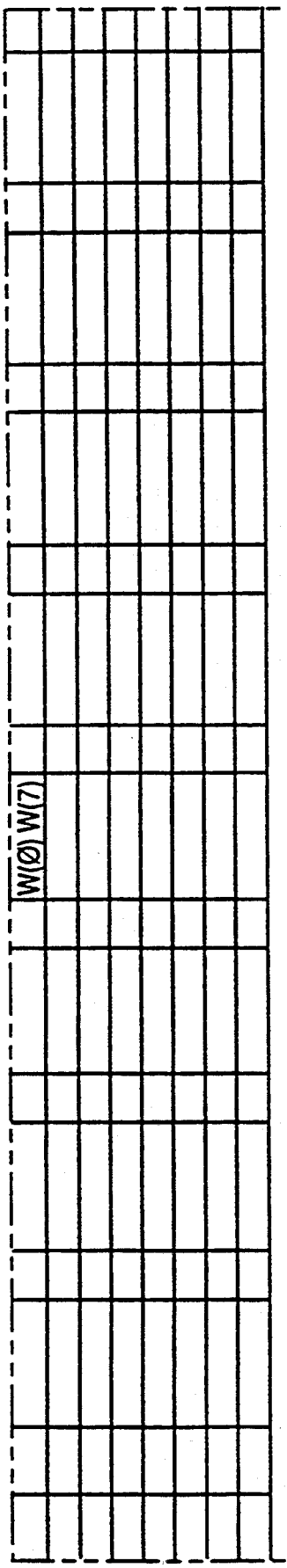
FIG. 8C(5)

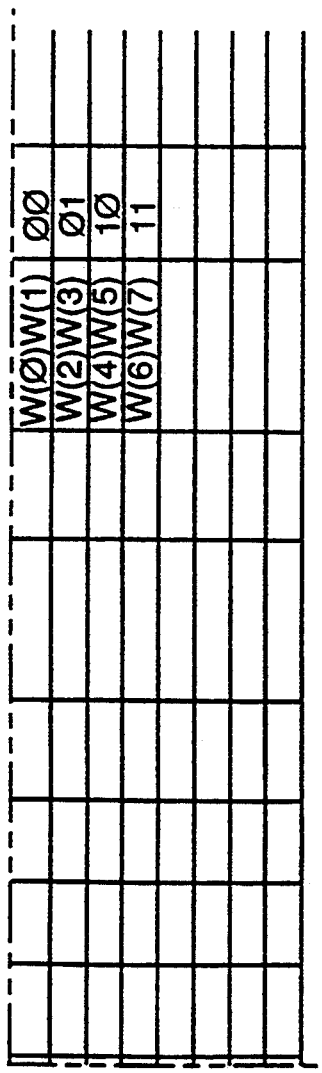
FIG. 8C(6)

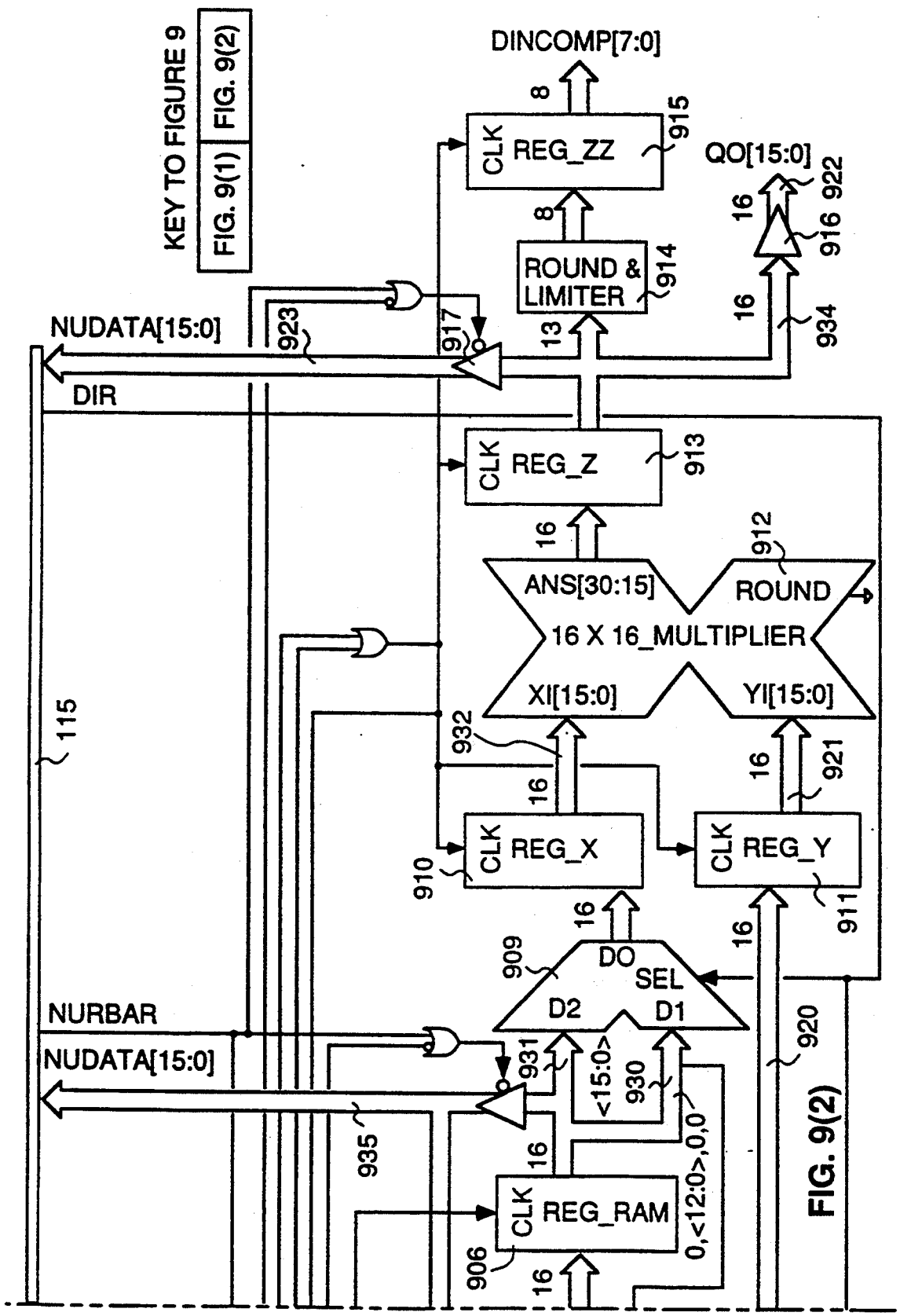

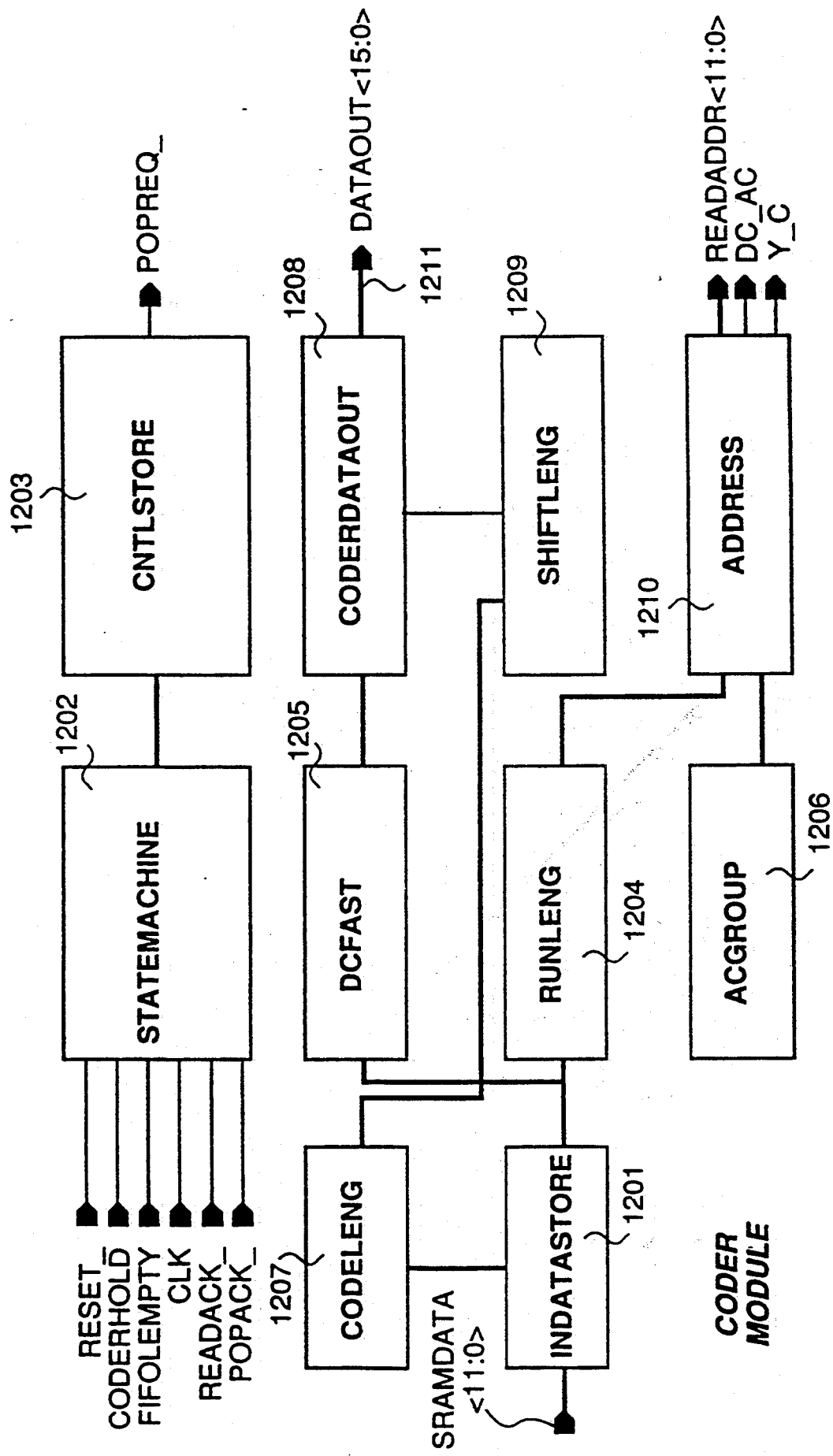

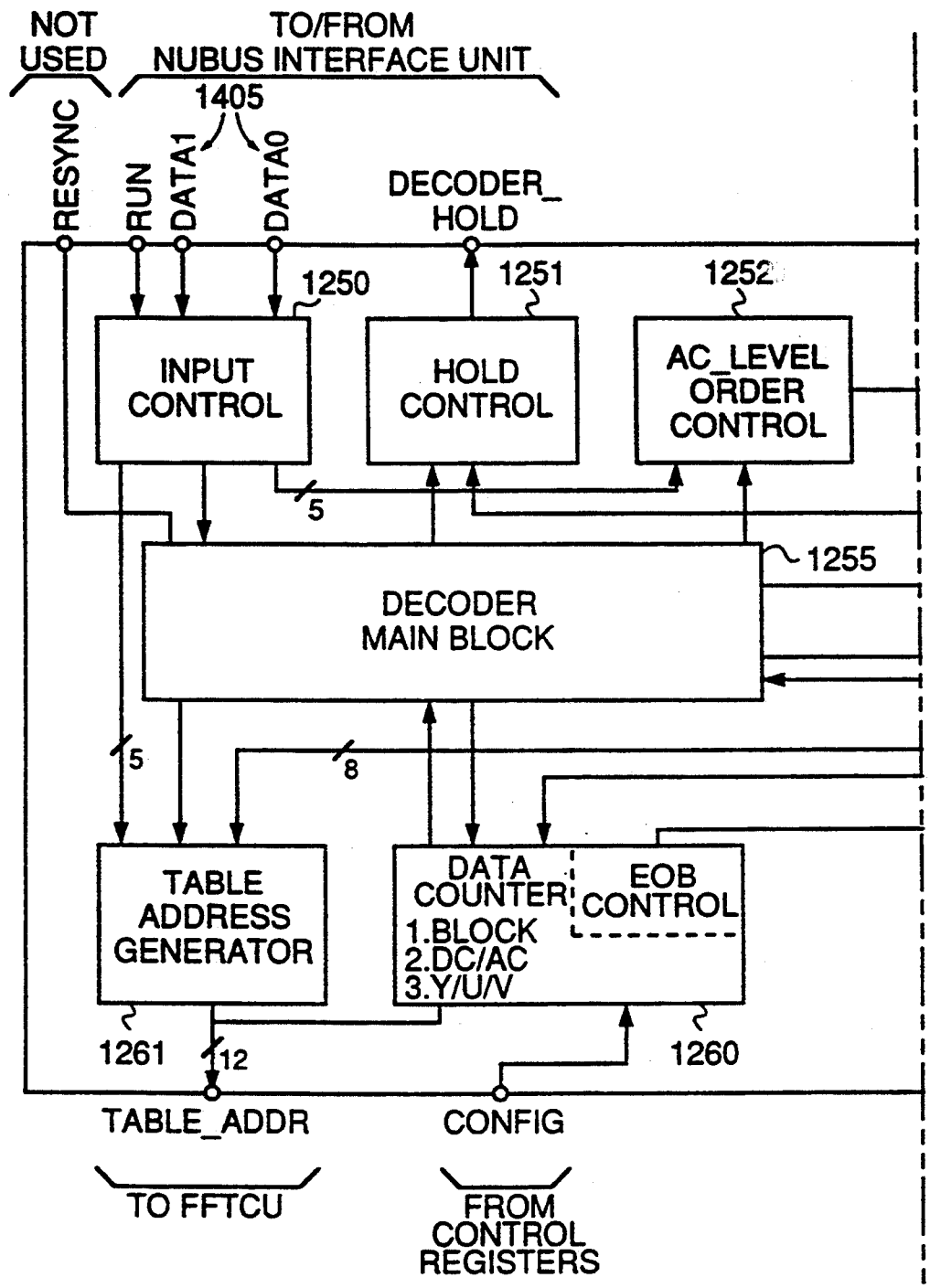
FIG. 12B(1)

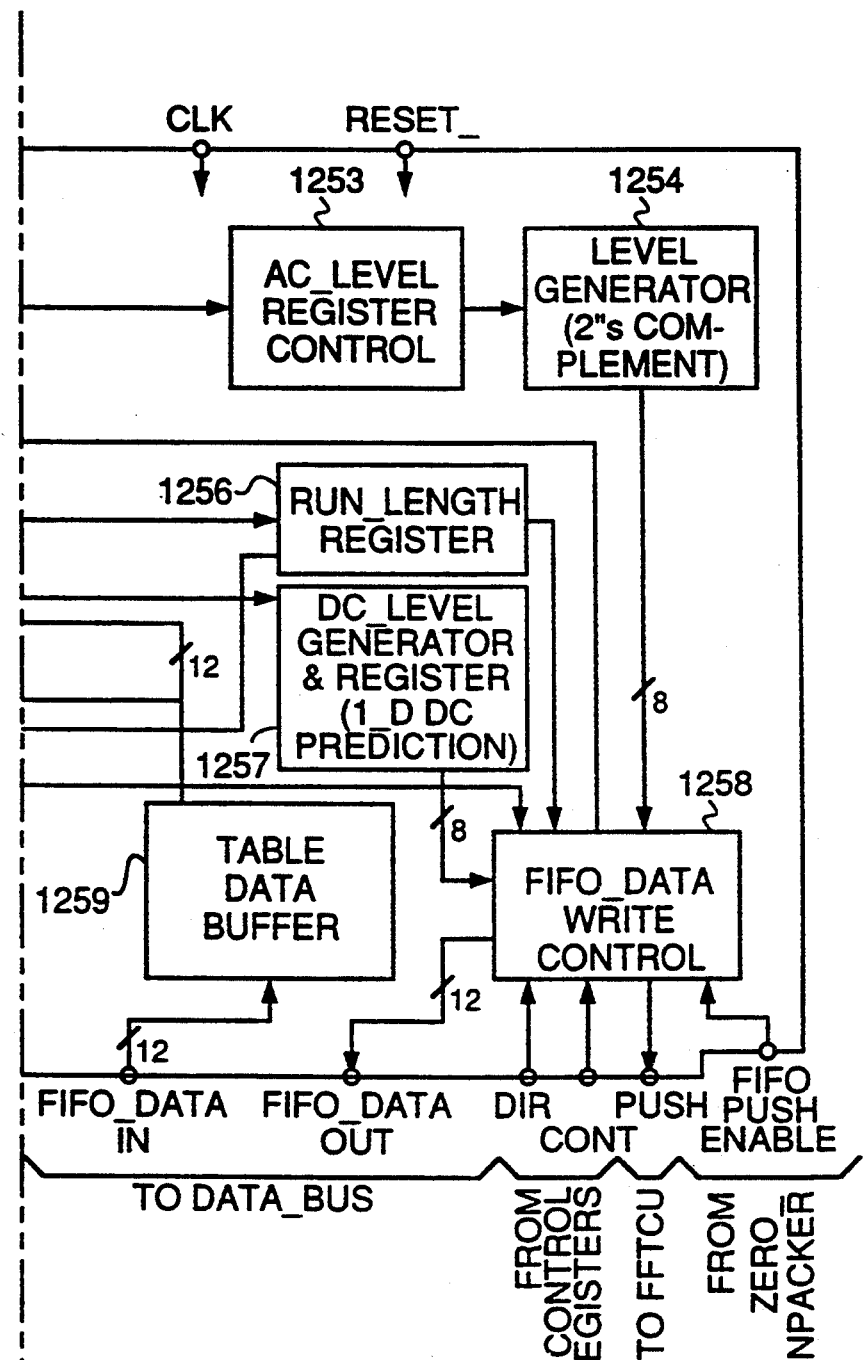
FIG. 12B(2)

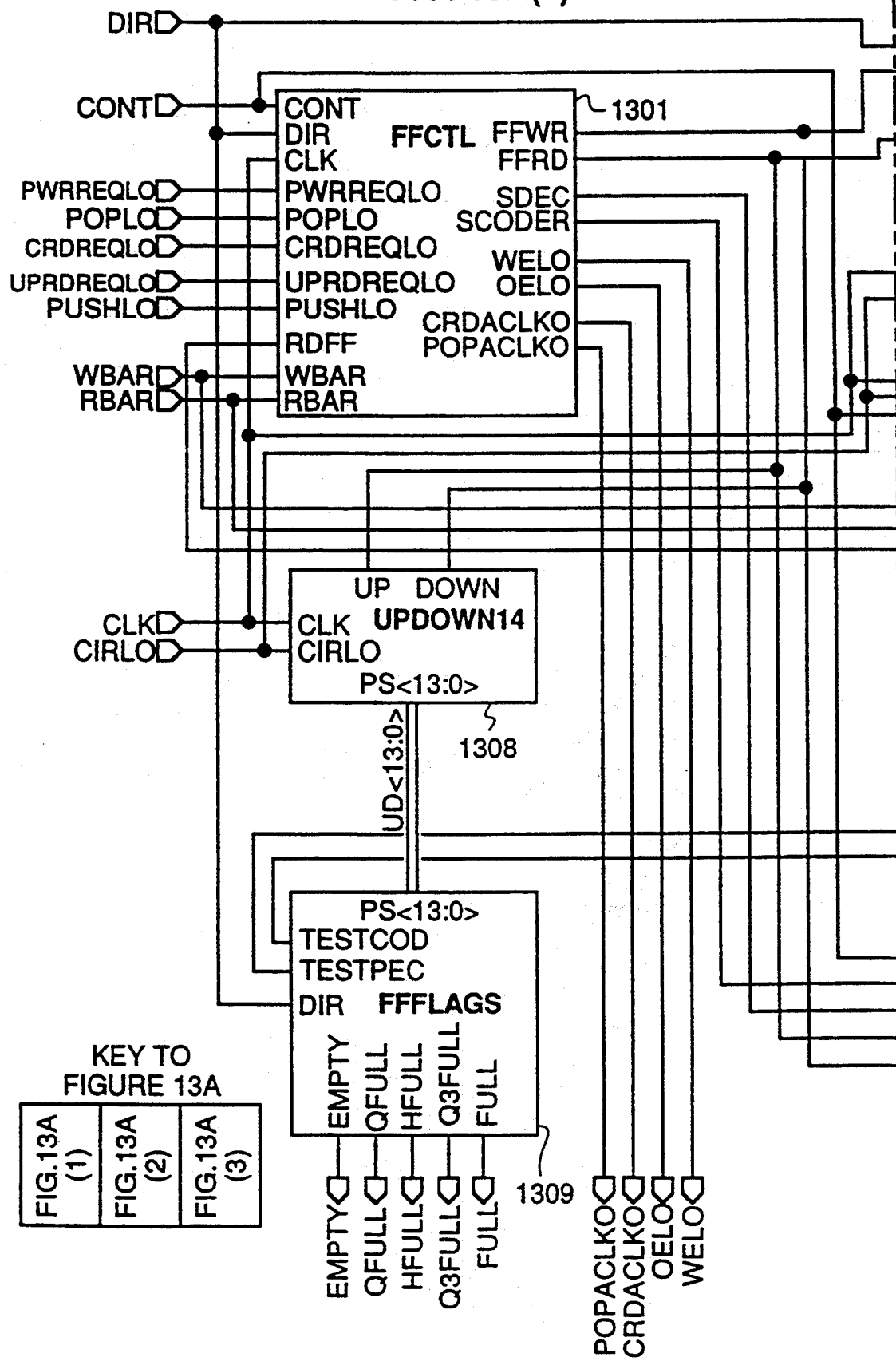

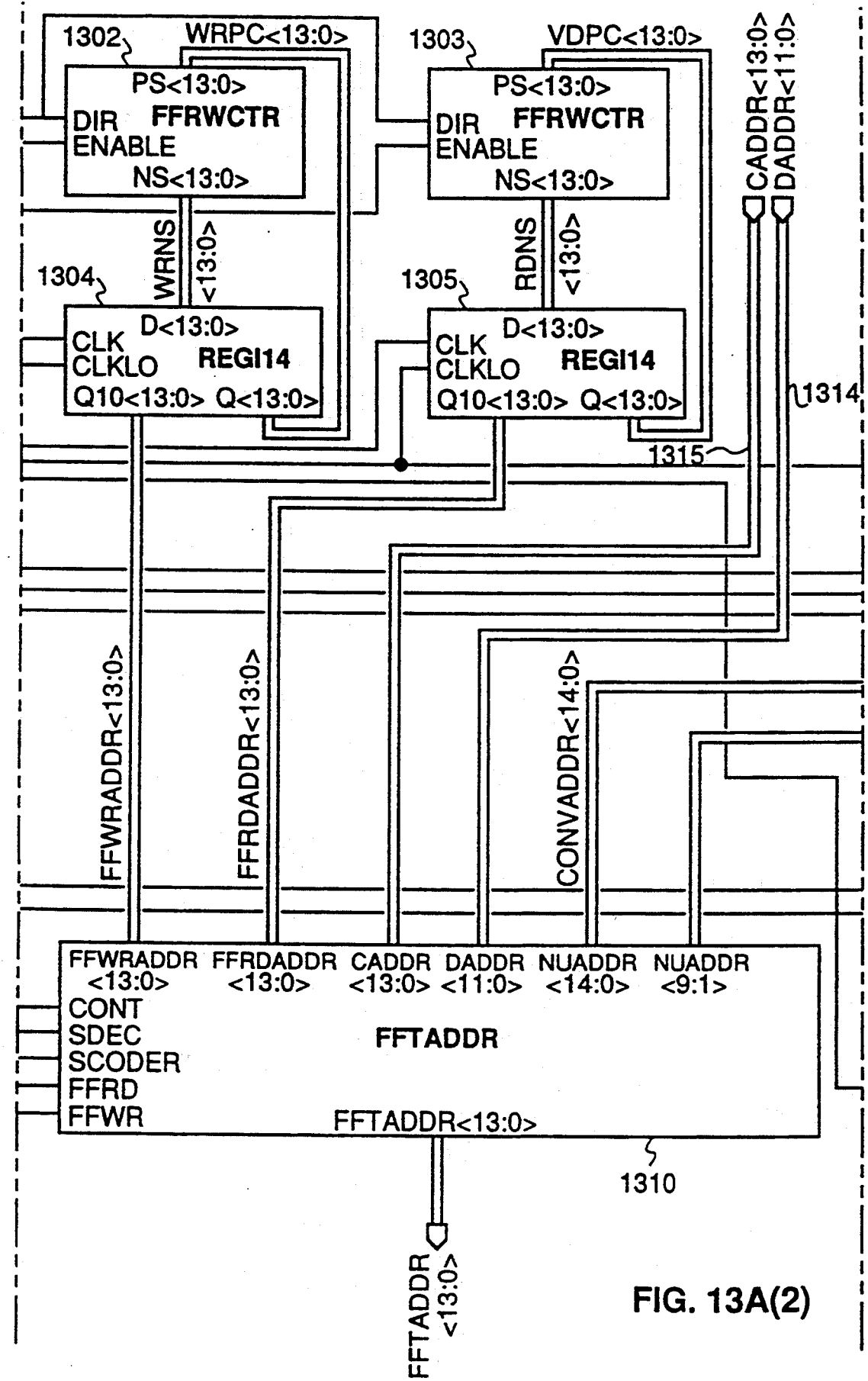
FIG. 13A(2)

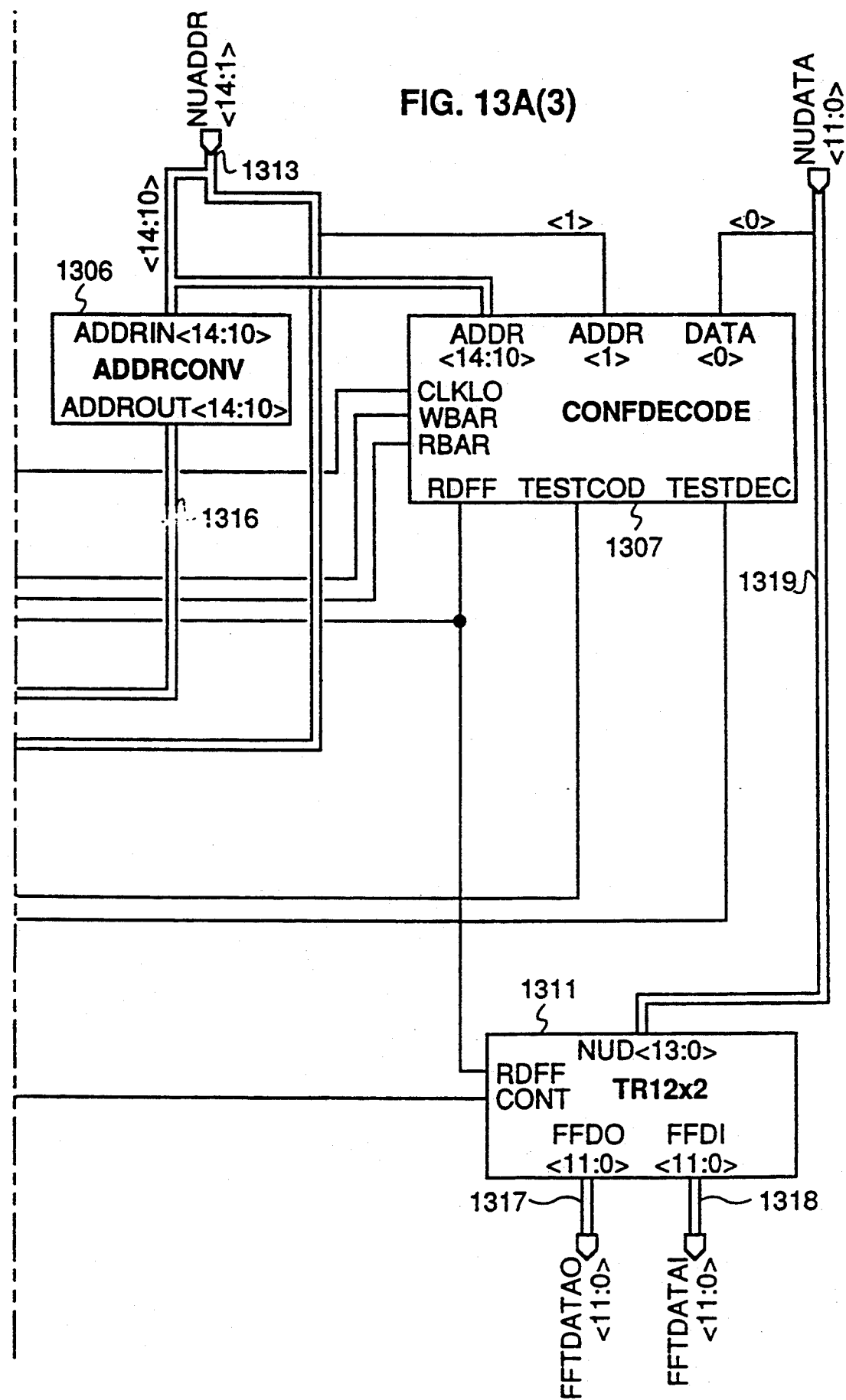
FIG. 13A(3)

FIG. 13B
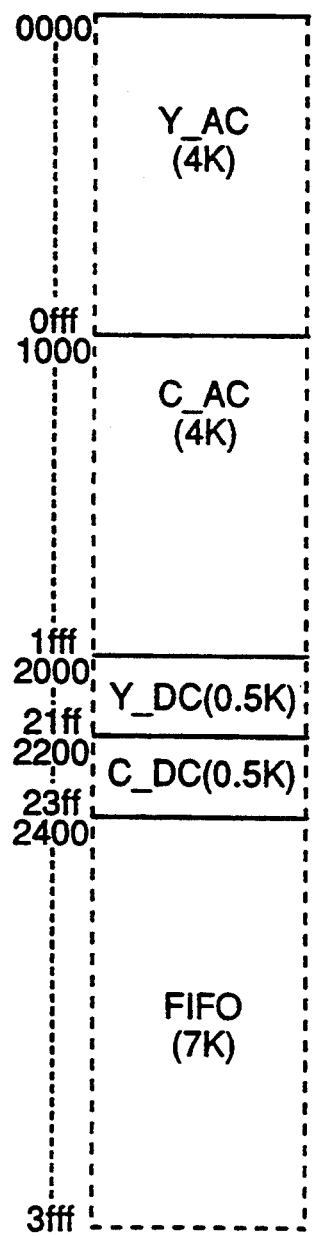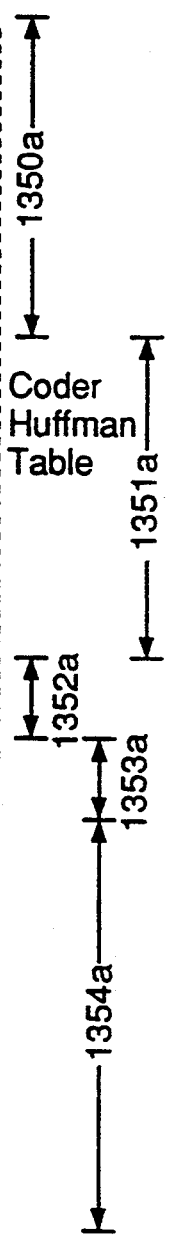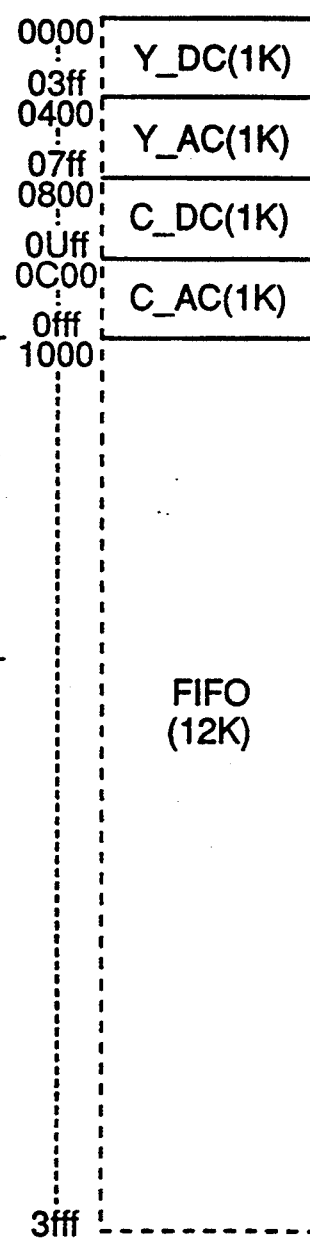

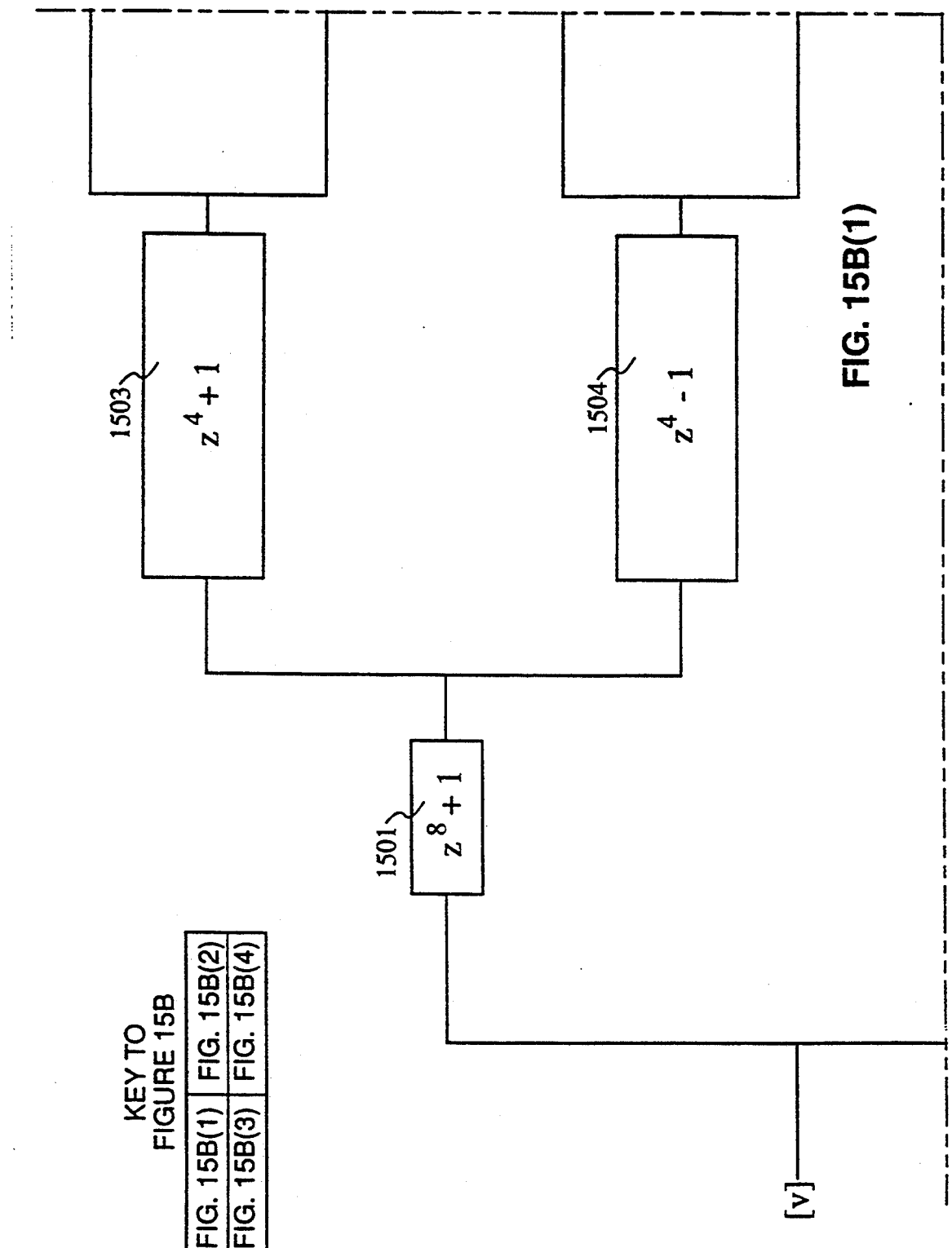
FIG. 15B(1)

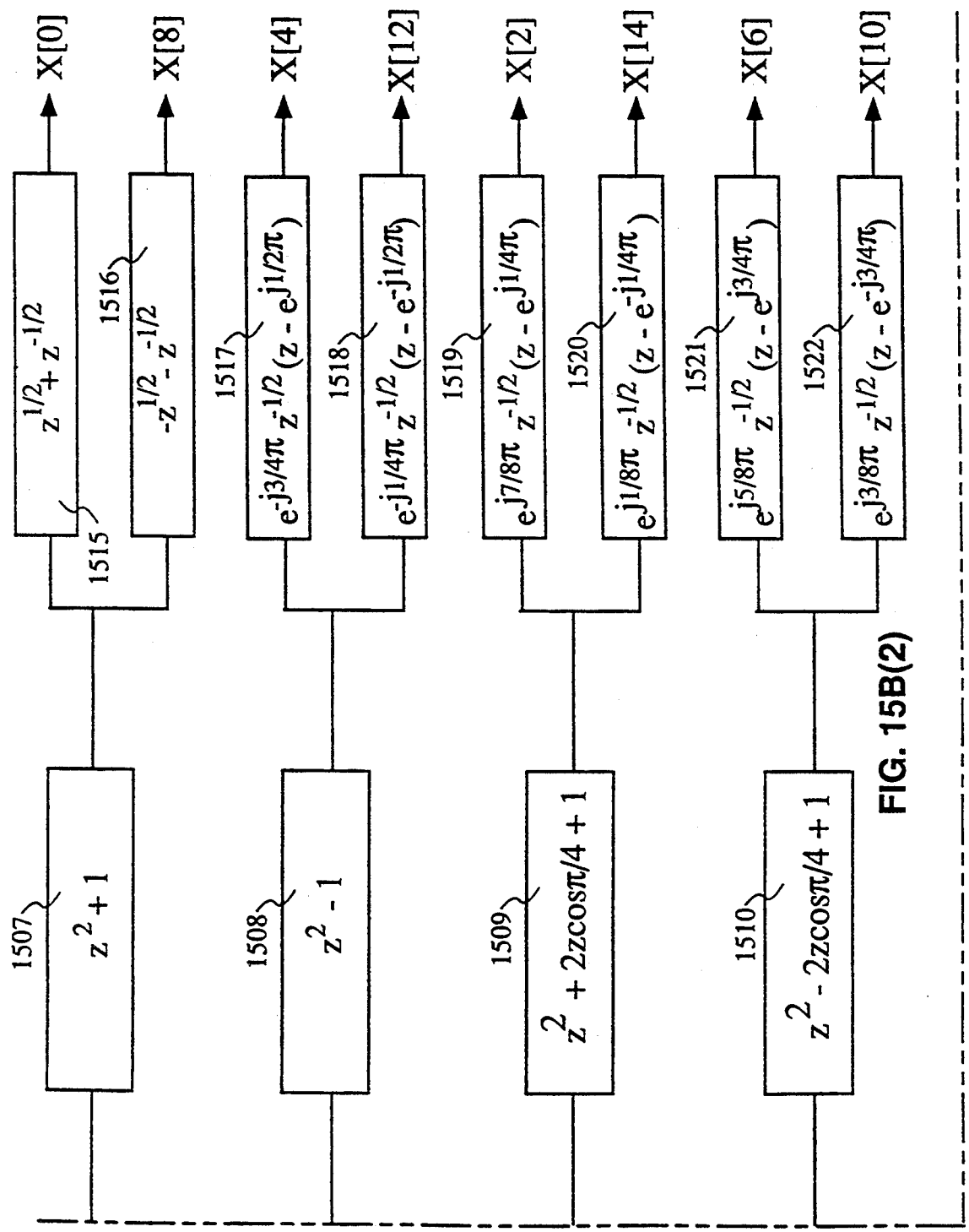
FIG. 15B(2)

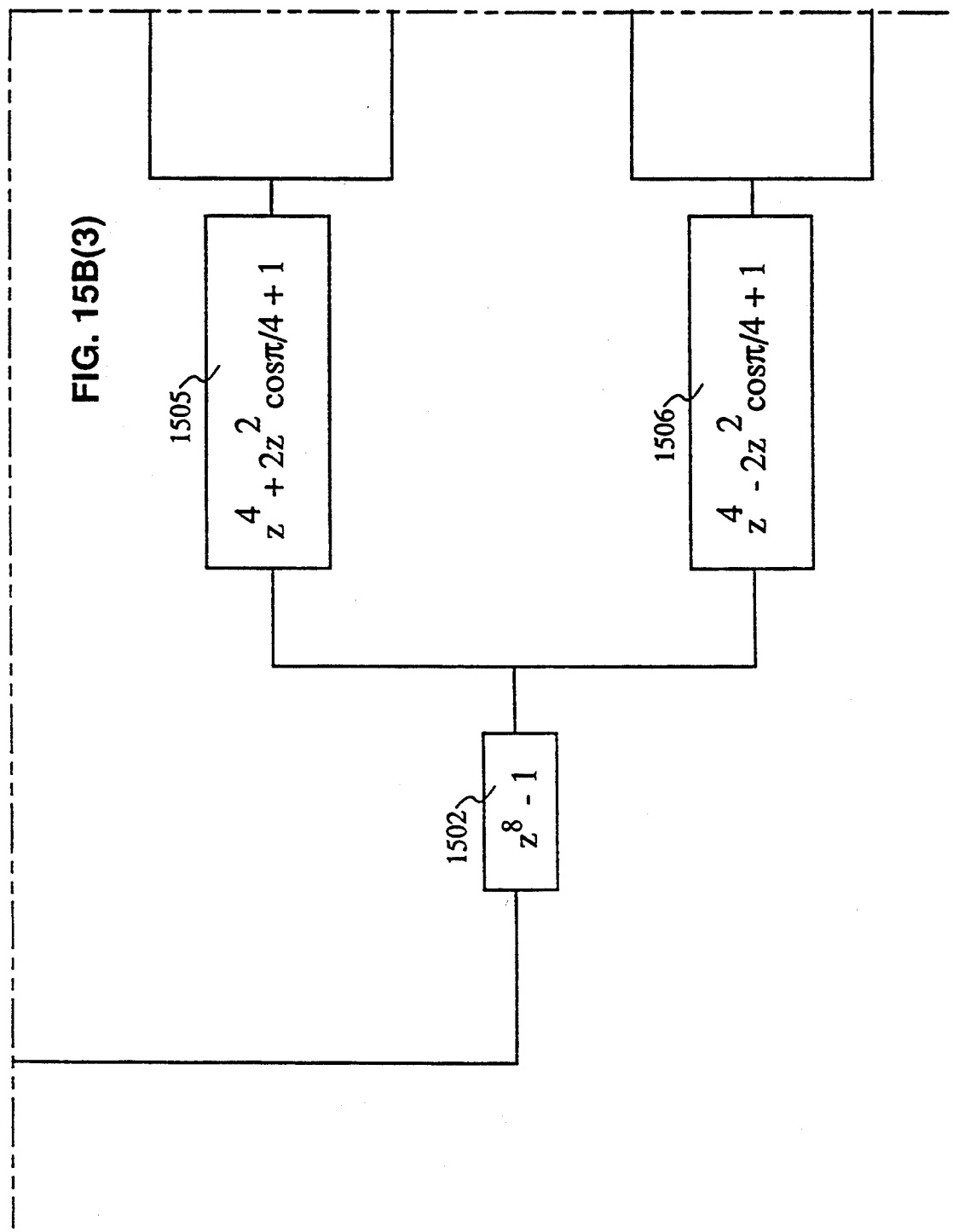
FIG. 15B(3)

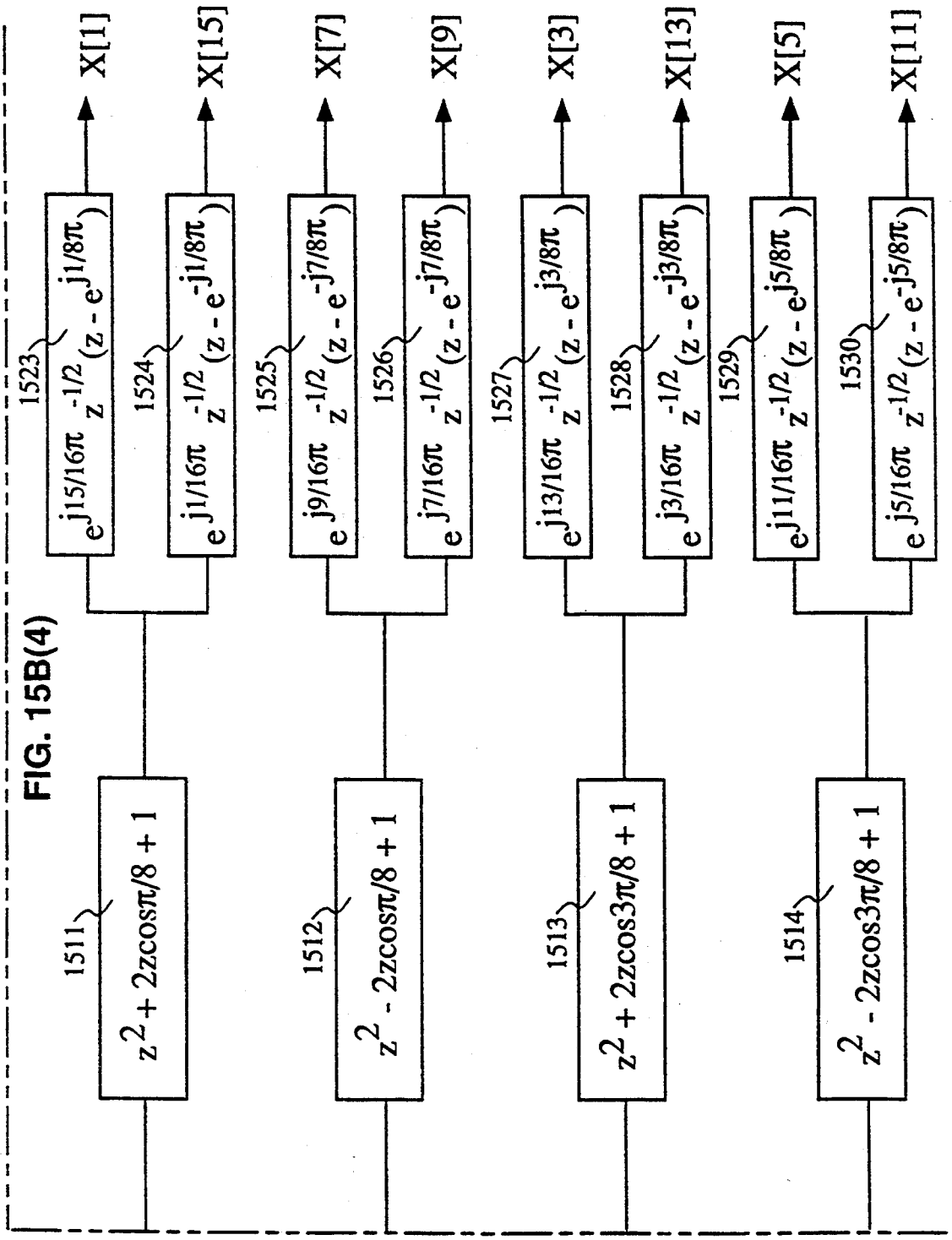
FIG. 15B(4)

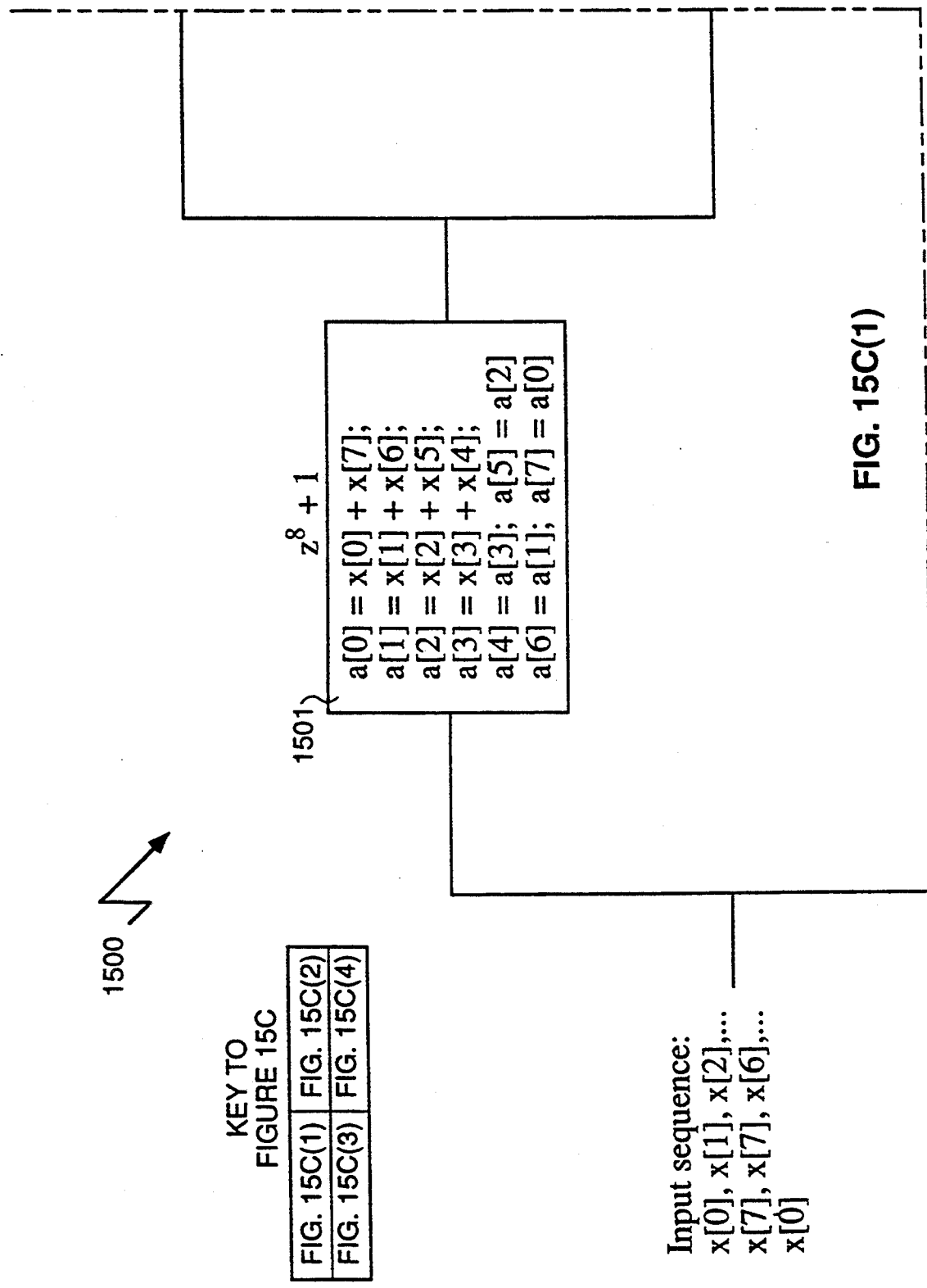

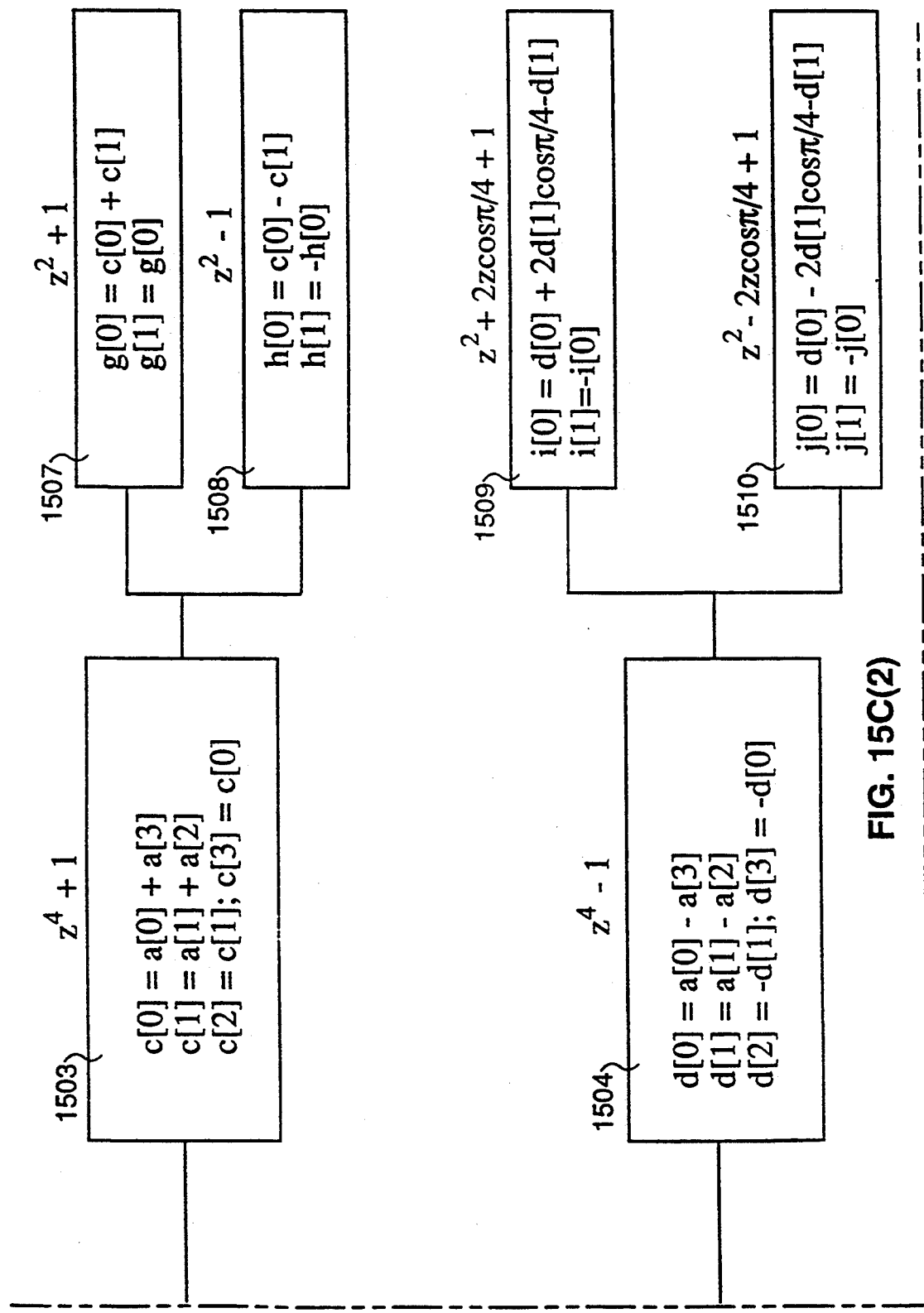
FIG. 15C(2)

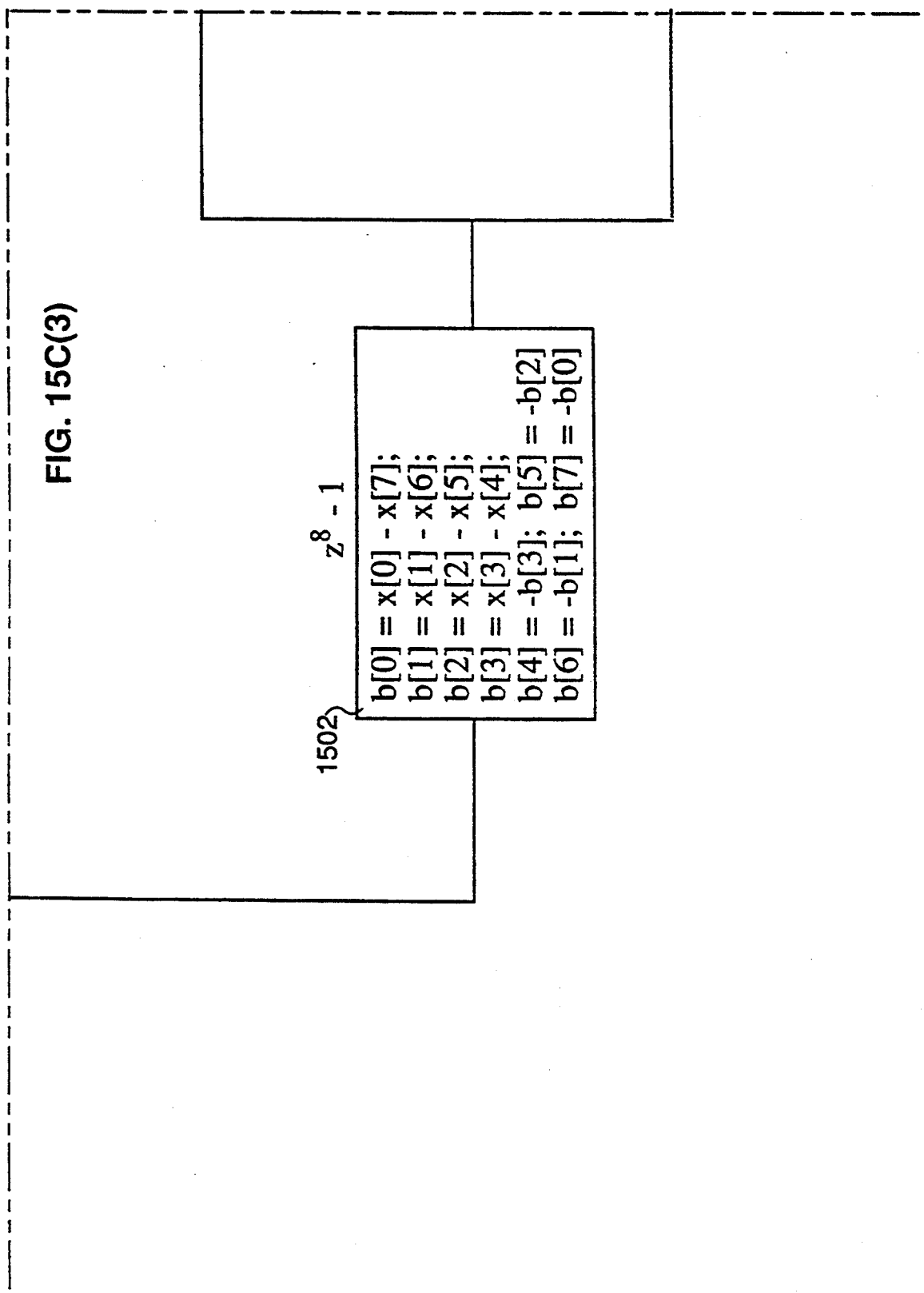

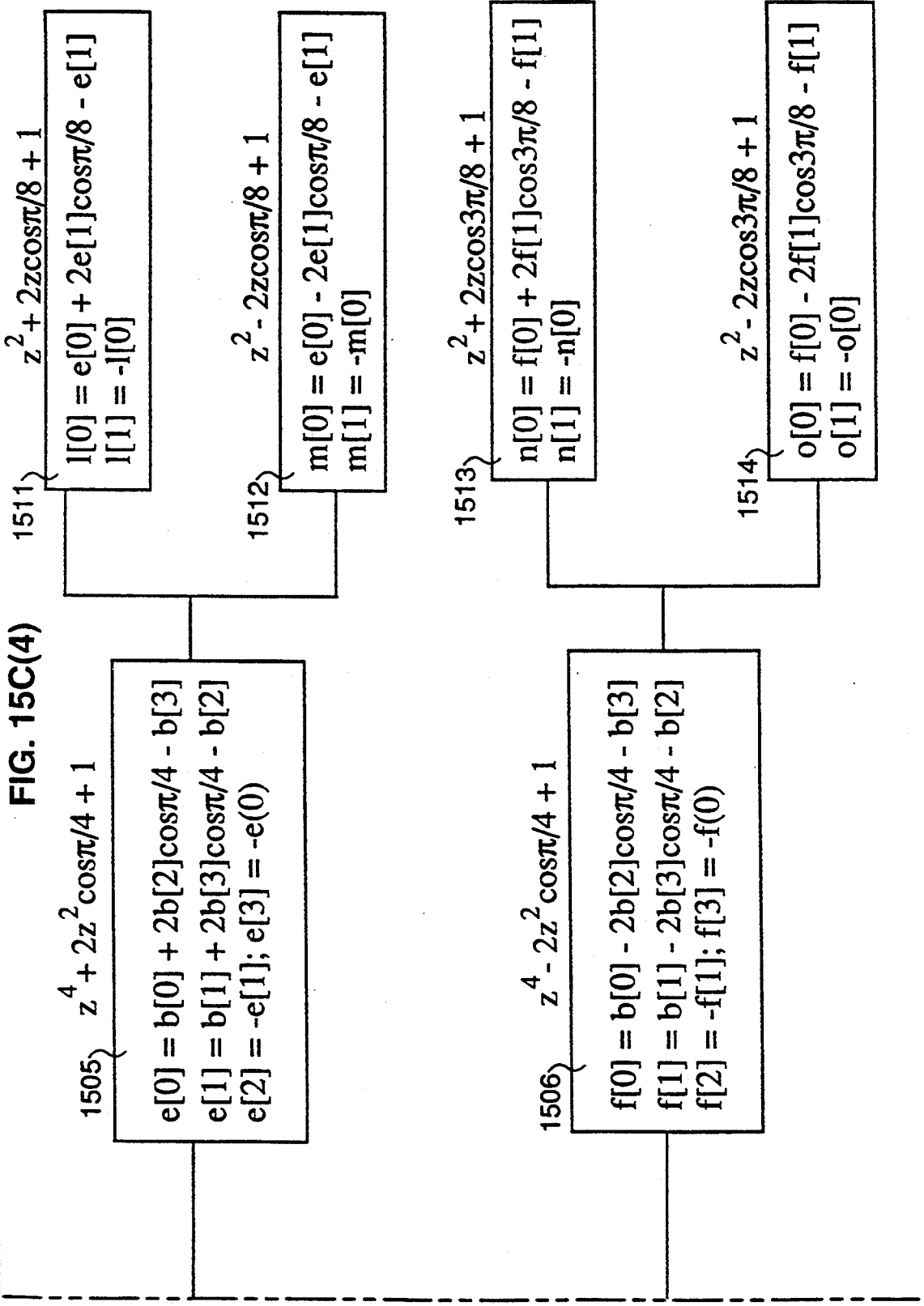
FIG. 15C(4)

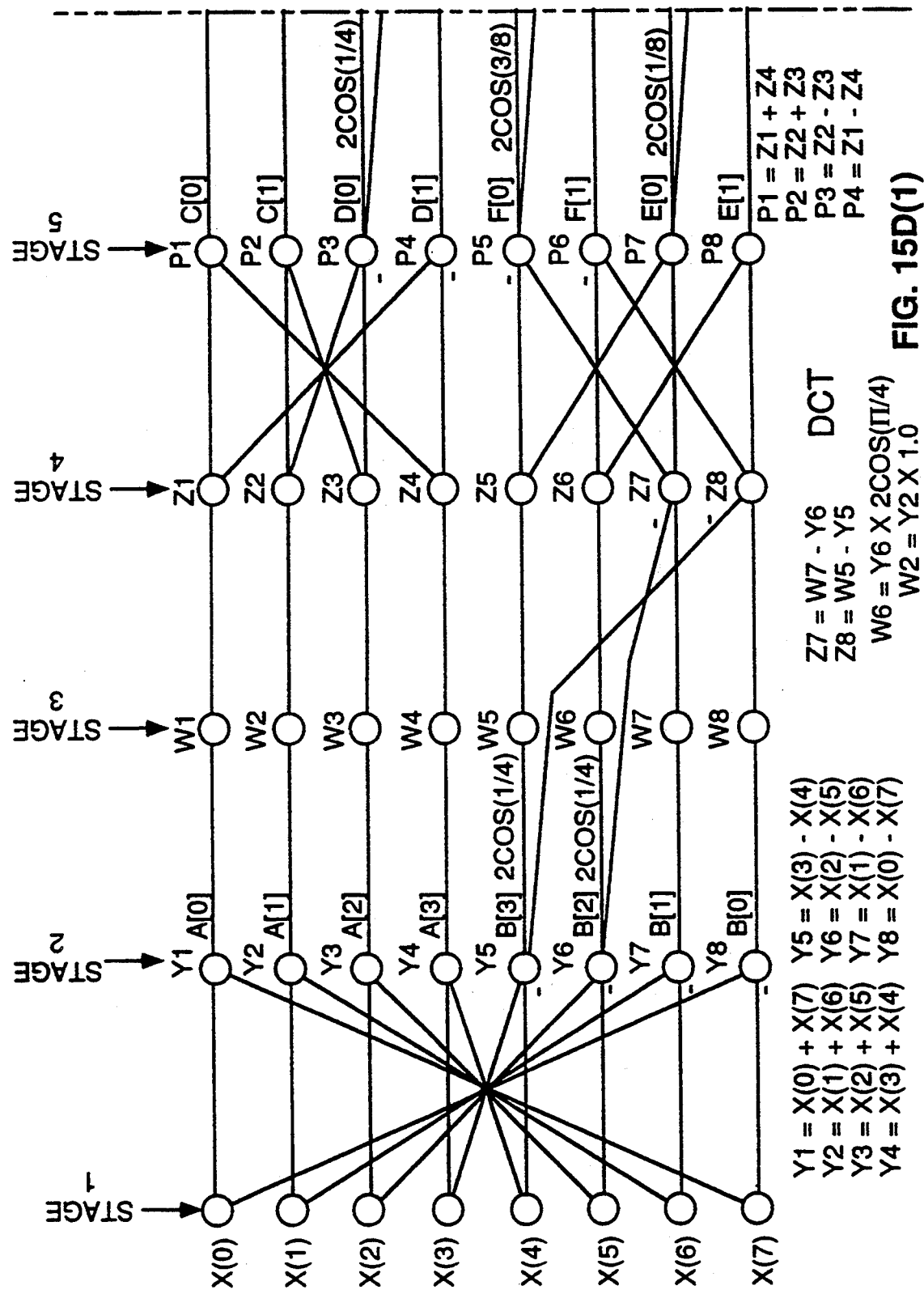
FIG. 15D(1)

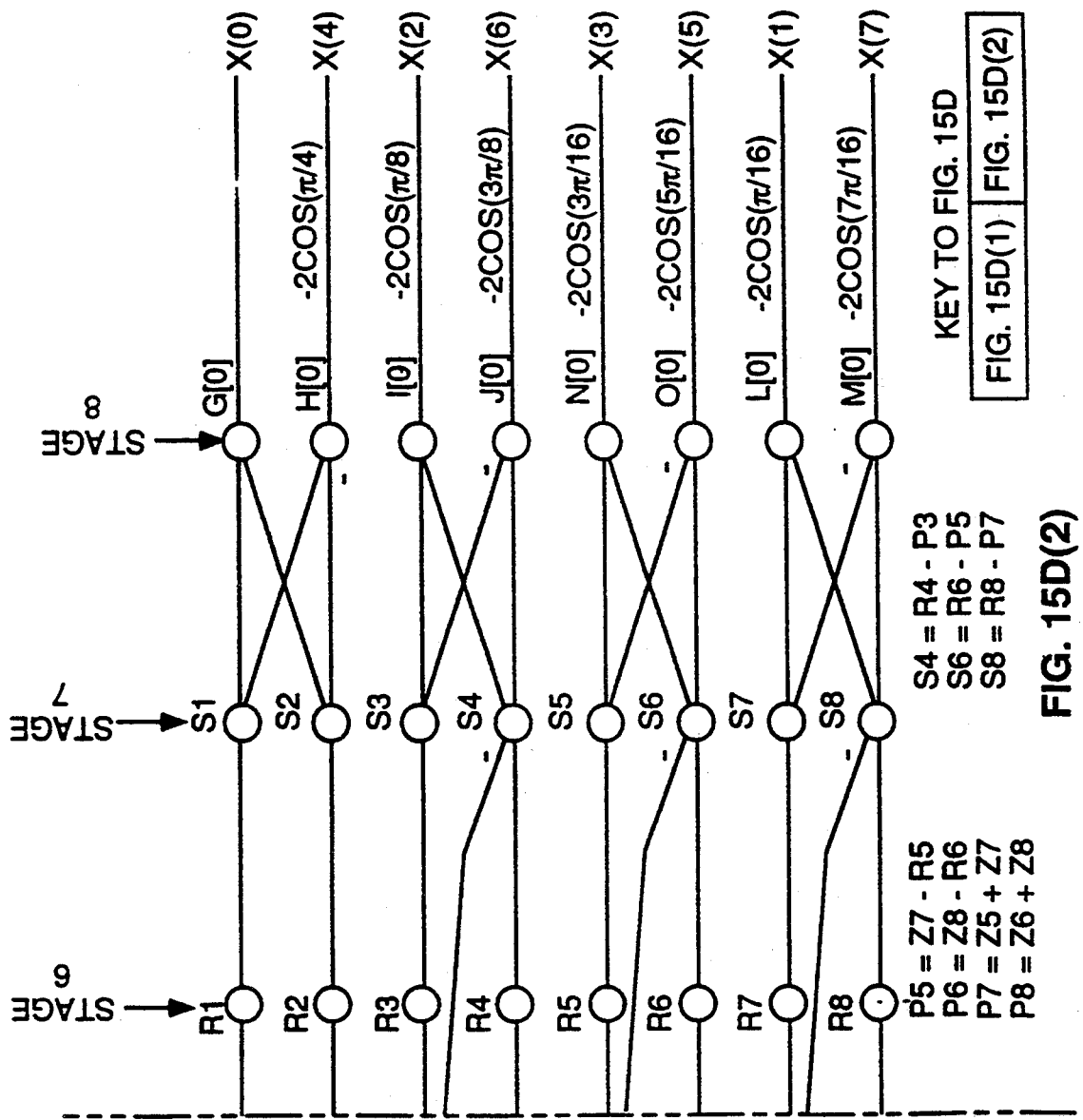
FIG. 15D(2)

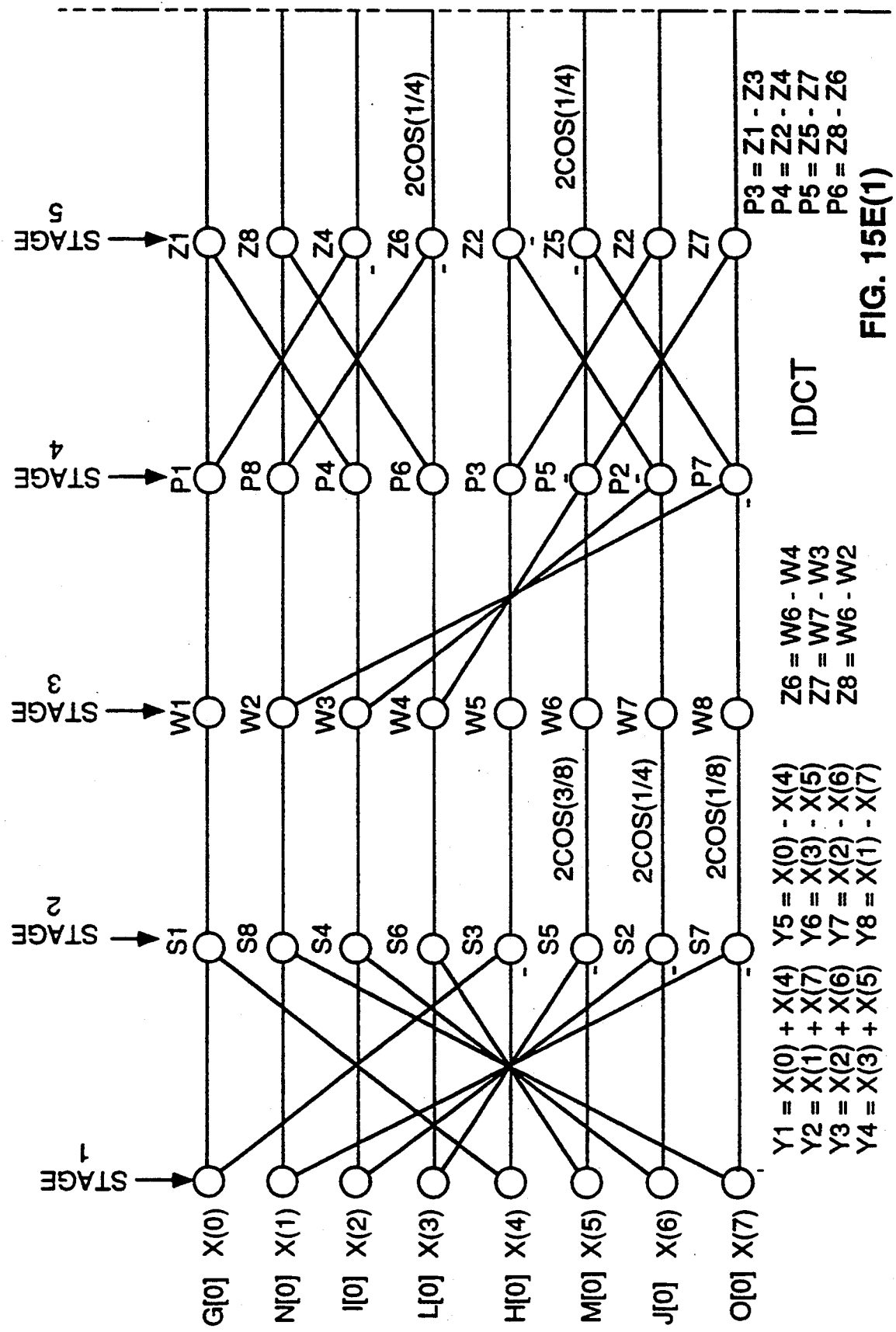
FIG. 15E(1)

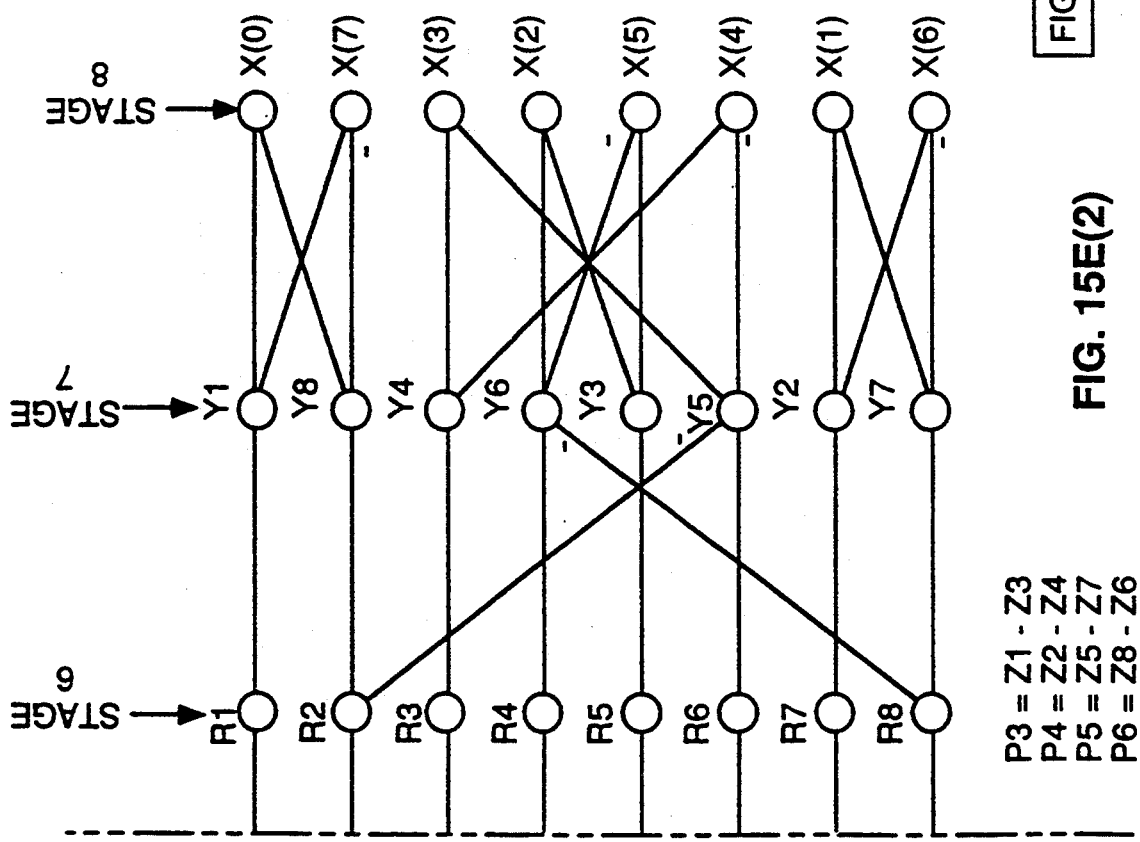
FIG. 15E(2)

SYSTEM FOR COMPRESSION AND DECOMPRESSION OF VIDEO DATA USING DISCRETE COSINE TRANSFORM AND CODING TECHNIQUES

This application is a division of U.S. patent application, Ser. No. 07/818,403, now U.S. Pat. No. 5,191,548, entitled "System for Compression and Decompression of Video Data Using Discrete Cosine Transform and Coding Techniques", to A. Balkanski et al, filed on Jan. 3, 1992, issued on Mar. 2, 1993, which is a continuation of U.S. patent application, Ser. No. 07/495,583, now abandoned, entitled "System for Compression and Decompression of Video Data Using Discrete Cosine Transform and Coding Techniques", filed on Mar. 16, 1990, which is a continuation-in-part of U.S. patent application, Ser. No. 07/494,242, now U.S. Pat. No. 5,196,946, entitled "System for Compression and Decompression of Video Data Using Discrete Cosine Transform and Coding Techniques", to A. Balkanski et al, filed on Mar. 14, 1990, and issued on Mar. 23, 1993.

This application is also related to U.S. patent application, Ser. No. 07/572,198, now U.S. Pat. No. 5,253,078, entitled "System for Compression and Decompression of Video Data Using Discrete Cosine Transform Techniques," to A. Balkanski et al, filed on Aug. 23, 1990, issued on Oct. 12, 1993.

All of the above U.S. patent applications and U.S. Patents are assigned to C-Cube Microsystems, which is also the Assignee of this application.

BACKGROUND OF THE INVENTION

This invention relates to the compression and decompression of data and in particular to the reduction in the amount of data necessary to be stored for use in reproducing a high quality video picture.

DESCRIPTION OF THE PRIOR ART

In order to store images and video on a computer, the images and video must be captured and digitized. Image capture can be performed by a wide range of input devices, including scanners and video digitizers.

A digitized image is a large two-dimensional array of picture elements, or pixels. The quality of the image is a function of its resolution, which is measured in the number of horizontal and vertical pixels. For example, a standard display of 640 by 480 has 640 pixels across (horizontally) and 480 from top to bottom (vertically). However, the resolution of an image is usually referred to in dots per inch (dpi). Dots per inch are quite literally the number of dots per inch of print capable of being used to make up an image measured both horizontally and vertically on, for example, either a monitor or a print medium. As more pixels are packed into smaller display area and more pixels are displayed on the screen, the detail of the image increases-as well as the amount of memory required to store the image.

A black and white image is an array of pixels that are either black or white, on or off. Each pixel requires only one bit of information. A black and white image is often referred to as a bi-level image. A gray scale image is one such that each pixel is usually represented using 8 bits of information. The number of shades of gray that can thus be represented is therefore equal to the number of permutations achievable on the 8 bits, given that each bit is either on or off, equal to $2^8$ or 256 shades of gray. In a color image, the number of possible colors that can be displayed is determined by the number of shades of each of the primary colors, Red, Green and Blue, and all their possible combinations. A color image is represented in full color with 24 bits per pixel. This means that each of the primary colors is assigned 8 bits, resulting in $2^8 \times 2^8 \times 2^8$ or 16.7 million colors possible in a single pixel.

In other words, a black and white image, also referred to as a bi-level image, is a two dimensional array of pixels, each of 1 bit. A continuous-tone image can be a gray scale or a color image. A gray scale image is an image where each pixel is allocated 8-bits of information thereby displaying 256 shades of gray. A color image can be 8-bits per pixel, corresponding to 256 colors or 24-bits per pixel corresponding to 16.7 million colors. A 24-bit color image, often called a true-color image, can be represented in one of several coordinate systems, the Red, Green and Blue (RGB) component system being the most common.

The foremost problem with processing images and video in computers is the formidable storage, communication, and retrieval requirements.

A typical True Color (full color) video frame consists of over 300,000 pixels (the number of pixels on a 640 by 480 display), where each pixel is defined by one of 16.7 million colors (24-bit), requiring approximately a million bytes of memory. To achieve motion in, for example, an NTSC video application, one needs 30 frames per second or two gigabytes of memory to store one minute of video. Similarly, a full color standard still frame image (8.5 by 11 inches) that is scanned into a computer at 300 dpi requires in excess of 25 Megabytes of memory. Clearly these requirements are outside the realm of existing storage capabilities.

Furthermore, the rate at which the data need to be retrieved in order to display motion vastly exceeds the effective transfer rate of existing storage devices. Retrieving full color video for motion sequences as described above (30 M bytes/sec) from current hard disk drives, assuming an effective disk transfer rate of about 1 Mbyte per second, is 30 times too slow; from a CD-ROM, assuming an effective transfer rate of 150 kbytes per second, is about 200 times too slow.

Therefore, image compression techniques aimed at reducing the size of the data sets while retaining high levels of image quality have been developed.

Because images exhibit a high level of pixel to pixel correlation, mathematical techniques operating upon the spatial Fourier transform of an image allow a significant reduction of the amount of data that is required to represent an image; such reduction is achieved by eliminating information to which the eye is not very sensitive. For example, the human eye is significantly more sensitive to black and white detail than to color detail, so that much color information in a picture may be eliminated without degrading the picture quality.

There are two means of image compression: lossy and lossless. Lossless image compression allows the mathematically exact restoration of the image data. Lossless compression can reduce the image data set by about one-half. Lossy compression does not preserve all information but it can reduce the amount of data by a factor of about thirty (30) without affecting image quality detectable by the human eye.

In order to achieve high compression ratios and still maintain a high image quality, computationally intensive algorithms must be relied upon. And further, it is required to run these algorithms in real time for many applications.

In fact, a large spectrum of applications requires the following:

(i) the real-time threshold of 1/30th of a second, in order to process frames in a motion sequence; and (ii) the human interactive threshold of under one (1) second, that can elapse between tasks without disrupting the workflow.

Since the processor capable of compressing a 1 Mbyte file in 1/30th of a second is also the processor capable of compressing a 25 Mbyte file—a single color still frame image—in less than a second, such a processor will make a broad range of image compression applications feasible.

Such a processor will also find application in high resolution printing. Since having such a processor in the printing device will allow compressed data to be sent from a computer to a printer without requiring the bandwidth needed for sending non-compressed data, the compressed data so sent may reside in an economically reasonable amount of local memory inside the printer, and printing may be accomplished by decompressing the data in the processor within a reasonable amount of time.

Numerous techniques have been proposed to reduce the amount of data required to be stored in order to reproduce a high quality picture particularly for use with video displays. Because of the high cost of memory, the ability to store a given quality picture with minimal data is not only important but also greatly enhances the utility of computer systems utilizing video displays. Among the work done in this area is work by Dr. Wen Chen as disclosed in U.S. Pat. Nos. 4,302,775, 4,385,363, 4,394,774, 4,410,916, 4,698,672 and 4,704,628. One technique for the storage of data for use in reproducing a video image is to transform the data into the frequency domain and store only that information in the frequency domain which, when the inverse transform is taken, allows an acceptable quality reproduction of the space varying signals to reproduce the video picture. Dr. Herbert Lohscheller's work as described in European Patent Office Application No. 0283715 also describes an algorithm for providing data compression.

Dr. Chen's U.S. Pat. No. 4,704,628 alluded to in the above described data transmission/receiving system uses intraframe and interframe transform coding. In intraframe and interframe transform coding, rather than providing the actual transform coefficients as output, the output encoded data are block-to-block difference values (intraframe) and frame-to-frame difference values (interframe). While coding differences rather than actual coefficients reduce the bandwidth necessary for transmission, large amounts of memory for storage of prior blocks and prior frames are required during the compression and decompression processes. Such systems are expensive and difficult to implement, especially on an integrated circuit implementation where "real estate" is a premier concern.

U.S. Pat. No. 4,385,363 describes a discrete cosine transform processor for 16 pixel by 16 pixel blocks. The 5-stage pipeline implementation disclosed in the '363 patent is not readily usable for operation with 8 pixel by 8 pixel blocks. Furthermore, Chen's algorithm requires global shuffling at stages 1, 4 and 5.

Despite the prior art efforts, the information which must be stored to reproduce a video picture is still quite enormous. Therefore, substantial memory is required particularly if a computer system is to be used to generate a plurality of video images in sequence to replicate either changes in images or data. Furthermore, the prior art has also failed to provide a processor capable of processing video pictures in real time.

SUMMARY OF THE INVENTION

The present invention provides a data compression/decompression system capable of significant data compression of video or still images such that the compressed images may be stored in the mass storage media commonly found in conventional computers.

The present invention also provides (i) a data compression/decompression system which will operate at real time speed, i.e. able to compress at least thirty frames of true color video per second, and to compress a full-color standard still frame (8.5"×11" at 300 dpi) within one second;

(ii) a system adhering to an external standard so as to allow compatibility with other computation or video equipment;

(iii) a data compression/decompression system capable of being implemented in an integrated circuit chip so as to achieve the economic and portability advantages of such implementation.

In accordance with this invention, a data compression/decompression system using a discrete cosine transform is provided to generate a frequency domain representation of the spatial domain waveforms which represent the video image. The discrete cosine transform may be performed by finite impulse response (FIR) digital filters in a filter bank. In this case, the inverse transform is obtained by passing the stored frequency domain signals through FIR digital filters to reproduce in the spatial domain the waveforms comprising the video picture. Thus, the advantage of simplicity in hardware implementation of FIR digital filters is realized. The filter bank according to this invention possesses the advantages of linear complexity and local communication. This system also provides Huffman coding of the transform domain data to effectuate large data compression ratios. This system may be implemented as an integrated circuit and may communicate with a host computer using an industry standard bus provided in the data compression/decompression system according to the present invention. Accordingly, by combining in hardware a novel discrete cosine transform algorithm, quantization and coding steps, minimal data are required to be stored in real time for subsequent reproduction of a high quality replica of an original image.

This invention will be more fully understood in conjunction with the following detailed description taken together with the accompanying drawings.

BRIEF DESCRIPTION OF THE DRAWINGS

FIGS. 4a(1)–4a(2) show a data flow diagram of the Discrete Cosine Transform (DCT) units, consisting of the units 103–107 of the embodiment shown in FIG. 1.

FIGS. 4b(1)–4b(4) show the schedule of 4:1:1 data flow in the DCT units under compression condition.

FIGS. 4c(1)–4c(2) show the schedule of 4:2:2 data flow in the DCT units under compression condition.

FIGS. 4d(1)–4d(4) show the schedule of 4:1:1 data flow in the DCT units under decompression condition.

FIGS. 4e(1)–4e(2) show the schedule of 4:2:2 data flow in the DCT units under decompression condition, FIGS. 5a(1)–5a(4) show a schematic diagram of the DCT input select unit 104 of the embodiment shown in FIG. 1.

FIGS. 5b(1)–5b(3) show the schedule of control signals of the DCT input select unit 104 under compression condition, according to the clock phases.

FIGS. 5c(1)–5c(4) show the schedule of control signals of the DCT input select unit 104 under decompression condition, according to the clock phases.

FIGS. 6a(1)–6a(2) show a schematic diagram of the DCT row storage unit 105 of the embodiment shown in FIG. 1.

FIG. 6b shows a horizontal write pattern of the memory arrays 609 and 610 in the DCT row storage unit 105 of FIG. 6a.

FIG. 6c shows a vertical write pattern of the memory arrays 609 and 610 in the DCT row storage unit 105 of FIG. 6a.

FIGS. 7a(1)–7a(2) show a schematic diagram of the DCT/IDCT processor unit 106 of the embodiment shown in FIG. 1.

FIG. 7b shows a flow diagram of the DCT computational algorithm used under compression condition in the DCT/IDCT processor unit 105 of FIG. 7a.

FIGS. 7c(1)–7c(4) show the data flow schedule of the DCT computational algorithm used under compression condition in the DCT/IDCT processor unit 105 of FIG. 7a.

FIGS. 7d(1)–7d(3) show the schedule of control signals of the DCT/IDCT processor unit 105 shown in FIG. 7a under compression condition.

FIG. 7e shows a flow diagram of the DCT computational algorithm used under decompression condition in the DCT/IDCT processor unit 105 of FIG. 7a.

FIGS. 7f(1)–7f(4) show the data flow schedule of the DCT/IDCT processor unit 105 of FIG. 7a under decompression condition.

FIGS. 7g(1)–7g(3) show the schedule of control signals of the DCT/IDCT processor unit shown in FIG. 7a under decompression condition.

FIGS. 8a(1)–8a(3) show a schematic diagram of the DCT row/column separator unit 107 in the embodiment shown in FIG. 1.

FIGS. 8b(1)–8b(2) show the schedule of control signals of the DCT row/column separator unit 107 under decompression condition.

FIGS. 8c(1)–8c(6) show the schedule of control signals of the DCT row/column separator unit 107 shown in FIG. 7a under decompression condition.

FIG. 12a shows a schematic diagram of the coder unit 11a of the coder/decoder unit 111 in the embodiment shown in FIG. 1.

FIGS. 12b(1)–12b(2) show a block diagram of the decoder unit 111b of the coder/decoder unit 111 in the embodiment shown in FIG. 1.

FIGS. 13a(1)–13a(3) show a schematic diagram of the FIFO/Huffman code controller unit 112 shown in the embodiment shown in FIG. 1.

FIG. 13b shows the memory maps of the FIFO Memory 114 of the preferred embodiment in FIG. 1, under compression and decompression conditions.

FIGS. 15b(1)–15b(4) show the system functions of the filter tree shown in FIG. 15a.

FIGS. 15c(1)–15c(4) show the steps of derivation from the system functions of the filter tree in FIG. 15a to a flow diagram representation of the algebraic operations of the FIR digital filter bank.

FIGS. 15d(1)–15d(2) show the flow diagram resulting from the derivation shown in FIG. 15c.

FIGS. 15e(1)–15e(2) show the flow diagram of the inverse discrete cosine transform, as a result of reversing the algebraic operations of the flow diagram of FIG. 15d.

DETAILED DESCRIPTION

Figure 1:
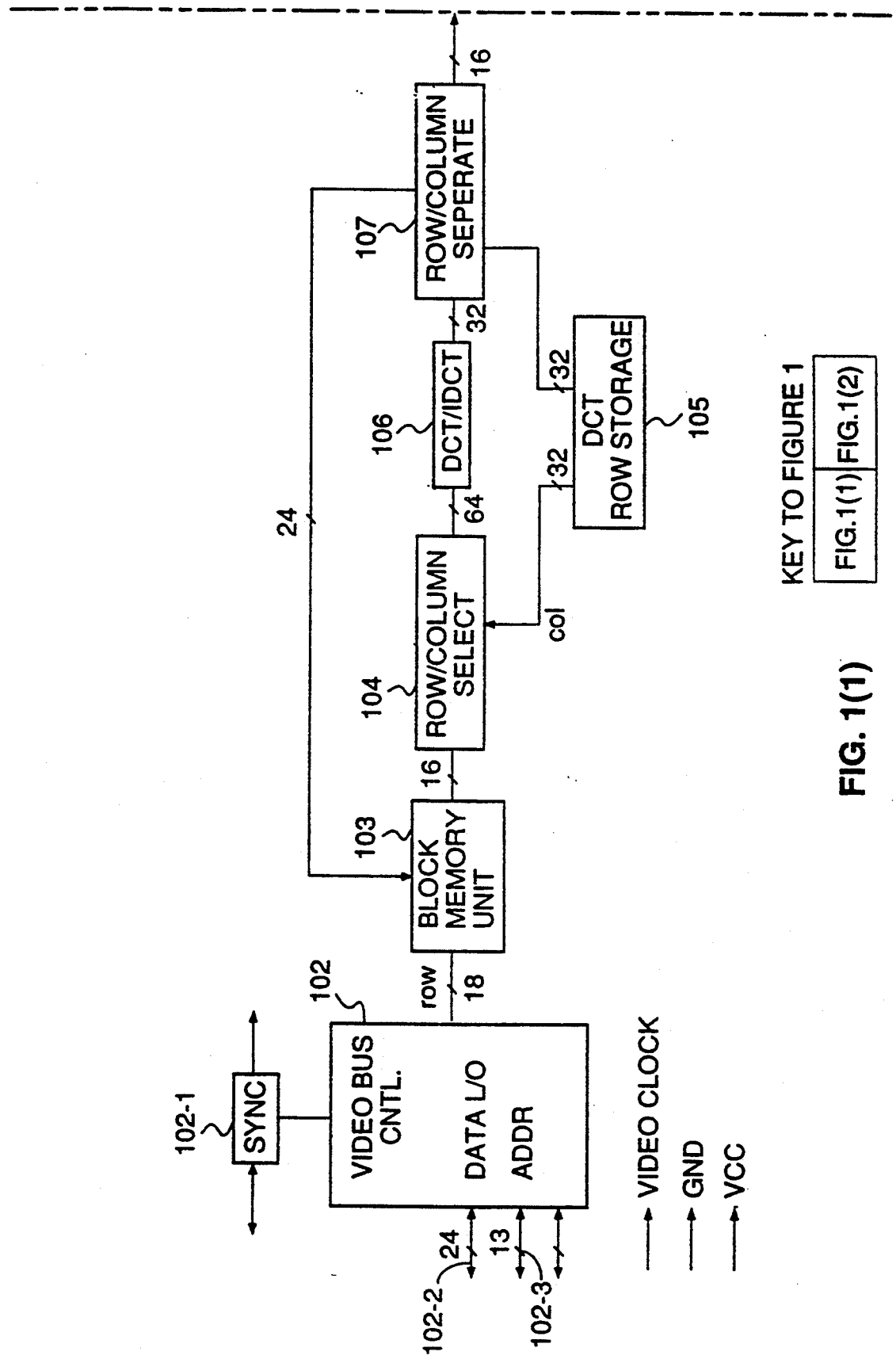
FIGS. 1(1)–1(2) show a block diagram of an embodiment of the present invention.
Figure 1:
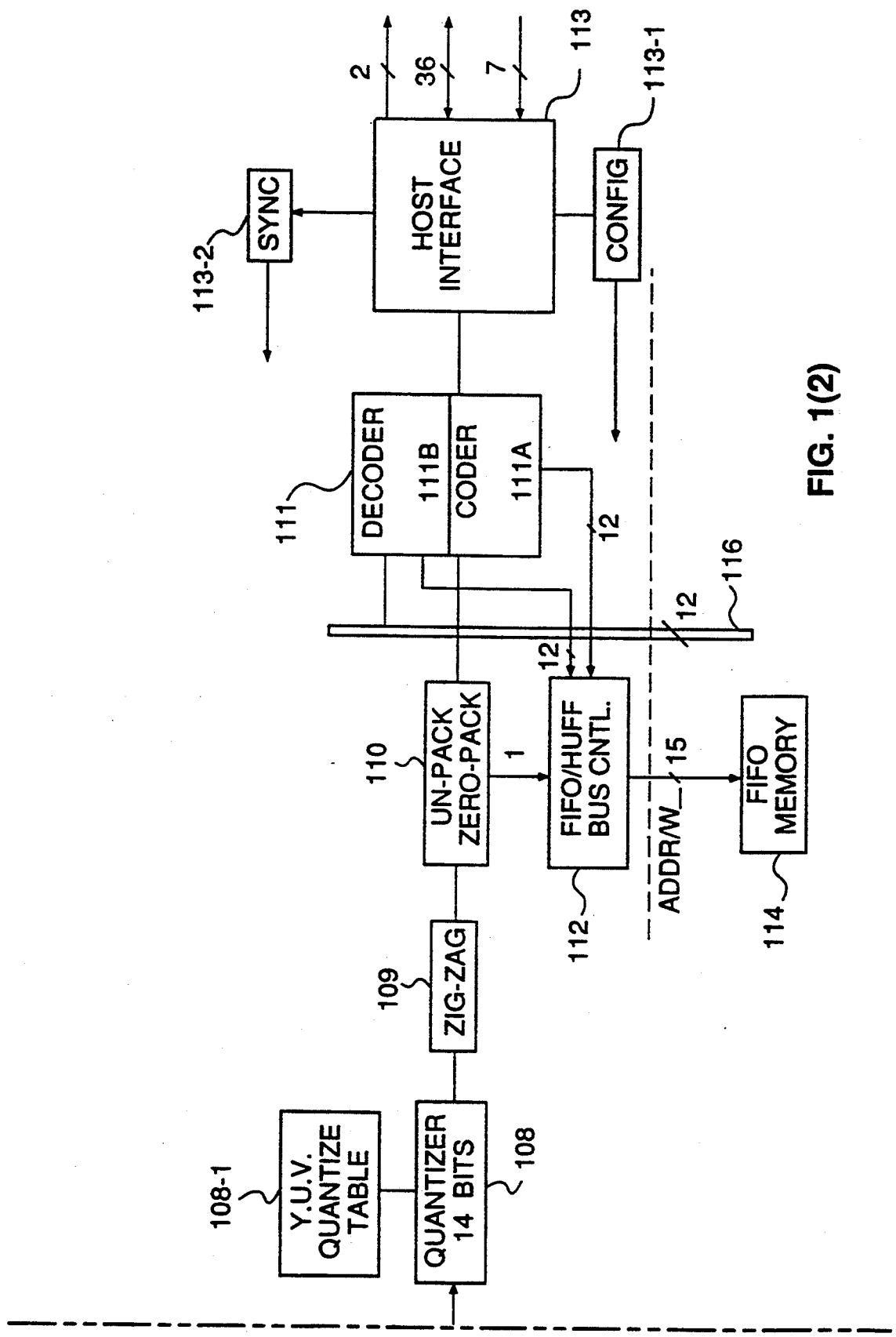

Data compression for image processing may be achieved by (i) using a coding technique efficient in the number of bits required to represent a given image, (ii) by eliminating redundancy, and (iii) by eliminating portions of data deemed unnecessary to achieve a certain quality level of image reproduction. The first two approaches involve no loss of information, while the third approach is "lossy". The amount of information loss acceptable is dependent upon the intended application of the data. For reproduction of image data for viewing by humans, significant amounts of data may be eliminated before noticeable degradation of image quality results.

According to the present invention, data compression is achieved by use of Huffman coding (a coding technique) and by elimination of portions of data deemed unnecessary for acceptable image reproduction. Because sensitivities of human vision to spatial variations in color and image intensity have been studied extensively in cognitive science, these characteristics of human vision are available for data compression of images intended for human viewing. In order to reduce data based on spatial variations, it is more convenient to represent and operate on the image represented in the frequency domain.

This invention performs data compression of the input discrete spatial signals in the frequency domain. The present method transforms the discrete spatial signals into their frequency domain representations by a Discrete Cosine Transform (DCT). The discrete spatial signal can be restored by an inverse discrete cosine transform (IDCT).

Theory

A discrete spatial signal can be represented as a sequence of signal sample values written as:

$$x[n] \text{ where } n=0,1,\ldots,N\text{-}1$$

$x[n]$ denotes a signal represented by N signal sample values at N points in space. The N-point DCT of this spatial signal is defined as $$X[k] = \gamma_k \sum_{n=0}^{N-1} x[n] \cos\left(\frac{\pi}{N} k(n + \tfrac{1}{2})\right)$$

where $k = 0, 1, \ldots, N - 1$ where $\gamma_k = \begin{cases} \frac{1}{\sqrt{2}} & \text{for } k = 0 \\ 1 & \text{for } k \neq 0 \end{cases}$ Recognizing that $\cos a = \tfrac{1}{2}(e^{-ja} + e^{ja})$     (1)

and $$e^{j\frac{\pi}{N} k(2N-n+\frac{1}{2})} = e^{j2\pi k} e^{-j\frac{\pi}{N} k(n-\frac{1}{2})} = e^{-j\frac{\pi}{N} k(n-\frac{1}{2})},$$    (2)

a method of computing the DCT of $x[n]$ is derived and illustrated in the following:

F1. The discrete spatial signal $x[n]$ is shifted by $\tfrac{1}{2}$ sample in the increasing n direction and mirrored about $n=N$ to form to form the resulting signal $x[n]$, written as:

$$x[n] = \begin{cases} x[n - \tfrac{1}{2}] & \text{for } n = 1/2, 3/2, 5/2, \ldots, N - 1/2 \\ x[2N - n - \tfrac{1}{2}] & \text{for } n = N + 1/2, N + 3/2, \ldots, 2N - 1/2 \end{cases}$$

F2. A 2N-point discrete Fourier Transform (DFT) is applied to the signal $x[n]$. The transformed representation of $x[n]$ is written as:

$$X[k] = \sum_{n=\frac{1}{2}}^{2N-\frac{1}{2}} x[n] e^{-j\frac{\pi}{N} kn} \text{ for } k = 0, 1, \ldots, 2N - 1$$

F3. Because of relations (1) and (2), the DCT of $x[n]$, i.e., $X[k]$, is readily obtained by setting $X[k]$ to zero for $k \geq N$ (truncation), or $$X[k] = \begin{cases} 1/\sqrt{2}\, X[0] & k = 0 \\ X[k] & k = 1, 2, \ldots, N - 1 \\ 0 & N \leq k \leq 2N - 1 \end{cases}$$

Furthermore, the frequency domain representation of $x[n]$, i.e. $X[k]$, has the following properties $X[k] = -X[2n - k]$, and $X[-k] = X[k]$    (3), (4)
(real, odd symmetry)

and $X[N] = 0$    (5)

Therefore, as will be shown below, despite truncation in step F3 the inverse transformation can be obtained using the information of (3), (4) and (5).

The inverse transformation, hence, follows the steps:

I1. The sequence $X[k]$ is reconstructed from $X[k]$ by a mirroring $X[k]$ about $k=N$, and scaling appropriately, i.e.

$$X[k] = \begin{cases} \sqrt{2}\, X[0] & \text{for } k = 0 \\ X[k] & k = 1, 2, \ldots, N - 1 \\ 0 & k = N \\ -X[2N - k] & k = n + 1, \ldots, 2N - 1 \end{cases}$$

(using relations (3), (4) and (5))

I2. The 2N-point inverse discrete Fourier transform (IDFT) is then applied to $X[k]$.

$$x[n] = \frac{1}{2N} \sum_{k=0}^{2N-1} X[k] e^{\frac{j\pi kn}{N}}$$

for $n = 1/2, 3/2, \ldots, 2N - 1/2$

I3. Finally, $x[n]$ may be obtained by setting $x[n]$ to zero for $n \geq N$ and shifting the signal by $\tfrac{1}{2}$ sample in the decreasing n direction, i.e.

$$x[n] = \begin{cases} n[m + \tfrac{1}{2}] & \text{for } m = 0, \ldots, N - 1 \\ 0 & \text{for } N \geq M \geq 2N - 1. \end{cases}$$

Filter Implementation

The Discrete Cosine Transform (DCT) and its inverse outlined in steps F1-F3 and I1-I3 steps discussed in the theory section above can be realized by a set of finite impulse response (FIR) digital filters. As discussed in the theory section above, DCT, and similarly IDCT, may be obtained through the use of a DFT or an inverse DFT at steps F2 and I2 respectively.

Because DFT, and similarly its inverse, can be seen as a system of linear equations of the form:

$$X[k] = \gamma \sum_{2N} x[n] w^{kn} \quad \begin{array}{l} \gamma = 1 \ (DFT) \\ = \frac{1}{2N} \ (\text{inverse}) \end{array}$$

the transform can be seen as being accomplished by a bank of filters, one filter for each value of k (forward DFT) or n (inverse DFT). The system function (z-transform of a filter's unit sample respones) of each filter may be generally written as, (a) $H_k(Z)$ in the forward DFT, for the kth filter, $$H_k(Z) = \sum_{n=\frac{1}{2}}^{2N-\frac{1}{2}} z^n e^{\frac{-j\pi kn}{N}}$$    (P1)

$$= z^{-\frac{1}{2}} e^{\frac{-j\pi k}{2N}} \left( \frac{1 - Z^{2N} - 1}{1 - Ze^{-j\frac{\pi}{N} k - 1}} \right)$$

or equivalently, $$= z^{-\frac{1}{2}} e^{\frac{j\pi k}{2N}} \prod_{\substack{l=0 \\ l \neq k}}^{2N-1} (1 - ze^{\frac{j\pi lk}{N}})$$

The last formulation (P1) specifically points out that the 2N-1 zeroes of the kth filter lie on the unit circle of the Z-plane, separated $$\frac{\pi}{N}$$

radially, except for l=k which is not a zero of the filter.

(b) Similarly, the system function $G_n(Z)$ for the inverse DFT in the nth filter, $$G_n(Z) = \frac{1}{2N} \sum_{k=0}^{2N-1} z^k e^{j\frac{\pi}{N}kn} \qquad (P2)$$

$$= \frac{1}{2N} \prod_{\substack{l=\frac{1}{2} \\ l\neq n}}^{2N-\frac{1}{2}} (1 - Ze^{\frac{j\pi ln}{N}})$$

Again, it can be seen that the zeros of the nth filter in the inverse DFT transform lie on the unit circle separated by $$\frac{\pi}{N}$$

radially, except for l≠n. The structure of equations P1 and P2 suggests that both forward and inverse DFTs may be implemented by the same filter banks with proper scaling (noting that P1 and P2 has identical zeroes for any k=n).

The representation of P1 suggests a "recursive" implementation of the FIR filter, i.e. the FIR filter may be formed by cascading 2N-1 single-point filters, each having a zero at a different integral multiple of $$e^{\frac{j\pi k}{N}}$$

or $$e^{\frac{j\pi n}{N}}.$$

For example, we may rewrite the kth (forward) or nth (inverse) filter as $$P_k(z) = z^{-\frac{1}{2}} e^{\frac{j\pi k}{2N}} \prod_{l\neq k} (z - R^l) \text{ for the forward } DFT$$

or $$P_n(z) = \frac{1}{2N} \prod_{l\neq n} (z^l - R) \text{ for the inverse } DFT$$

where $R^l$ is the $l^{th}$ zero, $$R = e^{\frac{j\pi lk}{N}} \text{ (for forward } DFT\text{)}$$

$$= e^{\frac{-j\pi ln}{N}} \text{ (for inverse } DFT\text{)}$$

Furthermore, we may write $$P_k(z) = P_{mk}(z)(z - R^m)$$

where $P_{mk}(z)$ denotes a FIR filter having 2N-2 zeroes spaced $$\frac{\pi}{N}$$

apart, except for l=k,m. Here, $P_k(z)$ is represented as a cascade of a 2N-2 point filter $P_{mk}(z)$ and a single point filter having a zero at $R^m$.

In the same way, $P_k(z)$ may also be decomposed into a cascade of a 2N-3 point FIR filter $P_{mnk}(z)$ and a 2-point filter having zeros at $R^m$ and $R^n$. $P_{mnk}(z)$ may itself be implemented by cascading lower order FIR filters.

Figure 15A:
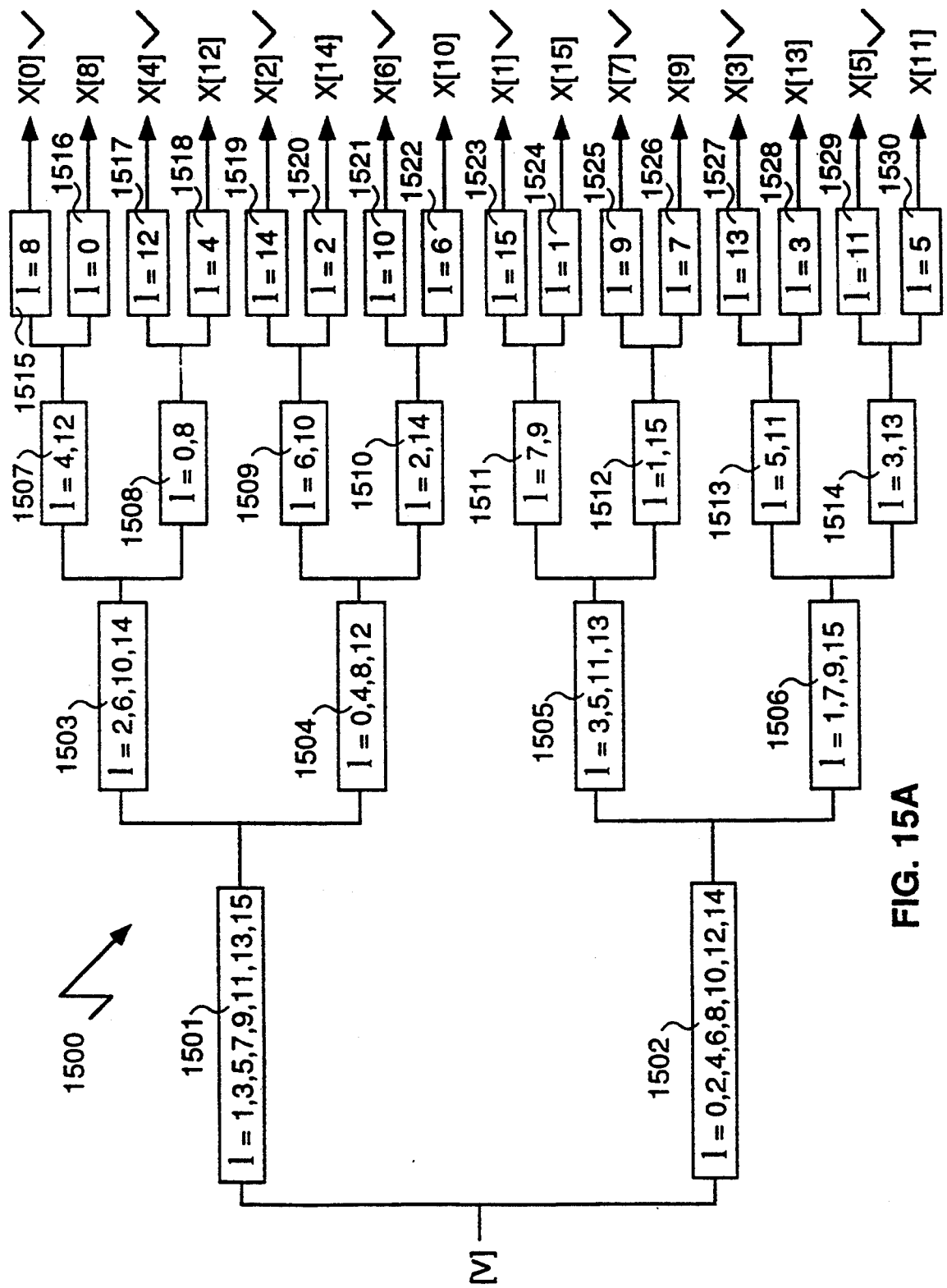
FIG. 15a shows a filter tree used to perform a 16-point discrete Fourier transform (DFT).

A 16-point DFT may be implemented by the FIR filter tree 1500 shown in FIG. 15a by selectively grouping FIR filters.

The grouping of filters shown in FIG. 15a is designed to minimize the number of intermediate results necessary to complete the DFT. A filter is characterized by its system function, and referred to as an N-th order filter if the leading term of the polynomial representing the system function is of power N. As shown in FIG. 15b, the two filters 1501 and 1502 in the first filter level are 8th order filters, i.e. the leading term of the power series representing the system function is a multiple of $z^8$. The four filters 1503–1506 in the second level of filters are 4th order filters, and the eight filters 1507–1514 in the third level of filters are 2nd order filters. In general, a N-point DFT may be implemented by this method using $(1+\log_2 N)$ levels of filters with the kth level of filters having $2^k$ filters, each being of order $N/2^{k-1}$, and such that the impulse response of each filter possesses either odd or even symmetry. Under this grouping scheme, the number of arithmetic operations are minimized because many filter coefficients are zero, and many multiplications are trivial (involving 1, −1, or a limited number of constants cos $$\frac{\pi l}{N},$$

where l is an integer). These properties lend to simplicity of circuit implementation. Furthermore, as will be shown in the following, computation at each level of filters involves only output data of the previous level, and, treating each filter as a node in a tree structure, specifically each child node depends only on output data of the immediate parent node. Therefore, no communication is required between data output of filters not in a "parent-child" relationship. This property results in "local connectivity" essential for area efficiency in an integrated circuit implementation. This filter tree 1500 has the following properties:

(i) all branches have the same number of zeros; and
(ii) all stages have the same number of zeros. These properties provide the advantages of locally connected filters ("local connectivity") and a maximum number of filters from which data must be supplied ("fan out") of two. The property of local connectivity, defined below, minimizes communication overhead. Minimum fan out of two allows a compact implementation in integrated circuits requiring high space efficiency.

In FIG. 15a, each rectangular box represents a filter having the zeroes $W^l$, for the values of l shown inside the box. W is $e^{j\pi k/N}$ or $e^{-j\pi n/N}$ dependent upon whether DCT or IDCT is computed. Recalling that, in order to obtain DCT from DFT, at steps F3 and I3, the DFT results for k≧N (forward) or n≧N are set to zero. Hence, only the portions of this filter tree that yield DFT results for k<N (forward) and n<N (inverse) need be implemented. The required DFT results are each marked in FIG. 15a with a "check".

The system functions for the forward transform filters are shown in FIG. 15b. Because of the symmetry in the input sequence and in the system function of the FIR filters, tracking carefully the intermediate values and eliminating duplicate computation of the same value, the flow graph of FIG. 15c is obtained. FIG. 15c illustrates these tracking steps by following the computation of the first three stages in the filter tree 1500 shown in FIG. 15a. Recall that at step F1, the input sequence X[n] is mirrored about n=N to obtain the input sequence x [n] to the 16-point DFT. Therefore x[n] is x [0], x[1], x[2] ... x[7], x[7], x[6], ..., x[0]. This sequence is used to compute the 8-point DCT. As shown in FIG. 15c, the filter 1501 has system function $H(Z)=Z^81$; hence, the first eight output data a[0] ... a[7] are each the sum of two samples of the input sequence, each sample being 8 unit "delays" apart, e.g. a[0]=x[0]+x[7]; a[1]=x[1]+x[6] etc. (These delays are not delays in time, but a distance in space since x[n] is a spatial sequence.) Because of the symmetry of the input sequence x[n], a[0] ... a[7] are symmetrical about n=3½. Therefore, when implementing this filter 1501, only the first four values a[0] ... a[3] need actually be computed, a[4] ... a[7] having values corresponding respectively to a[3] ... a[1]. Computation of a[0] ... a[3] is provided in the first four values of stage 2 shown in FIG. 15d. The operations to implement filter 1501 are shown in FIG. 15c.

The same procedure is followed for filter 1502. Filter 1502, however, possesses odd symmetry, i.e. b[0]=−b[7]; b[1]=−b[6] etc. For most implementations, including the embodiment described below, the algebraic sign of an intermediate value may be provided at a later stage when the value is used for a subsequent operation. Thus, in filter 1502, as in filter 1501, only the first four values b[0] ... b[3] need actually be computed, since b[4] ... b[7] may be obtained by a sign inversion of the values b[3] ... b[0] respectively at a subsequent operation. The operations to implement 1502 are shown in FIG. 15c. Hence, the bottom four values at stage 2 shown in FIG. 15d are provided for computation of values b[0] ... b[3].

Accordingly, by mechanically tracking the values computed at the previous stages, and noting the symmetry of each filter, the operations required to implement filters 1503–1514 are determined in the same manner as described above for filter 1501 and 1502, the result of the derivation is the flow diagram shown in FIG. 15d.

Finally, because of the symmetry of the output in filters 1507–1514, and the symmetry in filters 1515–1530, the required output data X[0] ... X[7] are obtained by multiplying g[0], h[0], i[0] ... o[0] by $$2, -2\cos\frac{\pi}{8}, -2\cos\frac{\pi}{4}, -2\cos\frac{3\pi}{8}, \ldots,$$
$$-2\cos\frac{7\pi}{8} \text{ respectively.}$$

The inverse transform flow diagram FIG. 15e is obtained by reversing the algebraic operations of the forward transform flow diagram in FIG. 15d.

Thus, intermediate results s1–s7 at stage 2 in FIG. 15e are given by reversing the algebraic operations for obtaining x(0)–x(7) at stage 8 of FIG. 15d. That is, ignoring for the moment a factor ½.

$$s1 = X(0) + X(4); s2 = X(0) - X(4);$$
$$s3 = X(2) - X(6); s4 = X(2) + X(6);$$
$$s5 = X(3) - X(5); s6 = X(3) + X(5);$$
$$s7 = X(1) - X(7); s8 = X(1) + X(7).$$

(In general, the scale factors, such as the ½ above, may be ignored because they are recaptured by output scaling). The same process is repeated by reversing the intermediate results s1–s7 at stage 6 of FIG. 15d to derive intermediate results p1–p7 at stage 4 of FIG. 15e. The intermediate results z1–z7, y1–y7 are similarly derived and additional intermediate results are then derived until the final values x(0)–x(7) are derived. The process is summarized below:

$$p1 = s1; p2 = s2; p3 = 2\, s3 \cos\frac{\pi}{4}, -s4;$$
$$p4 = s4; p5 = 2\, s5 \cos\frac{3\pi}{8} - s6; p6 = s6;$$
$$p7 = 2\, s7 \cos\frac{\pi}{8} - s8; p8 = s8;$$

$$z1 = p1 + p4; z2 = p2 + p3; z3 = p2 - p3;$$
$$z4 = p1 - p4; z5 = p7 - p5; z6 = p8 - p6;$$
$$z7 = p5 + p7; z8 = p6 + p8;$$

$$y1 = z1; y2 = z2; y3 = z3; y4 = z4;$$
$$y5 = 2\, z5 \cos\frac{\pi}{4} - z8; y6 = 2\, z6 \cos\frac{\pi}{4} - z7;$$
$$y7 = z7; y8 = z8;$$

$$x(0) = y1 + y8; x(1) = y2 + y7; x(2) = y3 + y6;$$
$$x(3) = y4 + y5; x(4) = y4 - y5; x(5) = y3 - y6;$$
$$x(6) = y2 - y7; x(7) = y1 - y8.$$

The quality of possible hardware implementations of a computation algorithm may be measured in two dimensions: (i) computational complexity and (ii) communication requirements. According to the present invention, the computational complexity of the DCT, measured by the number of multiplication steps needed to accomplish the DCT, taking into consideration of the throughput rate, is of order N (i.e. linear), where N is the number of points in the DCT. As discussed above, the tree structure of the filter bank results in a maximum fan out of two, which allows all communication to be "local" (i.e. data flows from the root filters—in other words, highest order filters—and no communication is required between filters not having parent-child relationship in the tree structure as described above in conjunction with FIG. 15a).

Overview of An Embodiment of the Present Invention

An embodiment of the present invention implements the "baseline" algorithm of the JPEG standard. FIG. 1 shows the functional block diagram of this embodiment of the present invention. This embodiment is implemented in integrated circuit form; however, the use of other technologies to implement this architecture, such as by discrete components, or by software in a computer is also feasible.

The operation of this embodiment during data compression (i.e. to reduce the amount of data required to represent a given image) is first functionally described in conjunction with FIG. 1.

FIG. 1 shows, in schematic block diagram form, a data compression/decompression system in accordance with this invention.

The embodiment in FIG. 1 interfaces with external equipment generating the video input data via the Video Bus Interface unit 102. Because the present invention provides compression and decompression (playback) of video signals in real-time, synchronization circuits 102-1 and 113-2 are provided for receiving and providing respectively synchronization signals from and to the external video equipment (not shown).

Video Bus Interface unit (VBIU) 102 accepts 24 bits of input video signal every two clock periods via the data I/O lines 102-2. The VBIU 102 also provides a 13-bit address on address lines 102-3 for use with an external memory buffer, at the user's option which provides temporary storage of input (compression) or output (decompression) data in "natural" horizontal line-by-line video data format used by many in video equipment. During compression, the horizontal line-by-line video data is read in as 8×8 pixel blocks for input to VBIU via I/O bus 102-2 according to addresses generated by VBIU 102 on bus 102-3. During decompression, the horizontal line-by-line video data is made available to external video equipment by writing the 8×8 pixel blocks output from VBIU 102 on bus 102-2 into proper address locations for horizontal line-by-line output. Again, the address generator inside VBIU 102 provides the proper addresses.

VBIU 102 accepts four external video data formats: color format (RGB) and three luminance-chrominance (YUV) formats. The YUV formats are designated YUV 4:4:4, YUV 4:2:2, and YUV 4:1:1. The ratios indicate the ratios of the relative sampling frequencies in the luminance and the two chrominance components. In the RGB format, each pixel is represented by three intensities corresponding to the pixel's intensity in each of the primary colors red, green, and blue. In the YUV representations, three numbers Y, U and V represent respectively the luminance index (Y component) and two chrominance indices (U and V components) of the pixel. In the JPEG standard, groups of 64 pixels, each expressed as an 8×8 matrix, are compressed or decompressed at a time. The 64 pixels in the RGB and YUV 4:4:4 formats occupy on the physical display an 8×8 area in the horizontal and vertical directions. Because human vision is less sensitive towards colors than intensity, it is adequate in some applications to provide in the U and V components of the YUV 4:2:2 and YUV 4:1:1 formats, U and V type data expressed as horizontally averaged values over areas of 16 pixels by 8 pixels and 32 pixels by 8 pixels respectively. An 8×8 matrix in the spatial domain is called a "pixel" matrix, and the counterpart 8×8 matrix in the transform domain is called a "frequency" matrix.

Although RGB and YUV 4:4:4 formats are accepted as input, they are immediately reduced to representations in YUV 4:2:2 format. RGB data is first transformed to YUV 4:4:4 format by a series of arithmetic operations on the RGB data. YUV 4:4:4 data are converted into YUV 4:2:2 data in the VBIU 102 by averaging neighboring pixels in the U, V components. This operation immediately reduces the amount of data to be processed by one-third. As a result, the circuit in this embodiment of the present invention needs only to process YUV 4:2:2 and YUV 4:1:1 formats. As mentioned hereinabove, the JPEG standard implements a "lossy" compression algorithm; the video information lost due to translation of the RGB and YUV 4:4:4 formats to the YUV 4:2:2 format is not considered significant for purposes under the JPEG standard. In the decompression mode, the YUV 4:4:4 format is restored by providing the average value in place of the sample value discarded in the compression operation. RGB format is restored from the YUV 4:4:4 format by a series of arithmetic operation on the YUV 4:4:4 data to be described below.

As a result of the processing in the VBIU unit 102, video data are supplied to the block memory unit 103, at 16 bits (two values) per clock period. The block memory unit 103 is a buffer for the incoming stream of 16-bit video data to be sorted into 8×8 blocks (matrices) of the same pixel type (Y, U or V). This buffering step is also essential because the discrete cosine transform (DCT) algorithm implemented herein is a 2-dimensional transform, requiring the video signal data to pass through the DCT/IDCT processor unit 106 twice, one for each spatial direction (horizontal and vertical). Intermediate data are obtained after the video input data pass through DCT/IDCT processor unit 106 once. Consequently, DCT/IDCT processor unit 106 must multiplex between video input data and the intermediate results after the first-pass DCT operation. To minimize the number of registers needed inside the DCT unit 106, and also to simplify the control signals within the DCT unit 106, the sequence in which the elements of the pixel matrix is processed is significant.

The sequencing of the input data, and of the intermediate data after first-pass of the 2-dimensional DCT, for DCT/IDCT processor unit 106 is performed by the DCT input select unit 104. DCT input select unit 104 alternatively selects, in predetermined order, either two 8-bit words from the block memory unit 103 or two 16-bit words from the DCT row storage unit 105. The DCT row storage unit 105 contains the intermediate results after the first pass of the data through the the 2-dimensional DCT. The data selected by DCT input select unit 104 is processed by the DCT/IDCT processor unit 106. The results are either, in the case of data which completed the 2-dimensional DCT, forwarded to the quantizer unit 108, or, in the case of first-pass DCT data, recycled via DCT row storage unit 105 for the second pass of the 2-dimensional DCT. This separation of data to supply either DCT row storage unit 105 or quantizer unit 108 is achieved in the DCT row/column separator unit 107. The result of the DCT operation yields two 16-bit data every clock period. A double-buffering scheme in the DCT row/column separator 107 provides a continuous stream i.e. 16 bits each clock cycle of 16-bit output data from DCT. row/column separator unit 107 into the quantizer unit 108.

The output data from the 2-dimensional DCT is organized as an 8 by 8 matrix, called a "frequency" matrix, corresponding to the spatial frequency coefficients of the original 8 by 8 pixel matrix. Each pixel matrix has a corresponding frequency matrix in the transform (frequency) domain as a result of the 2-dimensional DCT operation. According to its position in the frequency matrix, each element is multiplied in the quantizer 108 by a corresponding quantization constant taken from the YUV quantization table 108-1. Quantization constants are obtained from an international standard body, i.e. JPEG; or, alternatively, obtained from a customized image processing function supplied by a host computer to be applied on the present set of data. The quantizer unit 108 contains a 16-bit by 16-bit multiplier for multiplying the 16-bit input from the row/column separator unit 107 to the 16-bit quantization constant from the YUV quantization table 108-1. The result is a 32-bit value with bit 31 as the most significant bit and bit 0 as the least significant bit. In this embodiment, to meet the dual goals of allowing a reasonable dynamic range, and of minimizing the number of significant bits for simpler hardware implementation, only 8 bits in the mid-range are preserved. Therefore, a 1 is added at position bit 15 in order to round up the number represented by bits 31 through 16. The eight most significant bits, and the sixteen least significant bits of this 32-bit multiplication result are then discarded. The net result is an 8-bit value which is passed to the zig-zag unit 109, to be described below. Because the quantization step tends to set the higher frequency components of the frequency matrix to zero, the quantization unit 108 acts as a low-pass digital filter. Because of the DCT algorithm, the lower frequency coefficients of the luminance (Y) or chrominance (U, V) in the original image are represented in the lower elements of the respective frequency matrices, i.e. element $A_{ij}$ represents higher frequency coefficients of the original image than element $A_{mn}$, in both horizontal and vertical directions, if i>m and j>n.

The zig-zag unit 109 thus receives an 8-bit datum every clock period. Each datum is a quantized element of the 8 by 8 frequency matrix. As the data come in, they are individually written into a location of a 64-location memory array each location representing an element of the frequency matrix. As soon as the memory array is filled, it is read out in a manner corresponding to reading an 8 by 8 matrix in a zig-zag manner starting from the 00 position (i.e., in the order: $A_{00}$, $A_{10}$, $A_{01}$, $A_{02}$, $A_{11}$, $A_{20}$, $A_{30}$, $A_{21}$, $A_{12}$, $A_{03}$, etc.). Because the quantization steps tend to zero higher frequency coefficients, this method of reading the 8 by 8 frequency matrix is most likely to result in long runs of zeroed frequency coefficients, providing a convenient means of compressing the data sequence by representing a long run of zeroes as a run length rather than individual values of zero. The run length is encoded in the zero packer/unpacker unit of 110.

Because of double-buffering in the zig-zag unit 109 providing for accumulation of the current 64 8-bit values and simultaneous reading out of the prior 64 8-bit values in run-length format, a continuous stream of 8-bit data is made available to the zero packer/unpacker unit 110. This data stream is packed into a format of the pattern: DC-AC-RL-AC-RL ..., which represents in order the sequence: a DC coefficient, an AC coefficient, a run of zeroes, an AC coefficient, a run of zeroes, etc. (Element $A_{00}$ of matrix A is the DC coefficient, all other entries are referred to as AC coefficients). This data stream is then stored in a first-in, first-out (FIFO) memory array 114 for the next step of encoding into a compressed data representation. The compressed data representation in this instance is Huffman codes. This memory array 114 provides temporary storage, which content is to be retrieved by the coder/decoder unit 111 under direction of a host computer through the host interface 113. In addition to storage of data to be encoded, the FIFO memory 114 also contains the translation look-up tables for the encoding. The temporary storage in FIFO memory 114 is necessary because, unlike the previous signal processing step on the incoming video signal (which is provided to the VBIU 102 continuously and which must be processed in real time) by functional units 102 through 110, the coding step is performed under the control of an external host computer, which interacts with this embodiment of the present invention asynchronously through the host bus interface 113.

Writing and reading out of the FIFO memory 114 is controlled by the FIFO/Huffman code bus controller unit 112. In addition to controlling reading and writing of zero-packed video data into FIFO memory 114, the FIFO/Huffman code bus controller 112 accesses the FIFO memory 114 for Huffman code translation tables during compression, and Huffman decoding tables during decompression. The use of Huffman code is to conform to the JPEG standard of data compression. Other coding schemes may be used at the expense of compatibility with other data compression devices using the JPEG standard.

The FIFO/Huffman code bus controller unit 112 services requests of access to the FIFO memory 114 from the zero packer/unpacker unit 110, and from coder/decoder unit 111. Data are transferred into and out of FIFO memory 114 via an internal bus 116. Because of the need to service in real time a synchronous continuous stream of video signals coming in through the VBIU 102 during compression, or the corresponding outgoing synchronous stream during decompression, the zero packer/unpacker unit 110 is always given highest priority into the FIFO memory 114 over requests from the coder/decoder unit 111 and the host computer.

Besides requesting the FIFO/Huffman code bus controller unit 112 to read the zero-packed data from the FIFO memory 114, the coder/decoder unit 111 also translates the zero-packed data into Huffman codes by looking up the Huffman code table retrieved from FIFO memory 114. The Huffman-coded data is then sent through the host interface 113 to a host computer (not shown) for storage in mass storage media. The host computer may communicate directly with various modules of the system, including the quantizer 108 and the DCT block memory 103, through the host bus 115 (FIG. 6a). This host bus 115 implements a subset of the nubus standard to be discussed at a later section in conjunction with the host bus interface 113. This host bus 115 is not to be confused with internal bus 116. Internal bus 116 is under the control of the FIFO/Huffman code bus controller unit 112. Internal bus 116 provides access to data stored in the FIFO memory 114.

The architecture of the present embodiment is of the type which may be described as a heavily "pipe-lined" processor. One prominent feature of such processor is that a functional block at any given time is operating on a set of data related to the set of data operated on by another functional block by a fixed "latency" relationship, i.e. delay in time. To provide synchronization among functional blocks, a set of configuration registers are provided. Besides maintaining proper latency among functional blocks, these configuration registers also contain other configuration information.

Decompression of the video signal is accomplished substantially in the reverse manner of compression.

Structure and Operation of the Video Bus Controller Unit

The Video Bus Controller Unit 102 provides the external interface to as video input device, such as a video Camera with digitized output or to a video display. The Video Bus Controller Unit 102 further provides conversion of RGB or YUV 4:4:4 formats to YUV 4:2:2 format suitable for processing with this embodiment of the present invention during compression, and provides RGB or YUV 4:4:4 formats when required for output during decompression. Hence, this embodiment of the present invention allows interface to a wide variety of video equipment.

Figure 2:
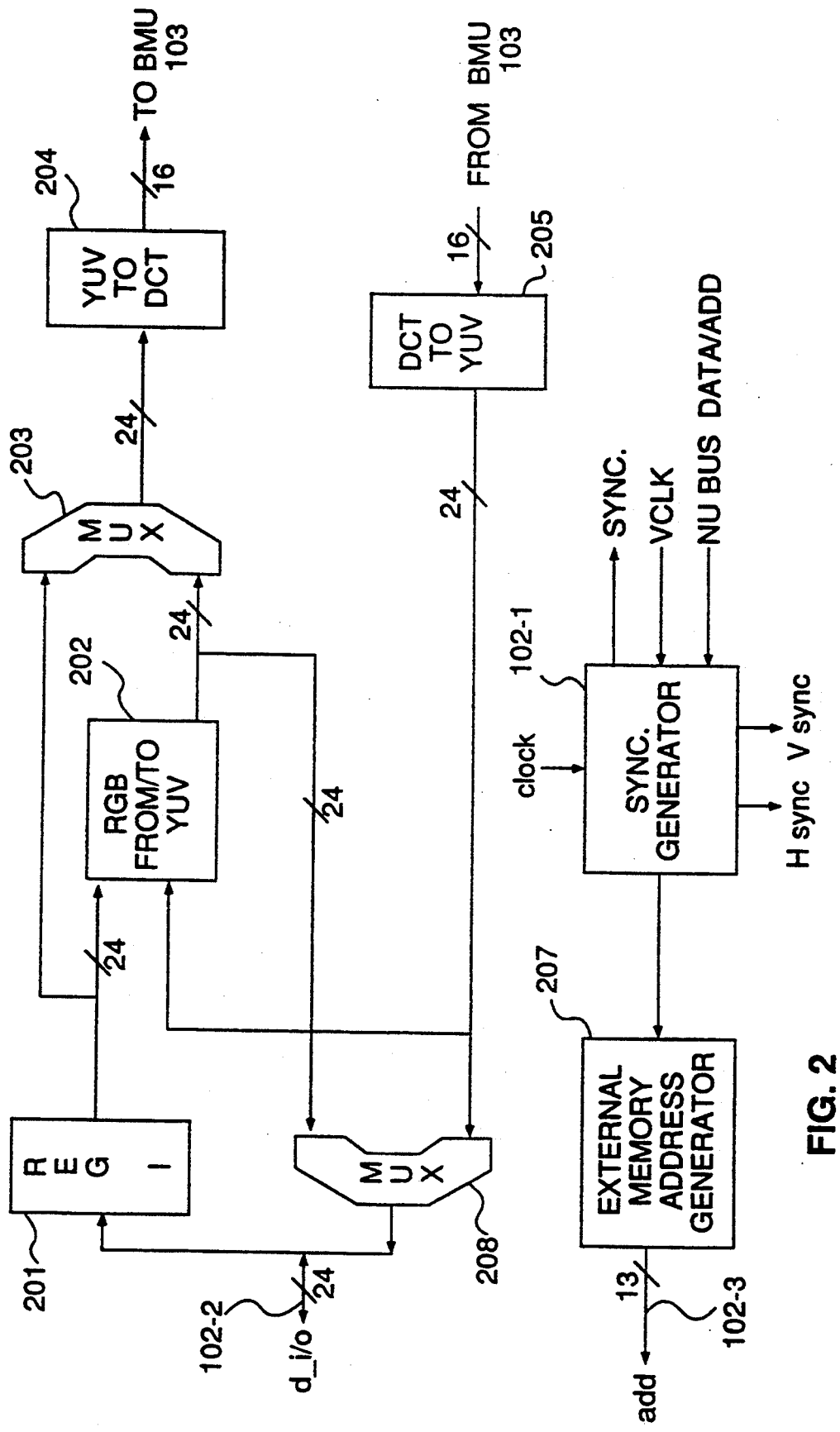
FIG. 2 shows a schematic diagram of the video bus controller unit 102 of the embodiment shown in FIG. 1.

FIG. 2 is a block diagram of the video bus controller unit (VBIU) 102 of the embodiment discussed above. As mentioned before, RGB or YUV 4:4:4 video signals come into the embodiment as 64 24-bit values, representing an 8-pixel by 8-pixel area of the digitized image. Each pixel is represented by three components, the value of each component being represented by eight (8) bits. In the RGB format each component represents the intensity of one of three primary colors. In the YUV format, the Y component represent an index of luminance and the U and V components represent two indices of chrominance. Dependent upon the mode selected, the incoming video signals in RGB or YUV 4:4:4 formats are reduced by the VBIU 102 to 64 16-bit values: 4:4:4 YUV video data and RGB data are reduced to 4:2:2 YUV data. Incoming 4:2:2 and 4:1:1 YUV data are not reduced. The process of reducing RGB data to 4:4:4 YUV data follows the formulae:

| | | |
|---|---|---|
| $Y = 0.3253 R + 0.5794 G + 0.0954 B$ | (luminance) | E1 |
| $U = (0.8378 B-Y)/2.03$ | (chrominance) | E2 |
| $V = (1.088 R-Y)/1.14$ | (chrominance) | E3 |

In order to perform the 4:4:4 YUV to 4:2:2 YUV format conversion, successive values of the U and V type data are averaged (see below), so that effectively the U and V data are sampled at half the frequency as the Y data.

During compression mode, the 24-bit external video data representing each pixel comes into the VBIU 102 via the data I/O bus 102-2. The 24-bit video data are latched into register 201, the latched video data are either transmitted by multiplexor 203, or sampled by the RGB/YUV converter circuit 202.

During compression mode, the RGB/YUV converter circuit 202 converts 24-bit RGB data into 24-bit YUV 4:4:4 data. The output data of RGB/YUV converter circuit 202 is forwarded to multiplexor 203. Dependent upon the data format chosen, multiplexor 203 selects either raw input data (any of 4:4:4, 4:2:2, or 4:1:1 YUV formats), or YUV 4:4:4 format data (converted from RGB format) from the RGB/YUV converter circuit 202.

The input pixel data formats under compression mode are as follows: in RGB and YUV 4:4:4 formats, pixel data are written at the data I/O bus 102-2 at 24 bits per two clock periods, in the sequence (R,G,B) (R,G,B) ... or (Y,U,V) (Y,U,V) ..., i.e. 8 bits for each of the data types Y, U or V in YUV format, and R, G, or B in RGB format; in 4:2:2 YUV format, pixel data are written in 16 bits per two clock periods, in the sequence (Y,U) (Y,V) (Y,U) ... ; and, in the 4:1:1 YUV format data are written in 12 bits per two clock periods, in the sequence (Y, LSB's U), (Y, MSB's U) (Y, LSB's V) (Y, MSB's V) (Y, LSB's U) ... [MSB and LSB are respectively "most significant bits" and "least significant bits"].

The output data from multiplexor 203 is forwarded to the YUV/DCT converter unit 204, which converts the 24-bit input video data into 16-bit format for block memory unit 103. The 16-bit block storage format requires that each 16-bit datum be one of (Y,Y), (U,U), (V,V), i.e. two 8-bit data of the same type is packed in a 16-bit datum.

Therefore, the (Y,U,V) ... (Y,U,V) format for the YUV 4:4:4 format data is repacked from 24-bit data sequence Y0U0V0, Y1U1V1, Y2U2V2, Y3U3V3, ... Y7U7V7 to 16-bit data sequence Y0Y1, U01U23, Y2Y3, V01V23, Y4Y5, etc., where Umn denotes the 8-bit average of $U_m$ and $U_n$ 8-bit data. Because each element of the U, V matrices under YUV 4:2:2 representation is an average value, in the horizontal direction of two neighboring pixels, the 64-value 8×8 matrix is assembled from an area of 16 pixel by 8 pixel in the video image. The YUV 4:2:2 representation, as discussed above, may have originated from input data either YUV 4:4:4, RGB, or YUV 4:2:2 formats.

The (Y,U), (Y,V), (Y,U), (Y,V) ... format for the YUV 4:2:2 format is repacked from 16-bit data sequence Y0U0, Y1V0, Y2U2, Y3V2, ... Y7V6 to Y0Y1, U0U2, Y2Y3, V0V2 etc.

Similarly, the (Y, LSB's U), (Y, MSB's U), (Y, LSB's V), (Y, MSB's V) ... format for YUV 4:1:1 format is repacked from 12-bit data sequence Y0U0L, Y1U0H, Y2V0L, Y3V0H, Y4U4L, etc. to 16-bit data sequence Y0Y1, Y2Y3, Y4Y5, U0U4, Y6Y7, V0V4 (for pixels in the even lines of the image) or from 12-bit data sequence Y0V0L, Y1V0H, Y2U0L, Y3U0H, Y4V4L ... to 16-bit data sequence Y0Y1, Y2Y3, Y4Y5, V0V4, Y6Y7, U0U4 (for pixels in the odd lines of the image).

During decompression, data from the block memory unit 103 are read by VBIU 102 as 16-bit words. The block memory format data are translated into the 24-bits RGB, YUV 4:4:4, or 16-bit 4:2:2, or 12-bit 4:1:1 formats as required. The translation from the 16-bit representation to the various YUV representations is performed by DCT/YUV converter 205. If RGB data is the specified output format, the DCT/YUV converter 205 outputs 24-bit YUV 4:4:4 format data for the RGB/YUV converter 202 to convert into RGB format.

Either the output data of the RGB/YUV converter 202, or the output data of the DCT/YUV converter 205 are selected by multiplexor 208 for output onto data I/O bus 102-2.

Clock circuits in sync. generator 102-1 generate the display timing signals Hsync and Vsync (horizontal synchronization signal and vertical synchronization signal, respectively) if required by the external display. The external memory address generator 207 provides the addresses on address bus 102-3 for loading the video data into an external display's buffer memory, if required. This external memory provides conversion of horizontal line-by-line "natural" video data into 8×8 blocks of pixel data for input during compression, and conversion of 8×8 blocks output pixel data into horizontal line-by-line output pixel data during decompression using addresses provided by the external memory address generator 207. Hence, the external memory address generator 207 provides compatibility with a wide variety of video equipment.

Structure and Operation of Block Memory Unit

The block memory unit (BMU) 103 assembles the stream of Y U and V interleaved pixel data into 8×8 blocks of pixel data of the same type (Y, U, or V).

In addition, BMU 103 acts as a data buffer between the video bus interface unit (VBIU) 102 and the DCT input select unit 104 during data compression and, between VBIU 102 and DCT row/column separator unit 107 during decompression operations.

During data compression, VBIU 102 will output pixels every clock period in the sequence YUYV—YUYV—, if a 4:2:2 format is required (each Y, U, V is a 16-bit datum containing information of two pixels); or in a sequence of YXYX—YUYV—, if a 4:1:1 format is used. ("—" indicates no output data from VBIU 102 and "X" indicates output data are of the "don't-care" type.) Since DCT input select unit 104 requires all 64 pixels (8×8 matrix) in a block to be available during its two-pass operation, BMU 103 must be able to accumulate a full matrix of 64 pixels of the same kind from VBIU 102 before output data can be made available to DCT input select unit 104.

During data decompression, a reverse operation takes place. The DCT row/column separator 107 outputs 64 pixels of the same kind serially to BMU 103; the pixels are temporarily stored in BMU 103 until four complete matrices of Y type pixels and one complete matrix each of U and V type pixels have been accumulated so that VBIU 102 may reconstitute the required video data for output to an external display device.

Figure 3:
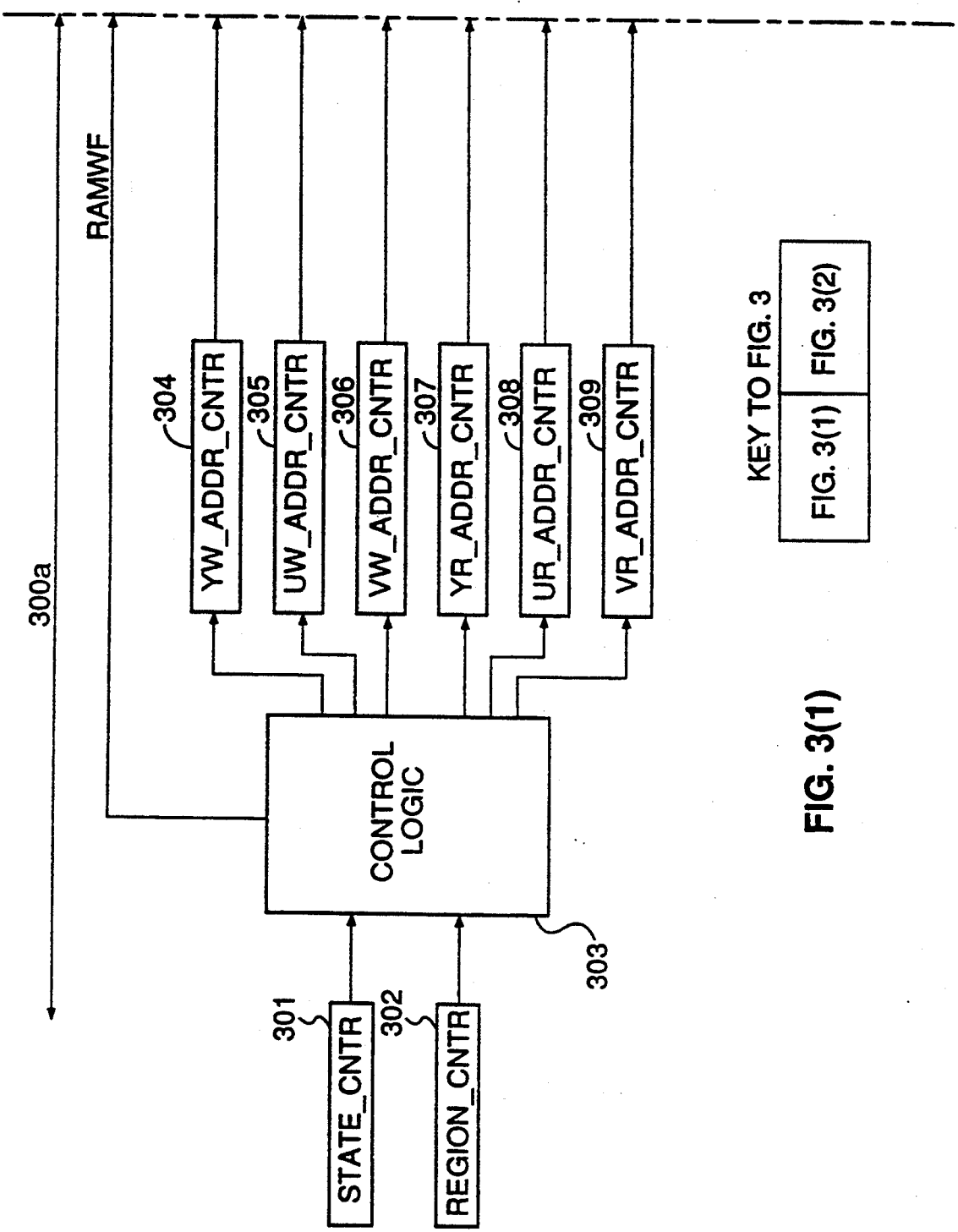
FIGS. 3(1)–3(2) show a block diagram of the block memory unit 103 of the embodiment shown in FIG. 1.
Figure 3:
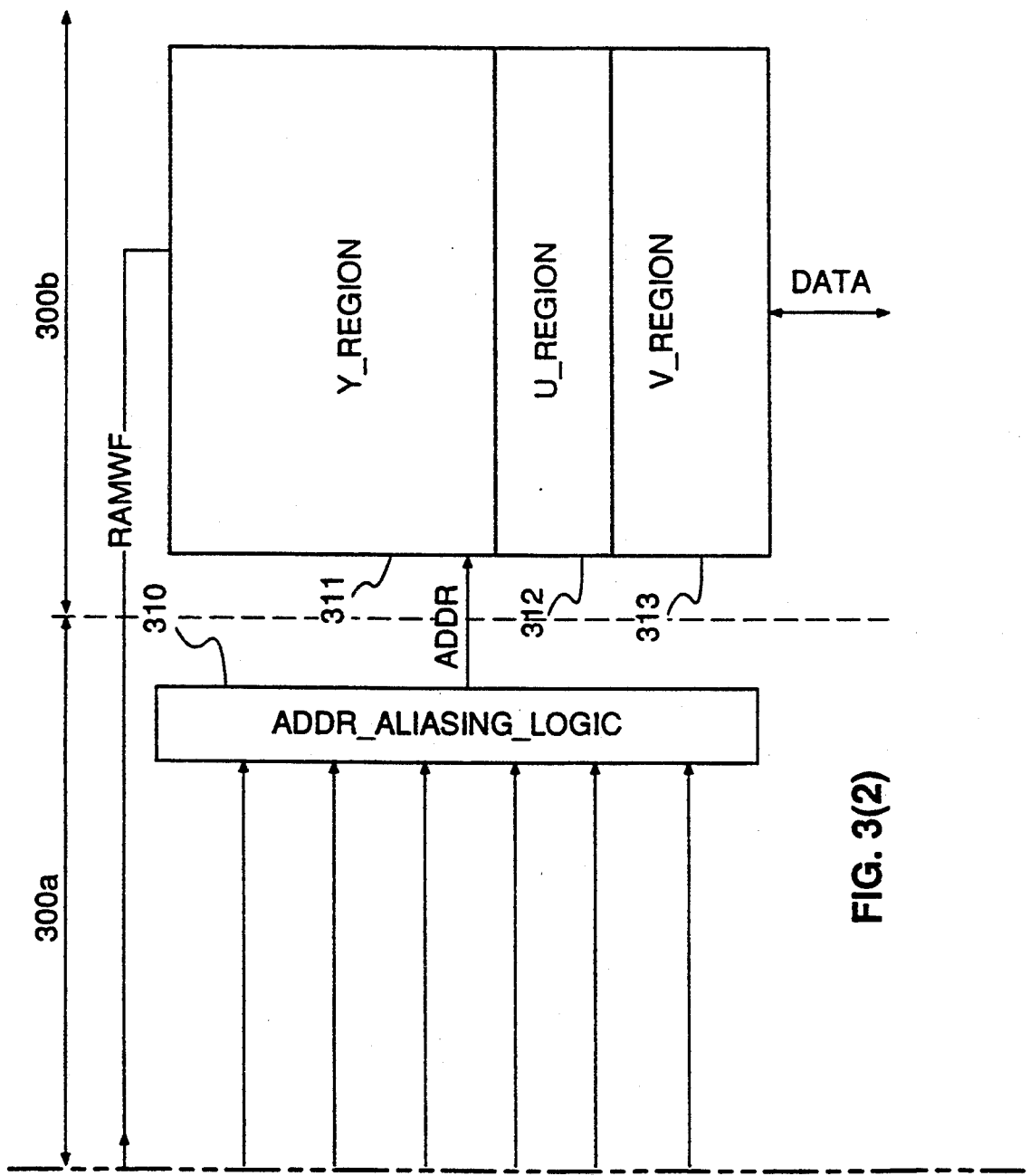

FIG. 3 shows a block diagram of BMU 103. BMU 103 consists of two parts: the control circuit 300a, and a memory core 300b. The memory core 300b is divided into three regions: Y_ region 311, U_ region 312, and V_ region 313. Each region stores one specific type of pixel data and may contain several 64-value blocks. In this embodiment, Y_ region 311 has a capacity of five blocks and contains Y pixels only. The U_ region 312 has a capacity of more than one block, but less than two blocks and contains U type pixels only. Similarly, the V_ region has a capacity of more than one block, but less than two blocks and contains V type pixels only. This arrangement is optimized for 4:1:1 format decompression, with extra storage in each of Y, U, or V type data to allow memory write while allowing a continuous output data stream to VBIU 102. Because data are transferred to and out of the block memory unit 103 at a rate of two values every clock period, a memory structure is constructed using address aliasing (described below) which allows successive read and write operations to the same address. Since data must be output to VBIU 102 in interleaved pixel format, and since data arrive from the DCT units 104-107 in matrices each of elements of the same pixel type (Y, U or V), there are instances when elements of the next U or V matrix arrive before the corresponding elements in the U or V matrix being currently output are provided to VBIU 102. During such time periods, the elements of the next U or V matrix is allocated memory locations not overlapping the current matrix being output. Hence, the physical memory allocated for U, V blocks must necessarily be greater than one block to allow for such situations. In practice, an extra one-quarter of a block is found to be sufficient for the data formats YUV 4:2:2 and YUV 4:1:1 handled in this embodiment. The starting addresses of the regions 311, 312 and 313 are designated 0, 256 and 320 respectively. While the data transaction between BMU 103 and VBIU 102 is in units of pixels, the transaction between BMU 103 and DCT input select 104 or DCT row/column separator 107 is in units of 64-value blocks.

Memory Access Modes in the Block Memory Unit

Another aspect of this embodiment is the aliasing of the memory core addresses in the memory core 300b. Aliasing is the practice of having more than one logical address pointing to the same physical memory location. Although aliasing of memory core addresses is not necessary for the practice of the present invention, address aliasing reduces the physical size of memory core 300b and saves significant chip area by allowing sharing of physical memory locations by two 64-value blocks. This sharing is discussed in detail next.

During compression or decompression operations, data flow from respectively the VBIU 102, through BMU 103 to DCT input select unit 104, or from DCT row/column separator 107, through BMU 103, to VBIU 102. Some parts of a block might have been read and will not be accessed again, while other parts of the block remain to be read. Therefore, the physical locations in the memory core 300b which contain the parts of a block that have been read may be written over before the entire block is completely read. The management of the address mapping to allow reuse of memory locations in this manner is known as address-aliasing or "in-line" memory. In this embodiment, address aliasing logic 310 performs such mapping. A set of six registers 304 to 309 generates the logical address of a datum which is mapped into a physical address by address aliasing logic 310. Accordingly, YW address counter 304, UW address counter 305 and VW address counter 306 provide the logical addresses for a write operation in regions Y_ region 311, U_ region 312, and V_ region 313 respectively. Similarly, YR address counter 307, UR address counter 308 and VR address counter provide the read logical addresses for a read operation in Y_ region 311, U_ region 312, and V_ region 313 respectively.

The address generation logic 300a in BMU 103 mainly consists of a state counter 301, a region counter 302 and the six address counters 304 through 309 described above. Depending upon the format chosen and the mode of operation, the memory core access will follow the pattern:

| | | |
|---|---|---|
| A. | 4:2:2 compression sequence - | YUYVRRRR YUYVRRRR |
| B. | 4:1:1 compression sequence - | YXYXRRRR YUYVRRRR |
| C. | 4:2:2 decompression sequence - | WWWWYUYV WWWWYUYV |
| D. | 4:1:1 decompression sequence - | WWWWYUYV WWWWYUYV | where the Y, U or V in compression sequence indicates a Y, U or V data is written from the VBIU 102 into BMU 103. The "R" in the compression sequence indicates a datum is to be read from BMU 103 to DCT input select unit 104. The Y, U or V in the decompression mode indicates a Y, U or V datum is to be read from BMU 103 into VBIU 102. The "W" in a decompression sequence indicates that a datum is to be written from DCT row/column separator 107 into BMU 103. Because the sequences repeat themselves every 16 clock periods, a 4-bit state counter 301 is sufficient to sequence the operation of the BMU 103.

The region counter 302 is used to indicate which region, among Y_ region 311, U_ region 312, and V_ region 313, the read or write operation is to take place. The region counter 302 output sequences in blocks for the several modes of operation are as follows:

```
4:2:2 compression: YYUV YYUV
4:1:1 compression: YY—YYUV
4:2:2 decompression: YYUVYYUV
4:1:1 decompression: YY—YYUV
```

Data Flow in the Discrete Cosine Transform Units

The Discrete Cosine Transform (DCT) function in the embodiment described above in conjunction with FIG. 1 involves five functional units: the block memory unit 103, the DCT input select unit 104, the DCT row storage unit 105, the DCT/IDCT processor 106, and the DCT row/column separator 107. The DCT function is performed in two passes, first in the row direction and then in the column direction.

FIG. 4a shows a data flow diagram of the DCT units. The input video image in a 64-value pixel matrix is first processed two values at a time in the DCT/IDCT processor 106, row by row, shown as the horizontal rows row0-row7 in FIG. 4a. The row-processed data are serially stored temporarily into the DCT row storage unit 105, again two values at a time. The row-processed data are then fed into the DCT/IDCT processor 106 for processing in the column direction col0-col7 in the second pass of the 2-dimensional DCT. The DCT row/column separator 107 streams the row-processed data into the DCT row storage unit 105, and the data after the second pass (i.e., representation in transform space) into the quantizer unit 108.

FIG. 4b shows the data flow schedule of the 4:1:1 data input into the DCT units 103–107 (FIG. 1) under compression mode. In FIG. 4b, the time axis runs from left to right, with each timing mark denoting four clock periods. In the vertical direction, this diagram in FIG. 4b is separated into upper and lower portions, respectively labelled "input data" and "DCT data." The input data portion shows the input data stream under the 4:1:1 format, and the DCT data portion shows the sequence in which data are selected from block memory unit 103 to be processed by the DCT/IDCT processor unit 106.

As described above in conjunction with VBIU 102, under the 4:1:1 YUV data format, the Y data come into the DCT units 103–107 at 8 bits per two clock periods, and the U, V data come in at 4 bits per two clock periods, with "don't-care" type data being sent by VBIU 102 50% of the time. Hence, for a 64-value 8 pixels by 8 pixels matrix, the U and V matrices each requires 512 clock periods to receive; during the same period of time, four 64-value Y matrices are received at DCT units 103–107. This 512-clock period of input data is shown in the top portion of FIG. 4b.

Under compression mode, as described above, the input data are assembled into 8×8 matrices of like-type pixels in the block memory unit 103. The DCT input select unit 104 selects alternatively DCT row storage unit 105 and the block memory unit 103 for input data into the DCT/IDCT processor unit 106. The input data sequence into the DCT/IDCT processor 106 is shown in the lower portion of FIG. 4b, marked "DCT data."

In FIG. 4b, first-pass YUV data (from block memory unit 103) coming into the DCT/IDCT processor unit 106 are designated Y_row, U_row, and V_row, the second-pass data (from DCT row storage unit 105) coming into the DCT/IDCT processor 105 are designated Y_col, U_col, and V_col. Between the time marked 401b and the time marked 403b, the DCT/IDCT processor unit 106 processes first-pass and second-pass data alternately. The first-pass and second-pass data during this period from 401b to 403b are data from a previous 64-value pixel matrix due to the lag time between the input data and the data being processed at DCT units 103–107. Because of the buffering mechanism described above in the block memory unit 103, pixel data coming in between the times marked 401b and 409b in FIG. 4b are stored in the block memory unit 103, while the pixel data stored in the last 512 clock periods are processed in the DCT units 104–107. The data from the last 512 clock periods are processed beginning at time marked 404b, and completes after the first 128 clock periods (identical to time period marked between 401b and 403b) of the next 512 clock periods.

The time period between marks 403b and 404b is "idle" in the DCT/IDCT processor 106 because the pipelines in DCT/IDCT processor unit 106 are optimized for YUV 4:2:2 data. Since the YUV 4:1:1 type data contain only half as much U and V information as contained in YUV 4:2:2 type data, during some clock periods the DCT/IDCT processor unit 106 must wait until a full matrix of 64 values is accumulated in block memory unit 103. In practice, no special mechanism is provided in the DCT/IDCT processor unit 106 for waiting on the input data. The output data of DCT/IDCT processor unit 106 during this period are simply discarded by the zero packer/unpacker unit 110 according to its control sequence. The control structures for DCT input select unit 104 and DCT row/column separator units 107 will be discussed in detail below.

FIG. 4c shows the data flow schedule for YUV 4:2:2 type data under compression mode. Under this input data format, as discussed above, an 8-bit U or V type value is received at the DCT units 103–107 every two clock periods; so that it requires 256 clock periods to receive both 64 8-bit U and V matrices. During this 256-cycle period, two 64-value Y matrices are received at DCT units 103–107. This 256-clock period is shown in FIG. 4c. There are no idle cycles under the YUV 4:2:2 type data. Again, because of the buffering scheme in the block memory unit 103, the DCT/IDCT processor 106 processes the data from the last 256-clock period, while the current incoming data are being buffered at the block memory unit 103.

Under decompression, the basic input data pattern to the DCT units 103–107 are: a) under YUV 4:1:1 format, two 64 16-bit values Y matrices, followed by the U and V matrices of 64 16-bit values each, and then two 64 16-bit values Y matrices; b) under YUV 4:2:2 format, two 64 16-bit values Y matrices, followed by the first U and V matrices of 64 16-bit values each, and then two 64 16-bit values Y matrices, followed by the second U and V matrices.

FIG. 4d shows the data flow schedule for the YUV 4:1:1 data format under decompression mode.

Since the decompression operation is substantially the reverse of the compression operation, the input data stream for decompression comes from the quantizer unit 108. The DCT input select unit 104, hence, alternately selects input data between DCT row storage unit 105 and the quantizer unit 108. Since the data stream must synchronize with timing of the external display, idle periods analogous to the period between the times marked 403b and 404b in FIG. 4b are present. An example of an idle period under YUV 4:1:1 format is the period between 404d and 405d in FIG. 4d. Instead of _row and _col designation under compression mode, FIG. 4d uses _1st and _2nd designation to highlight that the data being processed in the DCT/IDCT units 103–107 are values in the transform (frequency) domain.

Similarly, FIG. 4e shows the data flow schedule for the YUV 4:2:2 data format under decompression. Again, because the design in the DCT/IDCT processor 106 is optimized for YUV 4:2:2 data, there are no idle cycles for data in this input format.

Structure and Operation of the DCT Input Select Unit

Figure 5B:
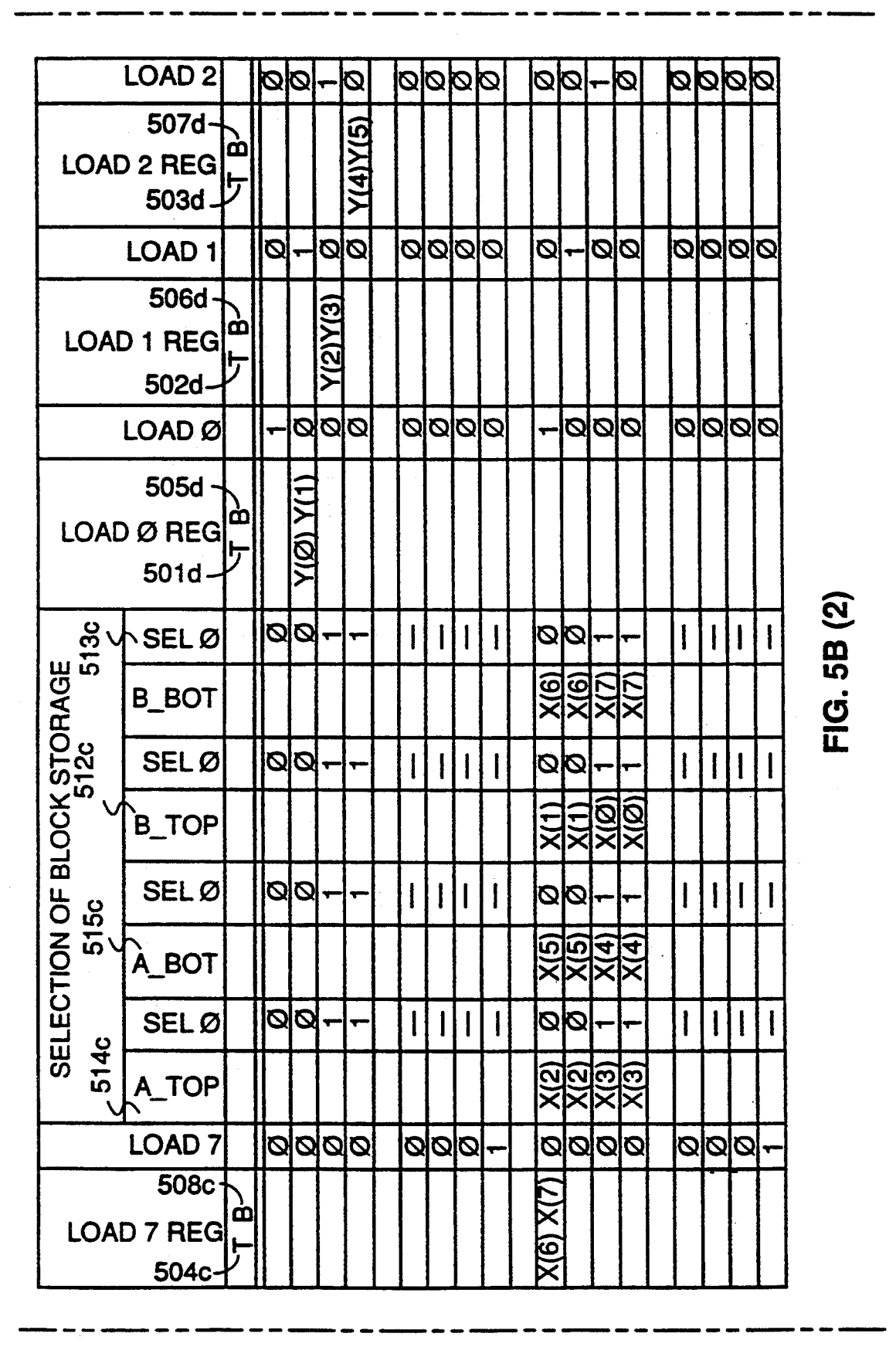
Figure 5C:
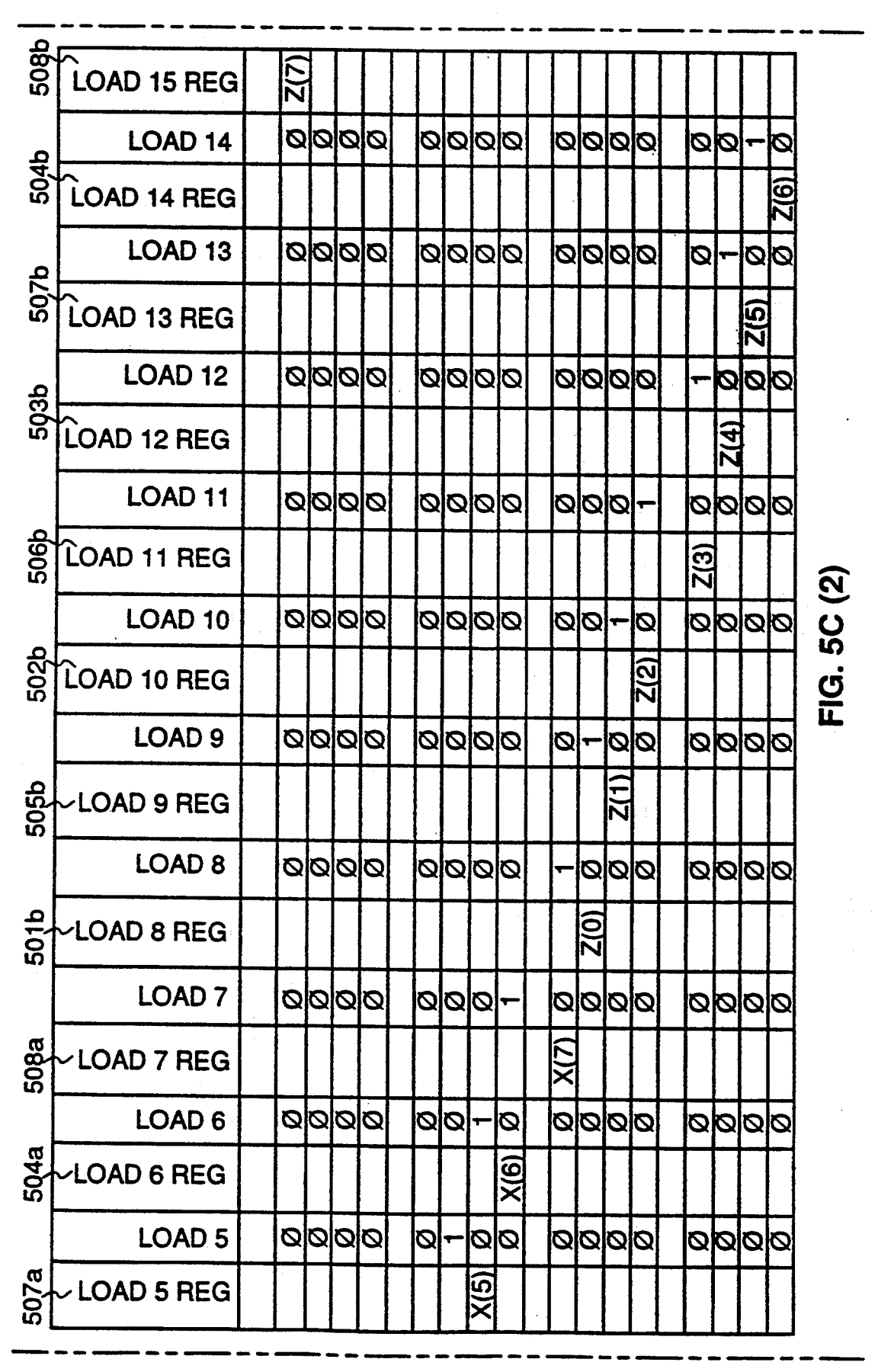
Figure 5C:
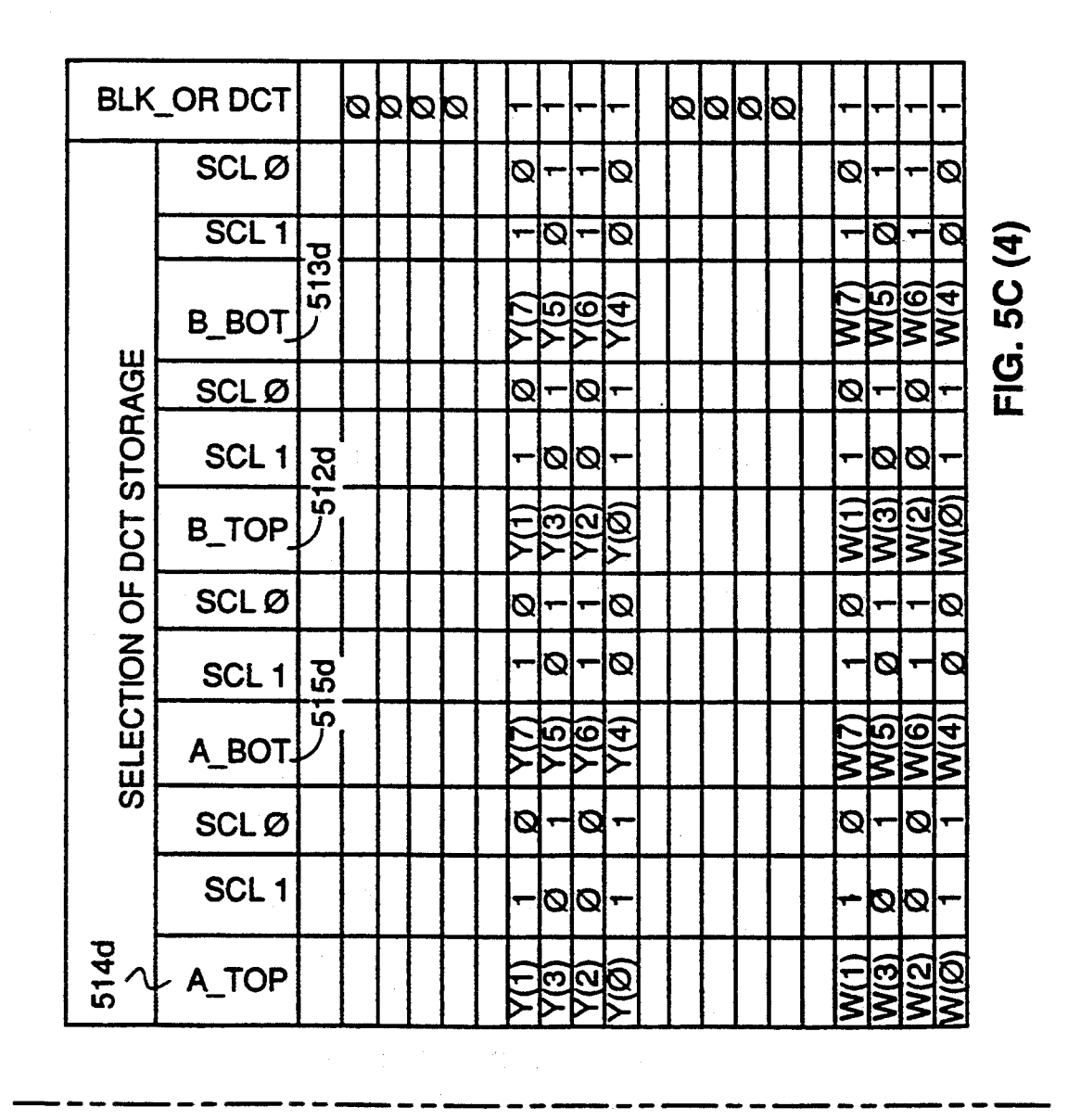

The implementation of the DCT input select unit 104 is next described in conjunction with FIGS. 5a, 5b and 5c.

The DCT Input Select Unit directs two streams of pixel data into the DCT/IDCT processor unit 106. The first stream of pixel data is the first-pass pixel data from either DCT block memory unit 103 or quantizer 108, dependent upon whether compression or decompression is required. This first stream of pixel data is designated for the first-pass of DCT or IDCT. The second stream of pixel data is streamed from the DCT row storage unit 105; the second stream of pixel data represents intermediate results of the first-pass DCT or IDCT. This second stream of pixel data needs to be further processed in a second-pass of the DCT or IDCT. By having the same DCT/IDCT processor unit 106 to perform the two passes of DCT or IDCT, utilization of resource is maximized. The DCT Input Select Unit 104 provides continuous input data stream into tile DCT/IDCT processor unit 106 without idle cycle under YUV 4:2:2 format.

FIG. 5a is a schematic diagram of the DCT input select unit 104. As discussed above, the DCT input select unit 104 takes input data alternately from the quantizer unit 108 and DCT row storage unit 105 during decompression. During compression, input data to tile DCT input select unit 104 are taken alternately from the block memory unit 103 and the DCT row storage unit 105.

During compression, when input data are taken from the block memory unit 103, two streams of 8/bit input data are presented on the 518a and 518b data busses. As shown in FIG. 5a, these two streams of data are then latched successively into one pair of the four pairs of latches (top-bot): 501c and 505c, 502c and 506c, 503c and 507c, 504c and 508c by the control signals blk_load4, blk_load5, blk_load6, and blk_load7 respectively. Each pair of latches consists of a top latch and a bottom ("bot") latch. The control signal (e.g. blk_load7) associated with a latch pair loads both the top and bottom latches. Latches 501c to 508c temporarily store data so that this can be properly sequenced into the DCT unit 106.

A set of four 2-to-1 8-bit multiplexors 512c, 513c, 514c and 515c (called block multiplexors) each selects either the top or bottom output datum from one of the four pairs of latches 501c-505c, 502c-506c, 503c-507c and 504c-508c, for input to another set of four 2:1 multiplexors 516a, 516b, 516c, and 516d (called block/quantizer multiplexors). The output datum selected by the block multiplexors from the pairs of latches 501c-505c and 502c-506c are denoted "block top data", and the output data selected from the pair of latches 503c-507c and 504c-508c are denoted "block bot data". The block/quantizer multiplexors 516a-d are 16-bit wide, and select between the output data of block multiplexors 512c to 515c, and the quantizer multiplexors 511a and 511b, in a manner to be discussed below.

During compression, the block/quantizer multiplexors 516a-d are set to select the output data of the block multiplexors 512c to 515c, since there is no output from the quantizer 108. The output data of the block/quantizer multiplexors 516a and 516c are denoted "block/quantizer top data"; being selected between block top data and quantizer top data (selected by multiplexer 511a, discussed below); the output data of the block/quantizer multiplexors 516b and 516d are denoted "block/quantizer bot data", being selected between block hot data and quantizer bot data (selected by multiplexor 511b, discussed below). Since the block multiplexors 512c-515c are each 8-bit wide, eight zero bits are appended to the least significant bits of each output datum of the block multiplexors 512c-515c to form a 16-bit word at the block/quantizer multiplexors 516a-d. The most significant bit of this 16-bit word is inverted to offset the resulting value by $-2^{15}$, to obtain a value in the appropriate range suitable for subsequent computation.

Two streams of input data, each 16-bit wide, are taken from the DCT row storage unit 105. The data flow path of the DCT row data in DCT row storage unit 105 to the DCT/IDCT processor unit 106 is very similar to the data flow path of the input data from the block memory storage unit 103 to the DCT/IDCT processor unit 106 described above. Four pairs of latches (top-bot): 501d-505d, 502d-506d, 503d-507d, and 504d-508d are controlled by control signals row_load0, row_load1, row_load2, and row_load3 respectively. A set of four 4:1 multiplexors 512d, 513d, 514d and 515d (called DCT row multiplexors) selects the output data (called DCT row top data) of two latches from the two pairs controlled by signals row_load0 and row_load1 (i.e. the two pairs 501d-505d and 502d-506d), and the output data (called DCT row bot data) of two latches from the two pairs controlled by signals row_load2 and row_load3 (i.e. the two pairs 503d—507d, and 504d-508d).

During decompression, as discussed above, data into the DCT/IDCT processor unit 106 (FIG. 1) are taken alternately from the the DCT row storage unit 105 and the quantizer 108. Hence, during decompression, the block/quantizer multiplexors (516a-d) are set to select from the quantizer multiplexors (511a-b), rather than tile block multiplexors.

A single stream of 16-bit data flows from the quantizer unit 108 (FIG. 1) on bus 519. A 16-bit datum can be latched into any one of 16 latches assigned in two banks: 501a-508a (bank 0), or 501b-508b (bank 1), each latch is controlled by one of the control signals load0-load15. A set of four 4:1 multiplexors: 509a (called quantizer bank 0 top multiplexor), 510a (called quantizer bank 0 bot multiplexor), 509b (called quantizer bank 1 top multiplexor), and 510b (called quantizer bank 1 bot multiplexor) selects four data items, each from a separate group of four latches in response to signals to be described later. Quantizer bank 0 top multiplexor 509a selects one output datum from the latches 501a, 502a, 505a, and 506a. Quantizer bank 0 bot multiplexor 510a selects one output datum from the latches 503a, 504a, 507a and 508a. Quantizer bank 1 top multiplexor 509b selects one output datum from the latches 501b, 502b, 505b, and 506b. Quantizer bank 1 bot multiplexor 510b selects one output datum from the latches 503b, 504b, 507b, and 508b.

A set of two 2:1 multiplexors 511a and 511b (quantizer multiplexors) then selects a quantizer top data item and a quantizer bot data item respectively. Quantizer top data item is selected from the output data items of the quantizer bank 0 and bank 1 top data items (output data of multiplexors 509a and 509b); and likewise, quantizer bot data item is selected from the output data items of the quantizer bank 0 and bank 1 bot data items (output data of multiplexors 510a and 510b). The quantizer top and bot data items are provided at the block/quantizer multiplexors 516a–516d, which are set to select the quantizer top and bot data items (output data of multiplexors 511a and 511b) during decompression.

Finally, a set of four 2:1 multiplexors 517a–d selects between the DCT row top and bot data (output data of multiplexors 512d–515d) and the block/quantizer top and bot data (output data of multiplexors 516a–516d) to provide the input data into the DCT/IDCT processor unit 106 (FIG. 1). Multiplexor 517a selects between one set of block/quantizer multiplexor top data 516a and DCT row storage top data 514d to provide "A" register top data 517a; multiplexor 517c selects from the other set of block/quantizer multiplexor top data 516c and DCT row storage top data 512d to provide "B" register top data. The two sets of quantizer multiplexor top data 516b and 516d and DCT storage hot data 515d and 513d provide the "A" register hot data 517b, and "B" register bot data 517d, respectively.

Operation of DCT Input Select Unit During Compression

Having described the structure of DCT input select unit 104, the operation of the DCT input select unit 104 is next discussed.

FIG. 5b shows the control signal and data flow of the DCT input select unit 104 during compression mode. The DCT input select unit 104 can be viewed as having sixteen internal states sequenced by the sixteen successive clock periods. FIG. 5b shows sixteen clock periods, corresponding to one cycle through the sixteen internal states. For compression mode, the internal states of the DCT units 104–107 for clock periods 0 through 7 are identical to the internal states of the DCT units 104–107 for clock periods 8 through 15. FIG. 5b shows the operations of the DCT input select unit 104 (FIG. 1) with respect to one row of data from the DCT row storage unit 105 and one row of input data from the block memory unit 103.

The first four clock periods illustrated (i.e. clock periods 0, 1, 2 and 3) are the loading phase of data on busses 518c and 518d into the latches 501d–508d from the DCT row storage unit 105. These first four clock periods are also the processing phase of the data from the block memory unit 103 loaded into latches 501c–508c in the last four clock periods. The processing of the block memory data stored in latches 501c–508c will be described below using an example, in conjunction with discussion of clock periods 8 through 11, after the loading of block memory data from block memory unit 103 is discussed in conjunction with clock periods 4 through 7.

During the first four clock periods (0–3), a row of data from DCT row storage unit 105 is loaded in the order Y(0), Y(1) . . . Y(7) in pairs of two into latch pairs 501d–505d, 502d–506d, 503d–507d and 504d–508d by successive assertion of control signals row_load0 through row_load3.

In the next four clock periods 4 through 7, the DCT input select unit 104 (FIG. 1) forwards to the DCT/IDCT processor 106 the data loaded from the DCT row storage unit 105 in the last four clock periods 0–3, and at the same time, loads data from the block memory unit 103. The multiplexors 517a through 517d are set to select DCT row storage data in latches 501d–508d. The DCT row storage multiplexors 512d through 515d are activated in the next four clock periods to select, at clock period 4 and 5 elements Y(2) and Y(5) to appear as output data of multiplexors 517a and 517b respectively ("A" register top and bot multiplexors), and Y(1) and Y(6) to appear as output data of 517c and 517d ("B" register top and bot multiplexors) respectively. At clock periods 6 and 7, Y(3) and Y(4) appear as the output data of multiplexors 517a and 517b respectively, and Y(0) and Y(7) appear as output data of multiplexors 517c and 517d respectively. During this time, multiplexors 517a through 517d are selecting DCT row storage data in latches 501d–508d.

During clock periods 4 through 7, a row of block memory data x(0) x(1) . . . x(7) are latched into latches 501c through 508c by control signals blk_load4 through blk_load7 in the same manner as the latching of DCT row storage data into latches 501d–508d during clock periods 0 through 3.

During the next four clock periods 8 through 11, the DCT input select unit 104 is successively in the same states as it is during clock periods 0 through 3; namely, loading from DCT row storage unit 105 and forwarding to DCT/IDCT processor unit 106 the data X(0) . . . x(7) loaded in latches 501c–508c from block memory unit 103 during the last four clock periods 4–7.

In clock periods 8 through 11, multiplexors 517a through 517d select data from the block/quantizer multiplexors 516a through 516d, which in turn are set to select data from the block memory multiplexors 512c through 515c. The block memory multiplexors 512c through 515c are set such that during clock periods 8 through 9, x(2) and x(5) are available at multiplexors 517a and 517b, respectively; and during the same clock periods 8 through 9, x(1) and x(6) are available at multiplexors 517c and 517d respectively.

Operation of DCT Input Select Unit During Decompression

The operation of DCT input select unit 104 during decompression mode is next discussed in conjunction with FIG. 5c.

FIG. 5c shows the control and data flow of the DCT input select unit 104 during decompression mode. As mentioned above, the DCT input select unit 104 may be viewed as having 16 internal states. As shown in FIG. 5c, during the 16 clock periods 0 to 15, two rows of data from DCT row storage unit 105 (clock periods 0–3 and 8–11) and two columns of data from the quantizer unit 108 are forwarded as input data to the DCT/IDCT processor unit 106 (clock periods 0–15).

As shown in FIG. 5c, a continuous stream of 16-bit data is provided by the quantizer unit 108 to the DCT input select unit 104 at one datum per clock period. A double-buffering scheme provides that when latches in bank 0 (latches 501a through 508a) are being loaded, the data in bank 1 (latches 501b through 508b) are being selected for input to the DCT/IDCT processor unit 106. The latches are loaded, beginning at 501a through 508a in bank 0 by control signals load0 through load7 respectively (at clock periods 0 through 7), and then switching over to bank 1 to load latches 501b through 508b by control signals load8 through load15 respectively (clock periods 8 through 15). During clock periods 8 through 11, while bank 1 is being loaded, the data in bank 0 x(0) . . . x(7) (loaded during clock periods 0 through 7) are being selected for input into the DCT/IDCT processor unit 106. The order of selection shown in FIG. 5c in the sequence (top-bot): x(1)-x(7) in clock period 8, x(3)-x(5) in clock period 9, x(2)-x(6) for clock period 10, and x(0)-x(4) in clock period 11. The same top data appear in both DCT "A" register top data and DCT "B" register top data. The bot data for the bot registers of "A" and "B" are the same as well. During clock periods 0 through 3 in the four clock periods following clock period 15 shown in FIG. 5c (analogous to clock periods 0 through 3 shown), the new data in latches 501b through 508b are selected in similar order for input to the DCT/IDCT processor unit 106.

Loading and processing of the data from the DCT row storage unit 105 follow the same pattern as in the compression mode: i.e. four clock periods during which the latch pairs in 501d through 508d are loaded by control signals row_load0 through row_load3 respectively at one pair of two 16-bit data per clock period. (The latches pairs are 501d-505d, 502d-506d, 503d-507d and 504d-508d). For example, during clock periods 0 through 3, the latches are loaded with a row of 16-bit data Y(0) . . . Y(7) from DCT row storage. In the next four clock periods, 4 through 7, 16-bit data Y(0) . . . Y(7) in the latches 501d through 508d are provided as input to DCT/IDCT processor unit 106 in the sequence ("A" register top, "A" register bot, "B" register top, "B" register bot): (Y(1), Y(7), Y(1), Y(7)), at clock period 4, (Y(3), Y(5), Y(3), Y(5)) at clock period 5, (Y(2), Y(6), Y(2), Y(6)) at clock period 6, and (Y(0), Y(4), Y(0), Y(4)) at clock period 7.

Analogous loading and processing phases are provided at clock periods 8 through 15. Data in the latches 501d through 508d (DCT row storage data) are alternately selected every 4 clock periods with the data from the quantizer unit 108 for input to DCT/IDCT processor unit 106. For example, during clock periods 0 through 3, and 8 through 11, data from the quantizer unit 108 is provided for input to DCT/IDCT processor unit 106 and during clock periods 4 through 7, and 12 through 15, DCT row storage data are provided for input to DCT/IDCT processor unit 106.

Structure and Operation of the DCT Row Storage Unit

The structure and operation of DCT row storage unit 105 (FIG. 1) is next described in conjunction with FIGS. 6a-c.

FIG. 6a is a schematic diagram of the DCT row storage unit 105.

The storage in DCT row storage unit 105 is implemented by two 32×16-bit static random access memory (SRAM) arrays 609 and 610, organized as "even" and "odd" planes. 2:1 multiplexors 611 and 612 forward to DCT input select unit 104 the output data read respectively from the odd and even planes of the memory arrays 609 and 610.

Configuration register 608 contains configuration information, such as latency values (for either compression or decompression) to synchronize output from the DCT row/column separator into DCT row storage 105, so that, according to the configuration information in the configuration register 608, the address generator 607 generates a sequence of addresses for the SRAM arrays 610 and 609.

The memory arrays 609 and 610 can be read or written by a host computer via the bus 115 (FIG. 6a). 2:1 multiplexors 605, 606 select the input address provided by the host computer on bus 613 when the host computer requests access to SRAM arrays 609 and 610.

Incoming data from the DCT row/column separator unit 107 arrive at DCT row storage unit 105 on two 16-bit buses 618 and 619. As described above, a host computer may also write into the SRAM arrays 609 and 610. The data from the host computer are latched into the SRAM arrays 609 and 610 from the 16-bit BUS 615. Alternatively, a set of 2:1 multiplexors 601-604 multiplex the data from DCT/IDCT processor unit 106 on buses 618, 619 to be written into either SRAM array 609 or 610 according to the memory access schemes to be described below.

Two 16-bit outgoing data words are placed on busses 616 and 617, transmitting to output data from the SRAM arrays 610 and 609, respectively. 2:1 multiplexors 611 and 612 select the data on busses 616 or 617 to place on busses 626 and 627, two 16-bit data words per clock period, in the order required by the DCT/IDCT algorithms implemented in the DCT/IDCT processor unit 106, already described in conjunction with DCT input select unit 104.

Alternatively, output data from the SRAM arrays 609 and 610 on busses 616 and 617 may be output on bus 614 under direction of a host computer (not shown).

The In-Line Memory of the DCT Row Storage Unit

Because two 16-bit values are written into or read from DCT row storage unit 105 per clock period, and because of the order in which DCT or IDCT first-pass data is accessed, an efficient scheme of reading and writing the SRAM arrays 609 and 610 is provided, such that the same memory locations may be written into with a row of data in the incoming 8×8 matrix after a column of data is read from the last 8×8 matrix. In this manner, an "in-line" memory access scheme is implemented, which requires 50% less storage than a comparable double-buffering scheme.

In order to achieve the "in-line" memory advantage, the SRAM arrays 609 and 610 are written and read under the "horizontal" and "vertical" access pattern alternately. Memory maps (called "write patterns") are shown in FIG. 6b and 6c for the horizontal and vertical access patterns respectively.

FIG. 6b shows the content of the SRAM arrays 609 and 610 with an 8×8 first pass result matrix completely written. For example, even and odd portions of logical memory location 0, 0e and 0o, contain elements respectively X0(0) and X0(1) of row X0; 0e and 0o correspond to address 0 in the E-plane (SRAM array 609) and O-plane (SRAM array 610) respectively. Because of their independent input and output capabilities, an E-plane datum and an O-plane datum may be accessed simultaneously during the same clock period. There are 32 memory locations in each of the E-plane and O-plane of the SRAM arrays 609 and 610; the "e" addresses are found in the E-plane, and the "o" addresses are found in the O-plane. Thus a total of 64 data words can be stored in the even and odd plane taken together.

During compression, the use of the words "row" and "column" refer to the rows and columns of the pixel matrix, while during decompression, "rows" and "columns" refer to the "rows" and "columns" of the frequency matrix.

During any clock period, either two 16-bit data arrive from DCT row/column separator unit 107 on busses 618 and 619 (input mode), or two 16-bit data go to the DCT input select unit 104 via busses 626 and 627 (output mode). The period of horizontal access pattern consists of 64 clock periods, during which there are eight (8) cycles each of four clock periods of read memory access followed by four clock periods of write memory access. In the horizontal access pattern, during compression, the outgoing data are provided to DCT input select unit 104 column by column "horizontally," and the incoming data are written into the SRAM arrays 609 and 610 row by row "horizontally." During decompression, the outgoing data are provided to DCT input select unit 104 row by row horizontally, and the incoming data are written column by column horizontally.

The following description is based on the data flow during compression only. During decompression, the incoming data into the DCT row storage unit 105 are columns of a matrix and the outgoing data into DCT input select unit 104 are rows of a matrix, but the principles of horizontal and vertical accesses are the same.

FIG. 6b shows a 8×8 matrix X with rows X0-X7 completely written horizontally into the SRAM arrays 609 and 610. FIG. 6b is the map of SRAM arrays 609 and 610 at the instant in time after the last two 16-bit data from the previous matrix are read, and the last two 16-bit data of the current matrix X (X7(6) and X7(7)) are written into the SRAM arrays 609 and 610.

Because the second pass of the 2-dimensional DCT requires data to be read in pairs, and in column order, i.e. in the order X0(0)—X1(0), X2(0)—X3(0), . . . X6(0)—X7(0), X0(1)—X1(1) . . . X6(7)—X7(7), after a column (for example, X0(0), X1(0) . . . X7(0)), is read, the memory locations Oe, 4o, 8e, 12o, . . . 28o previously occupied by the column X0(0) . . . X7(0) are now available for storage of the incoming row y0 with elements Y0(0) . . . Y0(7).

After the first column X0(0) . . . X7(0) is read and replaced by row Y0(0) . . . Y0(7), the second column X0(1) X7(1) is read and replaced by row Y1(0) . . . Y1(7). This process is repeated until all of matrix X is read and replaced by all of matrix Y, as shown in FIG. 6c. Since during this period, data are read and written "vertically," this access pattern is called vertical access pattern.

The output of matrix Y will be column by column to DCT input select unit 104. Because these columns are located "horizontally" in the SRAM array 609 and 610, the writing of the next incoming matrix row by row will be horizontally also, i.e., to constitute the horizontal access pattern.

In order to allow data to be written vertically and accessed horizontally, or vice versa, each row's first element, e.g., X0(0), X1(0) etc. must be alternately written in the E-plane and O-plane, as shown in FIGS. 6b and 6c, since adjacent 16-bit data in the same column must be accessed in pairs at the same time.

In this manner, an "in-line" memory is implemented resulting in a 50% saving of storage space over a double buffering scheme.

Structure and Operation of the DCT/IDCT Processor Unit

Input data for the DCT/IDCT processor unit 106 are selected by the multiplexors 517a through 517d in the DCT input select unit 104. The input data to the DCT/IDCT processor 106 are four 16-bit words latched by the latches 701t and 701b (FIG. 7a). The DCT/IDCT processor unit 106 calculates the discrete cosine transform or DCT during compression mode, and calculates the inverse discrete cosine transform IDCT during decompression mode.

Figure 7B:
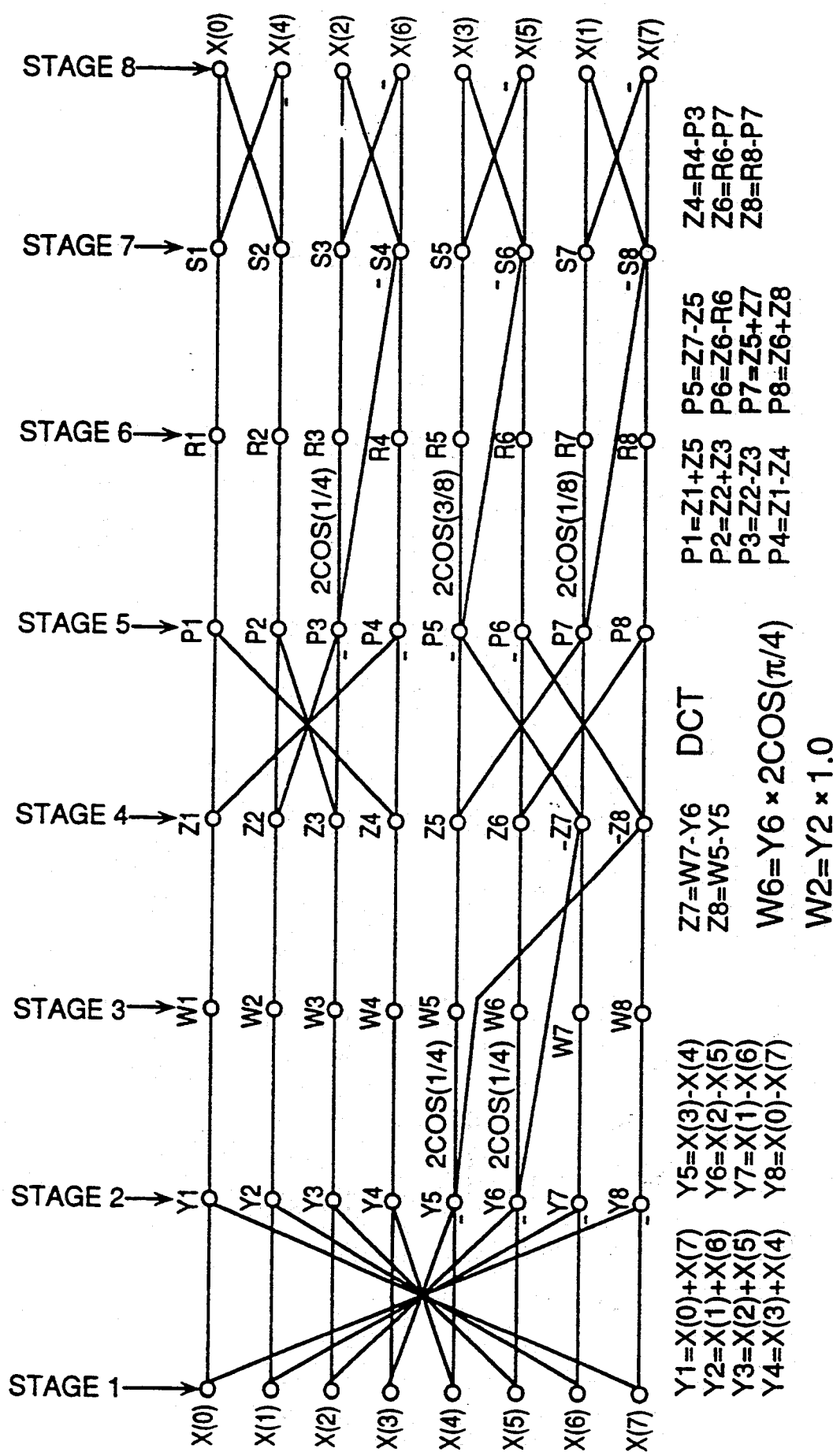
Figure 7C:
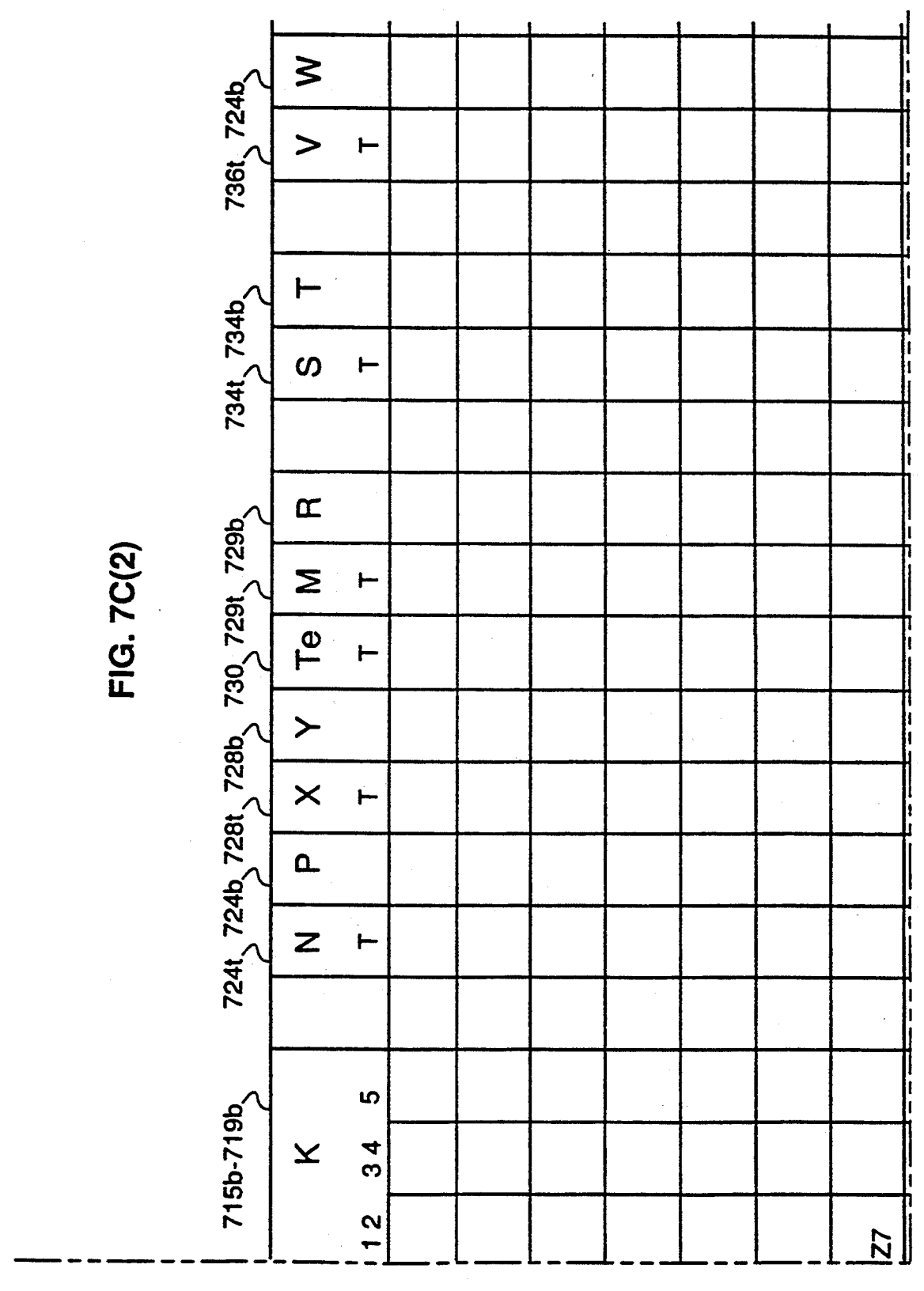
Figure 7C:
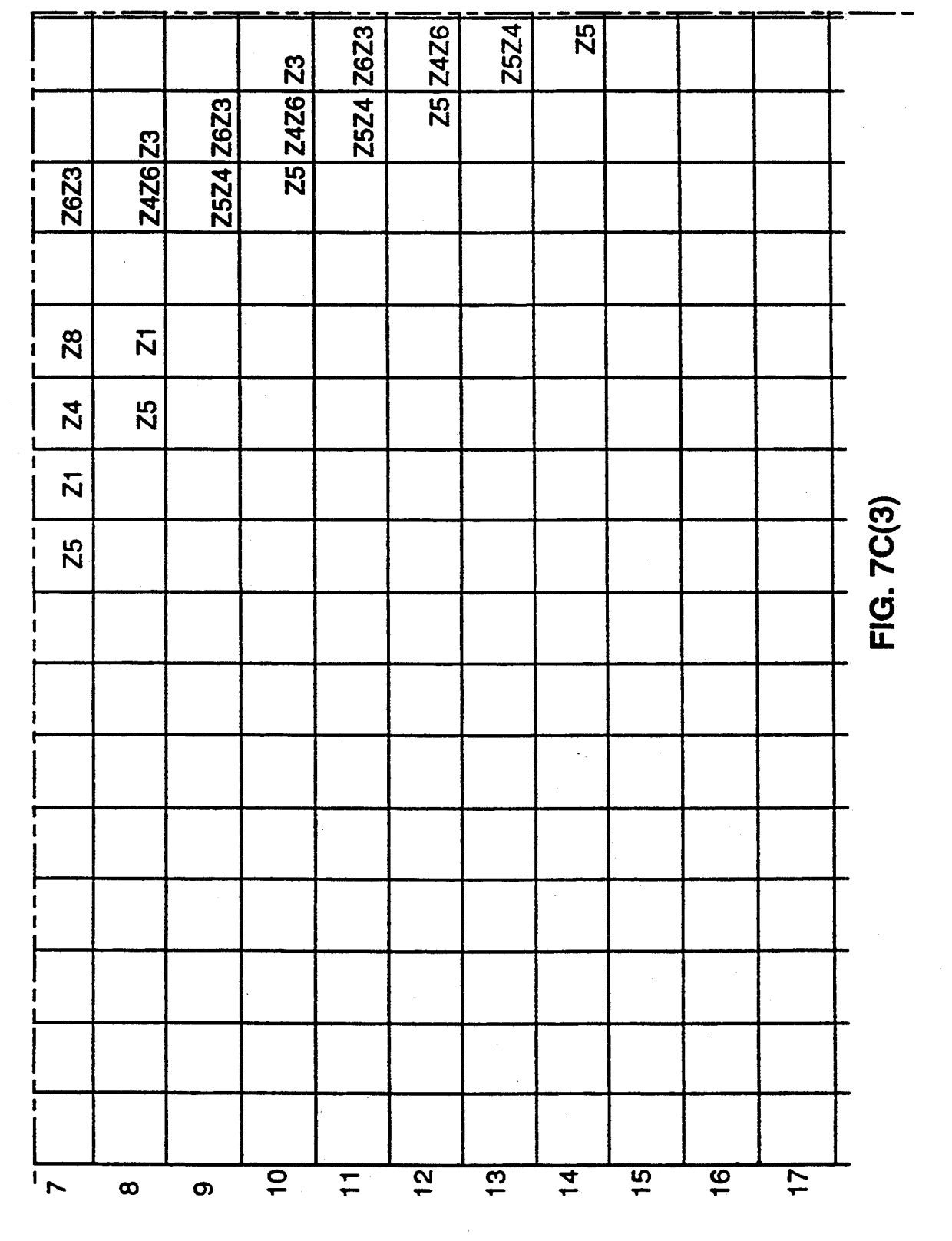
Figure 7C:
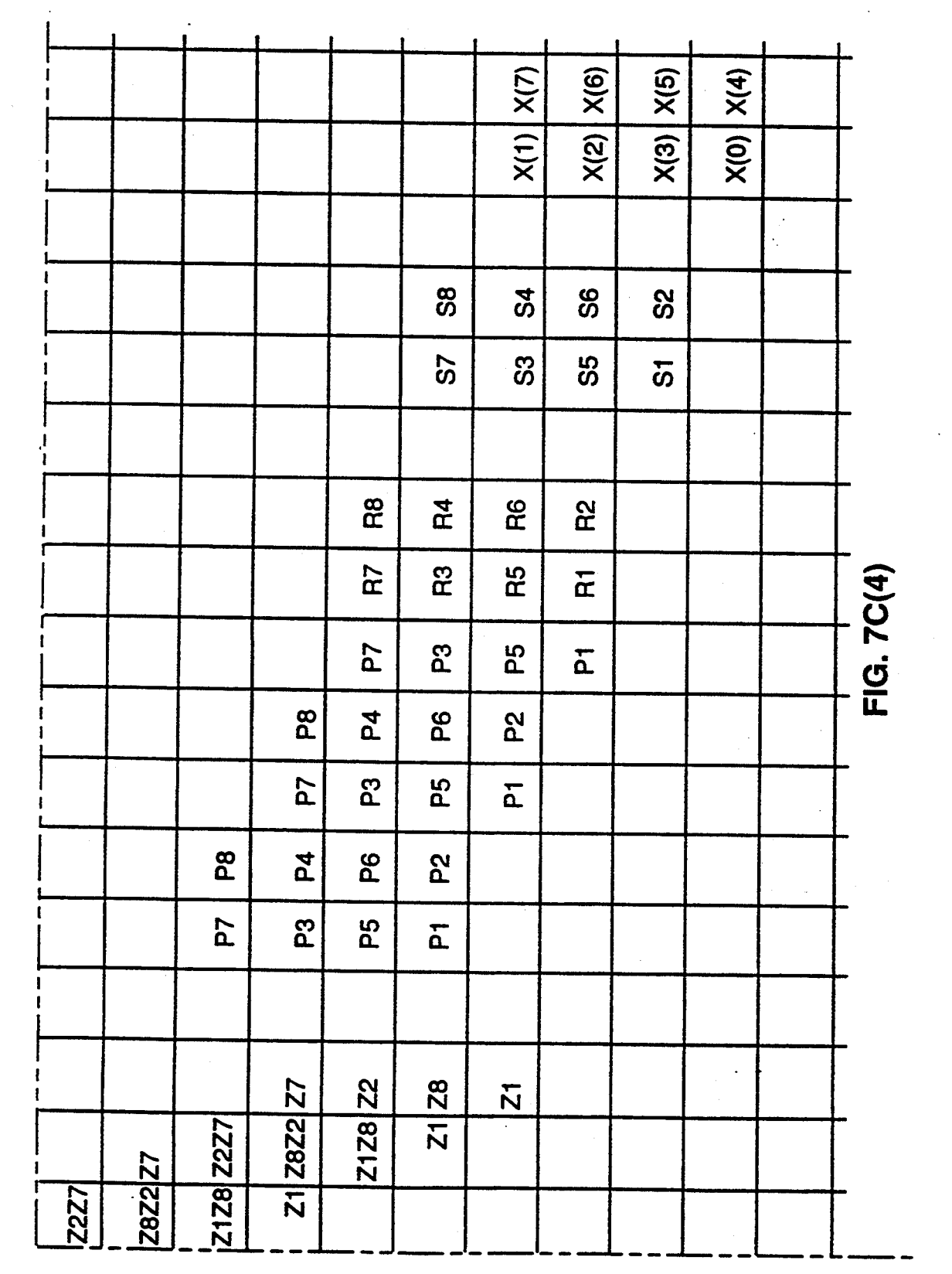
Figure 7E:
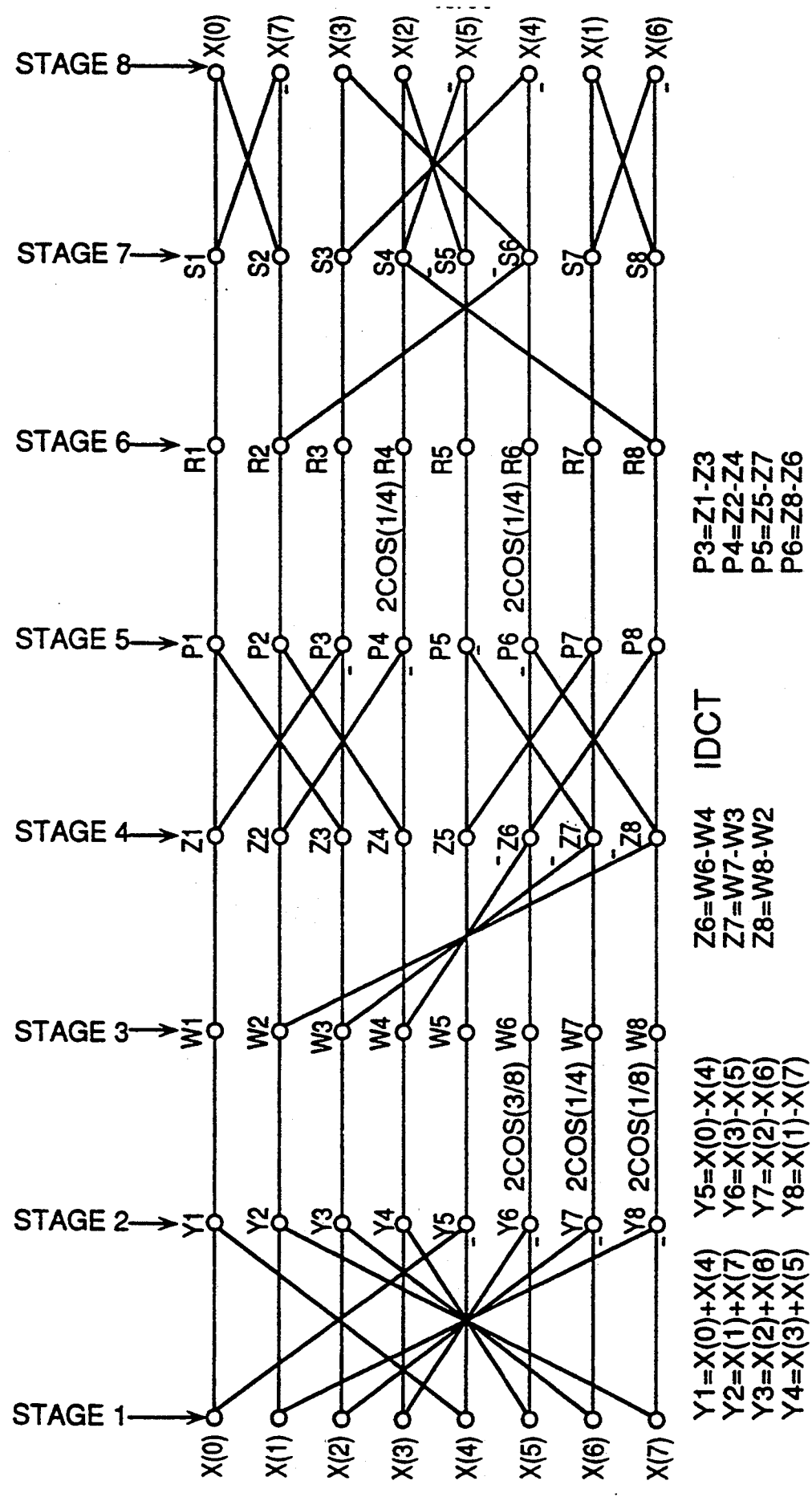

According to the present invention, the DCT and IDCT algorithms are implemented as two eight-stage pipelines, in accordance with the flow diagrams in FIGS. 7b and 7e. During compression the flow diagram in FIG. 7b is the same as FIG. 15d, except for the last multiplication step involving g[0], h[0] . . . i[0] (FIG. 15d). Because the quantization step involves a multiplication, the last multiplication of the DCT is deferred to be performed with the quantization step in the quantizer 108, i.e., the quantization coefficient actually employed is the product of the default JPEG standard quantization coefficient and the two deferred DCT multiplicands, one from each pass through the DCT/IDCT processor unit 106. During IDCT, multiplicands are premultiplied in the dequantization step. This deferment or premultiplication is possible because during DCT, all elements in a column have the same scale factor, and during IDCT all elements in a row have the same scale factor. By deferring these multiplication steps until the quantization step, two multiplies per pixel are saved. In the flow diagrams of FIGS. 7b and 7e, input data flows from left to right. A circle indicates a latch or register, and a line joining a left circle with a right circle indicates an arithmetic operation performed as a datum flow from the left latch (previous stage) to the right latch (next stage). A constant placed on a line joining a left latch to a right latch indicates that the value of the datum at the left latch is scaled (multiplied) by the constant as the datum flows to the right latch; otherwise, if no constant appears on the joining line, the datum on the left latch is not scaled. For example, in FIG. 7b, r3 in stage 6 is derived by having p3 scaled by 2cos(pi/4), and r2 is derived by having p2 scaled by 1 (unscaled). A latch having more than one line converging on it, and each line originating from the left, indicates summation at the right latch of the values in each originating left latch, and according to the sign shown on the line. For example, in FIG. 7b, y5 is the sum of x(3) and −x(4).

As shown in FIG. 7b, for the forward transform (DCT) algorithm, between stages 1 and 2 is a shuffle-and-add network, with each datum at stage 2 involving exactly two values from stage 1. Between the stages 2 and 3 are scaling operations involving either constants 1 or 2cos(pi/4). Stage 4 is either an unscaled stage 3 or a shuffle-and-add requiring a value at stage 2 and a value at stage 3. Between stages 4 and 5 is another shuffle-and-add network, and again each datum at stage 5 is the result of exactly two data items at stage 4. Stage 6 is a scaled version of stage 5, involving scaling constants 2cos(pi/4), 2cos(pi/8), 2cos(3pi/8) and 1. Stage 7 data are composed of scaled stage 6 data and summations requiring reference to stage 5 data. Finally, between stage 8 and stage 7 is another shuffle-and-add network, each datum at stage 8 is the result of summation of two data items at stage 7.

According to the present invention as shown in FIG. 7e, the algorithm for the inverse transform (IDCT) follows closely an 8-stage flow network as in the forward transform, except that scaling between stages 2 and 3 involves additionally the constants 2cos(pi/8) and 2cos(3pi/8), and the shuffle-and-add results at stages 4 and 7 involve values from their respective immediately previous stage, rather than requiring reference to two stages. Hence, with accommodation for the differences noted in the above, it is feasible to implement the forward and inverse algorithms with the same 8-stage processor.

Because no shuffle-and-add in the data flow involves more than two values from the previous stage, these algorithms may be implemented in two 8-stage pipelines with cross-over points where shuffle-and-add operations are required.

FIG. 7a shows the hardware implementation of the flow diagrams in FIGS. 15d and 15e derived above in the discussion of filter implementation. The two 8-stage pipelines shown in FIG. 7a implement, during compression, the filter tree of FIG. 15b in the following manner: operations between stages 1 and 2 implement the first level filters 1501 and 1502; operations between stages 2-8 implement the second level filters 1503-1506; and, between stages 5-8 implement the third level filters 1507-1514. As explained above, the operation of each of the filters 1515-1530 corresponds to the last multiplication step in each pixel. This last multiplication step is performed inside the quantizer 108 (FIG. 1).

The DCT/IDCT processor unit 106 is implemented by two data paths 700a and 700b, shown respectively in the upper and lower portions of FIG. 7a. Data may be transferred from one data path to the other via multiplexors such as 709, 711t, 722t, 722b, 731t, or 733t. Adders 735t and 735b also combine input data from one data path with input data in the other data path. Control signals in the data path are data-independent, providing proper sequencing of data in accordance with the DCT or IDCT algorithms shown in FIGS. 7b and 7e. All operations in the DCT/IDCT processor 106 shown in FIG. 7a involve 16-bit data. Adders in the DCT/IDCT processor unit 106 perform both additions and subtractions.

The two pairs of 16-bit input data are first latched into latches 701t ("A" register) and 701b ("B" Register). The adders 702t and 702b combine the respective 16-bit data in the A and B registers. The "A" and "B" latches each holds two 16-bit data words. The A and B registers are the stage 1 latches shown in FIGS. 7b and 7e. The results of the additions in adders 702t and 702b are latched respectively into the latches 703t and 703b (stage 2 latches). The datum in latch 703t is simultaneously latched by latch 707t, and multiplied by multiplier 706 with a constant stored in latch 705, which is selected by multiplexor 704. The constant in latch 705 is either 1, 2cos(pi/4), 2cos(3pi/8) or 2cos(pi/8). The result of the multiplication is latched into latch 708t (a stage 3 latch).

Alternatively, the datum in latch 703t may be latched by latch 707t to be then selected by multiplexor 709 for transferring the datum into data path 700b. 2:1 Multiplexor 709 may alternatively select the datum in latch 708t for the transfer. The datum in 703b is delayed by latch 707b before being latched into 708b (a stage 3 latch). This datum in 708b may either be added in adder 710 to the datum selected from the data path 700a by multiplexor 709 and then latched into latch 712b through multiplexor 711b or be passed into data path 700a through 2:1 multiplexor 711t and be latched by latch 712t (a stage 4 latch), or be directly latched into 712b (a stage 4 latch) through multiplexor 711b.

The datum in latch 708t may be selected by multiplexer 711t to be latched into latch 712t, or as indicated above, passed into data path 700b through multiplexor 709. The data in latches 712t and 712b may each pass over to the opposite data path, 700b and 700a respectively, selected by 2:1 multiplexors 713t and 713b into latches 714t or 714b respectively. Alternatively, the data in latches 712t and 712b may be latched in their respective data path 700a and 700b into latches 714t or 714b through multiplexors 713t and 713b.

A series of latches, 715t through 720t in data path 700a, and 715b to 719b in data path 700b, are provided for temporary storage. Data in these latches are advanced one latch every clock cycle, with the content of latches 720t and 719b discarded, as data in 719t and 718b advance into latches 720t and 719b. In data path 700a, the 5:1 multiplexor 721t may select any one of the data in the latches 715t through 718t, or from 714t, as an input operand of adder 723t. 5:1 multiplexor 722t selects a datum in any one of 714t, 716t through 718t or 720t as an input operand into adder 723b in data path 700b. Similarly, in data path 700b, 3:1 multiplexor 722b selects from latches 716b, 717b, and 719b an input operand into adder 723t in data path 700a. 5:1 multiplexor 721b selects one datum from the latches 715b through 719b, as an input operand to adder 723b.

The results of the summations in adders 723t and 723b are latched into latches 724t and 724b (stage 5 latches) respectively. The datum in latch 724t may be multiplied by multiplier 727 to a constant in latch 726, which is selected by 4:1 multiplexor 725, from among the constants 1, 2cos(pi/8), 2cos(3pi/8), or 2cos(pi/4). Alternatively, the datum in latch 724t may be latched into latch 730 after a delay at latch 728t. The result of the multiplication is stored in latch 729t (a stage 6 latch). The 2:1 multiplexor 731t may channel either the datum in latch 729t or in latch 730 as an input operand of adder 732 in data path 700b. The datum in latch 729t can also be passed to latch 734t (a stage 7 latch) through 2:1 multiplexor 733t.

The datum in latch 724b is passed to latch 728b, which is then either passed to adder 732 through 2:1 multiplexor 731b, to be added to the datum selected by 2:1 multiplexor 731t, or passed to latch 729b (a stage 6 latch). The datum in 729b may be passed to data path 700a by 2:1 multiplexor 733t, or passed as operand to adder 732 through 2:1 multiplexor 731b, to be added to the datum selected by 2:1 multiplexor 731t, or be passed to latch 734b (stage 7 latch) through 2:1 multiplexor 733b.

Adders 735t and 735b each add the data in latches 734t and 734b, and deliver the results of the summation to latches 736t and 736b (both stage 8 latches) respectively. The data in latches 736t and 736b leave the DCT/IDCT processor 106 through latches 738t and 738b respectively, after one clock delay at latches 737t and 737b respectively.

Multipliers 706 and 727 each require two clock periods to complete a multiplication. Each multiplier is provided an internal latch for storage of an intermediate result at the end of the first clock period, so that the input multiplicand need only be stable during the first clock period at the input terminals of the multiplier. Both during compression and decompression, every four clock periods a new row or a column of data (eight values) are supplied to the DCT/IDCT Processor Unit 106 two values at a time. Hence, the control signals inside the DCT/IDCT Processor Unit 106 repeats every four clock periods.

Operation of DCT/IDCT Processor Unit During Compression

Figure 7F:
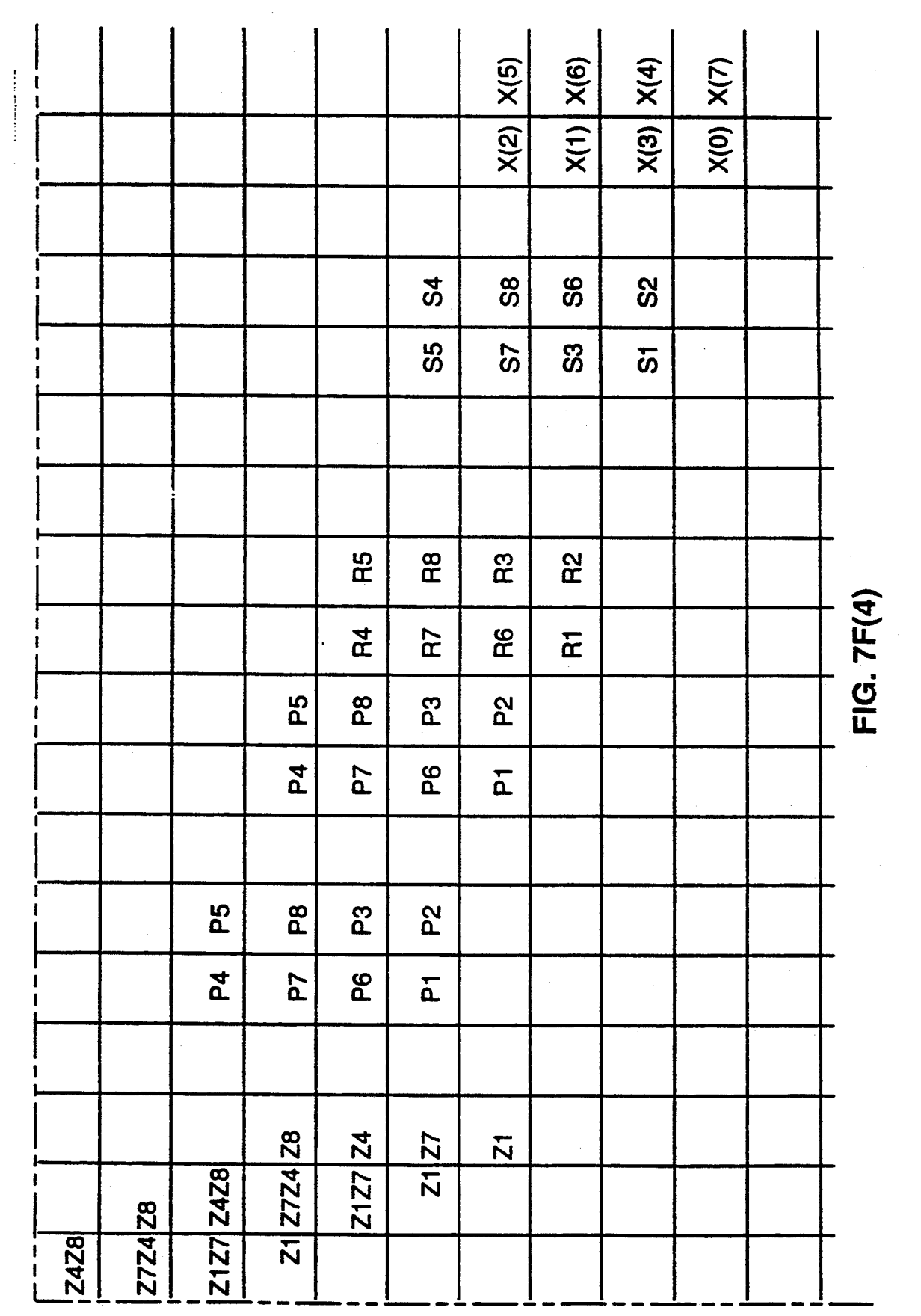

Having described the structure of the DCT/IDCT processor unit 106, the algorithms implemented are next described in conjunction with FIGS. 7b, 7c and 7d for compression mode, and in conjunction with FIGS. 7e, 7f and 7g for decompression mode.

The DCT/IDCT processor unit 106 calculates a 1-dimensional discrete cosine transform for one row (eight values) of pixel data during compression, and calculates a 1-dimensional inverse discrete cosine transform for one column (eight values) of pixel data during decompression.

FIG. 7b is a flow diagram representation of the DCT algorithm for a row of input data during compression mode. FIG. 7c shows the implementation of the DCT algorithm shown in FIG. 7b in accordance with the present invention. FIG. 7d shows the timing of the control signals for implementing the algorithm as illustrated in FIG. 7b.

The input data entering the DCT/IDCT processor 106 (FIG. 1) are either selected from the block memory unit 103, or from DCT row storage unit 105; the sequence in which a row of data from either source is presented to the DCT/IDCT processor 106 is described above in conjunction with the description of DCT input select unit 104.

Accordingly, at clock period 0, elements x(2) and x(5) are latched into latch 701t, and elements x(1) and x(6) are latched into latch 702b.

At the next clock period 1, the results of the sum $y3=x(2)+x(5)$, and the difference $y7=x(1)-x(6)$, are latched into latches 703t and 703b respectively.

At clock period 2, elements x(3) and x(4), x(0) and x(7) are latched into latches 701t and 701b respectively. At the same time, data y3 and y7 are advanced to latches 707t and 707b, and y3 and y7 are replaced at latches 703t and 703b by the difference $y6=x(2)-x(5)$, and the sum $y2=x(1)+x(6)$ respectively.

At clock period 3, data y3 and y7 are advanced to latches 708t and 708b as data w3 and w7 respectively. At the same time, data y6 and y2 are advanced to latches 707t and 707b. Latches 703t and 703b now contains respectively, the sum $y4=x(3)+x(4)$, and the difference $y8=x(0)-x(7)$, resulting from operations at adders 702t and 702b respectively.

At clock period 4, data y4 and y8 advance to latches 707t and 707b, while latches 703t and 703b now contain the difference $y5=x(3)-x(4)$, and the sum $y1=x(0)+x(7)$. Multiplier 706 multiplies constant 2cos(pi/4) to datum y6 to form datum w6 to be latched by latch 708t, and datum y2 advances to latch 708b as w2. Datum w3 advances to latch 712t and is renamed z3. At the same time, the difference $z7=w7-y6$ is latched into 712b.

It should be noted that the data is continuously being brought into the DCT/IDCT processor unit 106. Although FIG. 7c, and likewise FIG. 7f, shows no data for clock periods 4–16 residing in latches 701t and 701b, it is so shown for clear presentation to the reader. In fact, a new row or column (eight values) is brought into the DCT/IDCT processor 105 every four clock cycles. These rows or columns are alternatively selected from either DCT row storage unit 105 or block memory unit 103. For example, if the data brought into DCT/IDCT processor unit 106 during clock periods 0-3 are selected from block memory unit 103, the data brought into DCT/IDCT processor unit 106 during clock period 4–7 is from the DCT row storage unit 105. In other words, the pipelines are always filled.

At clock period 5, data y5 and y1 advance to 707t and 707b; data y4 add y8 advance to latches 708t and 708b to become w4 and w8 respectively; data z3 and z7 advance to latches 714t and 714b respectively; and, data w6 and w2 advance to latches 712t and 712b respectively to become z6 and z2.

At clock period 6, data z3 and z7 advance to latches 715t and 715b respectively; data z6 and z2 advance to latches 714t and 714b respectively; datum w4 advance to latch 712t and becomes z4, and $z8=w8-y5$ is latched into 712b as a result of subtraction at adder 710. At the same time, datum y1 is latched at latch 708b as w1, datum y5 has completed multiplication at multiplier 706 with the constant 2cos(pi/4) and latched at latch 708t.

At clock period 7, all data advance to the next latch in their respective data paths, to result in data z4, z6 and z3 in latches 714t, 715t and 716t respectively, and z8, z2 and z7 in latches 714b, 715b, and 716b respectively. The data w5 and w1 advance to latches 712t and 712b as data z5 and z1 respectively.

At clock period 8, all data advance one latch in their respective data path, so that data z1 through z8 are each stored in one of the temporary latches 714t through 720t in the 700a data path, or 714b through 719b in the data path 700b.

At clock period 9, multiplexors 721t and 722b select data z5 and z7 to input of adder 723t; the result of the sum $p7=z5+z7$ is latched into latch 724t. At the same time, multiplexors 722t and 721b select data z6 and z8 for adder 723b; the result of the sum $p8=z6+z8$ is latched into latch 724b.

At clock period 10, while data p7 and p8 advance to latches 728t and 728b respectively, multiplexors 721t, 721b, 722t and 722b select z1, z2, z3 and z4 for adders 723t and 723b, such that the results $p3=z2-z3$, $p4=z1-z4$ are latched into 724t and 724b respectively.

At clock period 11, the results of adders 723t and 723b, respectively, $p5=z7-z5$ and $p6=z8-z6$, are latched into latches 724t and 724b. At the same time, p3 and p4 are advanced to latches 728t and 728b respectively. P3 is present at the input terminals of multiplier 727. Datum p7 has, in clock period 9, been present at the input terminals of multiplier 727, has now completed the multiplication at multiplier 727 with constant 2cos(-pi/8) to yield r7, which is latched at latch 729t. A copy of datum p7 is advanced to latch 730, while datum p8 is advanced to latch 729b as r8.

At clock period 12, results of adders 723t and 723b: respectively, $p1=z1+z4$ and $p2=z2+z3$ are latched into latches 724t and 724b. Data p5 and p6 are advanced to 728t and 728b respectively. Datum p1 is also present at the inputs of multiplier 727. Datum p3 is advanced to latch 730, while p3 has completed the multiplication at multiplier 727 with constant 2cos(pi/4) to yield r3, which is latched into latch 729t. The datum p4 is advanced to latch 729b as r4. At the same time, datum r7 is advanced to latch 734t as s7. The result of adder 732, corresponding to $s8=r8-p7$, is latched at latch 734b. Z5, z4 and z6 are advanced one latch to the J latches 718t, 719t and 720t while z1 and z8 are advanced one latch to the K latches 718b, 719b while z2 is lost (no latch is available to receive z2 when it is shifted out of latch 719b).

At clock period 13, Data p1 and p2 are advanced to 728t and 728b respectively. Datum p1 is present at the inputs of multiplier 727 at clock period 12. Datum p5 is advanced to latch 730, while p5, which is present during the clock period 11 at the inputs of multiplier 727, has also completed a multiplication by constant 2cos(3pi/8) at multiplier 727, to yield datum r5, which is latched into latch 729t. Datum p6 is advanced to latch 729b as r6. Datum r3 is advanced through multiplexor 733t to latch 734t as s3. The result at adder 732, s4=r4−p3 is latched into latch 734b. The first DCT output data X(1)=s7+s8 and X(7)=s8−s7 are provided by adders 735t and 735b, respectively, and are latched into latches 736t and 736b respectively. Z5 and z4 are shifted to latches 719t and 720t, respectively, and z1 is shifted to latch 719b while z8 is shifted out of latch 719b and lost.

At clock period 14, datum p1 in 728t is advanced into latch 730, datum p1 is advanced to latch 729t through multiplier 727 as r1, datum p2 is advanced to latch 729b as r2, and datum r5 is advanced from latch 729t to latch 734t as s5. Latch 734b holds adder 732's result s6=r6−p5. DCT outputs X(2)=s3+s4 and X(6)=s4−s3 are latched into latches 736t and 736b, respectively. The results of X(1) and X(7) of clock period 13 are advanced to latches 737t and 737b respectively.

At clock period 15, data r1 and r2 are advanced to latch 734t and 734b as s1 and s2 respectively. DCT output data X(3)=s5+s6 and X(5)=s6−s5 are computed by adders 735t and 735b, respectively, and are available at latches 736t and 736b, respectively. The prior results X(2), X(6), X(1) and X(7) are advanced to latches 737t, 737b, 738t and 738b respectively.

At clock period 16, the last results of this row X(0)=s1+s2 and X(4)=s1−s2 are computed by adders 735t and 735b, respectively, and latched into latches 736t and 736b respectively. The output X(1) and X(7) are available at the input of the DCT row/column separator unit 107, for either storage in the DCT row storage unit 105, or to be forwarded to the quantizer unit 108, dependent respectively on whether X(0) ... X(7) are first-pass DCT output (row data) or second-pass DCT output (column data). DCT output X(3), X(5), X(2) and X(6) are respectively advanced to latches 737t, 737b, 738t, and 738b.

At the next 3 clock periods, the pairs X(2)−X(6), X(3)−X(5), and X(0)−X(4) are successively available as output data of the DCT/IDCT processor unit 106 for input into DCT row/column separator unit 107.

FIG. 7d shows the control signals for the multiplexer and address of FIG. 7a during the 16 clock periods. Each control signal is repeated every four clock cycles.

Operation of DCT/IDCT Processor During Decompression

The operation of DCT/IDCT processor unit 106 in the decompression mode is next described in conjunction with FIGS. 7a, 7e and 7f.

At clock period 0, data X(1) and X(7) are presented at the top and bottom latches, respectively, of each of "A" and "B" registers (latches 701t and 701b). Data X(1) and X(7) are selected by DCT input select unit 104 from either the quantizer unit 108 or the DCT row storage unit 105, as discussed above.

At clock period 1, data X(3) and X(5) are respectively presented at both top and bottom latches of latches 701t and 701b. At the same time, latches 703t and 703b respectively y8=X(1)−X(7) and y2=X(1)+X(7).

At clock period 2, data X(2) and X(6) are respectively presented at both top and bottom latches of latches 701t and 701b in the same manner as input data from the last two clock periods 0−1. The results y8 and y2 have advanced to latches 707t and 707b, and latches 703t and 703b latch the result y6=X(3)−X(5) and y4=X(3)+X(5) respectively from adders 702t and 702b.

At clock period 3, the input data at both the top and bottom latches of latches 701t and 701b are respectively X(0) and X(4). Results y7=X(2)−X(6) and y3=X(2)+X(6) are latched at latches 703t and 703b. At the same time, y8, which was present at the inputs of multiplier 706 at clock period 1 is scaled by multiplier 706 with the constant 2cos(pi/8) as w8 and latched into latch 708t, while y2 is advanced to and stored in latch 708b as w2. Y6 is transferred to latch 707t after serving as input to multiplier 706 during clock period 3. Y4 is transferred to latch 707b.

At clock period 4, w2 is advanced to latch 712t as z2, and adder 710 subtracts w2 from w8 to form z8 which is latched into latch 712b. The datum y4 is advanced to latch 708b as w4, and datum y6 which is present at the inputs of multiplier 706 at clock period 2, is scaled by multiplier 706 with the constant 2cos(3pi/8) to yield w6 latched into latch 708t. Data y7 and y3 are advanced to latches 707t and 707b respectively. The latches 703t and 703b contain respectively the results y5=X(0)−X(4) and y1=X(0)+X(4). Y5 is now input to multiplier 706.

At clock period 5, z2 and z8 are advanced to latches 714t and 714b, while w4 has crossed over to data path 700a via 2:1 multiplexor 711t and is latched at latch 712t as z4. Adder 710 subtracts w4 from w6, the result being latched as z6 at latch 712b. At the same time, datum y7 is scaled by 2cos(pi/4) to become datum w7 and then advanced to latch 708t. Y3 is advanced to and stored in latch 708b as w3 and y5 and y1 are advanced to latches 707t and 707b respectively.

At clock period 6, y5 (scaled by unity) and y1 are advanced to latches 708t and 708b respectively as w5 and w1. Datum w3 crosses over to data path 700a and is latched as z3 at latch 712t, and adder 710 subtracts w3 from w7 to yield z7 latched at latch 712b. Z6 is transferred from latch 712b through multiplexor 713t to latch 714t. Z4 is transferred from latch 712t through multiplexor 713b to latch 714b. Z2 is advanced from latch 714t to latch 715t while z8 is advanced from latch 714b to latch 715b.

At clock period 7, w5 and w1 are advanced to latches 712t and 712b as z5 and z1 respectively, and data z3, z7, z6, z4, z2 and z8 are advanced to latches 714t, 714b, 715t, 715b, 716t and 716b, respectively.

At clock period 8, z5, z1, z3, z7, z6, z4, z2, and z8 are advanced to latches 714t, 714b, 715t, 715b, 716t, 716b, 717t and 717b, respectively.

At clock period 9, z5, z1, z3, z7, z6, z4, z2 and z8 are advanced to latches 715t, 715b, 716t, 716b, 717t, 717b, 718t and 718b. At the same time, multiplexors 721t and 722b select data z2 and z4, respectively, into adder 723t to yield the result p4=z2−z4 which is latched into latch 724t. Likewise, multiplexors 722t and 721b select data z5 and z7, respectively, into adder 723b to yield the result p5=z5−z7, which is then loaded into latch 724b.

At clock period 10, multiplexors 721t and 722b select data z5 and z7, respectively, into adder 723t to yield the result p7=z5+z7, which is loaded into latch 724t. At the same time, multiplexors 722t and 721b select data z6 and z8, respectively, into adder 723b to yield the result p8=z6+zS, which is then loaded into latch 724b.

Data p4 and p5 from latches 724t, 724b are advanced to latch 728t and 728b respectively. The data z5, z3, z6 and z2 in latches 715t-718t are advanced one latch to 716t-719t, respectively. Similarly, data z1, z7, z4 and z8 are advanced to 716b-719b, respectively.

At clock period 11, the results of adders 723t and 723b p6=z8−z6 and p3=z1−z3 are latched at latches 724t and 724b, the operands z8, z6, z1 and z3 being selected by 722b, 721t, 721b and 722t, respectively. Data p7 and p8 are advanced to latches 728t and 728b respectively. At the same time, p4, having been presented as input to multiplier 727 at clock period 9, is scaled by multiplier 727 with a constant 2cos(pi/4) and latched as r4 at latch 729t, and p5 is advanced from latch 728b to latch 729b as r5. The data in latches 716t–719t, and 716b–719b are each advanced one latch to 717t–720t and 717b–720b, respectively. Datum z8 in latch 719b is discarded.

At clock period 12, p7 and p8 are advanced to latches 729t and 729b respectively as r7 and r8. Data p6 and p3 are advanced to latches 728t and 728b respectively. Datum r5 is advanced to latch 734t via multiplexor 733t as s5; r4 crosses over to data path 700b, and is subtracted r8 by adder 732 to yield s4 and is latched at latch 734b. At the same time, data z1 and z3 are selected by multiplexors 722b and 721t, respectively, into adder 723t to yield rsult p1=z1+z3 which is latched into latch 724t. Likewise, data z2 and z4 are selected by multiplexors 722t and 721b, respectively, into adder 723b to yield result p2=z2+z4 which is latched into latch 724b.

At clock period 13, data p1 and p2 are advanced to latches 728t and 728b respectively. Datum p6, which served as input to multiplier 727 during clock period 11, is scaled by multiplier 727 with a constant 2cos(pi/4) and latched as r6 at latch 729t, and datum p3 is advanced from latch 728b to latch 729b as r3. Data r7 and r8 are advanced to latches 734t and 734b respectively as s7 and s8. Adders 735t and 735b operated on s5 and s4, which are respectively in latches 734t and 734b in clock period 12, to yield respectively IDCT results x(2)=s4+s5 and x(5)=s5−s4, and latched into latches 736t and 736b respectively.

At clock period 14, data p1 and p2 are advanced to latches 729t and 729b as r1 and r2. Datum r6 crosses over to data path 700b through multiplexor 731t, and is then subtracted r2 by the adder 732 to yield the result s6, which is latched by latch 734b. Datum r3 crosses over to data path 700a through multiplexor 733t and is latched by latch 734t as s3. IDCT results x(1)=s7+s8 and x(6)=s7−s8 are computed by adder 735t and 735b respectively and are latched into latches 736t and 736b respectively. The previous results x(2) and x(5) are advanced to latches 737t and 737b respectively.

At clock period 15, r1 and r2 are advanced to latches 734t and 734b respectively as s1 and s2. IDCT results x(3)=s3+s6 and x(4)=s3−s6 are computed by adders 735t and 735b respectively and are latched at latches 736t and 736b. The prior results x(1), x(6), x(2), x(5) are advanced to latches 737t, 737b, 738t and 738b.

At clock period 16, IDCT results x(0)=s1+s2 and x(7)=s1−s2 are computed by adders 735t and 735b respectively and are latched into latches 736t and 736b. IDCT results x(2) and x(5) latches 738t and 738b respectively are latched into the DCT row/column separator unit 107. X(2) and x(5) are then channeled by the DCT row/column separator to the block memory unit 103, or DCT row storage unit 105 dependent upon whether the IDCT results are first-pass or second pass-results.

IDCT output pairs x(1)−x(6), x(3)−x(4) and x(0)−x(7) are available at the DCT row/column separator unit 107 at the next 3 clock periods.

FIG. 7g shows the control signals for the adders and multiplexors of the DCT/IDCT Processor 106 during decompression. Again these control signals are repeated every four clock cycles.

Structure and Operaton of the DCT Row/Column Separator Unit 107

The DCT Row/Column Separator separates the output of the DCT/IDCT Processor 106 into two streams of the data, both during compression and decompression. One stream of data represents the intermediate first-pass result of the DCT or the IDCT. The other stream of data represents the final results of the 2-pass DCT or IDCT. The intermediate first-pass results of the DCT or IDCT are streamed into DCT Row storage unit 105 for temporary storage and are staged for the second pass of the 2-pass DCT or IDCT. The other stream containing the final results of the 2-pass DCT or IDCT is streamed to the quantizer 108 or DCT block memory 103, dependent upon whether compression or decompression is performed. The DCT Row/Column Separator is optimized for 4:2:2 data format such that a 16-bit datum is forwarded to the quantizer 108 or DCT block memory 103 every clock period, and a row or column (eight values) of intermediate result is provided in four clock periods every eight clock periods.

Figure 8B:
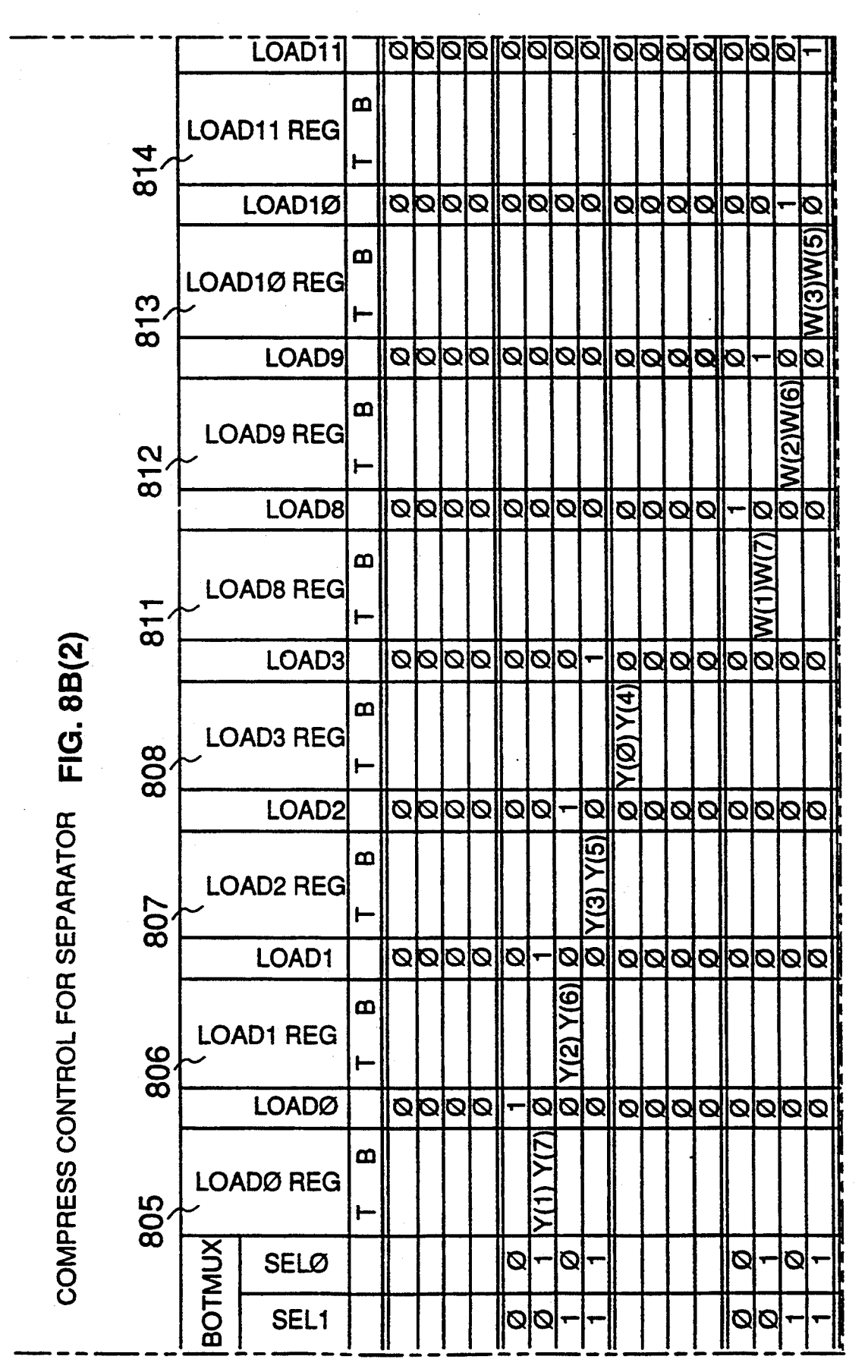
Figure 8C:
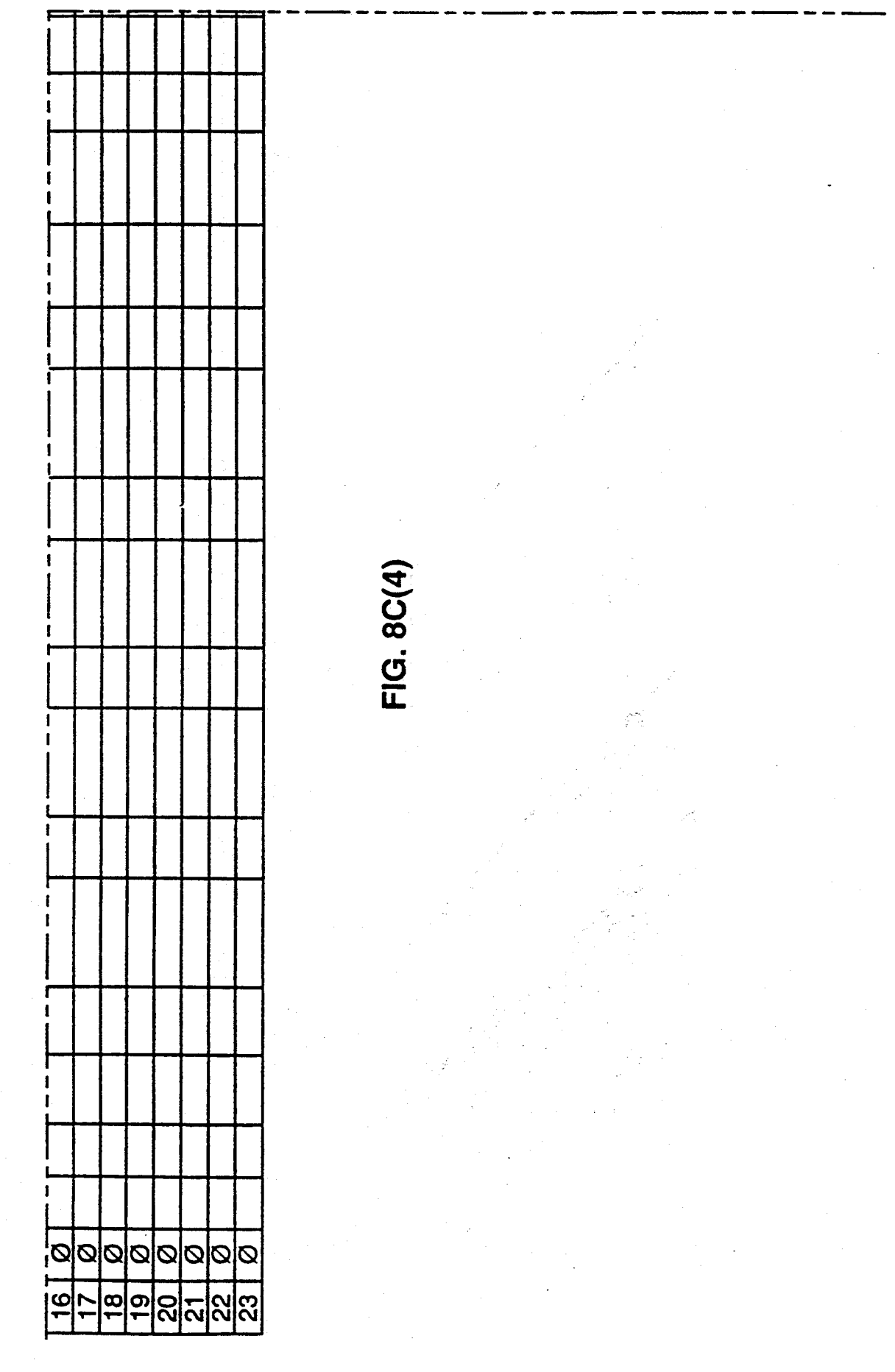

The structure and operation of the DCT row/column separator unit (DRCS) 107 are next described in conjunction with FIGS. 8a, 8b and 8c.

FIG. 8a shows a schematic diagram for DRCS 107. As shown, two 16-bit data come into the DRCS unit 107 every clock period via latches 738t and 738b in the DCT/IDCT processor unit 106. Hence, a row or column of data are supplied by the DCT/IDCT processor unit 106 every four clock cycles. The incoming data are channeled to one of three latch pair groups: the DCT row storage latch pairs (801t, 801b to 804t, 804b), the first quantizer latch pairs (805t, 805b to 808t, 808b) or the second quantizer latch pairs (811t, 811b to 814t, 818b). Each of these latch pairs are made up of two 16-bit latches. For example, latch pair 801 is made up of latches 801t and 801b.

The DCT row storage latch pairs 801t, 801b to 804t, 804b hold results of the first-pass DCT or IDCT; hence, the contents of these latches will be forwarded to DCT row storage unit 105 for the second-pass of the 2-dimensional DCT or IDCT. Multiplexors 809t and 809b select the contents of two latches, from among latches 801t–804t and 801b–804b respectively, for output to the DCT row storage unit 105.

On the other hand, the data channeled into the first and second quantizer latch pairs (805t and 805b to 808t and 808b, 811t and 811b to 814t and 814b) are forwarded to the quantizer unit 108 during compression, or forwarded to the block memory unit 103 during decompression, since such data have completed the 2-dimensional DCT or IDCT. 4:1 multiplexors 810t and 810b select two 16-bit data contained in the latches 805t–808t and 805b–808b. Similarly 4:1 multiplexors 815t and 815b select two 16-bit data contained in latches 811t–814t and 811b–814b. The four 16-bit data selected by the four 4:1 multiplexors 810t, 810b, 815t and 815b are again selected by 4:1 multiplexor 816 for output to quantizer unit 108.

During compression, the first and second quantizer latch pairs (805t and 805b to 808t and 808b, 811t and 811b to 814t and 814b) form a double-buffer scheme to provide a continuous output 16-bit data stream to the quantizer 108. As the first quantizer latch pairs (805t, 805b to 808t, 808b) are loaded, the second quantizer latch pairs (811t, 811b to 814t, 814b) are read for output to quantizer unit 108. 4:1 multiplexors 810t and 810b select the two 16-bit data contained in the latches 805t–808t and 805b–808b. Similarly 4:1 multiplexors 815t and 815b select two 16-bit data contained in latches 811t–814t and 811b–814b. The four 16-bit data selected by the four 4:1 multiplexors 810t, 810b, 815t and 815b are again selected by 4:1 multiplexor 816 for output to quantizer unit 108.

During decompression, however, the second quantizer latch pairs (811t and 811b to 814t and 814b) are not used. The incoming data stream from the DCT/IDCT processor unit 106 is latched into the first quantizer latch pairs (805t, 805b to 808t, 808b). 4:1 multiplexors 817t and 817b select two 16-bit data per clock period for output to the block memory unit 103. Since only the first 12 bits of each of these selected datum is considered significant, the 4 least significant bits are discarded from each selected datum. Therefore, two 12-bit data are forwarded to block memory unit 103 every clock period.

Operation of DCT Row/Column Separator Unit During Compression

FIG. 8b illustrates the data flow for DCT row/column separator unit 107 (FIG. 1) during compression.

At clock periods 0–3, the first-pass DCT pairs of 16-bit data X(1)-X(7), X(2)-X(6), X(3)-X(5), X(0)-X(4) are successively made available from latches 738t and 738b in the DCT/IDCT processor unit 106, at the rate of two 16-bit data per clock period. As shown in FIG. 8b, during clock periods 1–4, a pair of data is separately latched as they are made available at latches 738t and 738b at the end of each clock period into two latches among latches 801t–804t and 801b–804b. Therefore, X(2) and X(1), X(6) and X(7), X(0) and X(3) and X(4) and X(5) are, as a result, stored in latch pairs 801t and 801b, 802t and 802b, 803t and 803b, and 804t and 804b, respectively by the end of clock period 4.

Also, during clock periods 0–7, data loaded into latch pairs 811t, 811b to 814t, 814b previously are output from the second quantizer latch pairs 811t, 811b to 814t, 814b at the rate of an 16-bit datum per clock period. These data were loaded into latch pairs 811–814 in the clock periods 12–15 of the last 16-clock period cycle and clock period 0 of the current 16 clock period cycle. The loading and output of the quantizer latch pairs 805t, 805b to 808t, 808b and 811t, 811b to 814t, 814b are discussed below.

During clock periods 4–7, the first-pass data in latch pairs 801t, 801b to 804t, 804b loaded in clock periods 1–4 are output to the DCT row storage unit 103, at the rate of two 16-bit data per clock period, in order of X(0)-X(1), X(2)-X(3), X(4)-X(5), and X(6)-X(7). At the same time, second-pass 16-bit data pairs Y(1)-Y(7), Y(2)-Y(6), Y(3)-Y(5), and Y(0)-Y(4) are made available at latches 738t and 738b of the DCT/IDCT processor unit 106 for transfer to the row/column separator 107 at the rate of one pair of two data every clock period. These data are latched successively and in order into the first quantizer latch pairs 805t, 805b to 808t, 808b during clock periods 5–8.

During clock periods 8–11, the data Z(0) to Z(7) arriving from DCT/IDCT processor unit 106 are again first-pass DCT data. These data Z(0)-Z(7) arrive in the identical order as the X(0)-X(7) data during clock periods 0–3 and as the Y(0)-Y(7) data during clock period 4–7. The second-pass data Y(0)-Y(7) which arrived during clock periods 4–7 and latched into latch pairs 805t, 805b to 808t, 808b during clock periods 5–8 are now individually selected for output to quantizer unit 108 by multiplexors 810t, 810b and multiplexor 816, at the rate of a 16-bit datum per clock period, and in order Y(0), Y(1), ... Y(7) beginning with clock period 8. The read out of Y(0)-Y(7) will continue until clock period 15, when Y(7) is provided as an output datum to quantizer 108.

During clock periods 12–15, the data W(0) to W(7) arriving from DCT/IDCT processor unit 106 are second-pass data. These data W(0)-W(7) are channeled to the second quantizer latch pairs 811t, 811b to 814t, 814b during clock periods 13 to 16, and are latched individually in the order as described above for the data Y(0)-Y(7). During clock periods 12 to 15, the data Z(0)−Z(7) received during clock periods 8–11 and latched into latch pairs 801t, 801b to 804t, 804b during clock periods 9–12 are output to the DCT row storage unit 105 in the same order as described for X(0)−X(7) during clock periods 4–7. The W(0)−W(7) data are selected by multiplexors 815t, 815b, and 816 in the next eight clock periods (clock periods 0-7 in the next 16-clock period cycle corresponding to clock periods 16 to 23 in FIG. 8b.

Because of the DCT/IDCT processor 106 provides alternately one row/column of first-pass and second-pass data, the latches 801t and 801b to 804t and 804b, 805t and 805b to 808t and 808b, and 811t and 811b to 814t and 814b form two pipelines providing a continuous 16-bit output stream to the quantizer 108, and a row/column of output data to the DCT row storage unit 105 every eight clock cycles. There is no idle period under 4:2:2 input data format condition in the DCT Row/Column Separator Unit 107.

Operation of DCT Row/Column Separator Unit During Decompression

FIG. 8c shows the data flow for DCT row/column separator unit 107 during decompression.

During clock periods 0–3, 16-bit first-pass IDCT data pairs are made available at latches 738t and 738b of the DCT/IDCT processor unit 106, in the order X(2)-X(5), X(1)-X(6), X(3)-X(4) and X(0)-X(7), at the rate of two 16-bit data per clock period. Each datum is latched into one of the latches 801t–804t and 801b–804b, such that X(0) and X(1), X(2) and X(3), X(4) and X(5), X(6) and X(7) are latched into latch pairs 801t, 801b, to 804t, 804b as a result during clock periods 1–4. During clock periods 0–3, second-pass IDCT data latched into the DCT row/column separator unit 107 during the four clock periods beginning at clock period 13 of the last 16-clock period cycle and ending at clock period 0 of the present 16-clock period cycle is output to block memory unit 103 at two 12-bit data per clock period by 4:1 multiplexors 817t and 817b, having the lower four bits of the 16-bit IDCT data truncated as previously discussed. The loading and transferring of second-pass IDCT data is discussed below with respect to clock periods 4–11.

During clock periods 4–7, the first-pass IDCT data in latch pairs 801t and 801b to 804t and 804b are forwarded to the DCT row storage unit 105, two 16-bit data per clock period, selected in order of latch pairs 801t, 801b to 804t, 804b. At the same time, 16-bit second-pass IDCT data are made available at latches 738t and 738b in the DCT/IDCT processor unit 106, two 16-bit data per clock period, in the order, Y(2)−Y(5), Y(1)−Y(6), Y(3)−Y(4) and Y(0)−Y(7). These 16-bit data pairs are successively latched in order into latch pairs 805t and 805b to 808t and 808b during clock period 5–8.

During clock periods 8-11, first-pass IDCT data Z(0)—Z(7) are made available at latches 738t and 738b, and in order discussed for X(0)—X(7) during clock periods 0-3. The data Z(0)—Z(7) are latched into the latch pairs 801-804 in the same order as discussed for X(0)—X(7). At the same time, second-pass IDCT data Y(0)—Y(7) latched during the clock periods 5-8 are output at 4:1 multiplexors 817t and 817b at two 12-bit data per clock period, in the order Y(0)—Y(1), Y(2)—Y(3), Y(4)—Y(5), and Y(6)—Y(7).

During clock periods 12-15, first-pass IDCT data Z(0)—Z(7) are output to DCT row storage unit 105 in the order discussed for X(0)—X(7) during clock periods 4-7. At the same time, second-pass IDCT data W(0)—W(7) arrives from DCT/IDCT processor 106 in the same manner discussed for Y(0)—Y(7) during clock periods 4-7. The data W(0)—W(7) will be output to block memory unit 103 in the next four clock periods (clock periods 0-3 in the next 16-clock period cycle), in the same manner as discussed for Y(0)—Y(7) during clock periods 8-11. Because the DCT/IDCT processor 106 provides alternately one row/column of first-pass and second-pass data, the latches 801t and 801b to 804t and 804b, and 805t and 805b to 808t and 808b form two pipelines providing a continuous 12-bit output stream to DCT block storage 103, and a row/column of output data to the DCT row storage unit 105 every eight clock cycles. Under 4:2:2 output data format condition, there is no idle period in the DCT Row/Column Separator Unit 107.

Structure and Operation of Quantizer unit 108

Figure 9:
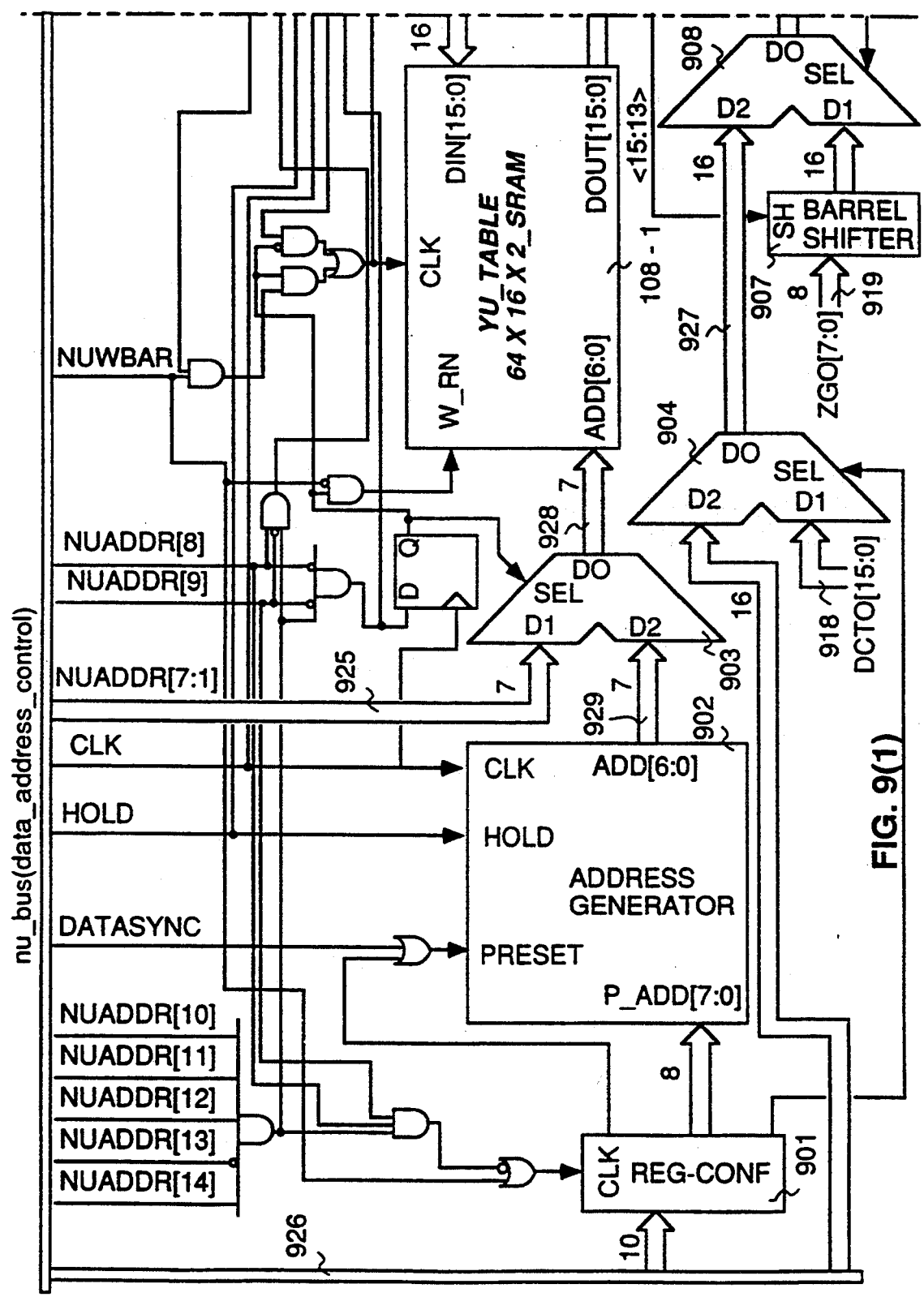
FIGS. 9(1)–9(2) show a schematic diagram of the quantizer unit 108 in the embodiment shown in FIG. 1.

The structure and operation of the quantizer unit 108 are next described in conjunction with FIG. 9.

The quantizer unit 108 performs a multiplication to each element of the Frequency Matrix. This is a digital signal processing step which scales the various frequency components of the Frequency Matrix for further compression.

FIG. 9 shows a schematic diagram of the quantizer unit 108.

During compression, a stream of 16-bit data arrive from the DCT row/column separator unit 107 via bus 918. Data can also be loaded under control of a host computer from the bus 926 which is part of the host bus 115. 2:1 multiplexor 904 selects a 16-bit datum per clock period from one of the busses 918 and 926, and place the datum on data bus 927.

During decompression mode, 8-bit data arrives from the zig-zag unit 109 via bus 919. Each 8-bit datum is shifted and scaled by barrel shifter 907 so as to form a 16-bit datum for decompression.

Dependent upon whether compression or decompression is performed, 2:1 multiplexor 908 selects either the output datum of the barrel shifter (during decompression) or from bus 927 (during compression). The 16-bit datum thus selected by multiplexor 908 and output on bus 920 is latched into register 911, which stores the datum as an input operand to multiplier 912. The other input operand to multiplier 912 is stored in register 910, which contains the quantization (compression) or dequantization (decompression) coefficients read from YU_table 108-1, discussed in the following.

Address generator 902 generates addresses for retrieving the quantization or dequantization coefficients from the YU_table 108-1, according to the data type (Y, U or V), and the position of the input datum in the 8×8 frequency matrix. Synchronization is achieved by synchronizing the DC term (element 0) in the frequency matrix with the external datasync signal. The configuration register 901 provides the information of the data format being received at the VBIU 102, to provide proper synchronization with each incoming datum.

The YU_table 108-1 is a 64×16×2 static random access memory (SRAM). That is, two 64-value quantization or dequantization matrices are contained in this SRAM array 108-1, with each element being 16-bit wide. During compression, the YU-table 108-1 contains 64 16-bit quantization coefficients for Y (luminance) type data, and 64 common 16-bit quantization coefficients for UV (chrominance) type data. Similarly, during decompression, YU-table 108-1 contains 64 16-bit dequantization coefficients for Y type data and 64 16-bit dequantization coefficients for U or V type data. Each quantization or dequantization coefficient is applied specifically to one element in the frequency matrix and U,V type data (chrominance) share the same sets of quantization or dequantization coefficients. The YU_table 108-1 can be accessed for read/write directly by a host computer via the bus 935 which is also part of the host bus 115. In this embodiment, the content of YU_table 108-1 is loaded by the host computer before the start of compression or decompression operations. If non-volatile memory components such as electrically programmable read only memory (EPROM) are provided, permanent copies of these tables may be made available. Read Only Memory (ROM) maybe also be used if the tables are fixed. Allowing the host computer to load quantization or dequantization constants provides flexibility for the host computer to adjust quantization and dequantization parameters. Other digital signal processing objectives may also be achieved by combining quantization and other filter functions in the quantization constants. However, non-volatile or permanent copies of quantization tables are suitable for every day (turn-key) operation, since the start-up procedure will thereby be greatly simplified. When the host bus access the YU_table 108-1, the external address bus 925 contains the 7-bit address (addressing any of the 128 entries in the two 64-coefficient tables for Y and U or V type data), and data bus 935 contains the 16-bit quantization or dequantization coefficients. 2:1 multiplexor 903 selects whether the memory access is by an internally generated address (generated by address generator 902) or by an externally provided address on bus 925 (also part of bus 115), at the request of the host computer.

The quantization or dequantization coefficient is read into the register 906. 2:1 multiplexor 909 selects whether the entire 16 bits is provided to the multiplier operand register 910, or have the datum's most significant bit (bit 15) and the two least significant bits (bits 0 and 1) set to 0. The bits 15 to 13 of the dequantization coefficients (during dequantization) are also supplied to the barrel shifter 907 to provide scaling of the operand coming in from bus 919. By encoding a scaling factor in the dequantization coefficient the dynamic range of quantized data is expanded, just as in any floating point number representation.

Multiplier 912 multiplies the operands in operand registers 910 and 911 and, after discarding the most significant bit, retains the sixteen next most significant bits of the 32-bit result in register 913 beginning at bit 30. This sixteen bits representation is determined empirically to be sufficient to substantially represent the dynamic range of the multiplication results. In this embodiment, multiplier 912 is implemented as a 2-stage pipelined multiplier, so that a 16-bit multiplication operation takes two clock periods but results are made available at every clock period.

The 16-bit datum in result register 913 can be sampled by the host computer via the host bus 923. Thirteen bits of the 16-bit result in the result register 913 are provided to the round and limiter unit 914 to further restrict the range of quantizer output value. Alternatively, during decompression, the entire 16-bit result of result register 913 is provided on bus 922 after being amplified by bus driver 916.

During decompression, the data_sync signal indicating the beginning of a pixel matrix is provided by VBIU 102. During compression, the external video data source provices the data_sync signal. Quantization and dequantization coefficients are loaded into YU_table 108-1 before the start of quantization and dequantization operations. An interval sync counter inside configuration register 901 provides sequencing of the memory accesses into YU_table 108-1 to ensure synchronization between the data_sync signal with the quantizer 108 operation. The timing of the accesses depends upon the input data formats, as extensively discussed above with respect to the DCT units 103–107.

During compression, the data coming in on bus 918 and the corresponding quantizer coefficients read from YU_table 108-1 are synchronously loaded into registers 911 and 910 as operands for multiplier 912. Two clock periods later, the bits 30 to 15 of the results from the multiplication operation are available and are latched by result registers 913.

Round and limiter 914 then adds 1 to bit 15 (bit 31 being the most significant bit) of the datum in result register 913 for rounding purpose. If the resulting datum of this rounding operation is not all "1"s or "0"s in bits 31 through 24, then the maximum or minimum representable value is exceeded. Bits 23 to 16 are then set to hexadecimal 7F or 81, corresponding to decimal 127 or −127, dependent upon bit 30, which indicates whether the datum is positive or negative. Otherwise, the result is within the allowed dynamic range. Bits 23 to 16 is output by the round and limiter 914 as an 8-bit result, which is latched by register 915 for forwarding to zig-zag unit 109.

Alternatively, during decompression, the 16-bit result in register 913 is provided in toto to the DCT input select unit 104 for IDCT on bus 922.

During decompression, the VBIU 102 provides the data-sync synchronization signal in sync unit 102-1 (FIG. 1). Data come in as an 8-bit stream, one datum per clock period, on bus 919 from zig-zag unit 109. To perform the proper scaling for dequantization, barrel shifter 907 first appends four zeroes to the datum received from zig-zag unit 109, and then sign-extends four bits the most significant bit to produce an intermediate 16-bit result. (This is equivalent to multiplying the datum received from the zig-zag unit 109 by 16). In accordance to the scaling factor encoded in the dequantization coefficient, as discussed earlier in this section, this 16-bit intermediate result is then shifted by the number of bits indicated by bits 15 to 13 of the 16-bit dequantization coefficient corresponding to the datum received from the zig-zag unit 109. The shifted result from the barrel shifter 907 is loaded into register 911, as an operand to the 16×16 bit multiplication.

The 16-bit dequantization constant is read from the YU_table 108-1 into register 906. The first three bits 15 to 13 are used to direct the number of bits to shift the 16-bit intermediate result in the barrel shifter 907 as previously discussed. The thirteen bits 12 through 0 of the dequantization coefficient form the bits 14 to 2 of the operand in register 910 to be multiplied to the datum in register 911. The other bits of the multiplier, i.e., bits 15, 1 and 0, are set to zero.

Just as in the compression case, the sixteen bits 30 to 15 of the 32-bit results of the multiplication operation involving the contents in registers 910 and 911 are loaded into register 913. Unlike compression, however, the 16-bit content of register 913 is supplied to the DCT input select unit 104 on bus 922 through buffer 916, without modification by the round and limiter unit 914.

Structure and Operation of the Zig-Zag Unit

Figure 10:
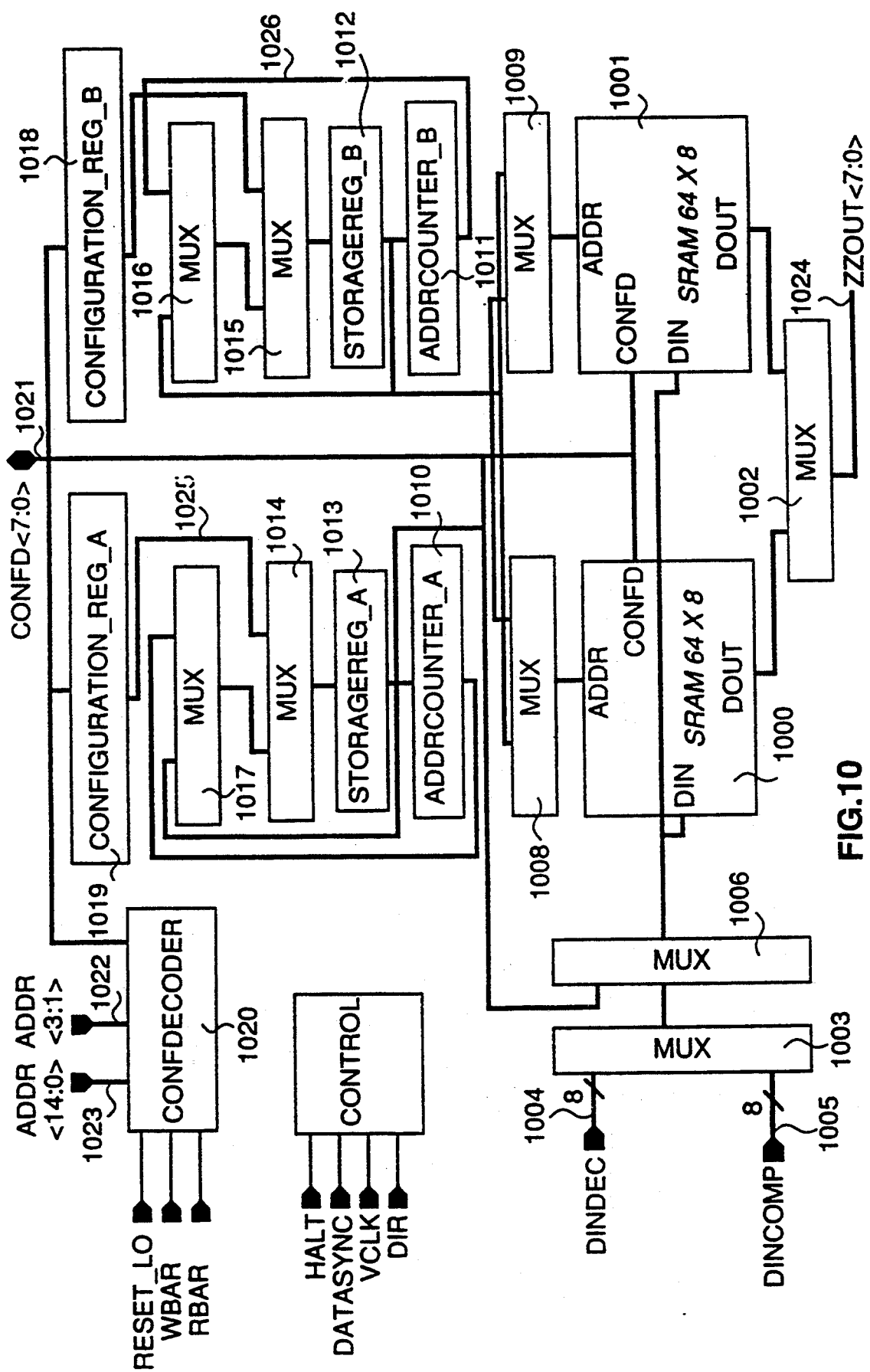
FIG. 10 shows a schematic diagram of the zig-zag unit 109 in the embodiment shown in FIG. 1.

The function and operation of zig-zag unit 109 are next described in conjunction with FIG. 10.

The Zig-Zag unit 109 rearranges the order of the elements in the Frequency Matrix into a format suitable for data compression using the run-length representation explained below.

FIG. 10 is a schematic diagram of zig-zag unit 109. During compression, the zig-zag unit 109 accumulates the output in sequential order (i.e. row by row) from the quantizer unit 108 until one full 64-element matrix is accumulated, and then output 8-bit elements of the frequency matrix in a "zig-zag" order, i.e. $A_{00}$, $A_{01}$, $A_{10}$, $A_{02}$, $A_{11}$, $A_{20}$, $A_{30}$, etc. This order is suitable for gathering long runs of zero elements of the frequency matrix created by the quantization process, since many higher frequency AC elements in the frequency matrix are set to zero by quantization.

During decompression, the incoming 8-bit data are in "zig-zag" order, and the zig-zag unit 109 reorders this 8-bit data stream in sequential order (row by row) for IDCT.

The storage in the zig-zag unit 109 is comprised of two banks of 64×8 SRAM arrays 1000 and 1001, so arranged to set up a double-buffer scheme. This double-buffering scheme allows a continuous output stream of data to be forwarded to the coder/decoder unit 111, so as not to require idle cycles during processing of 4:2:2 type input data. As one bank of 64×8-bit SRAM is used to accumulate the incoming 8-bit elements of the current frequency matrix, the other bank of 64×8 SRAM is used for output of a previously accumulated frequency matrix to zero packer/unpacker unit 110 during compression or to the quantizer unit 108 during decompression.

The SRAM arrays 1000 and 1001 can be accessed from a host computer on bus 115. Various parts of bus 115 are represented as busses 1021, 1022 and 1023 in FIG. 10. The host computer accesses the SRAM arrays 1000 or 1001 by providing an 8-bit address in two parts on busses 1023 and 1022:bus 1023 is 5-bit wide and bus 1022 is 3-bit wide.

During initialization, the host computer also loads two latency values, one each into configuration registers 1019 and 1018 to provide the synchronization information necessary to direct the zig-zag unit 109 to begin both sequential and zig-zag operations after the number of clock periods specified by each latency values elapses. Observation or test data read from or to be written into the SRAM arrays 1000 and 1001 are transmitted on bus 1021.

The address into each of SRAM banks 1000 and 1001 are generated by counters 1010 and 1011. 7-bit counter 1010 generates sequential addresses, and 6-bit counter 1011 generates "zig-zag" addresses. The sequential and zig-zag addresses are stored in registers 1013 and 1012 respectively. Bit 6 of register 1012 is used as a control signal for toggling between the two banks of SRAM arrays 1000 and 1001 for input and output under the double-buffering scheme.

During decompression, 8-bit data come in from zero packer/unpacker unit 110 on bus 1004. During compression, 8-bit data come in from quantizer unit 108 on bus 1005. 2:1 multiplexer 1003 selects the incoming data according to whether compression or decompression is performed. As previously discussed, data may also come from the external host computer; therefore, 2:1 multiplexor 1006 selects between internal data (from busses 1005 or 1004 through multiplexer 1003) or data from the host computer on bus 1021.

The zig-zag unit 109 outputs 8-bit data on bus 1024 via 2:1 multiplexer 1002, which alternatively selects between the output data of the SRAM arrays 1000 and 1001 in accordance with the double-buffering scheme, to the zero packer/unpacker unit 110 during compression and to the quantizer unit 108 during decompression.

During compression, 8-bit incoming data from the quantizer 108 arrive on bus 1005 and is each written into the memory address stored in register 1013, which points to a location in the SRAM array which is selected as the input buffer (in the following discussion, for the sake of convenience, we will assume SRAM array 1000 is selected for input.)

During this clock period, SRAM 1001 is in the output mode, register 1012 contains the current address for output generated by "zig-zag" counter 1011. The output datum of SRAM array 1001 residing in the address specified in register 1012 is selected by 2:1 multiplexor 1002 to be output on bus 1024.

At the end of the clock period, the next access address for sequential input is loaded into register 1013 through multiplexors 1014 and 1017. Counter 1010 also generates a new next address on bus 1025 for use in the next clock period. Multiplexer 1014 selects between the address generated by counter 1010 and the initialization address provided by the external host computer. Multiplexer 1017 selects between the next sequential address or the current sequential address. The current sequential address is selected when a "halt" signal is received to synchronize with the data format (e.g. inactive video time).

At the end of every clock period, the next "zig-zag" address is loaded into register 1012 through multiplexers 1016 and 1015 while a new next zig-zag address is generated by the zig-zag counter 1011 on bus 1026. Multiplexor 1015 selects between the address generated by counter 1011 and the initialization address provided by the host computer. Multiplexor 1016 selects between the next zig-zag address or the next zig-zag address. The current zig-zag address is selected when a halt signal is received to synchronize with the data format (e.g. inactive video time).

The operation of zig-zag unit 109 during decompression is similar to compression, except that the sequential access during decompression is a read access, and the zig-zag access is a write access, opposite to the compression process. The output data stream of the sequential access is selected by multiplexor 1002 for output to the quantizer unit 108.

Structure and Operation of the Zero-packer/unpacker Unit

Figure 11:
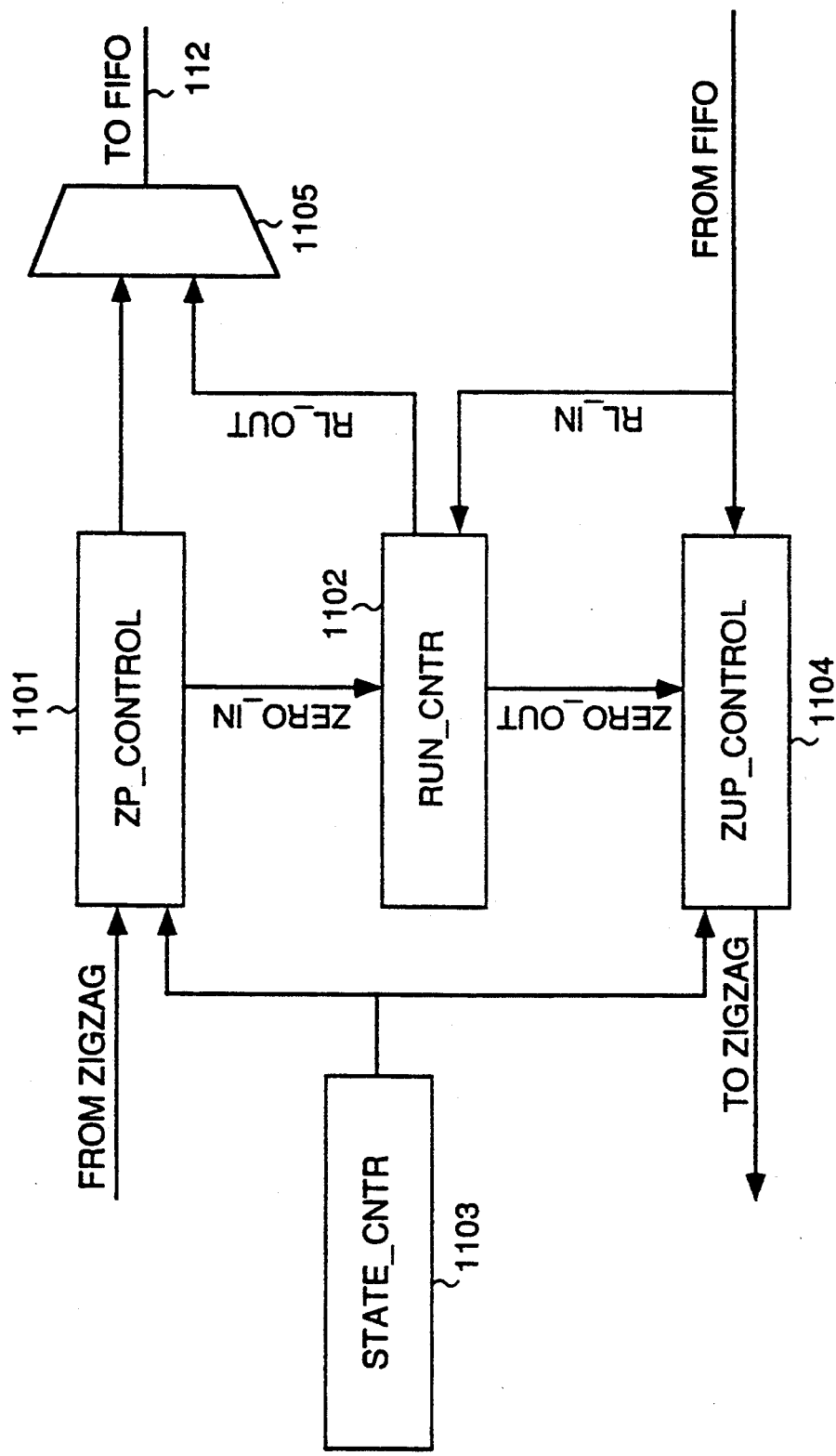
FIG. 11 shows a schematic diagram of the zero pack/unpack unit 110 in the embodiment shown in FIG. 1.

The structure and operation of the zero packer/unpacker (ZPZU) 110 (FIG. 1) are next described in conjunction with FIG. 11.

The ZPZU 110 consists functionally of a zero packer and a zero unpacker. The main function of the zero packer is to compress consecutive values of zero into a representation of a run length. The advantage of using run length data is the tremendous reduction of storage space requirement resulting from the fact that many values in the frequency matrix are reduced to zero during the quantization process. The zero unpacker provides the reverse operation of the zero packer.

A block-diagram of the ZPZU unit 110 is shown in FIG. 11. As shown, the ZPZU 110 consists of a state counter 1103, a run counter 1102, the ZP control logic 1101, a ZUP control logic 1104 and a multiplexer 1105. The state counter 1103 contains state information such as the mode of operation, e.g., compression or decompression, and the position of the current element in the frequency matrix. A datum from the zig-zag unit 109 is first examined by ZP control 1101 for zero value and passed to the FIFO/Huffman code bus controller unit 112 through the multiplexor 1105 for storage in FIFO means 114 if the datum is non-zero. Alternatively, if a value of zero is encountered, the run counter 1102 keeps a count of the zero values which follow the first zero detected and output the length of zeroes to the FIFO/Huffman code bus controller unit 112 for storage in FIFO Memory 114. The number of zeros in a run length is dependent upon the image information contained in the pixel matrix. If the pixel matrix corresponds to an area where very little intensity and color fluctuations occur in the sixty-four pixels contained, longer run-lengths of zeros are expected over an area where such fluctuations are greater.

During decompression, data arrive from the FIFO/Huffman code bus controller unit 112 via the ZUP (zero unpacker) unit 1104 and then forwarded to the zig-zag unit 109. If a run length is read during the decompression phase, the run length is unpacked to a string of zeroes which length corresponds to the run length read and the output string of zeroes is forwarded to the zig-zag unit 109.

There are four types of data that the zero packer/unpacker unit 110 will handle, i.e. DC, AC, RUN and EOB, together with the pixel type (Y, U or V) the information is encoded into four bits. During compression, as ZP_control 1101 received the first element of any frequency matrix from zig-zag unit 109, which will be encoded as a DC datum with an 8-bit value passed directly to the FIFO/Huffman code bus controller unit 112 for storage in FIFO Memory 114 regardless of whether its value is zero or not. Thereafter, if a non-zero element in the frequency matrix is received by ZP_control 1101 it would be encoded as an AC datum with an 8-bit value and passed to the FIFO/Huffman code bus controller unit 112 for storage in FIFO Memory 114. However, if a zero-value element of the frequency matrix is received, the run length counter 1102 will be initiated to count the number of zero elements following, until the next non-zero element of the frequency matrix is encountered. The count of zeroes is forwarded to the FIFO/Huffman code bus controller unit 112 for storage in FIFO Memory 114 in a run length (RUN) representation. If there is not another non-zero element in the remainder of the frequency matrix, instead of the run length, an EOB (end of block) code is output to the FIFO/Huffman code bus controller unit 112. After every run length or EOB code is output, the run counter 1102 is reset for receiving the next burst of zeroes.

During decompression, the ZUP control unit 1104 examines a stream of encoded data from the FIFO/Huffman code bus controller unit 112, which retrieves the data from FIFO Memory 114. As a DC or AC datum is encountered by the ZUP control unit 1104, the least significant 8 bits of data will be passed to the zig-zag unit 109. However, if a run length datum is encountered, the value of the run length count will be loaded into the run length counter 1102, zeroes will be output to the zig-zag unit 109 as the counter is decremented until it reaches zero. If an EOB datum is encountered, the ZUP control unit 1104 will automatically insert zeroes at its output until the the 64th element, corresponding to the last element of the frequency matrix, is output.

Structure and Operation of the Coder/Decoder Unit

The structure and operation of the coder/decoder unit 111 (FIG. 1) are next described in conjunction with FIGS. 12a and 12b.

The coder unit 111a directs encoding of the data in run-length representation into Huffman codes. The decoder unit 111b provides the reverse operation.

During compression, in order to achieve a high compression ratio of the DCT data coming from the zero packer/unpacker unit 110 the coder unit 111a of the coder/decoder unit 111 provides the translation of zero-packed DCT data in the FIFO memory 114 into a variable length Huffman code representation. The coder unit 111a provides the Huffman coded DCT data to Host Bus Interface Unit (HBIU) 113, which in turn transmits the Huffman encoded data to an external host computer.

During decompression, the decoder unit 111b of the coder/decoder unit 111 receives Huffman-coded data from the HBIU 113, and provides the translation of the variable length Huffman-coded data into zero-packed representation for the decompression operation.

The Coder Unit

FIG. 12a is a schematic diagram for the coder unit 111a (FIG. 1).

During compression, read control unit 1203 asserts a "pop-request" signal to the FIFO/Huffman code bus controller unit 112 to request the next datum for Huffman coding. Data storage unit 1201 then receives from internal bus 116 (FIG. 1) the datum "popped" into data storage unit 1201 for temporary storage, after receiving a "pop-acknowledge" signal from the FIFO/Huffman code bus controller unit 112. Since the coder unit 111a must yield priority of the internal bus 116 to the zero packer/unpacker unit 110, as will be discussed below in conjunction with the FIFO/Huffman code bus controller unit 112, the pop request will remain asserted until a "pop-acknowledge" signal is received from FIFO/Huffman code bus controller unit 112 indicating the data is ready to be latched into data storage 1201 at the data bus 116.

The encoding of data is according to the data type received: encoding types are DC, runlength and AC pair, or EOB. In order to retrieve the Huffman encoding from the FIFO/Huffman code bus controller unit 112, the address unit 1210 provides a 14-bit address consisting of a 2-bit type code (encoding the information of Y or C, AC or DC) and a 12-bit offset into one of the four tables (Y_DC, Y_AC, C_DC and C_AC) according to the encoding scheme. The encoding scheme is discussed in section 7.3.5 et seq. of the JPEG standard, attached hereto as Appendix A. The interested reader is referred to Appendix A for the details of the encoding scheme. The 2-bit type code indicates whether the data type is luminance or chrominance (Y or C), and whether the current datum is an AC term or a DC term in the frequency matrix. According to the 2-bit data type code, one of the four tables (Y_DC, Y_AC, C_DC, and C_AC) is searched for the Huffman code. The difference of the previous DC value in the last frequency matrix and the DC value in the current frequency matrix is used to encode the DC value Huffman code (this method of coding the difference of successive DC values is known as "linear predictor" coding). The organization of the Huffman code tables within FIFO memory 114 will be discussed below in conjunction with the FIFO/Huffman code bus controller unit 112. The "run length" unit 1204 extracts the run length value from the zero-packed representation received from the Zero packer/unpacker unit 110 and combine the next AC value received by the "ACgroup" unit 1206 to form a runlength-AC value combination to be used as a logical address for looking up the Huffman code table.

The Huffman code returned by the FIFO/Huffman code bus controller unit 112 on internal bus 116, and retrieved from the Huffman tables in FIFO Memory 114, is received by the Data storage unit 1201. The code-length unit 1207 examines the returned Huffman code to determine the number of bits used to represent the current datum. Since the Huffman code is of variable length, the Huffman-coded data are concatenated with previous Huffman-coded data and accumulated at the "shift-length" unit 1209 until a 16-bit datum is formed. The "DCfast" unit 1205 contains the last DC value, so that the difference between the last DC value and the current DC value may be readily determined to facilitate the encoding of the DC difference value under the linear predictor method.

Whenever a 16-bit datum is formed, coder 111a halts and requests the host bus interface unit 113 to latch the 16-bit datum from the coderdataout unit 1208. Coder 111a remains in the halt state until the datum is latched and acknowledged by the host bus interface unit 113.

Internal control signals for the coder unit 111a of the coder/decoder unit 111 is provided by the "statemachine" unit 1202.

The Decoder Unit

Each structure of the decoder unit 111b of the coder/decoder unit 111 (FIG. 1) is shown in block diagram form in FIG. 12b.

The following description outlines the decoding process.

During decompression, 2-bit data from the Host Bus Interface Unit (HBIU) 113 (FIG. 1) come into the decoder unit at the input control unit 1250. The "run" bit from the HBIU 113 requests decoding and signals the readiness of a 2-bit datum or bus 1405.

Each 2-bit datum received is sent to the decoder main block 1255, which controls the decoding process. The decoded datum is of variable length, consist of either a "level" datum, a runlength-AC group, or EOB Huffman codes. A level datum is an index encoding a range of amplitude rather than the exact amplitude. The DC value is a fixed length "level" datum. The runlength-AC group consists of an AC group portion and a run length portion. The AC group portion of the runlength-AC group contains a 3-bit group number, which is decoded in the level generator 1254 for the bit length of the significant level datum from HBIU 113 to follow.

If the first bit or both bits of the 2-bit datum from HBIU 113 is "level" data, i.e. significant index of the AC/DC value, the decoding is postponed until two bits of Huffman code is received. That is, if the first bit of the 2-bit datum is "level" and the second bit of the 2-bit datum is Huffman code, then the next 2-bit datum will be read, and decode will proceed using the second bit of the first 2-bit datum, and the first bit of the second 2-bit datum. Decoding is accomplished by looking up the Huffman decode table in FIFO memory 114 using the FIFO/Huffman code bus controller unit 112. The table address generator 1261 provides to the FIFO/Huffman code bus controller unit 112 the 12-bit address into the FIFO memory 114 for the next entry in the decoding table to look up. The returned Huffman decode table entry is stored in the table data buffer 1259. If the datum looked up indicates that further decoding is necessary (i.e. having the "code_done" bit set "0"), the 10-bit "next address" portion of the 12-bit datum is combined with the next 2-bit datum input from the HBIU 113 to generate the 12-bit address for the next Huffman decode table entry.

When the "code done" bit is set "1", it indicates the current datum contains a 5-bit runlength and 3-bit AC group number. The Huffman decode table entry also contains a "code odd" bit which is used by the AC_level order control 1252 to determine the bit order in the next 2-bit input datum to derive the level data. The AC group number is used to determine the bit-length and magnitude of the level data previously received in the AC_level register control 1253. The level generator 1254 the takes the level datum and provides the fully decoded datum, which is forwarded to be written in the FIFO memory 114, through the FIFO write control unit 1258, which interface with the FIFO/Huffman code controller unit 112. The write request is signalled to the FIFO/Huffman code controller unit 112 by asserting the signal "push", which is acknowledged by the FIFO/Huffman code controller unit 112 by asserting the signal "FIFO push enable" after the datum is written.

The data counter 1260 keeps a count of the data decoded to keep track of the datum type and position presently being decoded, i.e. whether the current datum being decoded is an AC or a DC value, the position in the frequency matrix which level is currently being computed, and whether the current block is of Y, U or V pixel type. The runlength register 1286 is used to generate the zero-packed representation of the run length derived from the Huffman decode table. Because the DC level encodes a difference between the previous DC value with the current DC value, the DC_level generator 1257 derives the actual level by adding the difference value to the stored previous DC value to derive current datum. The derived DC value is then updated and stored in DC_level generator 1257 for computing the next DC value.

The decoded DC, AC or runlength data are written into the FIFO memory 114 through the FIFO data write control 258. Since the zero packer/unpacker unit 110 must be given priority on the bus 116 (FIG. 1), data access by the decoder unit 111b must halt until the zero packer/unpacker unit 110 relinquishes its read access on bus 116. Decoder main block 1255 generates a hold signal to the HBIU to hold transfer of the 2-bit datum until the read/write access to the FIFO/Huffman code controller 112 is granted.

Structure and Operation of the FIFO/Huffman Code Bus Controller Unit

The structure and operation of the FIFO/Huffman code controller unit 112, together with an off-chip FIFO memory array 114 are next described in conjunction with FIGS. 13a and 13b.

The FIFO/Huffman code bus controller unit (FIFOC) 112, shown in FIG. 13a, interfaces with the Coder/decoder unit 111, the zero packer/unpacker unit 110, and host bus interface unit 113. The FIFOC 112 provides the interface to the off-chip first-in-first-out (FIFO) memory implemented in a 16K×12 SRAM array 114 (FIG. 1).

The implementation of the FIFO Memory 114 off-chip is a design choice involving engineering trade-off between complexity of control and efficient use of on-chip silicon real estate. Another embodiment of the present invention includes an on-chip SRAM array to implement the FIFO Memory 114. By moving the FIFO Memory 114 on-chip, the control of data flow may be greatly simplified by using a dual port SRAM array as the FIFO memory. This dual port SRAM arrangement allows independent accesses by the zero packer/unpacker unit 110 and the coder/decoder unit 111, instead of sharing a common internal bus 116.

During compression, the off-chip SRAM array 114 contains the memory buffer for temporary storage for the 2-dimensional DCT data from the zero packer/unpacker unit 110. In addition, the tables of Huffman code which are used to encode the data into further compressed representation of Huffman code are also stored in this SRAM array 114.

During decompression, the off-chip SRAM array 114 contains the memory buffer for temporary storage of the decoded data ready for the unpack operation in the zero packer/unpacker unit 110. In addition, the tables used for decoding Huffman coded DCT data are also stored in the SRAM array 114.

The memory maps for the SRAM array 114 are shown in FIG. 13b; the memory map for compression is shown on the left, and the memory map for decompression is shown on the right. In this embodiment, during compression, address locations (hexadecimal) 0000-0FFF (1350a), 1000-1FFF (1351a), 2000-21FF (1352a), and 2200-23FF (1353a) are respectively reserved for Huffman code tables: the AC values of the luminance (Y) matrix, the AC values of the chrominance matrices, the DC values of the luminance matrix, and the DC values of the chrominance (U or V) matrices. As a result, the rest of SRAM array 114—a 7K×12 memory array 1354a—is allocated as a FIFO memory buffer 1354a for the zero-packed representation datum.

During decompression, addresses 0000-03FF (1352b), 0400-07FF (1350b), 0800-0BFF (1353b), 0C00-0FFF are reserved for tables used in decoding Huffman codes: for DC values of the luminance (Y) matrix, the AC values of the luminance matrix, the DC values of the chrominance (U or V) matrices, and the AC values of the chrominance matrices, respectively. Since the space allocated for tables are much smaller during decompression, a 12K×12 area 1354b is available as the FIFO memory buffer 1354b.

FIG. 13a is a schematic diagram of the FIFOC unit 112. The SRAM array 114 may be directly accessed for read or write by a host computer via busses 1313 and 1319 (for addresses and data respectively), which are each a part of the host bus 115. The read or write request from the host computer is decoded in configuration decoder 1307. Address converter 1306 maps the logical address supplied by the host computer on bus 1313 to the physical addresses of the SRAM array 114. Together with the bits 9:1 of bus 1313, a host computer may load the Huffman coding and decoding tables 1350a-1353a or 1350b-1353b or the FIFO memory buffers 1354a or 1354b.

During compression, 12-bit data arrive from the zero packer/unpacker unit 110 on bus 116. During decompression, 12-bit data arrive from the coder/decoder unit 111 on bus 1319. Bus 1319 is also a part of host bus 115.

Since the FIFO memory 114 is organized as a first-in-first-out memory, to facilitate access, register 1304 contains the memory address for the next datum readable from the FIFO memory buffer 1354a or 1354b, and register 1305 contains the memory address for the next memory location available for write in the FIFO memory buffers 1354a or 1354b. The next read and write addresses are respectively generated by address counters 1302 and 1303. Each counter is incremented after a read (counter 1302) or write (counter 1303) is completed.

Logic unit 1301 provides the control signals for SRAM memory array 114 and the operations of the FIFOC unit 112. Up-down counter 1308 contains read and write address limits of the FIFO memory buffers 1354a or 1354b. FIFO memory tag unit 1309 provides status signals indicating whether the FIFO memory buffer is empty, full, quarter-full, half-full or three-quarters full.

Address decode unit 1310 interfaces with the off-chip SRAM array 114, and supplies the read and write addresses into the FIFO memory 114. A 12-bit datum read is returned from SRAM array 114 on bus 1318, and a 12-bit datum to be written is supplied to the SRAM array 114 on bus 1317. Busses 1317 and 1318 together form the internal bus 116 shown in FIG. 1.

Upon initialization, the host computer loads the Huffman code or decode tables 1350a-1353a or 1350b-1353b, dependent upon whether the operation is compression or decompression, and loads configuration information into configuration decode unit 1307 to synchronize the FIFOC unit 112 with the rest of the chip.

During compression, 12-bit data arrive from zero packer/unpacker unit 110 and are written sequentially into the SRAM array 114. The FIFO memory buffer 1354a fills as the incoming data are latched from bus 1319. Since a request from the zero packer/unpacker unit 110 has the highest priority, data on bus 116 from the zero packer zero unpacker unit 110 are automatically given priority to access SRAM array (FIFO Memory) 114 over coder/decoder 111, so as to avoid loss of incoming data.

Data in the FIFO memory buffer 1354a decrease as they are read by coder 111a of the coder/decoder unit 111, which requests read by asserting the "pop-request" signal. The coder 111a also request reads from the Huffman code tables according to the value of the datum read by providing the read address on the bus 1315. The code/decoder unit 111 then encodes the datum in Huffman code for storage by an external computer in a mass storage medium.

During decompression, 12-bit decoded data arrive from the decoder 111b of the coder/decoder unit 111 to be stored in the FIFO memory buffer 1354b by asserting a "push" request. The decoder 111b also requests reading of the Huffman decode tables by providing an address on bus 1314. The entry read from the Huffman decode table allows the decoder 111b to decode a compressed Huffman-coded datum provided by an external host computer.

Structure and Operation of the Host Bus Interface Unit

Figure 14:
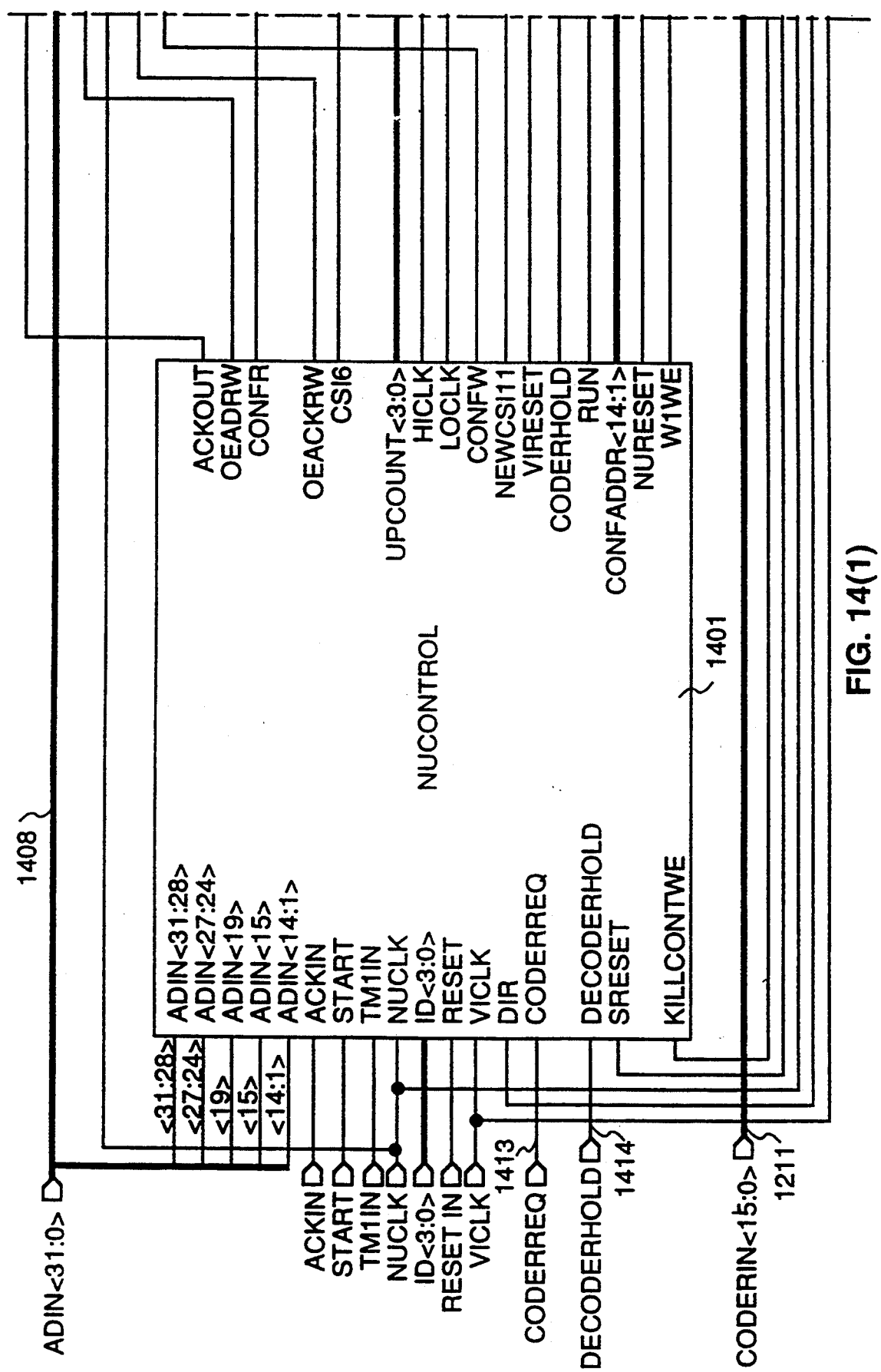
FIGS. 14(1)–14(3) show a schematic diagram of the host bus interface unit 113 in the embodiment shown in FIG. 1.
Figure 14:
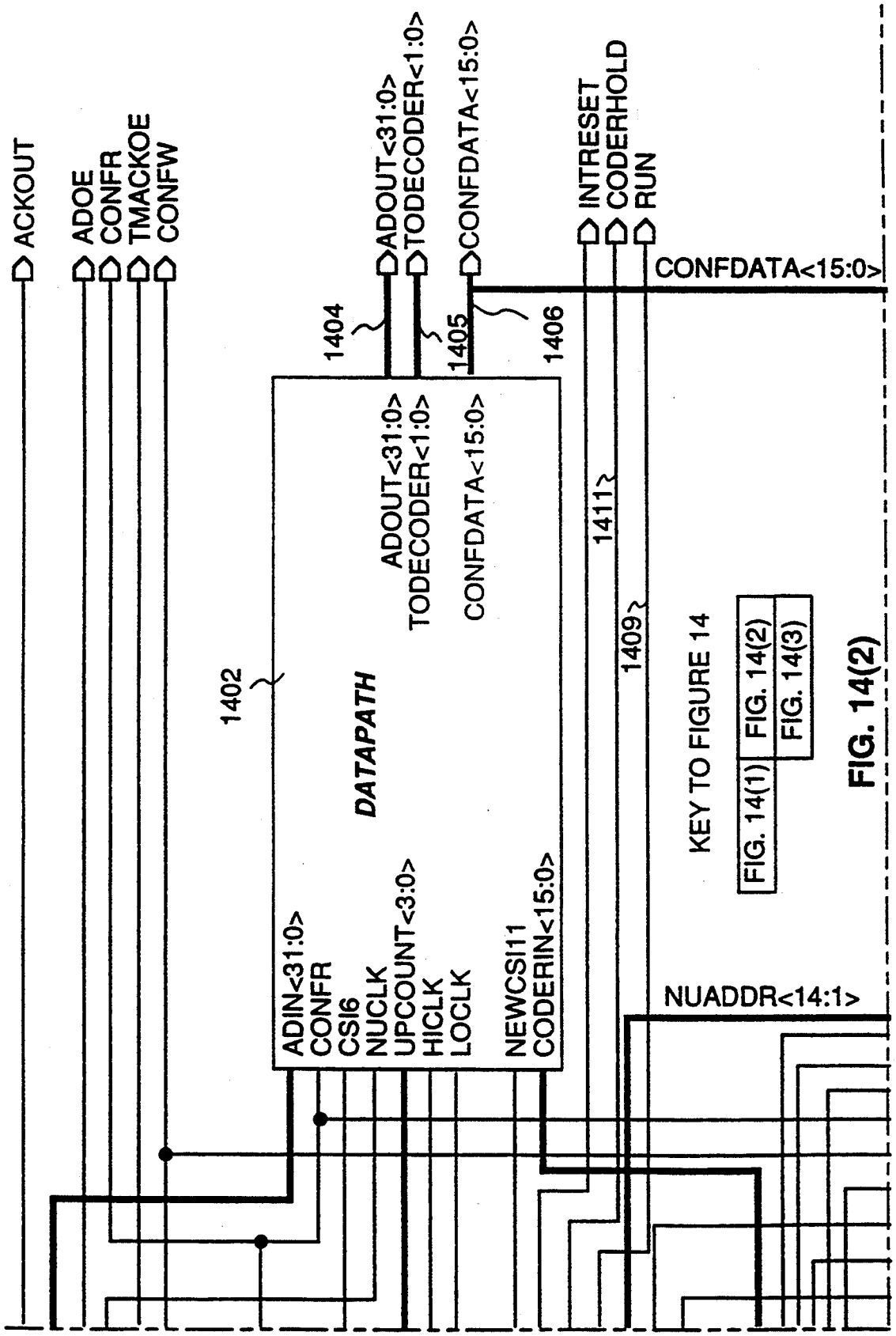
Figure 14:
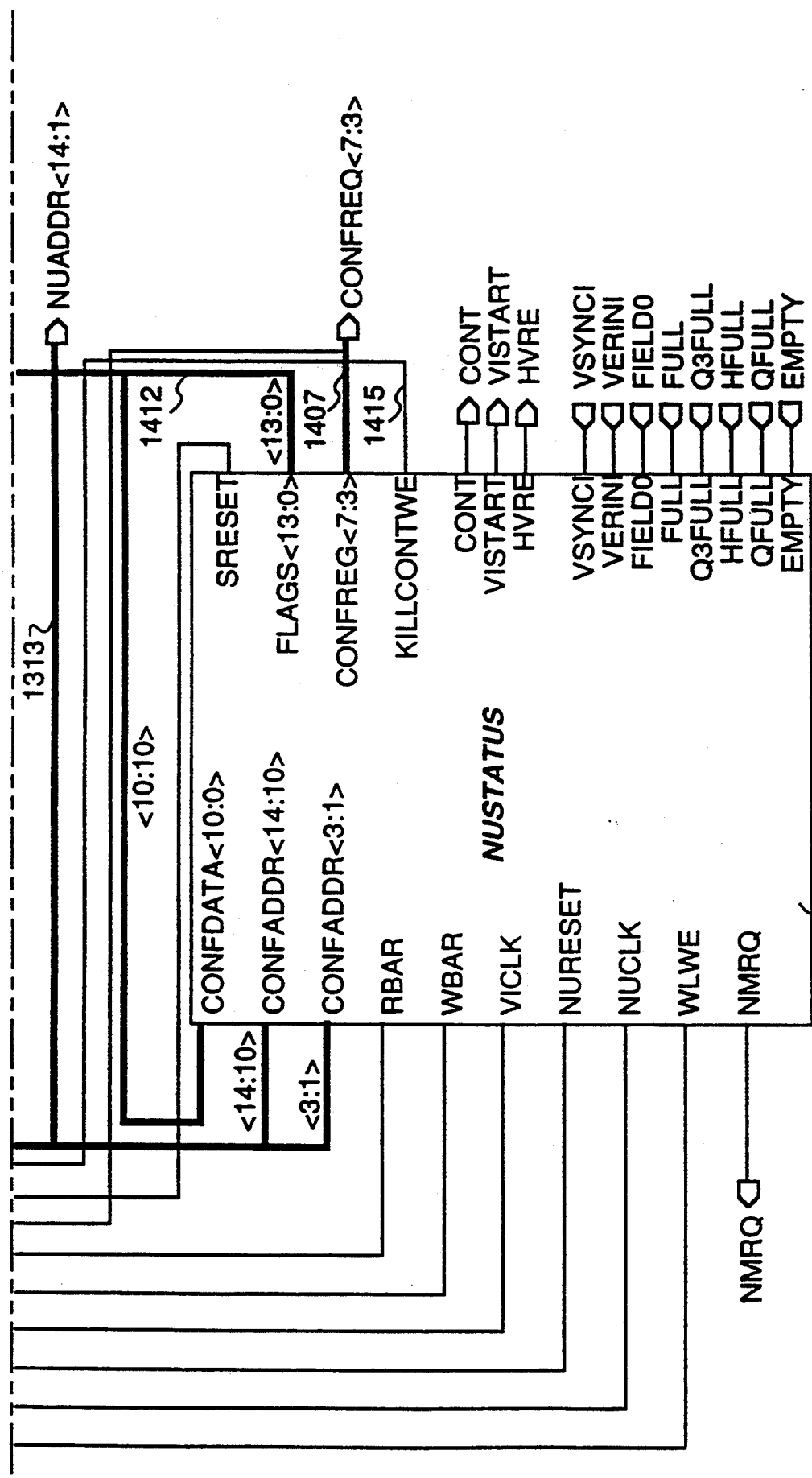

The structure and operation of the host bus interface unit (HBIU) 113 are next described in conjunction with FIG. 14.

FIG. 14 shows a block diagram of the HBIU 113. The main functions of the host bus interface are implemented by the three blocks: nucontrol block 1401, datapath block 1402, and nustatus block 1403.

The nucontrol block 1401 provides control signals for interfacing with a host computer and with the coder/decoder unit 111. The control signals follow the NuBus industry standard (see below). The datapath block 1402 provides the interface to two 32-bit busses 1404 (output) and 1408 (input), a 2-bit output bus 1405 to the decoder unit 111b, a 16-bit input bus 1211 to the coder unit 111a, and a 16-bit bi-directional configuration bus 1406 for interface with the various units 102-112 shown in FIG. 1 for synchronization and control purposes, for loading the Huffman code/decode tables into FIFO memory 104, and for the loading the quantization/dequantization coefficients into the quantizer unit 108. The datapath block 1402 also provides handshaking signals for these bus transactions.

The nustatus block 1403 monitors the status of the FIFO memory 114, and provides a 14-bit output of status flags in bus 1412, which is part of the output bus 1406. The nustatus block 1403 also provides the register addresses for loading configuration registers throughout the chip, such as configuration register 608 in the DCT row storage unit 105. Global configuration values are provided on 5-bit bus 1407. These configuration values contain information such as compression or decompression, 4:1:1 or 4:2:2 data format mode etc.

The host bus interface unit 113 implements the "NuBus" communication standard for communicating with a host computer. This standard is described in ANSI/IEEE standard 1196-1987.

Internally, the HBIU 113 interfaces with the coder/decoder unit 111. During compression mode, the coder 111a sends the variable length Huffman-coded data sixteen bits at a time, and the HBIU 113 forwards a Huffman-coded 32-bit datum (comprising two 16-bit data from coder 111a) on bus 1404 to the host computer. The coder 111a asserts status signal "coderreq" 1413 when a 16-bit segment of Huffman code forming a 16-bit datum is ready on bus 1211 to be latched, unless "coderhold" on line 1411 is asserted by the HBIU 113. Coder 111a expects the data to be latched in the same clock period as "coderreq" is asserted. Therefore, the coder 111a resets the data count automatically at the end of the clock period. When "coderhold" is asserted by the HBIU 113, it signals that the external host computer has not latched the last 32-bit datum from HBIU 113. Coder 111a will halt encoding until its 16-bit datum is latched after the next opportunity to assert the coderreq signal. Meanwhile, data output of zero packer/unpacker unit 110 accumulate in FIFO Memory 114.

During decompression mode, Huffman-coded compressed data are sent from the host computer thirty two bits at a time on bus 1408. The datapath 1402 sends the thirty two bits received from the host computer 2 bits at a time to the decoder unit 111b on bus 1405. The "run" bit 1409 signals the decoder unit 111b that a 2-bit datum is ready on bus 1405. The 2-bit datum stays on bus 1405 unit until the decoder 111b latches the 2-bit datum and signals the latching by asserting "decoderhold" bit 1414 indicating readiness for the next 2-bit datum.

During initialization, the dequantization or quantization coefficients are loaded into the YU_table 108-1 of the quantizer unit 108 (FIG. 9a), and the Huffman code or or decode tables are loaded into SRAM array 114. The "cont" bit 1415 request the FIFOC unit 112 for access to the external SRAM array 114. The addresses and data are generated at the datapath unit 1402.

Furthermore, through the system of configuration registers accessible from the HBIU 113, a host computer may monitor, diagnose or test control and status registers throughout the chip, random access memory arrays throughout the chip, and the external SRAM array 114.

An Application of the Present Invention

One application of the present invention is found in the implementation of local memories of displays or printers. A video display device usually has a frame buffer for refresh of the display. A similar kind of buffer, called page buffer, is used in a printer to compose the printed image. As discussed above, an uncompressed image requires a large amount of memory. For example, a color printer at 400 dpi at 24 bits per pixel (i.e. 8 bits for each of the intensities for red, green and blue) will require 48 megabytes of storage for a standard $8\frac{1}{2} \times 11$ image. The required amount of memory can be drastically reduced by storing compressed data in the frame or page buffers. However, decompressed data must be made available to the display or the print head when needed for output purpose. The present invention described above, such as the embodiment shown in FIG. 1, will allow decompression of data at a rate sufficient to support display refresh and composition of printed image in a printer.

Figure 16:
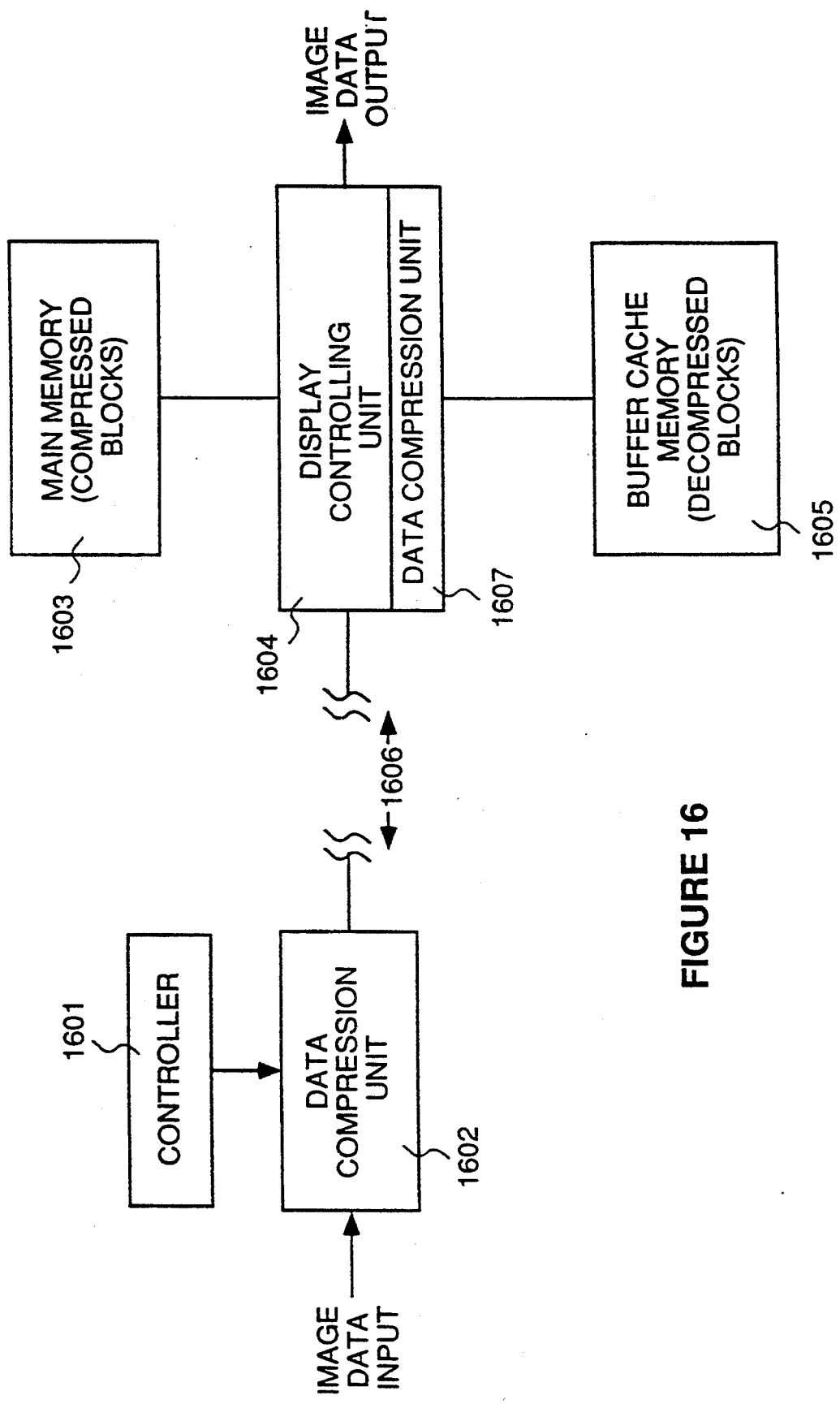
FIG. 16 shows a scheme by which the speed of data compression and decompression achieved by the present invention may be used to provide image reproduction sending only compressed data over the communication channel.

An embodiment of the present invention for applications in frame buffers for display refresh, and for printed image composition in printers is shown in FIG. 16. A source of compressed image data is provided by data compression unit 1602, under direction from a controller 1601. Controller 1601 may be a conventional computer, or any source suitable for providing image data for a display or for a printer. The data compression unit 1602 may be implemented by the embodiment of the present invention shown in FIG. 1. The compressed data are sent in small packets (e.g. 8 pixel by 8 pixel blocks as described above) over a suitable communication channel 1606, which can be as simple as a cable, to the display or printer controlling device 1604. Since compressed data rather than uncompressed data is sent over the communication channel 1606, the bandwidth required for sending entire images is drastically reduced by a factor equal to the compression ratio. As discussed previously in the Description of Prior Art section, a compression ratio of 30 is desirable, and is attainable according to the embodiment of the present invention discussed in conjunction with FIG. 1. This advantage is especially beneficial to applications involving large amounts of image data, which must be made available with certain time limits, such as applications in high speed printing or in a display of motion sequences.

The compressed data are stored in the main memory 1603 associated with the display or printer controlling device 604. The compressed data memory maps into the physical locality of the image displayed or printed, i.e. the memory location containing the compressed data representing a portion of the image may be simply determined and randomly accessed by the display controller unit 1604. Because the compressed data are stored in small packets, compressed data corresponding to small areas in the image may be updated locally by the display controller unit 1604 without decompressing parts of the image not affected by the update. This is especially useful for intelligent display applications which allow incremental updates to the image.

The compressed data stored in main memory 1603 is decompressed by decompression unit 1607, on demand of the display or printer controlling device 1604 when required for the display or printing purpose. The decompressed image are stored in the cache memory 1605. Because the physical processes of painting a screen or printing an image are relatively slow processes, the bandwidth of decompressed data needed to supply for the needs of these functions can be easily satisfied by a high speed decompression unit, such as the embodiment of the present invention shown in FIG. 1.

Because the cost of memory in frame buffer or page buffer applications is a significant portion of the total cost of a printer or display, the embodiment of the present invention shown in FIG. 16 provides enormous cost advantage, and allows applications of image processing to areas hitherto deemed technically difficult or economically impractical.

The above detailed description is intended to be exemplary and not limiting. To the person skilled in the art, the above discussion will suggest many variations and modifications within the scope of the present invention.

We claim:

1. A system for data compression and decompression, comprising:

a video interface for receiving and transmitting digitized images as a stream of composite pixels, each composite pixel being represented by data of a plurality of chrominance and luminance component types;

a block memory control circuit coupled to said video interface for receiving into a memory circuit, during data compression, said stream of composite pixels and sorting said stream of composite pixels into single-component type data blocks, and for receiving into said memory circuit and reconstituting, during data decompression, said single-component type data blocks into said stream of composite pixels;

a discrete cosine transform circuit, coupled to receive said single-component type data blocks and a stream of dequantized coefficients, for performing, during data compression, a 2-dimensional discrete cosine transform on each of said single-component type data blocks to compute coefficients of said 2-dimensional discrete cosine transform, and for performing on said stream of dequantized coefficients, during data decompression, a 2-dimensional inverse discrete cosine transform to provide as output data said single-component type data blocks;

a quantization circuit for quantizing said coefficients of said 2-dimensional discrete cosine transform to provide quantized coefficients of said 2-dimensional discrete cosine transform, and for dequantizing, during data decompression, said quantized coefficients of said 2-dimensional discrete cosine transform to provide said stream of dequantized coefficients;

a zig-zag circuit coupled to receive and to transmit said quantized coefficients of said 2-dimensional discrete cosine transform for rearranging, during data compression, said quantized coefficients of said 2-dimensional discrete cosine transform from "sequential" order into "zig-zag" order, and for rearranging, during data decompression, said zig-zag ordered quantized coefficients of said 2-dimensional discrete cosine transform from a "zig-zag" order to a "sequential" order;

a data packing and unpacking circuit coupled to receive and to transmit said "zig-zag" ordered quantized coefficients of said 2-dimensional discrete cosine transform for packing, during data compression, said "zig-zag" ordered quantized coefficients of said 2-dimensional discrete cosine transform as run length-represented coefficients of said 2-dimensional discrete cosine transform, and for unpacking, during data decompression, said run length-represented coefficients of said 2-dimensional discrete cosine transform to said "zig-zag" order quantized coefficients;

a Huffman coding/decoding circuit, coupled to receive and to transmit said run-length represented coefficients of said 2-dimensional discrete cosine transform, for coding, during data compression, said run length-represented coefficients of said 2-dimensional discrete cosine transform into Huffman codes, and for decoding, during data decompression, said Huffman codes into said run length-represented coefficients of said 2-dimensional discrete cosine transform; and a host interface for receiving control data from a host computer, said host interface being coupled to said video interface, said block memory control circuit, said discrete cosine transform circuit, said quantization circuit, said zig-zag circuit, said data packing and unpacking circuit and said Huffman coding/decoding circuit, to provide said control data to control the operations of said video interface, said block memory control circuit, said discrete cosine transform circuit, said quantization circuit, said zig-zag circuit, said data packing and unpacking circuit and said Huffman coding/decoding circuit.

2. A system as in claim 1, wherein said video interface comprises:

a video space conversion circuit for translating said stream of composite pixels from a color space ("RGB") representation to a luminance-chrominance space ("YUV") representation and vice versa; and a data synchronization circuit for providing synchronization signals when transmitting said stream of composite pixels during data decompression.

3. A system as in claim 2, wherein said video interface further comprises an external buffer memory address generation circuit for generating an external buffer memory address for storing into and retrieving from an external video memory buffer said stream of composite pixels.

4. A system as in claim 1, wherein said discrete cosine transform circuit comprises:

a processor for selectably providing as output data coefficients of a 1-dimensional discrete cosine transform and coefficients of a 1-dimensional inverse discrete cosine transform;

a row storage circuit for temporarily storing intermediate data of a 2-dimensional discrete cosine transform, and intermediate data of a 2-dimensional inverse discrete cosine transform;

an input selection circuit for alternatively receiving, during computation of a 2-dimensional discrete cosine transform, data from said block memory control circuit and intermediate data of a 2-dimensional discrete cosine transform from said row storage circuit for transmitting to said processor, and for alternatively receiving, during computation of a 2-dimensional inverse discrete cosine transform, dequantized coefficients from said quantization circuit and said intermediate data of a 2-dimensional inverse discrete cosine transform from said row storage circuit for transmitting to said processor; and a row/column separation circuit for separating from said output data of said processor, during computation of said 2-dimensional discrete cosine transform, coefficients of a 2-dimensional discrete cosine transform and said intermediate data of a 2-dimensional discrete cosine transform, transmitting said coefficients of a 2-dimensional discrete cosine transform as output data to said quantization circuit and said intermediate data of said 2-dimensional discrete cosine transform to said row storage circuit, and for separating from said output data of said processor, during computation of said 2-dimensional inverse discrete cosine transform, coefficients of a 2-dimensional inverse discrete cosine transform and said intermediate data of a 2-dimensional inverse discrete cosine transform, transmitting said coefficients of a 2-dimensional inverse discrete cosine transform to said block memory control circuit and said intermediate data of said 2-dimensional inverse discrete cosine transform to said row storage circuit.

5. A system as in claim 4 wherein said processor comprises:

a first plurality of latches for receiving a first, second, third and fourth data from said input selection circuit;

a first summing circuit, coupled to said first plurality of latches, for selectably computing a first sum or a difference of said first and second data, and for selectably computing a second sum or difference for said third and fourth data;

a second plurality of latches, each coupled to said first summing circuit, for receiving, storing and transmitting as a first result said first sum or difference and as a second result said second sum or difference;

a first multiplication circuit, coupled to said second plurality of latches, for selectably performing a first multiplication of said first result with $2\cos(pi/8)$, $2\cos(pi/4)$, $2\cos(3pi/8)$ and 1;

a third plurality of latches, coupled to said first multiplication circuit and said second plurality of latches, for receiving, storing and transmitting result of said first multiplication and for receiving from said second plurality of latches, storing and transmitting said second result;

a first multiplexor coupled to said first multiplication circuit and said second plurality of latches, for selecting a first multiplexed datum from said result of said first multiplication and said first result in said second plurality of latches;

a second multiplexor coupled to said first multiplication circuit and said third plurality of latches, for selecting a second multiplexed datum from said result of said first multiplication and said second result in said third plurality of latches;

a second summing circuit, coupled to said first multiplexor and said third plurality of latches for computing a third sum or difference of said first multiplexed datum and said second result stored in said third plurality of of latches;

a third multiplexor, coupled to said second summing circuit and said third plurality of latches, for selecting a third multiplexed datum from said second result stored in said third plurality of latches and said third sum or difference;

a fourth plurality of latches, coupled to said second and third multiplexors, for receiving said second multiplexed datum and said third multiplexed datum;

a group of multiplexors, coupled to said fourth plurality of latches, for selecting from said fourth plurality of latches a fourth, fifth, sixth and seventh multiplexed data;

a third summing circuit, coupled to said group of multiplexors, for selectably providing a fourth sum or difference of said fourth and fifth multiplexed data, and for selectably providing a fifth sum or difference of said sixth and seventh multiplexed data;

a fifth plurality of latches, coupled to said third summing circuit, for receiving and storing said fourth sum or difference, and said fifth sum or difference;

a second multiplication circuit, coupled to said third summing circuit, for selectably performing a second multiplication of said fourth sum and 2cos(-pi/8), 2cos(pi/4), 2cos(3pi/8), and 1;

a sixth plurality of latches, coupled to said second multiplication circuit and said third summing circuit, for receiving and storing the result of said second multiplication and said fifth sum or difference;

a fourth multiplexor, coupled to said third summing circuit and said sixth plurality of latches, for selecting an eighth multiplexed datum from said result of said second multiplication stored in said sixth plurality of latches and said fourth sum or difference;

a fourth summing circuit, coupled to said fourth multiplexor and said sixth plurality of latches, for computing a sixth sum or difference of said eighth multiplexed datum and said fifth sum or difference stored in said sixth plurality of latches;

a fifth multiplexor, coupled to said sixth plurality of latches, for selecting a ninth multiplexed datum from said fifth sum or difference stored in said sixth plurality of latches;

a sixth multiplexor, coupled to said fourth summing circuit and sixth plurality of latches for selecting a tenth multiplexed datum from said sixth sum or difference and said fifth sum or difference stored in said sixth plurality of latches;

a seventh plurality of latches, coupled to said fifth and said sixth multiplexors, for receiving and storing said ninth multiplexed datum and said tenth multiplexed datum;

a fifth summing circuit, coupled to said seventh plurality of latches, for providing a seventh sum of said ninth and tenth multiplexed data, and for selectably providing an eighth sum or difference of said ninth and tenth multiplexed data; and an eighth plurality of latches, coupled to said fifth summing circuit, for receiving and storing said seventh sum and said eighth sum, said seventh sum and said eighth sum being provided as output to said row/column separation circuit.

6. A system as in claim 4, wherein said row storage circuit comprises:
   a memory circuit for storing intermediate data of a 2-dimensional discrete cosine transform during data compression and for storing intermediate data for a 2-dimensional inverse discrete cosine transform during data decompression; and
   an address generator means for generating addresses for read/write access to said memory circuit.

7. A system as in claim 6, wherein said memory circuit is accessed two addresses at a time, said memory circuit comprises:
   an odd plane of memory cells, for storing a first datum at one address of said two addresses; and
   an even plane of memory cells, for storing a second datum at the other address of said two addresses.

8. A system as in claim 1, wherein said Huffman coding/decoding circuit comprises:
   a first-in-first-out (FIFO) memory for storing said run length-represented coefficients of said 2-dimensional discrete cosine transform;
   a Huffman table storage circuit for storing and providing Huffman code encoding tables during compression and Huffman code decoding tables during decompression;
   a coding circuit, coupled to said FIFO memory and said Huffman table storage circuit, for retrieving from said FIFO memory said run length-represented coefficients, and for translating said run length-represented coefficients into Huffman codes using said Huffman code encoding tables; and
   a decoding, coupled to said FIFO memory and said Huffman table storage circuit for translating said Huffman codes into said run length-represented coefficients using said Huffman code decoding tables, and for depositing said run length-represented coefficients into said FIFO memory.

9. A system as in claim 8, wherein said coding circuit comprises:
   a read control circuit for retrieving from said FIFO memory, a run length-represented coefficient;
   a coding address circuit, coupled to receive said run-length represented coefficient, for providing an address constructed from said run length-represented coefficient to said Huffman table storage circuit to access an entry in said Huffman code encoding tables; and
   Huffman code output circuit, coupled to said Huffman table storage circuit, for providing said entry in said Huffman code encoding tables as an output Huffman code.

10. A system as in claim 8, wherein said decoding circuit comprises:
- a decoding address circuit, receiving a Huffman code, for providing an address constructed from either said Huffman code or a next address to said Huffman table storage circuit to retrieve an entry in said Huffman code decoding tables;
- a decoding control circuit, coupled to said Huffman table storage means, for examining said entry of said Huffman code decoding tables to determine if said entry of said Huffman code decoding tables is a run-length represented coefficient or comprises a next address, said decoding control circuit providing said next address to said decoding circuit when said entry of said Huffman code decoding table comprises a next address; and
- a Huffman decode output circuit, coupled to said Huffman table storage circuit and said decode control circuit for providing said run-length represented coefficient of said 2-dimensional discrete cosine transform as an output Huffman decoded datum.

11. An apparatus for performing variable length coding/decoding on fixed length data comprising:
- a first-in-first-out (FIFO) memory for storing said fixed length data;
- a variable length code storage circuit for storing and providing a variable length code encoding table during encoding and a variable length code decoding table during decoding;
- a coding circuit, coupled to said FIFO memory and said variable length code storage circuit, for retrieving from said FIFO memory a fixed length datum, and translating said fixed length datum into a variable length code using said variable length code encoding table; and
- a decoding circuit, coupled to said variable length table storage circuit and said FIFO memory, for translating said variable length code into a fixed length datum using said variable length code decoding table, and for storing said fixed length datum into said FIFO memory.

12. An apparatus as in claim 11, wherein said coding circuit comprises:
- a coding address circuit, receiving a fixed length datum from said FIFO memory, for providing an address constructed from said fixed length datum to said variable length code storage circuit to retrieve an entry in said variable length code encoding table; and
- a variable length code output circuit, coupled to said variable length table storage circuit, for providing said entry in said variable length code encoding table as an output variable length code.

13. An apparatus as in claim 11, wherein said decoding circuit comprises:
- a decoding address circuit, receiving a variable length code, for providing an address constructed from either said variable length code or a next address to said variable length table storage circuit to retrieve an entry in said variable length code decoding table;
- a decoding control circuit, coupled to said decoding address circuit, for examining said entry of said variable length code decoding table to determine if said entry of said variable length code decoding table is a fixed length datum comprises a next address, and for providing said next address to said decoding address circuit when said entry of said variable length code decoding table comprises a next address; and
- variable length code decode output circuit, coupled to said FIFO memory, for providing said fixed length datum into said FIFO memory as an output fixed length decoded datum.

14. A method for providing video data to a video output device, comprising the steps of:
- providing compressed data to said video output device in a plurality of blocks of compressed data, said compressed data mapped to physical areas of an image, said plurality of blocks of compressed data cover said image entirely;
- storing said compressed data in a first memory inside said video output device;
- providing a block of decompressed data by accessing said first memory for a block of compressed data and performing decompression on said block of compressed data;
- storing said block of decompressed data in a second memory, said second memory holding only blocks of decompressed data corresponding to a portion of said image; and
- providing as output said portion of said image using said decompressed data stored in said second memory.

15. An apparatus for providing video data to a video output device, comprising:
- means for providing compressed data to said video output device as a plurality of blocks of compressed data, said compressed data mapped to physical areas of an image, said plurality of blocks of compressed data covering said image entirely;
- means, coupled to receive said blocks of compressed data from said means for providing compressed data, for storing said compressed data in a first memory inside said video output device;
- means, coupled to said first memory, for providing a block of decompressed data by accessing said first memory for a block of compressed data and performing decompression on said block of compressed data;
- means, coupled to said means for providing a block of decompressed data and receiving said block of decompressed data, for storing said block of decompressed data in a second memory, said second memory holding only blocks of decompressed data corresponding to a portion of said image; and
- means, coupled to said means for storing said block of decompressed data, for providing as output said portion of said image using said decompressed data stored in said second memory.

16. A method for data compression and decompression, comprising:
- providing a video interface means for receiving and transmitting digitized images;
- providing a discrete cosine transform means for performing, during data compression, a 2-dimensional discrete cosine transform on data received by said video interface mans, and providing coefficients of said 2-dimensional discrete cosine transform, and for performing, during data decompression, a 2-dimensional inverse discrete cosine transform, and providing as output data said coefficients of said 2-dimensional inverse discrete cosine transform to said video interface for transmission as digitized images;

providing a quantization means for attenuating, during data compression, higher frequency coefficients of said 2-dimensional discrete cosine transform, and for partially restoring, during data decompression, said higher frequency coefficients of said 2-dimensional discrete cosine transform, in preparation for said 2-dimensional inverse discrete cosine transform;

providing a zig-zag means for rearranging, during data compression, said coefficients of said 2-dimensional discrete cosine transform from "sequential" order into "zig-zag" order, and for rearranging, during data decompression, said zig-zag ordered coefficients of said 2-dimensional discrete cosine transform from a "zig-zag" order to a "sequential" order;

providing a data packing and unpacking means for packing, during data compression, said "zig-zag" ordered coefficients of said 2-dimensional discrete cosine transform as run length-represented coefficients of said 2-dimensional discrete cosine transform, said run length-represented coefficients of said 2-dimensional discrete cosine transform represent runs of zero coefficients as run lengths of zero coefficients, and for unpacking, during data decompression, said run length-represented coefficients of said 2-dimensional discrete cosine transform to said "zig-zag" ordered coefficients of said 2-dimensional discrete cosine transform;

providing a Huffman coding/decoding means for coding, during data compression, said run length-represented coefficients of said 2-dimensional discrete cosine transform into Huffman codes, and for decoding, during data decompression, said Huffman codes into said run length-represented coefficients of said 2-dimensional discrete cosine transform;

providing a host interface means for transmitting, during data compression, said Huffman codes to a host computer, and for retrieving, during data decompression, said Huffman codes from a host computer.

* * * * *

UNITED STATES PATENT AND TRADEMARK OFFICE
CERTIFICATE OF CORRECTION

PATENT NO. : 5,341,318

DATED : August 23, 1994

INVENTOR(S) : Balkanski, et al

It is certified that error appears in the above-indentified patent and that said Letters Patent is hereby corrected as shown below:

Col. 7, lines 27, 30, 38, 39, 40, 56 "x[n]" should read --$\tilde{x}[n]$--.

Col. 7, lines 40, 46, 51, 56, 63; "X[k]" should read --$\tilde{X}[k]$--.

Col. 7, lines 58 and 59, Equation (3), (4) should read $$\tilde{X}[k] = -\tilde{X}[2n-k], \text{ and } \tilde{X}[-k] = \tilde{X}[k]$$

Col. 8, lines 1, 8, 15, "X[k]" should read --$\tilde{X}[k]$--.

Col. 8, lines 17, 21, "x[n]" should read --$\tilde{x}[n]$--.

Col. 10, line 40, equation should read $$--cos\frac{\pi\ell}{N}--$$

Col. 11, lines 16 and 17, delete "x[n]" and insert --$\tilde{x}[n]$--

Col. 24, line 5, delete "hot" and insert --bot--.

UNITED STATES PATENT AND TRADEMARK OFFICE
CERTIFICATE OF CORRECTION

PATENT NO. : 5,341,318
DATED : August 23, 1994
INVENTOR(S) : Balkanski, et al

It is certified that error appears in the above-indentified patent and that said Letters Patent is hereby corrected as shown below:

Col. 60, line 61, Claim 16, delete "mans" and insert --means--.

Signed and Sealed this

Eighteenth Day of July, 1995

BRUCE LEHMAN

*Attest:*

*Attesting Officer*     *Commissioner of Patents and Trademarks*